US012795667B2

(12) United States Patent
Zhu et al.

(10) Patent No.: US 12,795,667 B2
(45) Date of Patent: Nov. 10, 2026

(54) PDSCH RECEPTION WITH TRP SWITCHING

(71) Applicant: Samsung Electronics Co., Ltd., Suwon-si (KR)

(72) Inventors: Dalin Zhu, Allen, TX (US); Emad Nader Farag, Flanders, NJ (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 18/426,001

(22) Filed: Jan. 29, 2024

(65) Prior Publication Data

US 2024/0276491 A1 Aug. 15, 2024

Related U.S. Application Data

(60) Provisional application No. 63/602,915, filed on Nov. 27, 2023, provisional application No. 63/546,403, filed on Oct. 30, 2023, provisional application No. 63/531,471, filed on Aug. 8, 2023, provisional application No. 63/468,682, filed on May 24, 2023, provisional application No. 63/466,176, filed on May 12, 2023, provisional application No. 63/451,425, (Continued)

(51) Int. Cl.
*H04W 72/1273* (2023.01)
*H04W 72/232* (2023.01)

(52) U.S. Cl.
CPC ..... *H04W 72/1273* (2013.01); *H04W 72/232* (2023.01)

(58) Field of Classification Search
CPC ........... H04W 72/1273; H04W 72/232; H04B 7/06968; H04B 7/06952; H04L 5/0023; H04L 5/0044; H04L 5/0094
See application file for complete search history.

(56) References Cited

U.S. PATENT DOCUMENTS

2020/0359243 A1* 11/2020 Zhou .................... H04B 7/0626
2021/0084624 A1* 3/2021 Zhou ................ H04W 72/0446
(Continued)

FOREIGN PATENT DOCUMENTS

WO 2021203300 A1 10/2021

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
(Continued)

*Primary Examiner* — Rina C Pancholi

(57) ABSTRACT

Methods and apparatuses for physical downlink shared channel (PDSCH) reception with transmission and reception point (TRP) switching. A method performed by a user equipment (UE) includes receiving a threshold to indicate a transmission configuration indication (TCI) state selection time and receiving downlink control information (DCI) that schedules a first PDSCH with a scheduling offset less than or equal to the threshold. The method further includes identifying a value of a frequency range index and determining, based on the value of the frequency range index and a capability, to receive the first PDSCH with a first TCI state or a second TCI state. The first and second TCI states are joint or downlink (DL) TCI states.

12 Claims, 7 Drawing Sheets

Related U.S. Application Data filed on Mar. 10, 2023, provisional application No. 63/449,205, filed on Mar. 1, 2023, provisional application No. 63/445,215, filed on Feb. 13, 2023.

(56) References Cited

U.S. PATENT DOCUMENTS

| | | | | |
|---|---|---|---|---|
| 2022/0022188 | A1 * | 1/2022 | Sakhnini | H04B 1/715 |
| 2022/0104237 | A1 * | 3/2022 | Muruganathan | H04W 72/51 |
| 2023/0049041 | A1 * | 2/2023 | Lin | H04W 72/044 |
| 2023/0133947 | A1 * | 5/2023 | Yao | H04W 72/1273<br>370/329 |
| 2025/0150243 | A1 * | 5/2025 | Zhang | H04L 5/0044 |

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)", 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

International Search Report issued May 14, 2024 regarding International Application No. PCT/KR2024/001846, 3 pages.

* cited by examiner

PDSCH RECEPTION WITH TRP SWITCHING

CROSS-REFERENCE TO RELATED AND CLAIM OF PRIORITY

The present application claims priority under 35 U.S.C. § 119 (e) to U.S. Provisional Patent Application No. 63/445,215 filed on Feb. 13, 2023; U.S. Provisional Patent Application No. 63/449,205 filed on Mar. 1, 2023; U.S. Provisional Patent Application No. 63/451,425 filed on Mar. 10, 2023; U.S. Provisional Patent Application No. 63/466,176 filed on May 12, 2023; U.S. Provisional Patent Application No. 63/468,682 filed on May 24, 2023; U.S. Provisional Patent Application No. 63/531,471 filed on Aug. 8, 2023; U.S. Provisional Patent Application No. 63/546,403 filed on Oct. 30, 2023; and U.S. Provisional Patent Application No. 63/602,915 filed on Nov. 27, 2023, which are hereby incorporated by reference in their entirety.

TECHNICAL FIELD

The present disclosure relates generally to wireless communication systems and, more specifically, the present disclosure relates to method and apparatus for physical downlink shared channel (PDSCH) reception with transmission and reception point (TRP) switching.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to PDSCH reception with TRP switching.

In one embodiment, a user equipment (UE) is provided. The UE includes a transceiver configured to receive a threshold to indicate a transmission configuration indication (TCI) state selection time and receive downlink control information (DCI) that schedules a first PDSCH with a scheduling offset less than or equal to the threshold. The UE further includes a processor operably coupled to the transceiver. The processor is configured to identify a value of a frequency range index and determine, based on the value of the frequency range index and a capability, to receive the first PDSCH with a first TCI state or a second TCI state. The first and second TCI states are joint or downlink (DL) TCI states.

In another embodiment, a base station (BS) is provided. The BS includes a transceiver configured to transmit a threshold to indicate a TCI state selection time and transmit DCI that schedules a first PDSCH with a scheduling offset less than or equal to the threshold. The BS further includes a processor operably coupled to the transceiver. The processor is configured to identify a value of a frequency range index and determine, based on the value of the frequency range index and a capability, to transmit the first PDSCH with a first TCI state or a second TCI state. The first and second TCI states are joint or DL TCI states.

In yet another embodiment, a method performed by a UE is provided. The method includes receiving a threshold to indicate a TCI state selection time; receiving DCI that schedules a first PDSCH with a scheduling offset less than or equal to the threshold; identifying a value of a frequency range index; and determining, based on the value of the frequency range index and a capability, to receive the first PDSCH with a first TCI state or a second TCI state. The first and second TCI states are joint or DL TCI states.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-12, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v16.1.0, “NR; Physical channels and modulation;” [2] 3GPP TS 38.212 v16.1.0, “NR; Multiplexing and Channel coding;” [3] 3GPP TS 38.213 v16.1.0, “NR; Physical Layer Procedures for Control;” [4] 3GPP TS 38.214 v16.1.0, “NR; Physical Layer Procedures for Data;” [5] 3GPP TS 38.321 v16.1.0, “NR; Medium Access Control (MAC) protocol specification;” and [6] 3GPP TS 38.331 v16.1.0, “NR; Radio Resource Control (RRC) Protocol Specification.”

Figure 1:
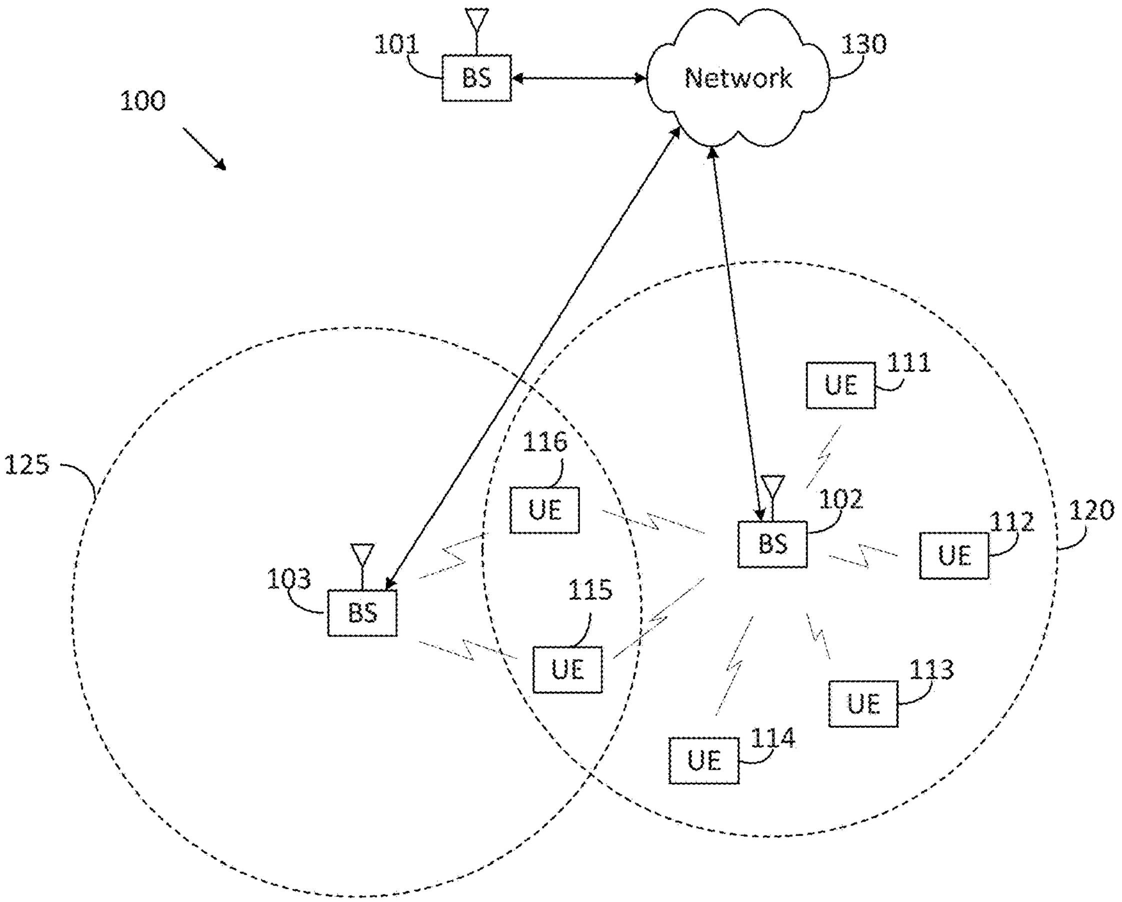
FIG. 1 illustrates an example wireless network according to embodiments of the present disclosure.
Figure 2:
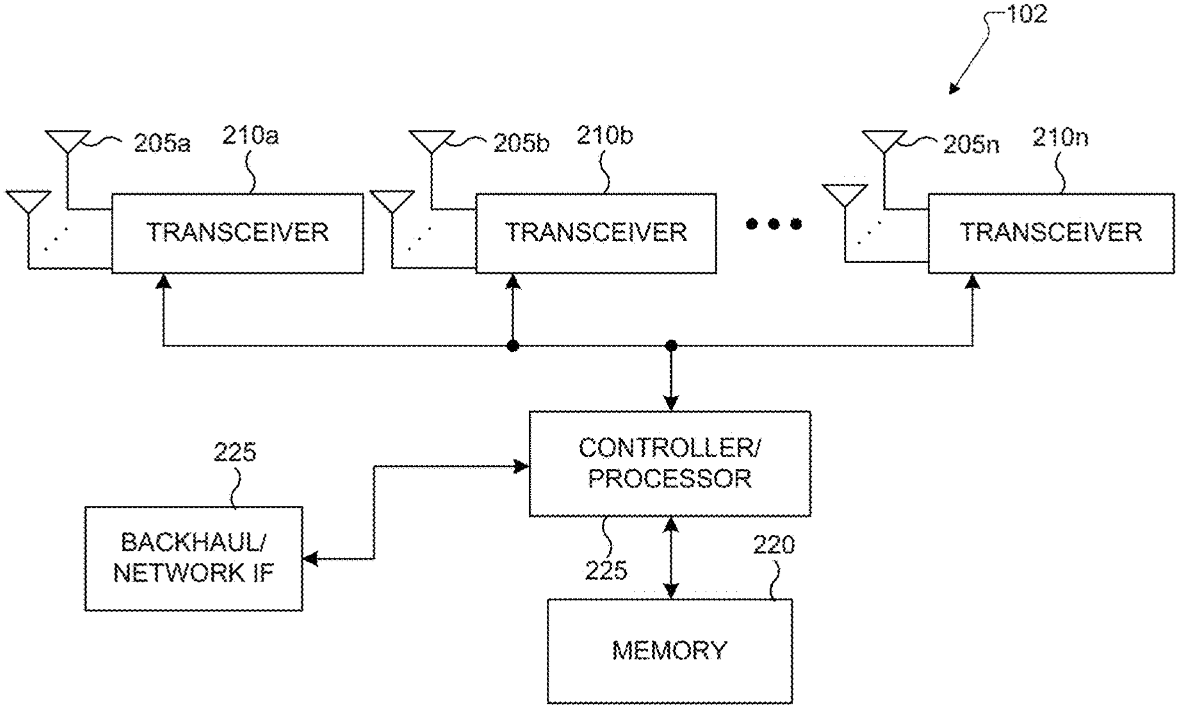
FIG. 2 illustrates an example gNodeB (gNB) according to embodiments of the present disclosure.
Figure 3:
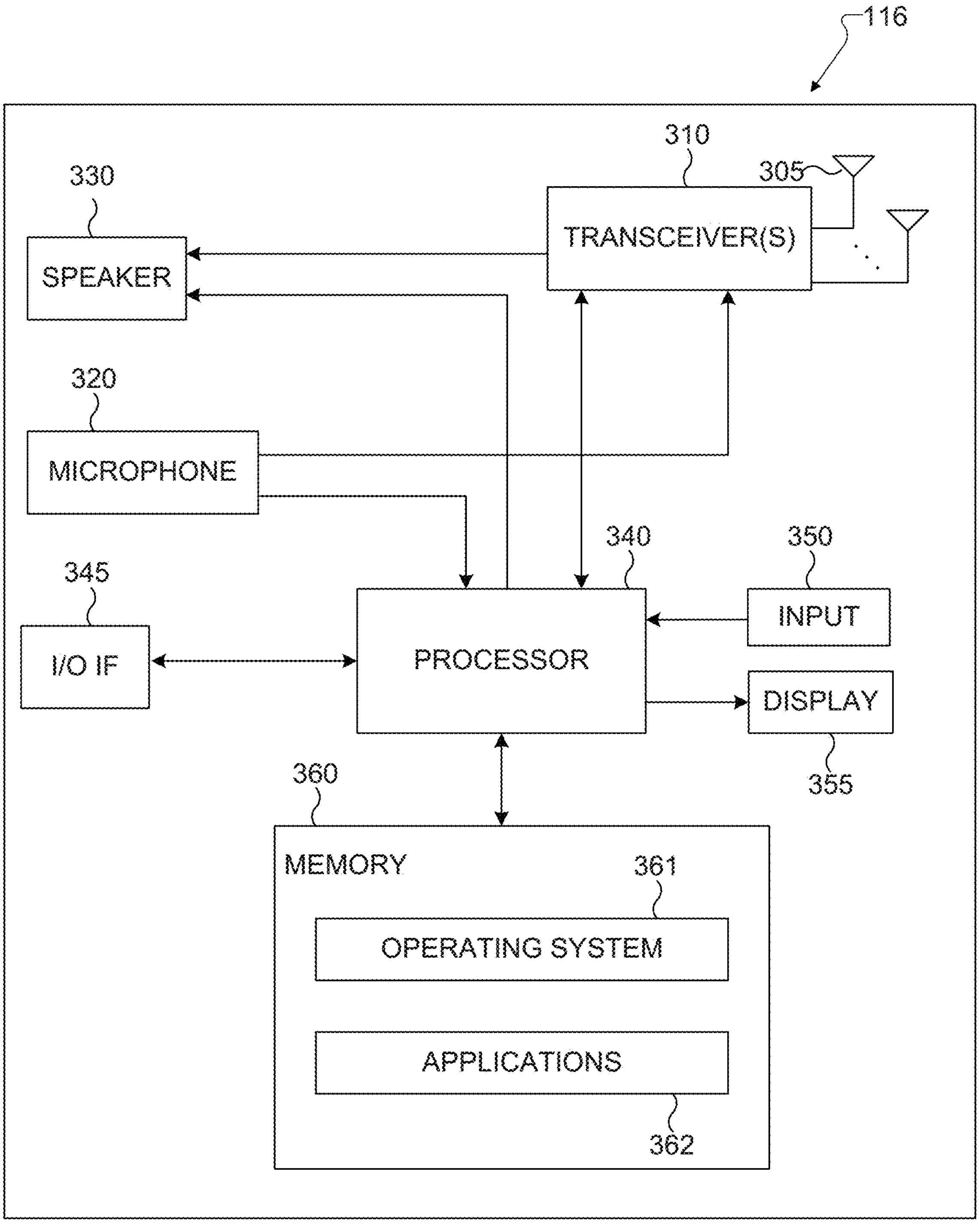
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE

114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for performing PDSCH reception with TRP switching. In certain embodiments, one or more of the BSs 101-103 include circuitry, programing, or a combination thereof to for performing PDSCH transmissions with TRP switching.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming radio frequency (RF) signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support methods for performing PDSCH transmissions with TRP switching. Any of a wide variety of other functions could be supported in the gNB 102 by the controller/processor 225.

The controller/processor 225 is also capable of executing programs and other processes resident in the memory 230, such as to support performing PDSCH transmissions with TRP switching. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet).

The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for performing PDSCH reception with TRP switching as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
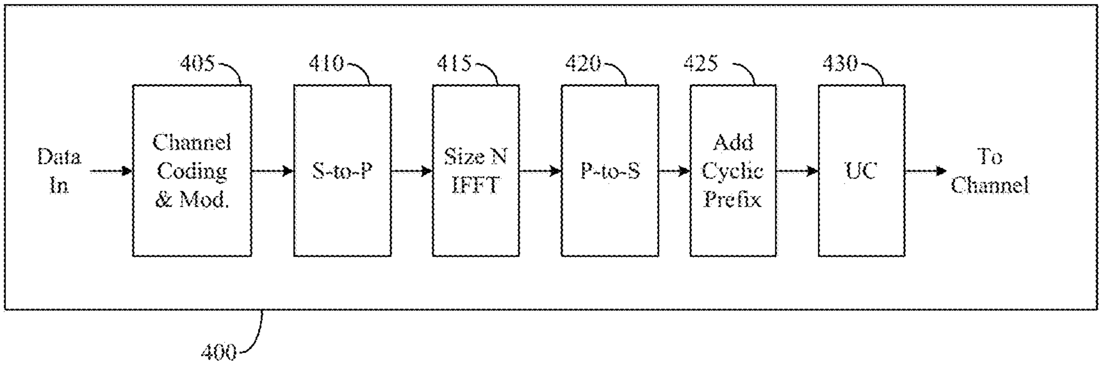
FIGS. 4A and 4B illustrate an example of a wireless transmit and receive paths according to embodiments of the present disclosure.
Figure 4B:
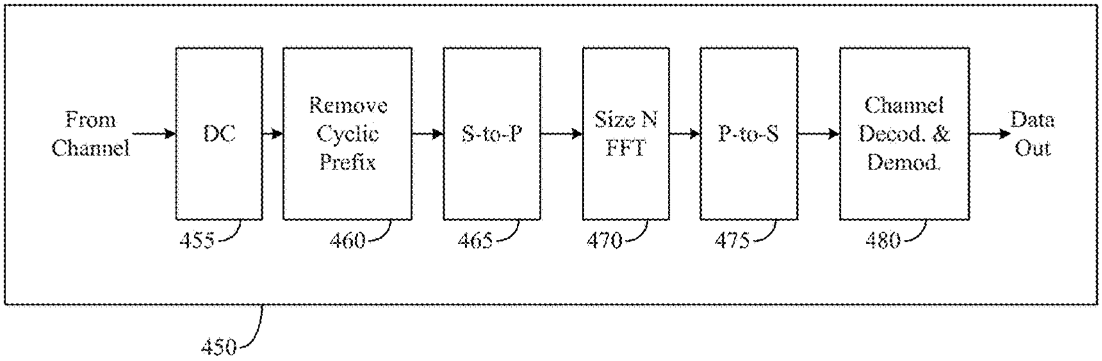

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is for PDSCH reception with TRP switching as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In embodiments of the present disclosure, a beam is determined by either a transmission configuration indicator (TCI) state that establishes a quasi-colocation (QCL) relationship between a source reference signal (RS) (e.g., single sideband (SSB) and/or Channel State Information Reference Signal (CSI-RS)) and a target RS or a spatial relation information that establishes an association to a source RS, such as SSB or CSI-RS or sounding reference signal (SRS). In either case, the ID of the source reference signal identifies the beam. The TCI state and/or the spatial relation reference RS can determine a spatial RX filter for reception of downlink channels at the UE 116, or a spatial TX filter for transmission of uplink channels from the UE 116.

Figure 5A:
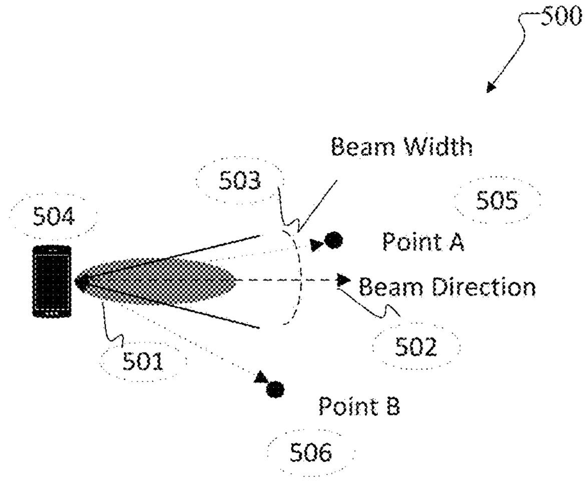
FIG. 5A illustrates an example of a wireless system according to embodiments of the present disclosure.

As illustrated in FIG. 5A, in a wireless system 500, a beam 501 for a device 504 can be characterized by a beam direction 502 and a beam width 503. For example, the device 504 (or UE 116) transmits RF energy in a beam direction and within a beam width. The device 504 receives RF energy in a beam direction and within a beam width. As illustrated in FIG. 5A, a device at point A 505 can receive from and transmit to device 504 as Point A is within a beam width and direction of a beam from device 504. As illustrated in FIG. 5A, a device at point B 506 cannot receive from and transmit to device 504 as Point B 506 is outside a beam width and direction of a beam from device 504. While FIG. 5A, for illustrative purposes, shows a beam in 2-dimensions (2D), it should be apparent to those skilled in the art, that a beam can be in 3-dimensions (3D), where the beam direction and beam width are defined in space.

Figure 5B:
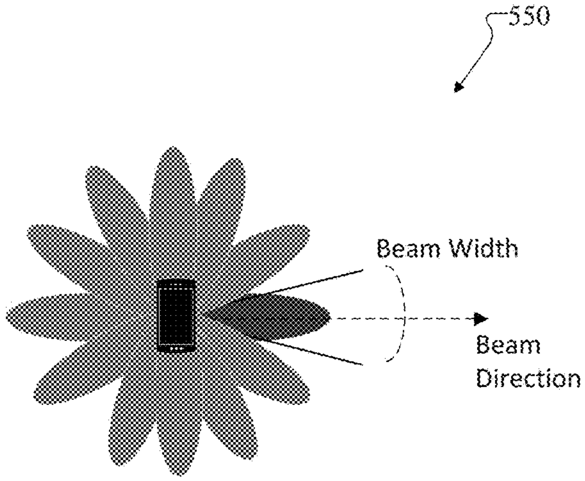
FIG. 5B illustrates an example of a multi-beam operation according to embodiments of the present disclosure.

FIG. 5B illustrates an example of a multi-beam operation 550 according to embodiments of the present disclosure. For example, the multi-beam operation 550 can be utilized by gNB 102 of FIG. 2. This example is for illustration only and other embodiments can be used without departing from the scope of the present disclosure.

In a wireless system, a device can transmit and/or receive on multiple beams. This is known as "multi-beam operation". While FIG. 5B, for illustrative purposes, a beam is in 2D, it should be apparent to those skilled in the art, that a beam can be 3D, where a beam can be transmitted to or received from any direction in space.

Figure 6:
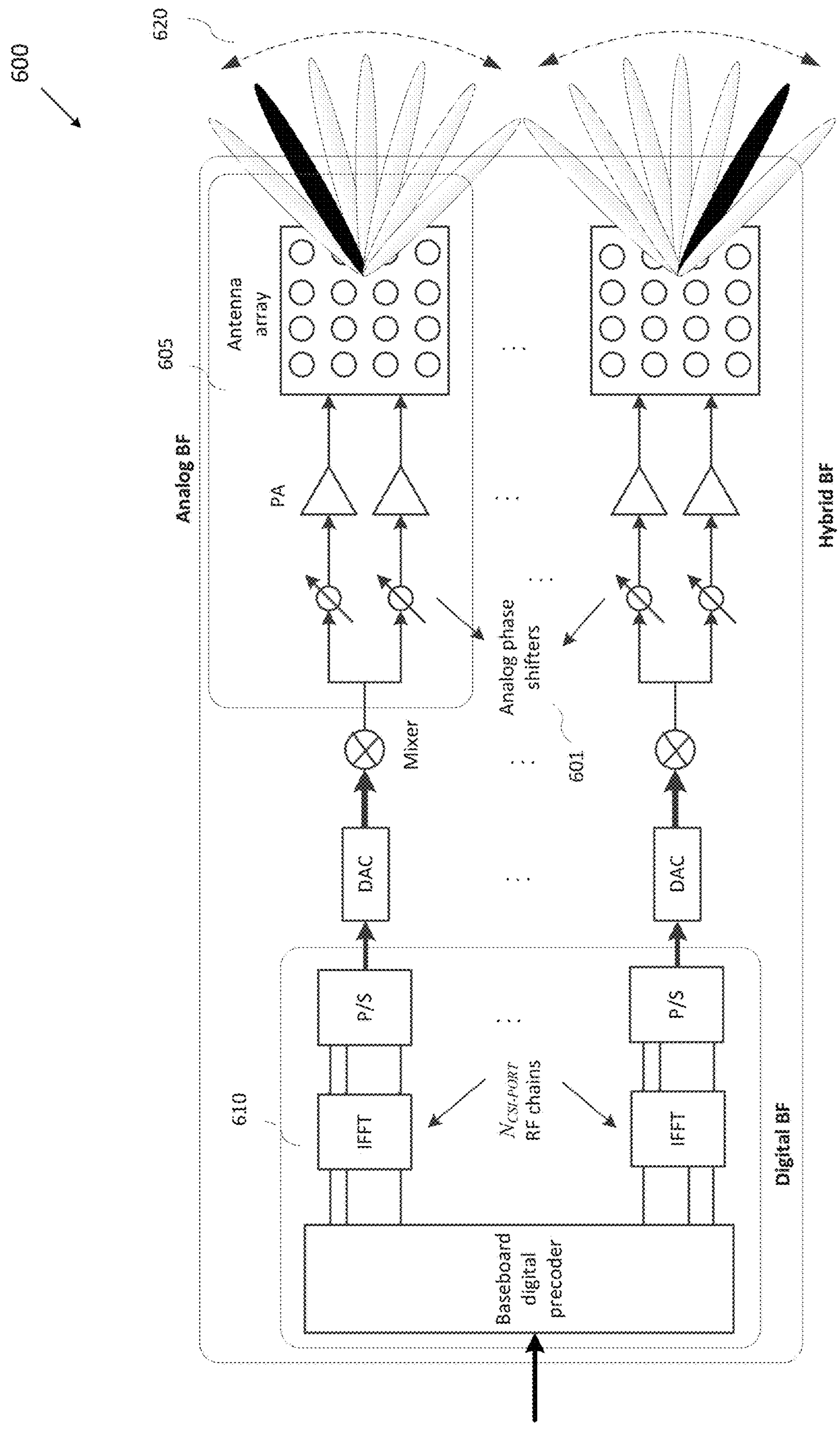
FIG. 6 illustrates an example of a transmitter structure for beamforming according to embodiments of the present disclosure.

FIG. 6 illustrates an example of a transmitter structure 600 for beamforming according to embodiments of the present disclosure. In certain embodiments, one or more of gNB 102 or UE 116 includes the transmitter structure 600. For example, one or more of antenna 205 and its associated systems or antenna 305 and its associated systems can be included in transmitter structure 600. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 6. Then, one CSI-RS port can be mapped onto a large number of antenna elements that can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or slots/subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 600 of FIG. 6 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 6 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 600 for beamforming is for illustration only and other embodiments can be used without departing from the scope of the present disclosure.

The flowcharts herein illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Figure 7:
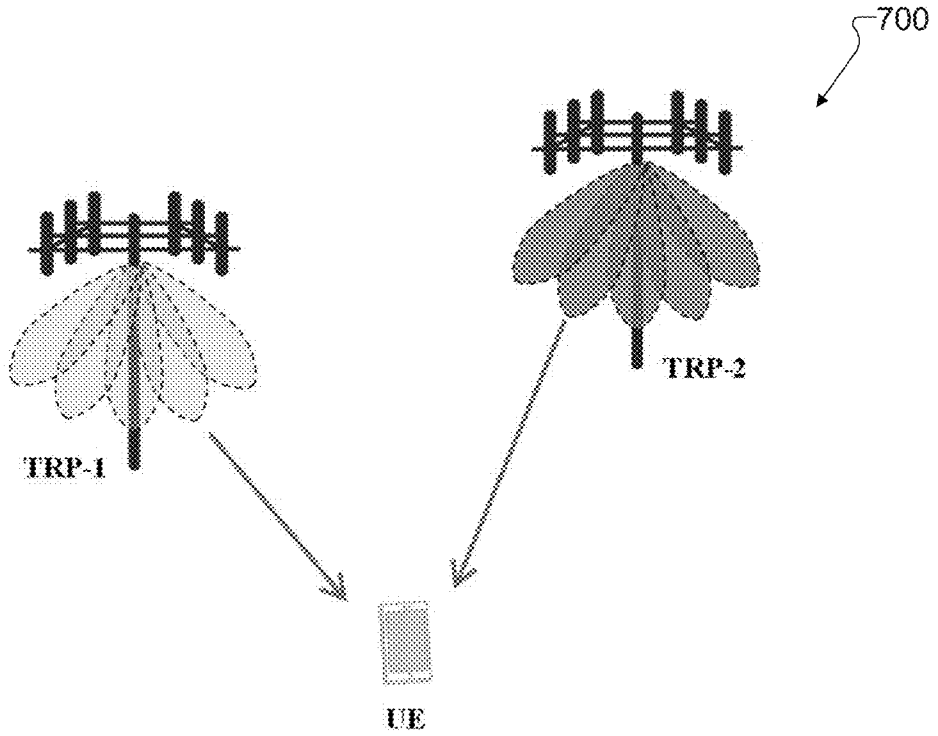
FIG. 7 illustrates an example system of a multi-TRP according to embodiments of the present disclosure.

FIG. 7 illustrates an example system 700 for a multi-TRP according to embodiments of the present disclosure. For example, the system 700 may operate within the wireless network 100 in FIG. 1. This example is for illustration only and other embodiments can be used without departing from the scope of the present disclosure.

With reference to FIG. 7, a UE could simultaneously receive from multiple physically non-co-located TRPs various channels/RSs such as PDCCHs and/or PDSCHs using either a single receive (RX) panel or multiple RX panels. In this disclosure, a RX panel could correspond to a set of RX antenna elements/ports at the UE, a set of measurement RS resources such as SRS resources, a spatial domain RX filter or etc. Furthermore, a TRP in the multi-TRP system can represent a collection of measurement antenna ports, measurement RS resources and/or control resource sets (CORESETs). For example, a TRP could be associated with one or more of:

A plurality of CSI-RS resources

A plurality of CRIs (CSI-RS resource indices/indicators)

A measurement RS resource set, for example, a CSI-RS resource set along with its indicator A plurality of CORESETs associated with a CORESETPoolIndex A plurality of CORESETs associated with a TRP-specific index/indicator/identity A cell/TRP could be a non-serving cell/TRP. In this disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, for the inter-cell operation evaluated in the present disclosure, different cells/TRPs could broadcast different PCIs and/or one or more cells/TRPs (referred to/defined as non-serving cells/TRPs in the present disclosure) could broadcast different PCIs from that of the serving cell/TRP (i.e., the serving cell PCI) and/or one or more cells/TRPs are not associated with valid SCI (e.g., provided by the higher layer parameter ServCellIndex). In the present disclosure, a non-serving cell PCI can also be referred to as an additional PCI, another PCI, or a different PCI (with respect to the serving cell PCI).

For single-PDCCH or single-downlink control information (DCI) based multi-TRP operation, if the time offset between the reception of the PDCCH and the reception of the PDSCH is less than a threshold, the UE could assume that the demodulation reference signal (DMRS) ports of the PDSCH follow the QCL parameters indicated by the default TCI state(s), which could correspond to the lowest codepoint among the TCI codepoints containing two different TCI states activated for the PDSCH. For multi-PDCCH or multi-DCI based multi-TRP operation (assuming that the CORESETPoolIndex is configured), if the time offset between the reception of the PDCCH and the reception of the PDSCH is less than a threshold, the UE could assume that the DMRS ports of the PDSCH follow the QCL parameters indicated by the default TCI state(s) which could be used for the PDCCH with the lowest CORESET index among the CORESETs configured with the same value of CORESETPoolIndex. Similar design procedures are also specified for receiving aperiodic CSI-RS (AP CSI-RS) triggered by a DCI (e.g., via the 'CSI request' field in DCI format 0_1) in a single-DCI or multi-DCI based multi-TRP system.

Embodiments of the present disclosure recognize that the default TCI state(s)/receive beam(s) configurations in the 3GPP Rel-15/16 assume that the PDCCH and the PDSCH could employ different beams. Therefore, the UE could use different spatial filters to receive the PDCCH and the PDSCH beams. If a common TCI state/beam is used/configured for various types of channels such as PDCCH and PDSCH, the configuration of the default TCI state(s)/receive beam(s) could be different from the existing solutions (described herein, relying on lowest CORESET ID/TCI codepoint). Furthermore, whether the UE could simultaneously receive the PDSCHs transmitted from the coordinating TRPs should also be evaluated when configuring the default TCI state(s) for the multi-TRP operation.

This disclosure evaluates various design aspects related to determining (default) TCI state(s) for PDSCH and/or aperiodic CSI-RS reception(s) in a single-DCI (SDCI) or multi-DCI (MDCI) based multi-TRP system when the corresponding time offset (e.g., beam indication offset, scheduling offset, beam switching offset, etc.) is smaller/below a threshold (e.g., beam application time, beam switching time, etc.). Furthermore, this disclosure also evaluates determining the (default) TCI state(s) as specified herein in the present disclosure in an inter-cell multi-TRP system, wherein different PCIs (e.g., including the serving cell PCI and/or at least one PCI other than the serving cell PCI) could be associated to different TCI states/pairs of TCI states indicated by a TCI codepoint of a TCI field in a beam indication DCI (e.g., DCI format 1_1/1_2 with or without DL assignment) or different CORESET pool index values. Throughout the present disclosure, if a UE could use/apply a TCI state for PDSCH reception(s) or to receive PDSCH(s), it is equivalent.

As specified in Rel-17, a unified TCI framework could indicate/include N≥1 DL TCI states and/or M≥1 UL TCI states, wherein the indicated TCI state could be at least one of:

- A DL TCI state and/or its corresponding/associated TCI state ID
- An UL TCI state and/or its corresponding/associated TCI state ID
- A joint DL and UL TCI state and/or its corresponding/associated TCI state ID
- Separate DL TCI state and UL TCI state and/or their corresponding/associated TCI state ID(s)

There could be various design options/channels to indicate to the UE a beam (i.e., a TCI state) for the transmission/reception of a PDCCH or a PDSCH. As described in the 3GPP Rel-17:

- In one example, a medium access control (MAC) control element (CE) could be used to indicate to the UE a beam (i.e., a TCI state and/or a TCI state ID) for the transmission/reception of a PDCCH or a PDSCH.
- In another example, a DCI could be used to indicate to the UE a beam (i.e., a TCI state and/or a TCI state ID) for the transmission/reception of a PDCCH or a PDSCH.
  - For example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.
  - For another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.
  - Yet for another example, a custom/purpose designed DCI format could be used to indicate to the UE a beam (i.e., a TCI state and/or a TCI state ID) for the transmission/reception of a PDCCH or a PDSCH.

Rel-17 introduced the unified TCI framework, where a unified or master or main TCI state is signaled to the UE. The unified or master or main TCI state can be one of:

1. In case of joint TCI state indication, wherein a same beam is used for DL and UL channels, a joint TCI state that can be used at least for UE-dedicated DL channels and UE-dedicated UL channels.
2. In case of separate TCI state indication, wherein different beams are used for DL and UL channels, a DL TCI state can be used at least for UE-dedicated DL channels.
3. In case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based physical uplink shared channel (PUSCH) and all of dedicated physical uplink control channel (PUCCH) resources.

In a (single-DCI based) multi-TRP system, a UE could be indicated/provided/configured by the network, e.g., via a beam indication MAC CE or a DCI (e.g., via one or more TCI codepoints of one or more TCI fields in the corresponding DCI 1_1/1_2 with or without DL assignment), a set of one or more (e.g., N>1) TCI states/pairs of TCI states, wherein a TCI state could be a joint DL and UL TCI state or a separate DL TCI state provided by TCI-State/DLorJointTCI-State, or a separate UL TCI state provided by TCI-State/UL-TCIState, and a pair of TCI states could include/contain a separate DL TCI state provided by TCI-State/DLorJointTCI-State or a separate UL TCI State provided by TCI-State/UL-TCIState under the unified TCI framework.

For PDCCH reception or PDCCH candidate monitoring in a (single-DCI based) multi-TRP system, a UE could be configured/provided/indicated by the network 130 via higher layer RRC signaling/parameter and/or MAC CE command and/or dynamic DCI based L1 signaling—e.g., in higher layer RRC signaling/parameter ControlResourceSet that configures a CORESET—a first indicator to indicate which one or more of the set of TCI states/pairs of TCI states indicated, e.g., by a TCI codepoint, in a beam indication DCI or MAC CE as specified herein in the present disclosure, to use/apply for receiving/monitoring the PDCCH(s)/PDCCH candidate(s) in the corresponding CORESET. For instance, for N=2 (i.e., a set of two TCI states/pairs of TCI states are indicated), the first indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate(s) in the corresponding CORESET. '01' indicates that the second TCI state(s) among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate(s) in the corresponding CORESET. '10' indicates that the first and second TCI states among the set of TCI states/pairs of TCI states indicated, e.g., by a TCI codepoint, in a beam indication DCI or MAC CE as specified herein in the present disclosure, could be respectively used/applied for receiving/monitoring the PDCCH(s)/PDCCH candidate(s)—e.g., first and second PDCCH candidates—in the corresponding CORESET(s). '11' indicates that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for receiving/monitoring the PDCCH(s)/PDCCH candidate(s)—e.g., first and second PDCCH candidates—in the corresponding CORESET(s), wherein the first and second PDCCH candidates could be received in search space sets that are higher layer linked via SearchSpaceLinking and/or the first and second PDCCH candidates carry the same/identical DCI payload. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states. Throughout the present disclosure, the first indicator could also be referred to as or could correspond to a higher layer parameter applyIndicatedTCIState configured/provided in PDCCH-Config/ControlResourceSet, which could be set to 'none', 'first', 'second'0 or 'both' respectively indicating/providing that none of the indicated TCI states, the first indicated TCI state(s), the second indicated TCI state(s) or both the first and second indicated TCI states could be used for PDCCH reception(s).

For PDSCH reception in a (single-DCI based) multi-TRP system, a UE could be configured/provided/indicated by the network 130 via higher layer RRC signaling/parameter and/or MAC CE command and/or dynamic DCI based L1 signaling—e.g., in a DL DCI (e.g., DCI format 1_0/1_1/1_2) that schedules the PDSCH—a second indicator to indicate which one or more of the set of TCI states/pairs of TCI states indicated, e.g., by a TCI codepoint, in a beam indication DCI or MAC CE as specified herein in the present disclosure, to use/apply for receiving the PDSCH(s). For instance, for N=2 (i.e., a set of two TCI states/pairs of TCI states are indicated), the second indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH. '01' indicates that the second TCI state(s) among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH. '10' indicates that the first and second TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH. '11' indicates that the second and first TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH, wherein the first and second PDSCHs could correspond to two PDSCH transmission occasions or repetition in space, time and/or frequency. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states. Throughout the present disclosure, the second indicator could also be referred to as or could correspond to a DCI indicator 'TCI selection' field in DCI format 1_1/1_2 (present when a higher layer parameter tciSelectionPresentInDCI is configured/present and/or set to 'enabled'), which could be set to 'none', 'first', 'second'0 or 'both' respectively indicating/providing that none of the indicated TCI states, the first indicated TCI state(s), the second indicated TCI state(s) or both the first and second indicated TCI states could be used for PDSCH reception(s).

That is, for PDSCH reception in a (single-DCI based) multi-TRP system, when a UE is configured with dl-OrJointTCI-StateList and is having two indicated TCI-states, if the UE 116 does not report its capability indicating support of "two default beams for S-DCI based MTRP" in frequency range 2 and when the offset between the reception of the scheduling/activation DCI format 1_0/1_1/1_2 and the scheduled or activated PDSCH reception is less than timeDurationForQCL in frequency range 2, the UE 116 shall apply the first indicated TCI-State to the scheduled or activated PDSCH reception. When a UE is configured with dl-OrJointTCI-StateList and is having two indicated TCI-states:

Regardless of the offset between the reception of the scheduling DCI format 1_0/1_1/1_2 and the scheduled/activated PDSCH reception, if the UE 116 is in frequency range 1, or the UE 116 reports its capability indicating support of "two default beams for S-DCI based MTRP" in frequency range 2; or If the UE 116 does not report its capability indicating support of "two default beams for S-DCI based MTRP" in frequency range 2 and if the scheduling offset between the reception of the scheduling DCI format 1_0/1_1/1_2 and the scheduled/activated PDSCH reception is equal to or larger than timeDurationForQCL.

- The UE 116 can be configured by higher layer parameter applyIndicatedTCIState to indicate whether the first, the second, or both of the indicated TCI-state(s) is/are applied to PDSCH reception scheduled or activated by DCI format 1_0. The UE 116 can be configured with applyIndicatedTCIState with value both only when the UE 116 is configured with cjtSchemePDSCH and the UE 116 reports its capability indicating support of two joint TCI states for PDSCH-CJT or the UE 116 is configured with sfnSchemePdsch. In that case, the UE 116 shall apply both indicated TCI-states to PDSCH reception scheduled or activated by DCI format 1_0 on a search space other than Type0/0A/2 common search space (CSS) on CORESET #0.
- If the UE 116 is not configured with applyIndicatedTCIState, the first indicated TCI-state is applied to PDSCH reception scheduled or activated by DCI format 1_0.
- When the UE 116 is configured with tciSelectionPresentInDCI jointly for both DCI formats 1_1 and 1_2 in the same DL bandwidth part (BWP) and when the UE 116 receives a DCI format 1_1/1_2 that schedules or activates PDSCH reception, the UE 116 shall determine the indicated joint/DL TCI state(s) for the PDSCH reception according to the following:
  - If the DCI format 1_1/1_2 indicates codepoint "00" for the TCI selection field (or equivalently, the second indicator as specified herein in the present disclosure), the UE 116 shall apply the first one of two indicated joint/DL TCI states to all PDSCH demodulation reference signal (DM-RS) port(s) of corresponding PDSCH transmission occasions(s) scheduled or activated by the DCI format 1_1/1_2.
  - If the DCI format 1_1/1_2 indicates codepoint "01" for the TCI selection field (or equivalently, the second indicator as specified herein in the present disclosure), the UE 116 shall apply the second one of two indicated joint/DL TCI states to all PDSCH DM-RS port(s) of corresponding PDSCH transmission occasion(s) scheduled or activated by the DCI format 1_1/1_2.
  - If the DCI format 1_1/1_2 indicates codepoint "10" for the TCI selection field (or equivalently, the second indicator as specified herein in the present disclosure), the UE 116 shall apply both indicated joint/DL TCI states to the PDSCH reception scheduled or activated by the DCI format 1_1/1_2.

If the UE 116 is not configured with tciSelection-PresentInDCI and when the UE 116 receives a DCI format 1_1/1_2 that schedules/activates PDSCH reception, the UE 116 shall apply both indicated TCI-States to the scheduled or activated PDSCH reception.

For PUCCH transmission in a (single-DCI based) multi-TRP system, a UE could be configured/provided/indicated by the network 130 via higher layer RRC signaling/parameter and/or MAC CE command and/or dynamic DCI based L1 signaling—e.g., in higher layer RRC signaling/parameter PUCCH-Config that configures PUCCH(s)/PUCCH resource(s)—a third indicator to indicate which one or more of the set of TCI states/pairs of TCI states indicated, e.g., by a TCI codepoint, in a beam indication DCI or MAC CE as specified herein in the present disclosure, to use/apply for transmitting the PUCCH(s)/PUCCH resource(s). For instance, for N=2 (i.e., a set of two TCI states/pairs of TCI states are indicated), the third indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for transmitting the PUCCH(s)/PUCCH resource(s). '01' indicates that the second TCI state(s) among the set of TCI states/pairs of TCI states indicated, e.g., by a TCI codepoint, in a beam indication DCI or MAC CE as specified herein in the present disclosure, could be used/applied for transmitting the PUCCH(s)/PUCCH resource(s). '10' indicates that the first and second TCI states among the set of TCI states/pairs of TCI states indicated, e.g., by a TCI codepoint, in a beam indication DCI or MAC CE as specified herein in the present disclosure, could be respectively used/applied for transmitting the PUCCH(s)/PUCCH resource(s)—e.g., first PUCCH/PUCCH resource and second PUCCH/PUCCH resource. '11' indicates that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for transmitting the PUCCH(s)/PUCCH resource(s)—e.g., first PUCCH/PUCCH resource and second PUCCH/PUCCH resource, wherein the first and second PUCCHs/PUCCH resources could correspond to two PUCCH transmission occasions or repetitions in space, time and/or frequency. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states. Throughout the present disclosure, the third indicator could also be referred to as or could correspond to a higher layer parameter applyIndicatedTCIState configured/provided in higher layer parameter(s) that configures/provides a PUCCH resource/resource group, which could be set to 'none', 'first', 'second'0 or 'both' respectively indicating/providing that none of the indicated TCI states, the first indicated TCI state(s), the second indicated TCI state(s) or both the first and second indicated TCI states could be used for PUCCH transmission(s).

For PUSCH transmission in a (single-DCI based) multi-TRP system, a UE could be configured/provided/indicated by the network 130 via higher layer RRC signaling/parameter and/or MAC CE command and/or dynamic DCI based L1 signaling—e.g., in an UL DCI (e.g., DCI format 0_0/0_1/0_2) that schedules the PUSCH—a fourth indicator to indicate which one or more of the set of TCI states/pairs of TCI states indicated, e.g., by a TCI codepoint, in a beam indication DCI or MAC CE as specified herein in the present disclosure, to use/apply for transmitting the PUSCH(s). For instance, for N=2 (i.e., a set of two TCI states/pairs of TCI states are indicated), the fourth indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH. '01' indicates that the second TCI state(s) among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH. '10' indicates that the first and second TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs—e.g., scheduled by the UL DCI/PDCCH. '11' indicates that the second and first TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs—e.g., scheduled by the UL DCI/PDCCH, wherein the first and second PUSCHs could correspond to two PUSCH transmission occasions or repetition in space, time and/or frequency. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states. Throughout the present disclosure, the fourth indicator could also be referred to as or could correspond to a DCI indicator 'SRS resource set' field in DCI format 0_1/0_2, which could be set to 'none', 'first', 'second'0 or 'both' respectively indicating/providing that none of the indicated TCI states, the first indicated TCI state(s), the second indicated TCI state(s) or both the first and second indicated TCI states could be used for PUSCH transmission(s).

In a (multi-DCI based) multi-TRP system, a UE could be indicated/provided/configured by the network 130, e.g., in PDCCH-Config, two values (i.e., 0 and 1) of CORESET pool index (denoted by CORESETPoolIndex), wherein each CORESET could be configured with a value of CORESET-PoolIndex. Furthermore, a UE could be indicated/provided/configured by the network 130, e.g., via a beam indication MAC CE or a DCI (e.g., via one or more TCI codepoints of one or more TCI fields in the corresponding DCI format 1_1/1_2 with or without DL assignment) associated to a CORESET pool index value (e.g., 0 or 1), one or more TCI states/pairs of TCI states for the same (or different) CORESET pool index value, wherein a TCI state could be a joint DL and UL TCI state or a separate DL TCI state provided by TCI-State/DLorJointTCI-State or a separate UL TCI state provided by TCI-State/UL-TCIState indicated for channels/signals such as PDCCH, PDSCH, PUCCH and PUSCH associated to the same (or different) CORESET pool index value, and a pair of TCI states could include/contain a separate DL TCI state provided by TCI-State/DLor-JointTCI-State or a separate UL TCI State provided by TCI-State/UL-TCIState indicated for channels/signals such as PDCCH, PDSCH, PUCCH and PUSCH associated to the same (or different) CORESET pool index value under the unified TCI framework.

Throughout the present disclosure, setting a first indicator for PDCCH reception(s) as specified herein in the present disclosure as '00' is equivalent to setting the first indicator for PDCCH reception(s) as specified herein in the present disclosure as 'first', and/or setting a first indicator for PDCCH reception(s) as specified herein in the present disclosure as '01' is equivalent to setting the first indicator for PDCCH reception(s) as specified herein in the present disclosure as 'second', and/or setting a first indicator for PDCCH reception(s) as specified herein in the present disclosure as '10' (or '11') is equivalent to setting the first indicator for PDCCH reception(s) as specified herein in the present disclosure as 'both', and/or setting a first indicator for PDCCH reception(s) as specified herein in the present disclosure as '11' (or '10') is equivalent to setting the first indicator for PDCCH reception(s) as specified herein in the present disclosure as 'none'.

Throughout the present disclosure, setting a second indicator for PDSCH reception(s) as specified herein in the present disclosure as '00' is equivalent to setting the second indicator for PDSCH reception(s) as specified herein in the present disclosure as 'first', and/or setting a second indicator for PDSCH reception(s) as specified herein in the present disclosure as '01' is equivalent to setting the second indicator for PDSCH reception(s) as specified herein in the present disclosure as 'second', and/or setting a second indicator for PDSCH reception(s) as specified herein in the present disclosure as '10' (or '11') is equivalent to setting the second indicator for PDSCH reception(s) as specified herein in the present disclosure as 'both', and/or setting a second indicator for PDSCH reception(s) as specified herein in the present disclosure as '11' (or '10') is equivalent to setting the second indicator for PDSCH reception(s) as specified herein in the present disclosure as 'none'.

Throughout the present disclosure, setting a third indicator for PUCCH transmission(s) as specified herein in the present disclosure as '00' is equivalent to setting the third indicator for PUCCH transmission(s) as specified herein in the present disclosure as 'first', and/or setting a third indicator for PUCCH transmission(s) as specified herein in the present disclosure as '01' is equivalent to setting the third indicator for PUCCH transmission(s) as specified herein in the present disclosure as 'second', and/or setting a third indicator for PUCCH transmission(s) as specified herein in the present disclosure as '10' (or '11') is equivalent to setting the third indicator for PUCCH transmission(s) as specified herein in the present disclosure as 'both', and/or setting a third indicator for PUCCH transmission(s) as specified herein in the present disclosure as '11' (or '10') is equivalent to setting the third indicator for PUCCH transmission(s) as specified herein in the present disclosure as 'none'.

Throughout the present disclosure, setting a fourth indicator for PUSCH transmission(s) as specified herein in the present disclosure as '00' is equivalent to setting the fourth indicator for PUSCH transmission(s) as specified herein in the present disclosure as 'first', and/or setting a fourth indicator for PUSCH transmission(s) as specified herein in the present disclosure as '01' is equivalent to setting the fourth indicator for PUSCH transmission(s) as specified herein in the present disclosure as 'second', and/or setting a fourth indicator for PUSCH transmission(s) as specified herein in the present disclosure as '10' (or '11') is equivalent to setting the fourth indicator for PUSCH transmission(s) as specified herein in the present disclosure as 'both', and/or setting a fourth indicator for PUSCH transmission(s) as specified herein in the present disclosure as '11' (or '10') is equivalent to setting the fourth indicator for PUSCH transmission(s) as specified herein in the present disclosure as 'none'.

A UE could be indicated/configured/provided by the network 130, e.g., via higher layer RRC signaling/parameter and/or MAC CE command and/or dynamic DCI based L1 signaling, that inter-cell multi-TRP operation (e.g., for SDCI based multi-TRP framework) is enabled. For instance, the UE 116 could be provided/configured by the network 130 a higher layer parameter InterCellSDCImTRP set to 'enabled'; for this case, the one or more TCI states/pairs of TCI states indicated by one or more TCI codepoints of one or more TCI fields in a beam indication DCI/MAC CE could be associated to different PCIs (or PCI indexes each pointing to an entry/PCI in a list of PCIs) including the serving cell PCI/PCI index or PCI(s)/PCI index(es) other than the serving cell PCI/PCI index. The UE 116 could be higher layer configured by the network 130 the list of PCIs.

In one example, the one or more TCI states/pairs of TCI states indicated by one or more TCI codepoints of one or more TCI fields in a beam indication DCI/MAC CE could be associated to the serving cell PCI/PCI index and PCI(s)/PCI index(es) other than the serving cell PCI/PCI index. For instance, a TCI codepoint indicated by a TCI field in a beam indication DCI could comprise/include/contain N=2 TCI states/pairs of TCI states denoted by {TCI state(s) A, TCI state(s) B}, wherein each of the indicated TCI states could be a joint DL and UL TCI state provided by TCI-State/DLorJoint-TCIState, a separate DL TCI state provided by TCI-State/DLorJoint-TCIState, or a separate UL TCI state provided by ULTCI-State. The UE 116 could be indicated/provided/configured by the network 130, e.g., via higher layer RRC signaling/parameter and/or MAC CE command and/or dynamic DCI based L1 signaling, the association between the indicated TCI state(s) and the PCI(s); alternatively, the association between the indicated TCI state(s) and the PCI(s) is fixed in the system specification(s).

For example, a PCI/PCI index could be provided in the higher layer parameter such as TCI-State, DLor-Joint-TCIState or ULTCI-State that configures a corresponding TCI state. For the design example specified herein in the present disclosure, the serving cell PCI/PCI index could be provided/configured/indicated in the higher layer parameter such as TCI-State, DLorJoint-TCIState or ULTCI-State that configures TCI state(s) A (or TCI state(s) B). A PCI/PCI index other than the serving cell PCI/PCI index could be provided/configured/indicated in the higher layer parameter such as TCI-State, DLor-Joint-TCIState or ULTCI-State that configures TCI state(s) B (or TCI state(s) A).

For another example, the first indicated TCI state(s)—e.g., among the N=2 TCI states/pairs of TCI states {TCI state(s) A, TCI state(s) B}—i.e., TCI state(s) A, could be associated to the serving cell PCI/PCI index when/if the (SDCI-based) inter-cell multi-TRP operation is enabled (e.g., without including the serving cell PCI/PCI index in the corresponding higher layer parameter(s) that configures TCI state(s) A), and the second indicated TCI state(s)—e.g., among the N=2 TCI states/pairs of TCI states {TCI state(s) A, TCI state(s) B}—i.e., TCI state(s) B, could be associated to a PCI/PCI index other than the serving cell PCI/PCI index when/if the (SDCI-based) inter-cell multi-TRP operation is enabled—the PCI/PCI index other than the serving cell PCI/PCI index could be provided/configured/indicated in the corresponding higher layer parameter(s) that configures TCI state(s) B as specified herein in the present disclosure or in a separate RRC/MAC CE/DCI signaling.

Yet for another example, the second indicated TCI state(s)—e.g., among the N=2 TCI states/pairs of TCI states {TCI state(s) A, TCI state(s) B}—i.e., TCI state(s) B, could be associated to the serving cell PCI/PCI index when/if the (SDCI-based) inter-cell multi-TRP operation is enabled (e.g., without including the serving cell PCI/PCI index in the corresponding higher layer parameter(s) that configures TCI state(s) B), and the first indicated TCI state(s)—e.g., among the N=2 TCI states/pairs of TCI states {TCI state(s) A, TCI state(s) B}—i.e., TCI state(s) A, could be associated to a PCI/PCI index other than the serving cell PCI/PCI index when/if the (SDCI-based) inter-cell multi-TRP operation is enabled—the PCI/PCI index other than the serving cell PCI/PCI index could be provided/configured/indicated in the corresponding higher layer parameter(s) that configures TCI state(s) A as specified herein in the present disclosure or in a separate RRC/MAC CE/DCI signaling.

Yet for another example, the UE 116 could be provided/configured/indicated by the network 130, e.g., via higher layer RRC signaling/parameter and/or MAC CE command and/or dynamic DCI based L1 signaling, a set/list of two PCIs/PCI indexes including the serving cell PCI/PCI index and a PCI/PCI index other than the serving cell PCI/PCI index. The first indicated TCI state(s)—e.g., among the N=2 TCI states/pairs of TCI states {TCI state(s) A, TCI state(s) B}—i.e., TCI state(s) A, could be associated to the first (or second) entry-corresponding to either the serving cell PCI/PCI index or the PCI/PCI index other than the serving cell PCI/PCI index—in the set/list of PCIs/PCI indexes. The second indicated TCI state(s)—e.g., among the N=2 TCI states/pairs of TCI states {TCI state(s) A, TCI state(s) B}—i.e., TCI state(s) B, could be associated to the second (or first) entry-corresponding to either the serving cell PCI/PCI index or the PCI/PCI index other than the serving cell PCI/PCI index—in the set/list of PCIs/PCI indexes.

Yet for another example, the UE 116 could be provided/configured/indicated by the network 130, e.g., via higher layer RRC signaling/parameter and/or MAC CE command and/or dynamic DCI based L1 signaling, a bitmap of two entries 0 and 1 with 0 (or 1) representing the serving cell PCI/PCI index and 1 (or 0) representing a PCI/PCI index other than the serving cell PCI/PCI index. The first indicated TCI state(s)—e.g., among the N=2 TCI states/pairs of TCI states {TCI state(s) A, TCI state(s) B}—i.e., TCI state(s) A, could be associated to the first (or second) entry of the bitmap-corresponding to either 0 (or 1) representing the serving cell PCI/PCI index or 1 (or 0) representing the PCI/PCI index other than the serving cell PCI/PCI index. The second indicated TCI state(s)—e.g., among the N=2 TCI states/pairs of TCI states {TCI state(s) A, TCI state(s) B}—i.e., TCI state(s) B, could be associated to the second (or first) entry of the bitmap-corresponding to either 0 (or 1) representing the serving cell PCI/PCI index or 1 (or 0) representing the PCI/PCI index other than the serving cell PCI/PCI index. For this case, the PCI/PCI index other than the serving cell PCI/PCI index could be provided/configured/indicated in the higher layer parameter(s) that configures the corresponding TCI state(s)—e.g., TCI state(s) A or TCI state(s) B—as specified herein in the present disclosure or in a separate RRC/MAC CE/DCI signaling.

Yet for another example, the UE 116 could be higher layer RRC configured by the network 130 one or more lists/groups of TCI states or TCI state IDs. The one or more lists/groups of TCI states/TCI state IDs could be associated/configured with different PCIs/PCI indexes including the serving cell PCI/PCI index and/or PCI(s)/PCI index(es) other than the serving cell PCI/PCI index. For instance, one or more PCIs/PCI indexes could be provided/configured/indicated in the higher layer RRC parameter(s) that configures the corresponding list(s)/group(s) of TCI states/TCI state IDs. The first indicated TCI state(s)—e.g., among the N=2 TCI states/pairs of TCI states {TCI state(s) A, TCI state(s) B}—i.e., TCI state(s) A, could be associated to the serving cell PCI/PCI index if it is from—e.g., via MAC CE activation—the RRC configured list(s)/group(s) of TCI states/TCI state ID(s) that is associated/configured with the serving cell PCI/PCI index, or a PCI/PCI index other than the serving cell PCI/PCI index if it is from—e.g., via MAC CE activation—the RRC configured list(s)/group(s) of TCI states/TCI state ID(s) that is associated/configured with the PCI/PCI index other than the serving cell PCI/PCI index. Furthermore, the second indicated TCI state(s)—e.g., among the N=2 TCI states/pairs of TCI states {TCI state(s) A, TCI state(s) B}—i.e., TCI state(s) B, could be associated to the serving cell PCI/PCI index if it is from—e.g., via MAC CE activation—the RRC configured list(s)/group(s) of TCI states/TCI state ID(s) that is associated/configured with the serving cell PCI/PCI index, or a PCI/PCI index other than the serving cell PCI/PCI index if it is from—e.g., via MAC CE activation—the RRC configured list(s)/group(s) of TCI states/TCI state ID(s) that is associated/configured with the PCI/PCI index other than the serving cell PCI/PCI index.

Yet for another example, the first indicated TCI state(s)—e.g., among the N=2 TCI states/pairs of TCI states {TCI state(s) A, TCI state(s) B}—i.e., TCI state(s) A, could be associated to the serving cell PCI/PCI index if it is from the set of one or more TCI states/pairs of TCI states in the TCI state(s) indication/activation MAC CE(s) that is associated/configured with the serving cell PCI/PCI index, or a PCI/PCI index other than the serving cell PCI/PCI index if it is from the set of one or more TCI states/pairs of TCI states in the TCI state(s) indication/activation MAC CE(s) that is associated/configured with the PCI/PCI index other than the serving cell PCI/PCI index. Furthermore, the second indicated TCI state(s)—e.g., among the N=2 TCI states/pairs of TCI states {TCI state(s) A, TCI state(s) B}—i.e., TCI state(s) B, could be associated to the serving cell PCI/PCI index if it is from the set of one or more TCI states/pairs of TCI states in the TCI state(s) indication/activation MAC CE(s) that is associated/configured with the serving cell PCI/PCI index, or a PCI/PCI index other than the serving cell PCI/PCI index if it is from the set of one or more TCI states/pairs of TCI states in the TCI state(s) indication/activation MAC CE(s) that is associated/configured with the PCI/PCI index other than the serving cell PCI/PCI index.

In another example, the one or more TCI states/pairs of TCI states indicated by one or more TCI codepoints of one or more TCI fields in a beam indication DCI/MAC CE could be associated to one or more PCIs/PCI indexes other than the serving cell PCI/PCI index. For instance, a TCI codepoint indicated by a TCI field in a beam indication DCI could comprise/include/contain N=2 TCI states/pairs of TCI states denoted by {TCI state(s) A, TCI state(s) B}, wherein each of the indicated TCI states could be a joint DL and UL TCI state provided by TCI-State/DLorJoint-TCIState, a separate DL TCI state provided by TCI-State/DLorJoint-TCIState, or a separate UL TCI state provided by ULTCI-State. The UE 116 could be indicated/provided/configured by the network 130, e.g., via higher layer RRC signaling/parameter and/or MAC CE command and/or dynamic DCI based L1 signaling, the association between the indicated TCI state(s) and the PCI(s); alternatively, the association between the indicated TCI state(s) and the PCI(s) is fixed in the system specification(s).

For example, a PCI/PCI index could be provided in the higher layer parameter such as TCI-State, DLorJoint-TCIState or ULTCI-State that configures a corresponding TCI state. For the design example specified herein in the present disclosure, a first PCI/PCI index other than the serving cell PCI/PCI index could be provided/configured/indicated in the higher layer parameter such as TCI-State, DLorJoint-TCIState or ULTCI-State that configures TCI state(s) A (or TCI state(s) B), and a second PCI/PCI index other than the serving cell PCI/PCI index could be provided/configured/indicated in the higher layer parameter such as TCI-State, DLorJoint-TCIState or ULTCI-State that configures TCI state(s) B (or TCI state(s) A).

For another example, the first indicated TCI state(s)—e.g., among the N=2 TCI states/pairs of TCI states {TCI state(s) A, TCI state(s) B}—i.e., TCI state(s) A, could be associated to a first PCI/PCI index other than the serving cell PCI/PCI index when/if the (SDCI-based) inter-cell multi-TRP operation is enabled. The second indicated TCI state(s)—e.g., among the N=2 TCI states/pairs of TCI states {TCI state(s) A, TCI state(s) B}—i.e., TCI state(s) B, could be associated to a second PCI/PCI index other than the serving cell PCI/PCI index when/if the (SDCI-based) inter-cell multi-TRP operation is enabled. The first or second PCI(s)/PCI index(es) other than the serving cell PCI/PCI index could be provided/configured/indicated in the corresponding higher layer parameter(s) that configures TCI state(s) A or TCI state(s) B as specified herein in the present disclosure or in separate RRC/MAC CE/DCI signaling(s). The first PCI/PCI index could be higher (or lower) than the second PCI/PCI index.

Yet for another example, the UE 116 could be provided/configured/indicated by the network 130, e.g., via higher layer RRC signaling/parameter and/or MAC CE command and/or dynamic DCI based L1 signaling, a set/list of two PCIs/PCI indexes including a first PCI/PCI index other than the serving cell PCI/PCI index and a second PCI/PCI index other than the serving cell PCI/PCI index. The first indicated TCI state(s)—e.g., among the N=2 TCI states/pairs of TCI states {TCI state(s) A, TCI state(s) B}—i.e., TCI state(s) A, could be associated to the first (or second) entry-corresponding to either the first PCI/PCI index or the second PCI/PCI index—in the set/list of PCIs/PCI indexes. The second indicated TCI state(s)—e.g., among the N=2 TCI states/pairs of TCI states {TCI state(s) A, TCI state(s) B}—i.e., TCI state(s) B, could be associated to the second (or first) entry-corresponding to either the first PCI/PCI index or the second PCI/PCI index—in the set/list of PCIs/PCI indexes.

Yet for another example, the UE 116 could be provided/configured/indicated by the network 130, e.g., via higher layer RRC signaling/parameter and/or MAC CE command and/or dynamic DCI based L1 signaling, a bitmap of two entries 0 and 1 with 0 (or 1) representing a first PCI/PCI index other than the serving cell PCI/PCI index and 1 (or 0) representing a second PCI/PCI index other than the serving cell PCI/PCI index. The first indicated TCI state(s)—e.g., among the N=2 TCI states/pairs of TCI states {TCI state(s) A, TCI state(s) B}—i.e., TCI state(s) A, could be associated to the first (or second) entry of the bitmap-corresponding to either 0 (or 1) representing the first PCI/PCI index or 1 (or 0) representing the second PCI/PCI index. The second indicated TCI state(s)—e.g., among the N=2 TCI states/pairs of TCI states {TCI state(s) A, TCI state(s) B}—i.e., TCI state(s) B, could be associated to the second (or first) entry of the bitmap-corresponding to either 0 (or 1) representing the first PCI/PCI index or 1 (or 0) representing the second PCI/PCI index. For this case, the first or second PCI(s)/PCI index(es) other than the serving cell PCI/PCI index could be provided/configured/indicated in the higher layer parameter(s) that configures the corresponding TCI state(s)—e.g., TCI state(s) A or TCI state(s) B—as specified herein in the present disclosure or in separate RRC/MAC CE/DCI signaling(s).

Yet for another example, the UE 116 could be higher layer RRC configured by the network 130 one or more lists/groups of TCI states or TCI state IDs. The one or more lists/groups of TCI states/TCI state IDs could be associated/configured with different PCIs/PCI indexes including PCI(s)/PCI index(es) other than the serving cell PCI/PCI index. For instance, one or more PCIs/PCI indexes could be provided/configured/indicated in the higher layer RRC parameter(s) that configures the corresponding list(s)/group(s) of TCI states/TCI state IDs. The first indicated TCI state(s)—e.g., among the N=2 TCI states/pairs of TCI states {TCI state(s) A, TCI state(s) B}—i.e., TCI state(s) A, could be associated to a first PCI/PCI index other than the serving cell PCI/PCI index if it is from—e.g., via MAC CE activation—the RRC configured list(s)/group(s) of TCI states/TCI state ID(s) that is associated/configured with the first PCI/PCI index, or a second PCI/PCI index other than the serving cell PCI/PCI index if it is from—e.g., via MAC CE activation—the RRC configured list(s)/group(s) of TCI states/TCI state ID(s) that is associated/configured with the second PCI/PCI index. Furthermore, the second indicated TCI state(s)—e.g., among the N=2 TCI states/pairs of TCI states {TCI state(s) A, TCI state(s) B}—i.e., TCI state(s) B, could be associated to a first PCI/PCI index other than the serving cell PCI/PCI index if it is from—e.g., via MAC CE activation—the RRC configured list(s)/group(s) of TCI states/TCI state ID(s) that is associated/configured with the first PCI/PCI index, or a second PCI/PCI index other than the serving cell PCI/PCI index if it is from—e.g., via MAC CE activation—the RRC configured list(s)/group(s) of TCI states/TCI state ID(s) that is associated/configured with the second PCI/PCI index.

Yet for another example, the first indicated TCI state(s)—e.g., among the N=2 TCI states/pairs of TCI states {TCI state(s) A, TCI state(s) B}—i.e., TCI state(s) A, could be associated to a first PCI/PCI index other than the serving cell PCI/PCI index if it is from the set of one or more TCI states/pairs of TCI states in the TCI state(s) indication/activation MAC CE(s) that is associated/configured with the first PCI/PCI index, or a second PCI/PCI index other than the serving cell PCI/PCI index if it is from the set of one or more TCI states/pairs of TCI states in the TCI state(s) indication/activation MAC CE(s) that is associated/configured with the second PCI/PCI index. Furthermore, the second indicated TCI state(s)—e.g., among the N=2 TCI states/pairs of TCI states {TCI state(s) A, TCI state(s) B}—i.e., TCI state(s) B, could be associated to a first PCI/PCI index other than the serving cell PCI/PCI index if it is from the set of one or more TCI states/pairs of TCI states in the TCI state(s) indication/activation MAC CE(s) that is associated/configured with the first PCI/PCI index, or a second PCI/PCI index other than the serving cell PCI/PCI index if it is from the set of one or more TCI states/pairs of TCI states in the TCI state(s) indication/activation MAC CE(s) that is associated/configured with the second PCI/PCI index.

In one embodiment, as specified herein in the present disclosure, the UE 116 could be indicated/provided/configured by the network 130, in a beam indication DCI with DL assignment (e.g., DCI format 1_1 or 1_2 with PDSCH assignment)—denoted by beam indication DCI_a, one or more (e.g., N=2) first TCI states/pairs of TCI states by one or more TCI codepoints of one or more TCI fields, and/or a second indicator as specified herein in the present disclosure, for PDSCH reception(s) in a SDCI based multi-TRP system. The one or more first TCI states/pairs of TCI states could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. Furthermore, the UE 116 could send to the network 130 a capability signaling, e.g., denoted by twoDefaultTCI-States, to indicate to the network 130 that the UE 116 is capable of using/applying two or more (default) joint/DL TCI states—and therefore, the corresponding two or more (default) QCL assumptions—to simultaneously receive one or more PDSCHs, or the UE 116 could send to the network 130 a capability signaling, e.g., denoted by oneDefaultTCI-State, to indicate to the network 130 that the UE 116 is capable of using/applying only one (default) joint/DL TCI state—and therefore, the corresponding one (default) QCL assumption—to receive the PDSCH(s). The UE 116 could also be configured by the network 130, e.g., via a higher layer RRC signaling/parameter denoted by enableTwoDefaultTCI-States, to use/apply two or more (default) joint/DL TCI states—and therefore, the corresponding two or more (default) QCL assumptions—to simultaneously receive one or more PDSCHs. When/if the UE 116 does not send to the network 130 twoDefaultTCI-States, or the UE 116 sends to the network 130 oneDefaultTCI-State, or the UE 116 is not configured with enableTwoDefaultTCI-States, the UE 116 could use/apply only one (default) joint/DL TCI state—and therefore, the corresponding one (default) QCL assumption—to receive the PDSCH(s). The default TCI state(s) could be only applied/used when scheduling offset between the scheduling DCI and the scheduled PDSCH is less than a threshold, wherein the threshold could be: (1) configured/provided/indicated by the network 130, e.g., via higher layer RRC signaling/parameter and/or MAC CE command and/or dynamic DCI based L1 signaling, e.g., threshold=timeDurationForQCL, (2) fixed in the system specifications, e.g., threshold=timeDurationForQCL and/or (3) autonomously determined by the UE 116 and reported to the network 130.

The UE 116 could be able to determine which one or more of the indicated first TCI states/pairs of TCI states to use/apply for PDSCH reception(s) according to the second indicator indicated in the corresponding beam indication DCI_a t_0 (e.g., in terms of slots, symbols, etc.) after reception of the beam indication DCI_a (e.g., t_0 slots/symbols after the last symbol/slot of the PDCCH/PDCCH candidate that carries the beam indication DCI_a). Furthermore, the UE 116 could be able to use/apply the determined one or more of the indicated first TCI states/pairs of TCI states for PDSCH reception(s) t_1 (e.g., in terms of slots, symbols, etc.) after reception of the beam indication DCI_a (e.g., t_1 slots/symbols after the last symbol/slot of the PDCCH/PDCCH candidate that carries the beam indication DCI_a). In one example, t_0 could be: (1) configured/provided/indicated by the network 130, e.g., via higher layer RRC signaling/parameter and/or MAC CE command and/or dynamic DCI based L1 signaling, e.g., t_0=timeDurationForQCL, (2) fixed in the system specifications, e.g., t_0=timeDurationForQCL and/or (3) autonomously determined by the UE 116 and reported to the network 130. In another example, t_1 could correspond to the beam application time specified under the unified TCI framework, which is defined as follows: when the UE 116 would transmit the last symbol of a PUCCH with hybrid automatic repeat request (HARQ)-acknowledgement (ACK) information corresponding to the PDSCH scheduled by the beam indication DCI_a, and if the one or more of the indicated first TCI states is different from the previously indicated one(s), the one or more of the indicated first TCI states could be applied starting from the first slot that is at least BeamAppTime_r17 symbols after the last symbol of the PUCCH; the first slot and the BeamAppTime_r17 symbols could be both determined on the carrier with the smallest subcarrier spacing (SCS) among the carrier(s) applying the beam indication.

In one example, when/if the scheduling offset—e.g., the time duration/difference between the last symbol/slot of the PDCCH/PDCCH candidate that carries the beam indication DCI_a and the first symbol/slot of the PDSCH scheduled by the beam indication DCI_a—is greater than or equal to t_1 associated to the beam indication DCI_a, and when/if the second indicator is RRC configured to be present in the corresponding beam indication/scheduling DCI, the UE 116 could follow the second indicator to use/apply one or more of the indicated first TCI states in the beam indication DCI_a as specified herein in the present disclosure, to receive the PDSCH.

For instance, N=2 TCI states/pairs of TCI states—denoted by {TCI state(s) X, TCI state(s) Y}—could be indicated by a TCI codepoint of a TCI field in the beam indication DCI_a; for this case, when/if the second indicator indicated in the beam indication DCI_a is set to '00' as specified herein in the present disclosure, the UE 116 could use/apply the first indicated TCI state(s)—e.g., among the N=2 TCI states/pairs of TCI states indicated in the DCI_a—i.e., TCI state(s) X in this design example to receive the PDSCH(s); when/if the second indicator indicated in the beam indication DCI_a is set to '01' as specified herein in the present disclosure, the UE 116 could use/apply the second indicated TCI state(s)—e.g., among the N=2 TCI states/pairs of TCI states indicated in the DCI_a—i.e., TCI state(s) Y in this design example to receive the PDSCH(s); when/if the second indicator indicated in the beam indication DCI_a is set to '10' or '11' as specified herein in the present disclosure, the UE 116 could use/apply both of the first and second indicated TCI states—e.g., among the N=2 TCI states/pairs of TCI states indicated in the DCI_a—i.e., TCI state(s) X and TCI state(s) Y in this design example to receive the PDSCH(s).

For this design example, when/if the UE 116 reports to the network 130 the capability signaling oneDefault-TCI-State, or the UE 116 is configured with enable-OneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '00' or '01' indicating that the first or second indicated TCI state(s)—e.g., among the N=2 TCI states/pairs of TCI states indicated in the DCI_a—i.e., TCI state(s) X or TCI state(s) Y in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '10' or '11' indicating that both of the first and second indicated TCI states—e.g., among the N=2 TCI states/pairs of TCI states indicated in the DCI_a—i.e., TCI state(s) X and TCI state(s) Y in this design example, could be used for PDSCH reception(s).

In another example, when/if the scheduling offset—e.g., the time duration/difference between the last symbol/slot of the PDCCH/PDCCH candidate that carries the beam indication DCI_a and the first symbol/slot of the PDSCH scheduled by the beam indication DCI_a—is less than or equal to t_0, the UE 116 could use/apply one or more indicated second TCI states to receive the PDSCH, wherein the one or more indicated second TCI states could be determined according to one or more of the following. Furthermore, the indicated second TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. In addition, the PDSCH could be UE-dedicated PDSCH and/or non-UE-dedicated PDSCH as specified herein in the present disclosure.

For example, the indicated second TCI state(s) could correspond to one or more of the TCI state(s) indicated in a beam indication DCI_b, wherein (1) the time offset between the beam indication DCI_b and the PDSCH scheduled by the beam indication DCI_a—e.g., the time duration/difference between the last symbol/slot of the PDCCH/PDCCH candidate that carries the beam indication DCI_b and the first symbol/slot of the PDSCH scheduled by the beam indication DCI_a—is greater than or equal to t_1 associated to the beam indication DCI_b, and/or (2) the beam indication DCI_b is received the most recent in time relative to the beam indication DCI_a, and/or (3) the one or more of the TCI state(s) indicated in the beam indication DCI_b is joint or (separate) DL TCI state(s) provided by TCI-State or DLorJoint-TCIState, and/or (4) the number of the one or more of the TCI state(s) indicated in the beam indication DCI_b is one or two. Furthermore, the TCI state(s) indicated in the beam indication DCI_b could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled.

In one example, a single TCI state/pair of TCI states—denoted by TCI state(s) A—could be indicated by a TCI codepoint of a TCI field in the beam indication DCI_b; for this case, the indicated second TCI state(s) as discussed in the present disclosure could correspond to the TCI state(s) A. When/if the (SDCI based) inter-cell multi-TRP operation is enabled, and when/if the TCI state(s) A is associated to the serving cell PCI/PCI index, the indicated second TCI state(s) as discussed in the present disclosure could correspond to the TCI state(s) A. When/if the (SDCI based) inter-cell multi-TRP operation is enabled, and when/if the TCI state(s) A is associated to PCI(s)/PCI index(es) other than the serving cell PCI/PCI index, the indicated second TCI state(s) as discussed in the present disclosure could correspond to the TCI state(s) A for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

In another example, N=2 TCI states/pairs of TCI states—denoted by {TCI state(s) A, TCI state(s) B}—could be indicated by a TCI codepoint of a TCI field in the beam indication DCI_b; for this case, the indicated second TCI states as discussed in the present disclosure could correspond to both of the TCI state(s) A and TCI state(s) B. When/if the (SDCI based) inter-cell multi-TRP operation is enabled, and when/if at least one of the TCI state(s) A and TCI state(s) B is associated to the serving cell PCI/PCI index, the indicated second TCI state(s) as discussed in the present disclosure could correspond to both of the TCI state(s) A and TCI state(s) B—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if both of the TCI state(s) A and TCI state(s) B are associated to PCI(s)/PCI index(es) other than the serving cell PCI/PCI index, the indicated second TCI state(s) as discussed in the present disclosure could correspond to the TCI state(s) A and TCI state(s) B for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling twoDefaultTCI-States, or the UE 116 could be configured with enableTwoDefaultTCI-States as specified herein in the present disclosure.

In yet another example, N=2 TCI states/pairs of TCI states—denoted by {TCI state(s) A, TCI state(s) B}—could be indicated by a TCI codepoint of a TCI field in the beam indication DCI_b; for this case, the indicated second TCI state(s) could correspond to the first indicated TCI state(s)—e.g., among the N=2 TCI states/pairs of TCI states indicated in the DCI_b—i.e., TCI state(s) A in this design example. When/if the (SDCI based) inter-cell multi-TRP operation is enabled, and when/if the first indicated TCI state(s)—e.g., among the N=2 TCI states/pairs of TCI states indicated in the DCI_b—i.e., TCI state(s) A in this design example is associated to the serving cell PCI/PCI index, the indicated second TCI state(s) as discussed in the present disclosure could correspond to the TCI state(s) A. When/if the (SDCI based) inter-cell multi-TRP operation is enabled, and when/if the first indicated TCI state(s)—e.g., among the N=2 TCI states/pairs of TCI states indicated in the DCI_b—i.e., TCI state(s) A in this design example is associated to PCI(s)/PCI index(es) other than the serving cell PCI/PCI index, the indicated second TCI state(s) as discussed in the present disclosure could correspond to the TCI state(s) A for at least UE-dedicated PDSCH reception(s), and/or the second indicated TCI state(s)—e.g., among the N=2 TCI states/pairs of TCI states indicated in the DCI_b—i.e., TCI state(s) B in this design example for at least non-UE-dedicated PDSCH reception (s) when/if the TCI state(s) B is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling oneDefaultTCI-State, or the UE 116 does not report to the network 130 the capability signaling twoDefaultTCI-States, or the UE 116 is not configured with enableTwoDefaultTCI-States as specified herein in the present disclosure. Alternatively, the UE 116 could report to the network 130 the capability signaling twoDefaultTCI-States, or the UE 116 could be configured with enableTwoDefaultTCI-States as specified herein in the present disclosure.

In yet another example, N=2 TCI states/pairs of TCI states—denoted by {TCI state(s) A, TCI state(s) B}—could be indicated by a TCI codepoint of a TCI field in the beam indication DCI_b; for this case, the indicated second TCI state(s) could correspond to the second indicated TCI state(s)—e.g., among the N=2 TCI states/pairs of TCI states indicated in the DCI_b—i.e., TCI state(s) B in this design example. When/if the (SDCI based) inter-cell multi-TRP operation is enabled, and when/if the second indicated TCI state(s)—e.g., among the N=2 TCI states/pairs of TCI states indicated in the DCI_b—i.e., TCI state(s) B in this design example is associated to the serving cell PCI/PCI index, the indicated second TCI state(s) as discussed in the present disclosure could correspond to the TCI state(s) B. When/if the (SDCI based) inter-cell multi-TRP operation is enabled, and when/if the second indicated TCI state(s)—e.g., among the N=2 TCI states/pairs of TCI states indicated in the DCI_b—i.e., TCI state(s) B in this design example is associated to PCI(s)/PCI index(es) other than the serving cell PCI/PCI index, the indicated second TCI state(s) as discussed in the present disclosure could correspond to the TCI state(s) B for at least UE-dedicated PDSCH reception(s), and/or the first indicated TCI state(s)—e.g., among the N=2 TCI states/pairs of TCI states indicated in the DCI_b—i.e., TCI state(s) A in this design example for at least non-UE-dedicated PDSCH reception(s) when/if the TCI state(s) A is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling oneDefaultTCI-State, or the UE 116 does not report to the network 130 the capability signaling twoDefaultTCI-States, or the UE 116 is not configured with enableTwoDefaultTCI-States as specified herein in the present disclosure. Alternatively, the UE 116 could report to the network 130 the capability signaling twoDefaultTCI-States, or the UE 116 could be configured with enableTwoDefaultTCI-States as specified herein in the present disclosure.

In yet another example, N=2 TCI states/pairs of TCI states—denoted by {TCI state(s) A, TCI state(s) B}—could be indicated by a TCI codepoint of a TCI field in the beam indication DCI_b; furthermore, the UE 116 could be indicated/configured/provided by the network 130, e.g., via higher layer RRC signaling/parameter (e.g., in the higher layer parameter PDSCH-Config that configures the PDSCH) and/or MAC CE command, a 2-bit indicator with '00' ('01', '10' or '11') indicating that the indicated second TCI state(s) could correspond to the first indicated TCI state(s)—e.g., among the N=2 TCI states/pairs of TCI states indicated in the DCI_b—i.e., TCI state(s) A in this design example. '01' ('00', '10' or '11') indicates that the indicated second TCI state(s) could correspond to the second indicated TCI state(s)—e.g., among the N=2 TCI states/pairs of TCI states indicated in the DCI_b—i.e., TCI state(s) B in this design example, and '10' or '11' ('00' or '01') indicating that the indicated second TCI states could correspond to both of the first and second indicated TCI states—e.g., among the N=2 TCI states/pairs of TCI states indicated in the DCI_b—i.e., TCI state(s) A and TCI state(s) B in this design example.

When/if the (SDCI based) inter-cell multi-TRP operation is enabled, and when/if the 2-bit indicator is set to '00' ('01', '10' or '11') as specified herein in the present disclosure indicating the first indicated TCI state(s)—e.g., among the N=2 TCI states/pairs of TCI states indicated in the DCI_b—i.e., TCI state(s) A in this design example, and when/if the first indicated TCI state(s)—e.g., among the N=2 TCI states/pairs of TCI states indicated in the DCI_b—i.e., TCI state(s) A in this design example is associated to the serving cell PCI/PCI index, the indicated second TCI state(s) as discussed in the present disclosure could correspond to the TCI state(s) A. When/if the (SDCI based) inter-cell multi-TRP operation is enabled, and when/if the 2-bit indicator is set to '00' ('01', '10' or '11') as specified herein in the present disclosure indicating the first indicated TCI state(s)—e.g., among the N=2 TCI states/pairs of TCI states indicated in the DCI_b—i.e., TCI state(s) A in this design example, and when/if the first indicated TCI state(s)—e.g., among the N=2 TCI states/pairs of TCI states indicated in the DCI_b—i.e., TCI state(s) A in this design example is associated to PCI(s)/PCI index(es) other than the serving cell PCI/PCI index, the indicated second TCI state(s) as discussed in the present disclosure could correspond to the TCI state(s) A for at least UE-dedicated PDSCH reception(s), and/or the second indicated TCI state(s)—e.g., among the N=2 TCI states/pairs of TCI states indicated in the DCI_b—i.e., TCI state(s) B in this design example for at least non-UE-dedicated PDSCH reception(s) when/if the TCI state(s) B is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the 2-bit indicator is set to '01' ('00', '10' or '11') as specified herein in the present disclosure indicating the second indicated TCI state(s)—e.g., among the N=2 TCI states/pairs of TCI states indicated in the DCI_b—i.e., TCI state(s) B in this design example, and when/if the second indicated TCI state(s)—e.g., among the N=2 TCI states/pairs of TCI states indicated in the DCI_b—i.e., TCI state(s) B in this design example is associated to the serving cell PCI/PCI index, the indicated second TCI state(s) as discussed in the present disclosure could correspond to the TCI state(s) B. When/if the (SDCI based) inter-cell multi-TRP operation is enabled, and when/if the 2-bit indicator is set to '01' ('00', '10' or '11') as specified herein in the present disclosure indicating the second indicated TCI state(s)—e.g., among the N=2 TCI states/pairs of TCI states indicated in the DCI_b—i.e., TCI state(s) B in this design example, and when/if the second indicated TCI state(s)—e.g., among the N=2 TCI states/pairs of TCI states indicated in the DCI_b—i.e., TCI state(s) B in this design example is associated to PCI(s)/PCI index(es) other than the serving cell PCI/PCI index, the indicated second TCI state(s) as discussed in the present disclosure could correspond to the TCI state(s) B for at least UE-dedicated PDSCH reception(s), and/or the first indicated TCI state(s)—e.g., among the N=2 TCI states/pairs of TCI states indicated in the DCI_b—i.e., TCI state(s) A in this design example for at least non-UE-dedicated PDSCH reception(s) when/if the TCI state(s) A is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the 2-bit indicator is set to '10' or '11' ('00' or '01') as specified herein in the present disclosure indicating the first and second indicated TCI states—e.g., among the N=2 TCI states/pairs of TCI states indicated in the DCI_b—i.e., TCI state(s) A and TCI state(s) B in this design example, and when/if at least one of the TCI state(s) A and TCI state(s) B is associated to the serving cell PCI/PCI index, the indicated second TCI state(s) as discussed in the present disclosure could correspond to both of the TCI state(s) A and TCI state(s) B—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the 2-bit indicator is set to '10' or '11' ('00' or '01') as specified herein in the present disclosure indicating the first and second indicated TCI states—e.g., among the N=2 TCI states/pairs of TCI states indicated in the DCI_b—i.e., TCI state(s) A and TCI state(s) B in this design example, and when/if both of the TCI state(s) A and TCI state(s) B are associated to PCI(s)/PCI index(es) other than the serving cell PCI/PCI index, the indicated second TCI state(s) as discussed in the present disclosure could correspond to the TCI state(s) A and TCI state(s) B for at least UE-dedicated PDSCH reception(s), and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States as specified herein in the present disclosure, or the UE 116 reports to the network 130 the capability signaling twoDefaultTCI-States, or the UE 116 is configured with enableTwoDefault-TCI-States as specified herein in the present disclosure, the 2-bit indicator, e.g., provided in PDSCH-Config, could be set to value(s) such as '00' or '01' indicating that the first or second indicated TCI state(s)—e.g., among the N=2 TCI states/pairs of TCI states indicated in the DCI_b—i.e., TCI state(s) A or TCI state(s) B in this design example, could be used for PDSCH reception(s). When/if the UE 116 reports to the network 130 the capability signaling twoDefaultTCI-States, or the UE 116 is configured with enableTwoDefault-TCI-States as specified herein in the present disclosure, the 2-bit indicator, e.g., provided in PDSCH-Config, could be set to value(s) such as '10' or '11' indicating that both of the first and second indicated TCI states—e.g., among the N=2 TCI states/pairs of TCI states indicated in the DCI_b—i.e., TCI state(s) A and TCI state(s) B in this design example, could be used for PDSCH reception(s).

In yet another example, N=2 TCI states/pairs of TCI states—denoted by {TCI state(s) A, TCI state(s) B}—could be indicated by a TCI codepoint of a TCI field in the beam indication DCI_b; furthermore, the UE 116 could be indicated/configured/provided by the network 130, e.g., via higher layer RRC signaling/parameter ControlResourceSet, a 2-bit indicator for the corresponding CORESET. When/if the beam indication DCI_a is received in CORESET(s) with the corresponding/associated 2-bit indicator set to '00' ('01', '10' or '11'), the indicated second TCI state(s) could correspond to the first indicated TCI state(s)—e.g., among the N=2 TCI states/pairs of TCI states indicated in the DCI_b—i.e., TCI state(s) A in this design example, when/if the beam indication DCI_a is received in CORESET(s) with the corresponding/associated 2-bit indicator set to '01' ('00', '10' or '11'), the indicated second TCI state(s) could correspond to the second indicated TCI state(s)—e.g., among the N=2 TCI states/pairs of TCI states indicated in the DCI_b—i.e., TCI state(s) B in this design example, and when/if the beam indication DCI_a is received in CORESET(s) with the corresponding/associated 2-bit indicator set to '10' or '11' ('00' or '01'), the indicated second TCI states could correspond to both of the first and second indicated TCI states—e.g., among the N=2 TCI states/pairs of TCI states indicated in the DCI_b—i.e., TCI state(s) A and TCI state(s) B in this design example.

When/if the (SDCI based) inter-cell multi-TRP operation is enabled, and when/if the beam indication DCI_a is received in CORESET(s) with the corresponding/associated 2-bit indicator set to '00' ('01', '10' or '11') indicating the first indicated TCI state(s)—e.g., among the N=2 TCI states/pairs of TCI states indicated in the DCI_b—i.e., TCI state(s) A in this design example, and when/if the first indicated TCI state(s)—e.g., among the N=2 TCI states/pairs of TCI states indicated in the DCI_b—i.e., TCI state(s) A in this design example is associated to the serving cell PCI/PCI index, the indicated second TCI state(s) as discussed in the present disclosure could correspond to the TCI state(s) A. When/if the (SDCI based) inter-cell multi-TRP operation is enabled, and when/if the beam indication DCI_a is received in CORESET(s) with the corresponding/associated 2-bit indicator set to '00' ('01', '10' or '11') indicating the first indicated TCI state(s)—e.g., among the N=2 TCI states/pairs of TCI states indicated in the DCI_b—i.e., TCI state(s) A in this design example, and when/if the first indicated TCI state(s)—e.g., among the N=2 TCI states/pairs of TCI states indicated in the DCI_b—i.e., TCI state(s) A in this design example is associated to PCI(s)/PCI index(es) other than the serving cell PCI/PCI index, the indicated second TCI state(s) as discussed in the present disclosure could correspond to the TCI state(s) A for at least UE-dedicated PDSCH reception(s), and/or the second indicated TCI state(s)—e.g., among the N=2 TCI states/pairs of TCI states indicated in the DCI_b—i.e., TCI state(s) B in this design example for at least non-UE-dedicated PDSCH reception(s) when/if the TCI state(s) B is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the beam indication DCI_a is received in CORESET(s) with the corresponding/associated 2-bit indicator set to '01' ('00', '10' or '11') indicating the second indicated TCI state(s)—e.g., among the N=2 TCI states/pairs of TCI states indicated in the DCI_b—i.e., TCI state(s) B in this design example, and when/if the second indicated TCI state(s)—e.g., among the N=2 TCI states/pairs of TCI states indicated in the DCI_b—i.e., TCI state(s) B in this design example is associated to the serving cell PCI/PCI index, the indicated second TCI state(s) as discussed in the present disclosure could correspond to the TCI state(s) B. When/if the (SDCI based) inter-cell multi-TRP operation is enabled, and when/if the beam indication DCI_a is received in CORESET(s) with the corresponding/associated 2-bit indicator set to '01' ('00', '10' or '11') indicating the second indicated TCI state(s)—e.g., among the N=2 TCI states/pairs of TCI states indicated in the DCI_b—i.e., TCI state(s) B in this design example, and when/if the second indicated TCI state(s)—e.g., among the N=2 TCI states/pairs of TCI states indicated in the DCI_b—i.e., TCI state(s) B in this design example is associated to PCI(s)/PCI index(es) other than the serving cell PCI/PCI index, the indicated second TCI state(s) as discussed in the present disclosure could correspond to the TCI state(s) B for at least UE-dedicated PDSCH reception(s), and/or the first indicated TCI state(s)—e.g., among the N=2 TCI states/pairs of TCI states indicated in the DCI_b—i.e., TCI state(s) A in this design example for at least non-UE-dedicated PDSCH reception(s) when/if the TCI state(s) A is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the beam indication DCI_a is received in CORESET(s) with the corresponding/associated 2-bit indicator set to '10' or '11' ('00' or '01') indicating the first and second indicated TCI states—e.g., among the N=2 TCI states/pairs of TCI states indicated in the DCI_b—i.e., TCI state(s) A and TCI state(s) B in this design example, and when/if at least one of the TCI state(s) A and TCI state(s) B is associated to the serving cell PCI/PCI index, the indicated second TCI state(s) as discussed in the present disclosure could correspond to both of the TCI state(s) A and TCI state(s) B—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the beam indication DCI_a is received in CORESET(s) with the corresponding/associated 2-bit indicator set to '10' or '11' ('00' or '01') indicating the first and second indicated TCI states—e.g., among the N=2 TCI states/pairs of TCI states indicated in the DCI_b—i.e., TCI state(s) A and TCI state(s) B in this design example, and when/if both of the TCI state(s) A and TCI state(s) B are associated to PCI(s)/PCI index(es) other than the serving cell PCI/PCI index, the indicated second TCI state(s) as discussed in the present disclosure could correspond to the TCI state(s) A and TCI state(s) B for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the 2-bit indicator, e.g., configured/associated to the CORESET(s), could be set to value(s) such as '00' or '01' indicating that the first or second indicated TCI state(s)—e.g., among the N=2 TCI states/pairs of TCI states indicated in the DCI_b—i.e., TCI state(s) A or TCI state(s) B in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the 2-bit indicator, e.g., configured/associated to the CORESET(s), could be set to value(s) such as '10' or '11' indicating that both of the first and second indicated TCI states—e.g., among the N=2 TCI states/pairs of TCI states indicated in the DCI_b—i.e., TCI state(s) A and TCI state(s) B in this design example, could be used for PDSCH reception(s).

In yet another example, N=2 TCI states/pairs of TCI states—denoted by {TCI state(s) A, TCI state(s) B}—could be indicated by a TCI codepoint of a TCI field in the beam indication DCI_b; for this case, when/if the most recent applicable second indicator or the second indicator received the latest in time that is applicable is set to '00' as specified herein in the present disclosure, the indicated second TCI state(s) could correspond to the first indicated TCI state(s)—e.g., among the N=2 TCI states/pairs of TCI states indicated in the DCI_b—i.e., TCI state(s) A in this design example; when/if the most recent applicable second indicator or the second indicator received the latest in time that is applicable is set to '01' as specified herein in the present disclosure, the indicated second TCI state(s) could correspond to the second indicated TCI state(s)—e.g., among the N=2 TCI states/pairs of TCI states indicated in the DCI_b—i.e., TCI state(s) B in this design example; when/if the most recent applicable second indicator or the second indicator received the latest in time that is applicable is set to '10' or '11' as specified herein in the present disclosure, the indicated second TCI states could correspond to both of the first and second indicated TCI states—e.g., among the N=2 TCI states/pairs of TCI states indicated in the DCI_b—i.e., TCI state(s) A and TCI state(s) B in this design example.

When/if the (SDCI based) inter-cell multi-TRP operation is enabled, and when/if the most recent applicable second indicator or the second indicator received the latest in time that is applicable is set to '00' as specified herein in the present disclosure indicating the first indicated TCI state(s)—e.g., among the N=2 TCI states/pairs of TCI states indicated in the DCI_b—i.e., TCI state(s) A in this design example, and when/if the first indicated TCI state(s)—e.g., among the N=2 TCI states/pairs of TCI states indicated in the DCI_b—i.e., TCI state(s) A in this design example is associated to the serving cell PCI/PCI index, the indicated second TCI state(s) as discussed in the present disclosure could correspond to the TCI state(s) A. When/if the (SDCI based) inter-cell multi-TRP operation is enabled, and when/if the most recent applicable second indicator or the second indicator received the latest in time that is applicable is set to '00' as specified herein in the present disclosure indicating the first indicated TCI state(s)—e.g., among the N=2 TCI states/pairs of TCI states indicated in the DCI_b—i.e., TCI state(s) A in this design example, and when/if the first indicated TCI state(s)—e.g., among the N=2 TCI states/pairs of TCI states indicated in the DCI_b—i.e., TCI state(s) A in this design example is associated to PCI(s)/PCI index(es) other than the serving cell PCI/PCI index, the indicated second TCI state(s) as discussed in the present disclosure could correspond to the TCI state(s) A for at least UE-dedicated PDSCH reception(s), and/or the second indicated TCI state(s)—e.g., among the N=2 TCI states/pairs of TCI states indicated in the DCI_b—i.e., TCI state(s) B in this design example for at least non-UE-dedicated PDSCH reception(s) when/if the TCI state(s) B is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the most recent applicable second indicator or the second indicator received the latest in time that is applicable is set to '01' as specified herein in the present disclosure indicating the second indicated TCI state(s)—e.g., among the N=2 TCI states/pairs of TCI states indicated in the DCI_b—i.e., TCI state(s) B in this design example, and when/if the second indicated TCI state(s)—e.g., among the N=2 TCI states/pairs of TCI states indicated in the DCI_b—i.e., TCI state(s) B in this design example is associated to the serving cell PCI/PCI index, the indicated second TCI state(s) as discussed in the present disclosure could correspond to the TCI state(s) B. When/if the (SDCI based) inter-cell multi-TRP operation is enabled, and when/if the most recent applicable second indicator or the second indicator received the latest in time that is applicable is set to '01' as specified herein in the present disclosure indicating the second indicated TCI state(s)—e.g., among the N=2 TCI states/pairs of TCI states indicated in the DCI_b—i.e., TCI state(s) B in this design example, and when/if the second indicated TCI state(s)—e.g., among the N=2 TCI states/pairs of TCI states indicated in the DCI_b—i.e., TCI state(s) B in this design example is associated to PCI(s)/PCI index(es) other than the serving cell PCI/PCI index, the indicated second TCI state(s) as discussed in the present disclosure could correspond to the TCI state(s) B for at least UE-dedicated PDSCH reception(s), and/or the first indicated TCI state(s)—e.g., among the N=2 TCI states/pairs of TCI states indicated in the DCI_b—i.e., TCI state(s) A in this design example for at least non-UE-dedicated PDSCH reception(s) when/if the TCI state(s) A is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the most recent applicable second indicator or the second indicator received the latest in time that is applicable is set to '10' or '11' as specified herein in the present disclosure indicating the first and second indicated TCI states—e.g., among the N=2 TCI states/pairs of TCI states indicated in the DCI_b—i.e., TCI state(s) A and TCI state(s) B in this design example, and when/if at least one of the TCI state(s) A and TCI state(s) B is associated to the serving cell PCI/PCI index, the indicated second TCI state(s) as discussed in the present disclosure could correspond to both of the TCI state(s) A and TCI state(s) B—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the most recent applicable second indicator or the second indicator received the latest in time that is applicable is set to '10' or '11' as specified herein in the present disclosure indicating the first and second indicated TCI states—e.g., among the N=2 TCI states/pairs of TCI states indicated in the DCI_b—i.e., TCI state(s) A and TCI state(s) B in this design example, and when/if both of the TCI state(s) A and TCI state(s) B are associated to PCI(s)/PCI index(es) other than the serving cell PCI/PCI index, the indicated second TCI state(s) as discussed in the present disclosure could correspond to the TCI state(s) A and TCI state(s) B for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the most recent applicable second indicator or the second indicator received the latest in time that is applicable could be set to value(s) such as '00' or '01' indicating that the first or second indicated TCI state(s)—e.g., among the N=2 TCI states/pairs of TCI states indicated in the DCI_b—i.e., TCI state(s) A or TCI state(s) B in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the most recent applicable second indicator or the second indicator received the latest in time that is applicable could be set to value(s) such as '10' or '11' indicating that both of the first and second indicated TCI states—e.g., among the N=2 TCI states/pairs of TCI states indicated in the DCI_b—i.e., TCI state(s) A and TCI state(s) B in this design example, could be used for PDSCH reception(s). Furthermore, in the present disclosure, the most recent applicable second indicator or the second indicator received the latest in time that is applicable could be provided/indicated in a DCI_b', wherein (1) the time offset between the DCI_b'0 and the PDSCH scheduled by the beam indication DCI_a or DCI_b'—e.g., the time duration/difference between the last symbol/slot of the PDCCH/PDCCH candidate that carries the DCI_b' and the first symbol/slot of the PDSCH scheduled by the beam indication DCI_a or DCI_b'—is greater than or equal to t_0 associated to the DCI_b', and/or (2) the DCI_b' is received the most recent in time relative to the beam indication DCI_a.

Figure 8:
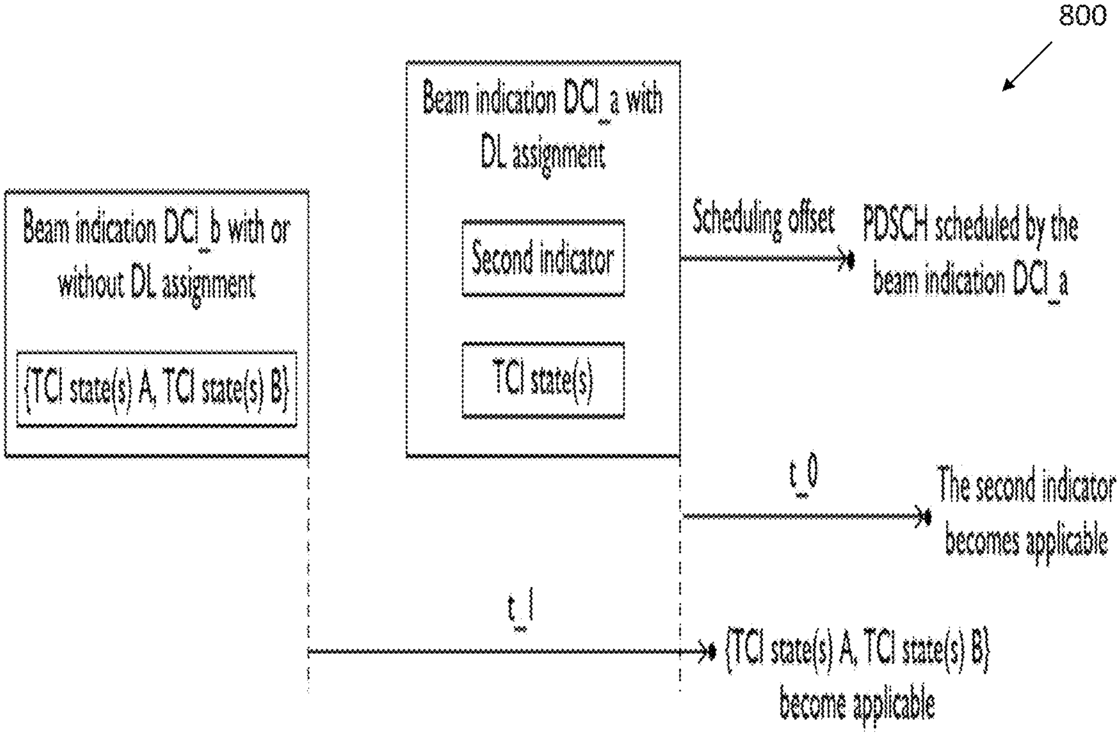
FIG. 8 illustrates a flow diagram for determining default beam(s) for PDSCH reception(s) with scheduling offset(s) less than or equal to a threshold according to embodiments of the present disclosure.

FIG. 8 illustrates a flow diagram 800 for determining default beam(s) for PDSCH reception(s) with scheduling offset(s) less than or equal to a threshold according to embodiments of the present disclosure. For example, flow diagram 800 for determining default beam(s) for PDSCH reception(s) with scheduling offset(s) less than or equal to a threshold could be utilized by any of the UEs 111-116 of FIG. 1. This example is for illustration only and other embodiments can be used without departing from the scope of the present disclosure.

With reference to FIG. 8, the UE 116 could apply TCI state(s) A and/or TCI state(s) B indicated in the DCI_b according to one or more of the design examples specified herein in the present disclosure to receive the PDSCH scheduled by the beam indication DCI_a when the corresponding scheduling offset is less than t_0 associated to the beam indication DCI_a.

For another example, the indicated second TCI state(s) could correspond to one or more of the TCI state(s) indicated in one or more beam indication DCIs received prior to the beam indication DCI_a in time, wherein (1) the time offset between the one or more previously received beam indication DCIs and the PDSCH scheduled by the beam indication DCI_a—e.g., the time duration(s)/difference(s) between the last symbol(s)/slot(s) of the PDCCH(s)/PDCCH candidate(s) that carries the previously received one or more DCIs and the first symbol/slot of the PDSCH scheduled by the beam indication DCI_a—is greater than or equal to t_1's associated to the previously received one or more beam indication DCIs, and/or (2) the previously received one or more beam indication DCIs are received the most recent in time relative to the beam indication DCI_a, and/or (3) the one or more of the TCI state(s) indicated in the previously received one or more beam indication DCIs is joint or (separate) DL TCI state(s) provided by TCI-State or DLorJoint-TCIState, and/or (4) the number of TCI state(s) indicated in each of the previously received one or more beam indication DCIs is one or two. For instance, the previously received one or more beam indication DCIs could include/comprise a beam indication DCI_b and a beam indication DCI_c each carrying one or more unified TCI states; the beam indication DCI_b could be received later in time than the beam indication DCI_c. Furthermore, the TCI state(s) indicated in the beam indication DCI_b and/or DCI_c could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled.

In one example, the beam indication DCI_c could provide/indicate/include/update, e.g., by a TCI codepoint of a TCI field in the beam indication DCI_c, N=2 TCI states/pairs of TCI states-denoted by {TCI state(s) A', TCI state(s) B'}—for at least the UE-dedicated channels/signals. Furthermore, the beam indication DCI_b could provide/indicate/include/update, e.g., by a TCI codepoint of a TCI field in the beam indication DCI_b, a single TCI state/pair of TCI states—denoted by TCI state(s) B—for at least the UE-dedicated channels/signals. In this design example, the TCI state/pair of TCI states indicated in the beam indication DCI_b—i.e., TCI state(s) B—could be used to update/replace one of the TCI states/pairs of TCI states indicated in the beam indication DCI_c, forming an effective TCI codepoint. For this case, the effective TCI codepoint could be formulated as {TCI state(s) A', TCI state(s) B'}, {TCI state(s) A', TCI state(s) B}, {TCI state(s) B, TCI state(s) B'}, {TCI state(s) A'}, {TCI state(s) B'}0 or {TCI state(s) B}, and the indicated second TCI state(s) could correspond to one or more of the TCI states indicated by the effective TCI codepoint. The UE 116 could be indicated/provided/configured by the network 130, e.g., via higher layer RRC signaling/parameter and/or MAC CE command and/or dynamic DCI based L1 signaling, which one or more of the TCI states/pairs of TCI states indicated in the beam indication DCI_c could be updated/replaced by the TCI state/pair of TCI states indicated in the beam indication DCI_b, i.e., how the effective TCI codepoint is formulated as specified herein in the present disclosure.

In another example, the beam indication DCI_c could provide/indicate/include/update, e.g., by a TCI codepoint of a TCI field in the beam indication DCI_c, a single TCI state/pair of TCI states—denoted by TCI state(s) A'—for at least the UE-dedicated channels/signals. Furthermore, the beam indication DCI_b could provide/indicate/include/update, e.g., by a TCI codepoint of a TCI field in the beam indication DCI_b, N=2 TCI states/pairs of TCI states—denoted by {TCI state(s) A, TCI state(s) B}—for at least the UE-dedicated channels/signals. For this case, an effective TCI codepoint could be formulated as {TCI state(s) A, TCI state(s) B}, {TCI state(s) A', TCI state(s) B}, {TCI state(s) A, TCI state(s) A'}, {TCI state(s) A}, {TCI state(s) B}0 or {TCI state(s) A'}, and the indicated second TCI state(s) could correspond to one or more of the TCI states indicated by the effective TCI codepoint. The UE 116 could be indicated/provided/configured by the network 130, e.g., via higher layer RRC signaling/parameter and/or MAC CE command and/or dynamic DCI based L1 signaling, how the effective TCI codepoint is formulated as specified herein in the present disclosure.

In yet another example, the beam indication DCI_c could provide/indicate/include/update, e.g., by a TCI codepoint of a TCI field in the beam indication DCI_c, a single TCI state/pair of TCI states—denoted by TCI state(s) A'—for at least the UE-dedicated channels/signals. Furthermore, the beam indication DCI_b could provide/indicate/include/update, e.g., by a TCI codepoint of a TCI field in the beam indication DCI_b, a single TCI state/pair of TCI states—denoted by TCI state(s) B—for at least the UE-dedicated channels/signals. For this case, an effective TCI codepoint could be formulated as {TCI state(s) A', TCI state(s) B}, {TCI state(s) B, TCI state(s) A'}, {TCI state(s) A'}0 or {TCI state(s) B}, and the indicated second TCI state(s) could correspond to one or more of the TCI states indicated by the effective TCI codepoint. The UE 116 could be indicated/provided/configured by the network 130, e.g., via higher layer RRC signaling/parameter and/or MAC CE command and/or dynamic DCI based L1 signaling, how the effective TCI codepoint is formulated as specified herein in the present disclosure.

In yet another example, the beam indication DCI_c could provide/indicate/include/update, e.g., by a TCI codepoint of a TCI field in the beam indication DCI_c, N=2 TCI states/pairs of TCI states—denoted by {TCI state(s) A', TCI state(s) B'}—for at least the UE-dedicated channels/signals. Furthermore, the beam indication DCI_b could provide/indicate/include/update, e.g., by a TCI codepoint of a TCI field in the beam indication DCI_b, N=2 TCI states/pairs of TCI states-denoted by {TCI state(s) A, TCI state(s) B}—for at least the UE-dedicated channels/signals. For this case, an effective TCI codepoint could be formulated as {TCI state(s) A', TCI state(s) B'}, {TCI state(s) A, TCI state(s) B}, {TCI state(s) A', TCI state(s) B}, {TCI state(s) A, TCI state(s) B'}, {TCI state(s) A'}, {TCI state(s) B'}, {TCI state(s) A}0 or {TCI state(s) B}0 and the indicated second TCI state(s) could correspond to one or more of the TCI states indicated by the effective TCI codepoint. The UE 116 could be indicated/provided/configured by the network 130, e.g., via higher layer RRC signaling/parameter and/or MAC CE command and/or dynamic DCI based L1 signaling, how the effective TCI codepoint is formulated as specified herein in the present disclosure.

For an effective TCI codepoint as specified herein in the present disclosure:

In one example, as specified here in the present disclosure, a single TCI state/pair of TCI states could be indicated by the effective TCI codepoint; for this case, the indicated second TCI state(s) as discussed in the present disclosure could correspond to the TCI state/pair of TCI states indicated by the effective TCI codepoint. When/if the (SDCI based) inter-cell multi-TRP operation is enabled, and when/if the TCI state/pair of TCI states indicated by the effective TCI codepoint is associated to the serving cell PCI/PCI index, the indicated second TCI state(s) as discussed in the present disclosure could correspond to the TCI state/pair of TCI states indicated by the effective TCI codepoint. When/if the (SDCI based) inter-cell multi-TRP operation is enabled, and when/if the TCI state/pair of TCI states indicated by the effective TCI codepoint is associated to PCI(s)/PCI index(es) other than the serving cell PCI/PCI index, the indicated second TCI state(s) as discussed in the present disclosure could correspond to the TCI state/pair of TCI states indicated by the effective TCI codepoint for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

In another example, as specified herein in the present disclosure, N=2 TCI states/pairs of TCI states—denoted by {TCI state(s) A', TCI state(s) B'}—could be indicated by the effective TCI codepoint; for this case, the indicated second TCI states as discussed in the present disclosure could correspond to both of the TCI state(s) A'0 and TCI state(s) B'. When/if the (SDCI based) inter-cell multi-TRP operation is enabled, and when/if at least one of the TCI state(s) A'0 and TCI state(s) B' is associated to the serving cell PCI/PCI index, the indicated second TCI state(s) as discussed in the present disclosure could correspond to both of the TCI state(s) A'0 and TCI state(s) B'—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if both of the TCI state(s) A'0 and TCI state(s) B' are associated to PCI(s)/PCI index(es) other than the serving cell PCI/PCI index, the indicated second TCI state(s) as discussed in the present disclosure could correspond to the TCI state(s) A'0 and TCI state(s) B' for at least UE-dedicated PDSCH reception(s), and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling twoDefaultTCI-States, or the UE 116 could be configured with enableTwoDefaultTCI-States as specified herein in the present disclosure.

In yet another example, as specified herein in the present disclosure, N=2 TCI states/pairs of TCI states—denoted by {TCI state(s) A', TCI state(s) B'}—could be indicated by the effective TCI codepoint; for this case, the indicated second TCI state(s) could correspond to the first indicated TCI state(s)—e.g., among the N=2 TCI states/pairs of TCI states indicated by the effective TCI codepoint—i.e., TCI state(s) A' in this design example. When/if the (SDCI based) inter-cell multi-TRP operation is enabled, and when/if the first indicated TCI state(s)—e.g., among the N=2 TCI states/pairs of TCI states indicated by the effective TCI codepoint—i.e., TCI state(s) A' in this design example is associated to the serving cell PCI/PCI index, the indicated second TCI state(s) as discussed in the present disclosure could correspond to the TCI state(s) A'. When/if the (SDCI based) inter-cell multi-TRP operation is enabled, and when/if the first indicated TCI state(s)—e.g., among the N=2 TCI states/pairs of TCI states indicated by the effective TCI codepoint—i.e., TCI state(s) A' in this design example is associated to PCI(s)/PCI index(es) other than the serving cell PCI/PCI index, the indicated second TCI state(s) as discussed in the present disclosure could correspond to the TCI state(s) A' for at least UE-dedicated PDSCH reception(s), and/or the second indicated TCI state(s)—e.g., among the N=2 TCI states/pairs of TCI states indicated by the effective TCI codepoint—i.e., TCI state(s) B' in this design example for at least non-UE-dedicated PDSCH reception(s) when/if the TCI state(s) B' is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling oneDefaultTCI-State, or the UE 116 does not report to the network 130 the capability signaling twoDefaultTCI-States, or the UE 116 is not configured with enableTwoDefaultTCI-States as specified herein in the present disclosure. Alternatively, the UE 116 could report to the network 130 the capability signaling twoDefaultTCI-States, or the UE 116 could be configured with enableTwoDefaultTCI-States as specified herein in the present disclosure.

In yet another example, as specified herein in the present disclosure, N=2 TCI states/pairs of TCI states—denoted by {TCI state(s) A', TCI state(s) B'}—could be indicated by the effective TCI codepoint; for this case, the indicated second TCI state(s) could correspond to the second indicated TCI state(s)—e.g., among the N=2 TCI states/pairs of TCI states indicated by the effective TCI codepoint—i.e., TCI state(s) B' in this design example. When/if the (SDCI based) inter-cell multi-TRP operation is enabled, and when/if the second indicated TCI state(s)—e.g., among the N=2 TCI states/pairs of TCI states indicated by the effective TCI codepoint—i.e., TCI state(s) B' in this design example is associated to the serving cell PCI/PCI index, the indicated second TCI state(s) as discussed in the present disclosure could correspond to the TCI state(s) B'. When/if the (SDCI based) inter-cell multi-TRP operation is enabled, and when/if the second indicated TCI state(s)—e.g., among the N=2 TCI states/pairs of TCI states indicated by the effective TCI codepoint—i.e., TCI state(s) B' in this design example is associated to PCI(s)/PCI index(es) other than the serving cell PCI/PCI index, the indicated second TCI state(s) as discussed in the present disclosure could correspond to the TCI state(s) B' for at least UE-dedicated PDSCH reception(s), and/or the first indicated TCI state(s)—e.g., among the N=2 TCI states/pairs of TCI states indicated by the effective TCI codepoint—i.e., TCI state(s) A' in this design example for at least non-UE-dedicated PDSCH reception(s) when/if the TCI state(s) A' is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling oneDefaultTCI-State, or the UE 116 does not report to the network 130 the capability signaling twoDefaultTCI-States, or the UE 116 is not configured with enableTwoDefaultTCI-States as specified herein in the present disclosure. Alternatively, the UE 116 could report to the network 130 the capability signaling twoDefaultTCI-States, or the UE 116 could be configured with enableTwoDefaultTCI-States as specified herein in the present disclosure.

In yet another example, as specified herein in the present disclosure, N=2 TCI states/pairs of TCI states—denoted by {TCI state(s) A', TCI state(s) B'}—could be indicated by the effective TCI codepoint; furthermore, the UE 116 could be indicated/configured/provided by the network 130, e.g., via higher layer RRC signaling/parameter (e.g., in the higher layer parameter PDSCH-Config that configures the PDSCH) and/or MAC CE command, a 2-bit indicator with '00' ('01', '10' or '11') indicating that the indicated second TCI state(s) could correspond to the first indicated TCI state(s)—e.g., among the N=2 TCI states/pairs of TCI states indicated by the effective TCI codepoint—i.e., TCI state(s) A' in this design example. '01' ('00', '10' or '11') indicates that the indicated second TCI state(s) could correspond to the second indicated TCI state(s)—e.g., among the N=2 TCI states/pairs of TCI states indicated by the effective TCI codepoint—i.e., TCI state(s) B' in this design example. '10' or '11' ('00' or '01') indicates that the indicated second TCI states could correspond to both of the first and second indicated TCI states—e.g., among the N=2 TCI states/pairs of TCI states indicated by the effective TCI codepoint—i.e., TCI state(s) A'0 and TCI state(s) B' in this design example.

When/if the (SDCI based) inter-cell multi-TRP operation is enabled, and when/if the 2-bit indicator is set to '00' ('01', '10' or '11') as specified herein in the present disclosure indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to the serving cell PCI/PCI index, the indicated second TCI state(s) as discussed in the present disclosure could correspond to the TCI state(s) A'. When/if the (SDCI based) inter-cell multi-TRP operation is enabled, and when/if the 2-bit indicator is set to '00' ('01', '10' or '11') as specified herein in the present disclosure indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to PCI(s)/PCI index(es) other than the serving cell PCI/PCI index, the indicated second TCI state(s) as discussed in the present disclosure could correspond to the TCI state(s) A' for at least UE-dedicated PDSCH reception(s) and/or the second indicated TCI state(s)—e.g., among the N=2 TCI states/pairs of TCI states indicated by the effective TCI codepoint—i.e., TCI state(s) B' in this design example for at least non-UE-dedicated PDSCH reception(s) when/if the TCI state(s) B' is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the 2-bit indicator is set to '01' ('00', '10' or '11') as specified herein in the present disclosure indicating the second indicated TCI state(s)—e.g., among the N=2 TCI states/pairs of TCI states indicated by the effective TCI codepoint—i.e., TCI state(s) B' in this design example, and when/if the second indicated TCI state(s)—e.g., among the N=2 TCI states/pairs of TCI states indicated by the effective TCI codepoint—i.e., TCI state(s) B' in this design example is associated to the serving cell PCI/PCI index, the indicated second TCI state(s) as discussed in the present disclosure could correspond to the TCI state(s) B'. When/if the (SDCI based) inter-cell multi-TRP operation is enabled, and when/if the 2-bit indicator is set to '01' ('00', '10' or '11') as specified herein in the present disclosure indicating the second indicated TCI state(s)—e.g., among the N=2 TCI states/pairs of TCI states indicated by the effective TCI codepoint—i.e., TCI state(s) B' in this design example, and when/if the second indicated TCI state(s)—e.g., among the N=2 TCI states/pairs of TCI states indicated by the effective TCI codepoint—i.e., TCI state(s) B' in this design example is associated to PCI(s)/PCI index(es) other than the serving cell PCI/PCI index, the indicated second TCI state(s) as discussed in the present disclosure could correspond to the TCI state(s) B' for at least UE-dedicated PDSCH reception(s), and/or the first indicated TCI state(s)—e.g., among the N=2 TCI states/pairs of TCI states indicated by the effective TCI codepoint—i.e., TCI state(s) A' in this design example for at least non-UE-dedicated PDSCH reception(s) when/if the TCI state(s) A' is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the 2-bit indicator is set to '10' or '11' ('00' or '01') as specified herein in the present disclosure indicating the first and second indicated TCI states—e.g., among the N=2 TCI states/pairs of TCI states indicated by the effective TCI codepoint—i.e., TCI state(s) A'0 and TCI state(s) B' in this design example, and when/if at least one of the TCI state(s) A'0 and TCI state(s) B' is associated to the serving cell PCI/PCI index, the indicated second TCI state(s) as discussed in the present disclosure could correspond to both of the TCI state(s) A'0 and TCI state(s) B'—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the 2-bit indicator is set to '10' or '11' ('00' or '01') as specified herein in the present disclosure indicating the first and second indicated TCI states—e.g., among the N=2 TCI states/pairs of TCI states indicated by the effective TCI codepoint—i.e., TCI state(s) A'0 and TCI state(s) B' in this design example, and when/if both of the TCI state(s) A'0 and TCI state(s) B' are associated to PCI(s)/PCI index(es) other than the serving cell PCI/PCI index, the indicated second TCI state(s) as discussed in the present disclosure could correspond to the TCI state(s) A'0 and TCI state(s) B' for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the 2-bit indicator, e.g., provided in PDSCH-Config, could be set to value(s) such as '00' or '01' indicating that the first or second indicated TCI state(s)—e.g., among the N=2 TCI states/pairs of TCI states indicated by the effective TCI codepoint—i.e., TCI state(s) A'0 or TCI state(s) B' in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the 2-bit indicator, e.g., provided in PDSCH-Config, could be set to value(s) such as '10' or '11' indicating that both of the first and second indicated TCI states—e.g., among the N=2 TCI states/pairs of TCI states indicated by the effective TCI codepoint—i.e., TCI state(s) A'0 and TCI state(s) B' in this design example, could be used for PDSCH reception(s).

In yet another example, as specified herein in the present disclosure, N=2 TCI states/pairs of TCI states—denoted by {TCI state(s) A', TCI state(s) B'}—could be indicated by the effective TCI codepoint; furthermore, the UE 116 could be indicated/configured/provided by the network 130, e.g., via higher layer RRC signaling/parameter ControlResourceSet, a 2-bit indicator for the corresponding CORESET. When/if the beam indication DCI_a is received in CORESET(s) with the corresponding/associated 2-bit indicator set to '00' ('01', '10' or '11'), the indicated second TCI state(s) could correspond to the first indicated TCI state(s)—e.g., among the N=2 TCI states/pairs of TCI states indicated by the effective TCI codepoint—i.e., TCI state(s) A' in this design example, when/if the beam indication DCI_a is received in CORESET(s) with the corresponding/associated 2-bit indicator set to '01' ('00', '10' or '11'), the indicated second TCI state(s) could correspond to the second indicated TCI state(s)—e.g., among the N=2 TCI states/pairs of TCI states indicated by the effective TCI codepoint—i.e., TCI state(s) B' in this design example, and when/if the beam indication DCI_a is received in CORESET(s) with the corresponding/associated 2-bit indicator set to '10' or '11' ('00' or '01'), the indicated second TCI states could correspond to both of the first and second indicated TCI states—e.g., among the N=2 TCI states/pairs of TCI states indicated by the effective TCI codepoint—i.e., TCI state(s) A'0 and TCI state(s) B' in this design example.

When/if the (SDCI based) inter-cell multi-TRP operation is enabled, and when/if the beam indication DCI_a is received in CORESET(s) with the corresponding/associated 2-bit indicator set to '00' ('01', '10' or '11') indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to the serving cell PCI/PCI index, the indicated second TCI state(s) as discussed in the present disclosure could correspond to the TCI state(s) A'. When/if the (SDCI based) inter-cell multi-TRP operation is enabled, and when/if the beam indication DCI_a is received in CORESET(s) with the corresponding/associated 2-bit indicator set to ‘00’ (‘01’, ‘10’ or ‘11’) indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to PCI(s)/PCI index(es) other than the serving cell PCI/PCI index, the indicated second TCI state(s) as discussed in the present disclosure could correspond to the TCI state(s) A' for at least UE-dedicated PDSCH reception(s), and/or the second indicated TCI state(s)—e.g., among the N=2 TCI states/pairs of TCI states indicated by the effective TCI codepoint—i.e., TCI state(s) B' in this design example for at least non-UE-dedicated PDSCH reception(s) when/if the TCI state(s) B' is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the beam indication DCI_a is received in CORESET(s) with the corresponding/associated 2-bit indicator set to ‘01’ (‘00’, ‘10’ or ‘11’) indicating the second indicated TCI state(s)—e.g., among the N=2 TCI states/pairs of TCI states indicated by the effective TCI codepoint—i.e., TCI state(s) B' in this design example, and when/if the second indicated TCI state(s)—e.g., among the N=2 TCI states/pairs of TCI states indicated by the effective TCI codepoint—i.e., TCI state(s) B' in this design example is associated to the serving cell PCI/PCI index, the indicated second TCI state(s) as discussed in the present disclosure could correspond to the TCI state(s) B'. When/if the (SDCI based) inter-cell multi-TRP operation is enabled, and when/if the beam indication DCI_a is received in CORESET(s) with the corresponding/associated 2-bit indicator set to ‘01’ (‘00’, ‘10’ or ‘11’) indicating the second indicated TCI state(s)—e.g., among the N=2 TCI states/pairs of TCI states indicated by the effective TCI codepoint—i.e., TCI state(s) B' in this design example, and when/if the second indicated TCI state(s)—e.g., among the N=2 TCI states/pairs of TCI states indicated by the effective TCI codepoint—i.e., TCI state(s) B' in this design example is associated to PCI(s)/PCI index(es) other than the serving cell PCI/PCI index, the indicated second TCI state(s) as discussed in the present disclosure could correspond to the TCI state(s) B' for at least UE-dedicated PDSCH reception(s) and/or the first indicated TCI state(s)—e.g., among the N=2 TCI states/pairs of TCI states indicated by the effective TCI codepoint—i.e., TCI state(s) A' in this design example for at least non-UE-dedicated PDSCH reception(s) when/if the TCI state(s) A' is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the beam indication DCI_a is received in CORESET(s) with the corresponding/associated 2-bit indicator set to ‘10’ or ‘11’ (‘00’ or ‘01’) indicating the first and second indicated TCI states—e.g., among the N=2 TCI states/pairs of TCI states indicated by the effective TCI codepoint—i.e., TCI state(s) A'0 and TCI state(s) B' in this design example, and when/if at least one of the TCI state(s) A'0 and TCI state(s) B' is associated to the serving cell PCI/PCI index, the indicated second TCI state(s) as discussed in the present disclosure could correspond to both of the TCI state(s) A'0 and TCI state(s) B'—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the beam indication DCI_a is received in CORESET(s) with the corresponding/associated 2-bit indicator set to ‘10’ or ‘11’ (‘00’ or ‘01’) indicating the first and second indicated TCI states—e.g., among the N=2 TCI states/pairs of TCI states indicated by the effective TCI codepoint—i.e., TCI state(s) A'0 and TCI state(s) B' in this design example, and when/if both of the TCI state(s) A'0 and TCI state(s) B' are associated to PCI(s)/PCI index(es) other than the serving cell PCI/PCI index, the indicated second TCI state(s) as discussed in the present disclosure could correspond to the TCI state(s) A'0 and TCI state(s) B' for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the 2-bit indicator, e.g., configured/associated to the CORESET(s), could be set to value(s) such as ‘00’ or ‘01’ indicating that the first or second indicated TCI state(s)—e.g., among the N=2 TCI states/pairs of TCI states indicated by the effective TCI codepoint—i.e., TCI state(s) A'0 or TCI state(s) B' in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the 2-bit indicator, e.g., configured/associated to the CORESET(s), could be set to value(s) such as ‘10’ or ‘11’ indicating that both of the first and second indicated TCI states—e.g., among the N=2 TCI states/pairs of TCI states indicated by the effective TCI codepoint—i.e., TCI state(s) A'0 and TCI state(s) B' in this design example, could be used for PDSCH reception(s).

In yet another example, N=2 TCI states/pairs of TCI states—denoted by {TCI state(s) A', TCI state(s) B'}—could be indicated by the effective TCI codepoint; for this case, when/if the most recent applicable second indicator or the second indicator received the latest in time that is applicable is set to '00' as specified herein in the present disclosure, the indicated second TCI state(s) could correspond to the first indicated TCI state(s)—e.g., among the N=2 TCI states/pairs of TCI states indicated by the effective TCI codepoint—i.e., TCI state(s) A' in this design example; when/if the most recent applicable second indicator or the second indicator received the latest in time that is applicable is set to '01' as specified herein in the present disclosure, the indicated second TCI state(s) could correspond to the second indicated TCI state(s)—e.g., among the N=2 TCI states/pairs of TCI states indicated by the effective TCI codepoint—i.e., TCI state(s) B' in this design example; when/if the most recent applicable second indicator or the second indicator received the latest in time that is applicable is set to '10' or '11' as specified herein in the present disclosure, the indicated second TCI states could correspond to both of the first and second indicated TCI states—e.g., among the N=2 TCI states/pairs of TCI states indicated by the effective TCI codepoint—i.e., TCI state(s) A'0 and TCI state(s) B' in this design example.

When/if the (SDCI based) inter-cell multi-TRP operation is enabled, and when/if the most recent applicable second indicator or the second indicator received the latest in time that is applicable is set to '00' as specified herein in the present disclosure indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to the serving cell PCI/PCI index, the indicated second TCI state(s) as discussed in the present disclosure could correspond to the TCI state(s) A'. When/if the (SDCI based) inter-cell multi-TRP operation is enabled, and when/if the most recent applicable second indicator or the second indicator received the latest in time that is applicable is set to '00' as specified herein in the present disclosure indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to PCI(s)/PCI index(es) other than the serving cell PCI/PCI index, the indicated second TCI state(s) as discussed in the present disclosure could correspond to the TCI state(s) A' for at least UE-dedicated PDSCH reception(s), and/or the second indicated TCI state(s)—e.g., among the N=2 TCI states/pairs of TCI states indicated by the effective TCI codepoint—i.e., TCI state(s) B' in this design example for at least non-UE-dedicated PDSCH reception(s) when/if the TCI state(s) B' is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the most recent applicable second indicator or the second indicator received the latest in time that is applicable is set to '01' as specified herein in the present disclosure indicating the second indicated TCI state(s)—e.g., among the N=2 TCI states/pairs of TCI states indicated by the effective TCI codepoint—i.e., TCI state(s) B' in this design example, and when/if the second indicated TCI state(s)—e.g., among the N=2 TCI states/pairs of TCI states indicated by the effective TCI codepoint—i.e., TCI state(s) B' in this design example is associated to the serving cell PCI/PCI index, the indicated second TCI state(s) as discussed in the present disclosure could correspond to the TCI state(s) B'. When/if the (SDCI based) inter-cell multi-TRP operation is enabled, and when/if the most recent applicable second indicator or the second indicator received the latest in time that is applicable is set to '01' as specified herein in the present disclosure indicating the second indicated TCI state(s)—e.g., among the N=2 TCI states/pairs of TCI states indicated by the effective TCI codepoint—i.e., TCI state(s) B' in this design example, and when/if the second indicated TCI state(s)—e.g., among the N=2 TCI states/pairs of TCI states indicated by the effective TCI codepoint—i.e., TCI state(s) B' in this design example is associated to PCI(s)/PCI index(es) other than the serving cell PCI/PCI index, the indicated second TCI state(s) as discussed in the present disclosure could correspond to the TCI state(s) B' for at least UE-dedicated PDSCH reception(s), and/or the first indicated TCI state(s)—e.g., among the N=2 TCI states/pairs of TCI states indicated by the effective TCI codepoint—i.e., TCI state(s) A' in this design example for at least non-UE-dedicated PDSCH reception(s) when/if the TCI state(s) A' is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the most recent applicable second indicator or the second indicator received the latest in time that is applicable is set to '10' or '11' as specified herein in the present disclosure indicating the first and second indicated TCI states—e.g., among the N=2 TCI states/pairs of TCI states indicated by the effective TCI codepoint—i.e., TCI state(s) A' and TCI state(s) B' in this design example, and when/if at least one of the TCI state(s) A'0 and TCI state(s) B' is associated to the serving cell PCI/PCI index, the indicated second TCI state(s) as discussed in the present disclosure could correspond to both of the TCI state(s) A'0 and TCI state(s) B'—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the most recent applicable second indicator or the second indicator received the latest in time that is applicable is set to '10' or '11' as specified herein in the present disclosure indicating the first and second indicated TCI states—e.g., among the N=2 TCI states/pairs of TCI states indicated by the effective TCI codepoint—i.e., TCI state(s) A' and TCI state(s) B' in this design example, and when/if both of the TCI state(s) A'0 and TCI state(s) B' are associated to PCI(s)/PCI index(es) other than the serving cell PCI/PCI index, the indicated second TCI state(s) as discussed in the present disclosure could correspond to the TCI state(s) A'0 and TCI state(s) B' for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the most recent applicable second indicator or the second indicator received the latest in time that is applicable could be set to value(s) such as '00' or '01' indicating that the first or second indicated TCI state(s)—e.g., among the N=2 TCI states/pairs of TCI states indicated by the effective TCI codepoint—i.e., TCI state(s) A'0 or TCI state(s) B' in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the most recent applicable second indicator or the second indicator received the latest in time that is applicable could be set to value(s) such as '10' or '11' indicating that both of the first and second indicated TCI states—e.g., among the N=2 TCI states/pairs of TCI states indicated by the effective TCI codepoint—i.e., TCI state(s) A'0 and TCI state(s) B' in this design example, could be used for PDSCH reception(s). Furthermore, in the present disclosure, the most recent applicable second indicator or the second indicator received the latest in time that is applicable could be provided/indicated in a DCI_b', wherein (1) the time offset between the DCI_b'0 and the PDSCH scheduled by the beam indication DCI_a or DCI_b'—e.g., the time duration/difference between the last symbol/slot of the PDCCH/PDCCH candidate that carries the DCI_b'0 and the first symbol/slot of the PDSCH scheduled by the beam indication DCI_a or DCI_b'—is greater than or equal to t_0 associated to the DCI_b'0 and/or (2) the DCI_b' is received the most recent in time relative to the beam indication DCI_a.

Figure 9:
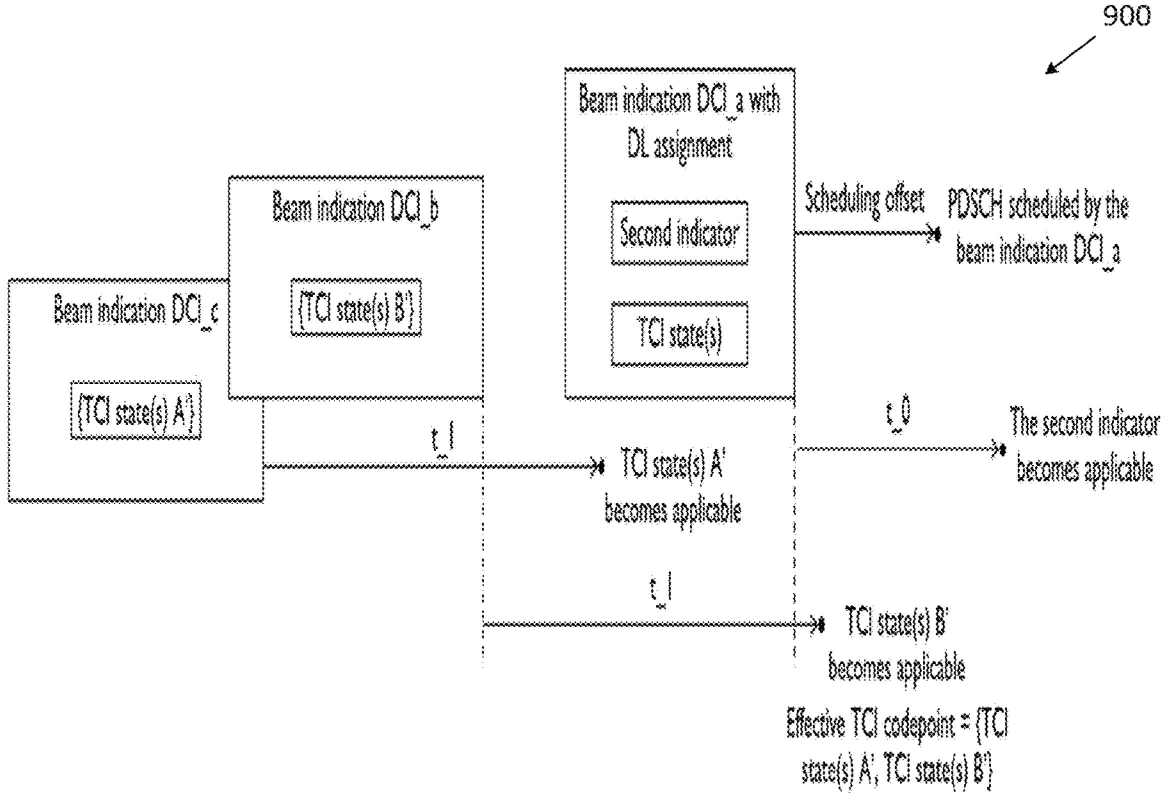
FIG. 9 illustrates a flow diagram for determining default beam(s) for PDSCH reception(s) with scheduling offset(s) less than or equal to a threshold according to embodiments of the present disclosure.

FIG. 9 illustrates a flow diagram 900 for determining default beam(s) for PDSCH reception(s) with scheduling offset(s) less than or equal to a threshold according to embodiments of the present disclosure. For example, flow diagram 900 for determining default beam(s) for PDSCH reception(s) with scheduling offset(s) less than or equal to a threshold can be adhered to by the UE 116 of FIG. 3. This example is for illustration only and other embodiments can be used without departing from the scope of the present disclosure.

With reference to FIG. 9, the UE 116 could apply TCI state(s) A'0 and/or TCI state(s) B' indicated by the effective TCI codepoint according to one or more of the design examples specified herein in the present disclosure to receive the PDSCH scheduled by the beam indication DCI_a when the corresponding scheduling offset is less than t_0 associated to the beam indication DCI_a.

Yet for another example, the indicated second TCI state(s) could correspond to one or more of the TCI state(s) used/applied for receiving/monitoring the PDCCH(s)/PDCCH candidate(s) that carries the scheduling DCI_a. Furthermore, the TCI state(s) used/applied for receiving/monitoring the PDCCH(s)/PDCCH candidate(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled.

In one example, a single TCI state/pair of TCI states could be used/applied for receiving the beam indication DCI_a; for this case, the indicated second TCI state(s) as discussed in the present disclosure could correspond to the TCI state/pair of TCI states used/applied for receiving the beam indication DCI_a. When/if the (SDCI based) inter-cell multi-TRP operation is enabled, and when/if the TCI state/pair of TCI states used/applied for receiving the beam indication DCI_a is associated to the serving cell PCI/PCI index, the indicated second TCI state(s) as discussed in the present disclosure could correspond to the TCI state/pair of TCI states used/applied for receiving the beam indication DCI_a. When/if the (SDCI based) inter-cell multi-TRP operation is enabled, and when/if the TCI state/pair of TCI states used/applied for receiving the beam indication DCI_a is associated to PCI(s)/PCI index(es) other than the serving cell PCI/PCI index, the indicated second TCI state(s) as discussed in the present disclosure could correspond to the TCI state/pair of TCI states used/applied for receiving the beam indication DCI_a for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

In another example, N=2 TCI states/pairs of TCI states—denoted by {TCI state(s) A", TCI state(s) B"}—could be used/applied for receiving the beam indication DCI_a; for this case, the indicated second TCI states as discussed in the present disclosure could correspond to both of the TCI state(s) A"0 and TCI state(s) B". When/if the (SDCI based) inter-cell multi-TRP operation is enabled, and when/if at least one of the TCI state(s) A"0 and TCI state(s) B" is associated to the serving cell PCI/PCI index, the indicated second TCI state(s) as discussed in the present disclosure could correspond to both of the TCI state(s) A"0 and TCI state(s) B"—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if both of the TCI state(s) A"0 and TCI state(s) B" are associated to PCI(s)/PCI index(es) other than the serving cell PCI/PCI index, the indicated second TCI state(s) as discussed in the present disclosure could correspond to the TCI state(s) A"0 and TCI state(s) B" for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling twoDefaultTCI-States, or the UE 116 could be configured with enableTwoDefaultTCI-States as specified herein in the present disclosure.

In yet another example, N=2 TCI states/pairs of TCI states—denoted by {TCI state(s) A", TCI state(s) B"}—could be used/applied for receiving the beam indication DCI_a; for this case, the indicated second TCI state(s) could correspond to the first indicated TCI state(s)—e.g., among the N=2 TCI states/pairs of TCI states used/applied for receiving the beam indication DCI_a—i.e., TCI state(s) A" in this design example. When/if the (SDCI based) inter-cell multi-TRP operation is enabled, and when/if the first indicated TCI state(s)—e.g., among the N=2 TCI states/pairs of TCI states used/applied for receiving the beam indication DCI_a—i.e., TCI state(s) A" in this design example is associated to the serving cell PCI/PCI index, the indicated second TCI state(s) as discussed in the present disclosure could correspond to the TCI state(s) A". When/if the (SDCI based) inter-cell multi-TRP operation is enabled, and when/if the first indicated TCI state(s)—e.g., among the N=2 TCI states/pairs of TCI states used/applied for receiving the beam indication DCI_a—i.e., TCI state(s) A" in this design example is associated to PCI(s)/PCI index(es) other than the serving cell PCI/PCI index, the indicated second TCI state(s) as discussed in the present disclosure could correspond to the TCI state(s) A" for at least UE-dedicated PDSCH reception(s), and/or the second indicated TCI state(s)—e.g., among the N=2 TCI states/pairs of TCI states used/applied for receiving the beam indication DCI_a—i.e., TCI state(s) B" in this design example for at least non-UE-dedicated PDSCH reception(s) when/if the TCI state(s) B" is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling oneDefaultTCI-State, or the UE 116 does not report to the network 130 the capability signaling twoDefaultTCI-States, or the UE 116 is not configured with enableTwoDefaultTCI-States as specified herein in the present disclosure. Alternatively, the UE 116 could report to the network 130 the capability signaling twoDefaultTCI-States, or the UE 116 could be configured with enableTwoDefaultTCI-States as specified herein in the present disclosure.

In yet another example, N=2 TCI states/pairs of TCI states—denoted by {TCI state(s) A", TCI state(s) B"}—could be used/applied for receiving the beam indication DCI_a; for this case, the indicated second TCI state(s) could correspond to the second indicated TCI state(s)—e.g., among the N=2 TCI states/pairs of TCI states used/applied for receiving the beam indication DCI_a—i.e., TCI state(s) B" in this design example. When/if the (SDCI based) inter-cell multi-TRP operation is enabled, and when/if the second indicated TCI state(s)—e.g., among the N=2 TCI states/pairs of TCI states used/applied for receiving the beam indication DCI_a—i.e., TCI state(s) B" in this design example is associated to the serving cell PCI/PCI index the indicated second TCI state(s) as discussed in the present disclosure could correspond to the TCI state(s) B". When/if the (SDCI based) inter-cell multi-TRP operation is enabled, and when/if the second indicated TCI state(s)—e.g., among the N=2 TCI states/pairs of TCI states used/applied for receiving the beam indication DCI_a—i.e., TCI state(s) B" in this design example is associated to PCI(s)/PCI index(es) other than the serving cell PCI/PCI index, the indicated second TCI state(s) as discussed in the present disclosure could correspond to the TCI state(s) B" for at least UE-dedicated PDSCH reception(s), and/or the first indicated TCI state(s)—e.g., among the N=2 TCI states/pairs of TCI states used/applied for receiving the beam indication DCI_a—i.e., TCI state(s) A" in this design example for at least non-UE-dedicated PDSCH reception(s) when/if the TCI state(s) A" is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling oneDefaultTCI-State, or the UE 116 does not report to the network 130 the capability signaling twoDefaultTCI-States, or the UE 116 is not configured with enableTwoDefaultTCI-States as specified herein in the present disclosure. Alternatively, the UE 116 could report to the network 130 the capability signaling twoDefaultTCI-States, or the UE 116 could be configured with enableTwoDefaultTCI-States as specified herein in the present disclosure.

In yet another example, N=2 TCI states/pairs of TCI states—denoted by {TCI state(s) A", TCI state(s) B"}—could be used/applied for receiving the beam indication DCI_a; furthermore, the UE 116 could be indicated/configured/provided by the network 130, e.g., via higher layer RRC signaling/parameter (e.g., in the higher layer parameter PDSCH-Config that configures the PDSCH) and/or MAC CE command, a 2-bit indicator with '00' ('01', '10' or '11') indicating that the indicated second TCI state(s) could correspond to the first indicated TCI state(s)—e.g., among the N=2 TCI states/pairs of TCI states used/applied for receiving the beam indication DCI_a—i.e., TCI state(s) A" in this design example, '01' ('00', '10' or '11') indicating that the indicated second TCI state(s) could correspond to the second indicated TCI state(s)—e.g., among the N=2 TCI states/pairs of TCI states used/applied for receiving the beam indication DCI_a—i.e., TCI state(s) B" in this design example, and '10' or '11' ('00' or '01') indicating that the indicated second TCI states could correspond to both of the first and second indicated TCI states—e.g., among the N=2 TCI states/pairs of TCI states used/applied for receiving the beam indication DCI_a—i.e., TCI state(s) A"0 and TCI state(s) B" in this design example.

When/if the (SDCI based) inter-cell multi-TRP operation is enabled, and when/if the 2-bit indicator is set to '00' ('01', '10' or '11') as specified herein in the present disclosure indicating the first indicated TCI state(s)—e.g., among the N=2 TCI states/pairs of TCI states used/applied for receiving the beam indication DCI_a—i.e., TCI state(s) A" in this design example, and when/if the first indicated TCI state(s)—e.g., among the N=2 TCI states/pairs of TCI states used/applied for receiving the beam indication DCI_a—i.e., TCI state(s) A" in this design example is associated to the serving cell PCI/PCI index, the indicated second TCI state(s) as discussed in the present disclosure could correspond to the TCI state(s) A". When/if the (SDCI based) inter-cell multi-TRP operation is enabled, and when/if the 2-bit indicator is set to '00' ('01', '10' or '11') as specified herein in the present disclosure indicating the first indicated TCI state(s)—e.g., among the N=2 TCI states/pairs of TCI states used/applied for receiving the beam indication DCI_a—i.e., TCI state(s) A" in this design example, and when/if the first indicated TCI state(s)—e.g., among the N=2 TCI states/pairs of TCI states used/applied for receiving the beam indication DCI_a—i.e., TCI state(s) A" in this design example is associated to PCI(s)/PCI index(es) other than the serving cell PCI/PCI index, the indicated second TCI state(s) as discussed in the present disclosure could correspond to the TCI state(s) A" for at least UE-dedicated PDSCH reception(s), and/or the second indicated TCI state(s)—e.g., among the N=2 TCI states/pairs of TCI states used/applied for receiving the beam indication DCI_a—i.e., TCI state(s) B" in this design example for at least non-UE-dedicated PDSCH reception(s) when/if the TCI state(s) B" is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the 2-bit indicator is set to '01' ('00', '10' or '11') as specified herein in the present disclosure indicating the second indicated TCI state(s)—e.g., among the N=2 TCI states/pairs of TCI states used/applied for receiving the beam indication DCI_a—i.e., TCI state(s) B" in this design example, and when/if the second indicated TCI state(s)—e.g., among the N=2 TCI states/pairs of TCI states used/applied for receiving the beam indication DCI_a—i.e., TCI state(s) B" in this design example is associated to the serving cell PCI/PCI index, the indicated second TCI state(s) as discussed in the present disclosure could correspond to the TCI state(s) B". When/if the (SDCI based) inter-cell multi-TRP operation is enabled, and when/if the 2-bit indicator is set to '01' ('00', '10' or '11') as specified herein in the present disclosure indicating the second indicated TCI state(s)—e.g., among the N=2 TCI states/pairs of TCI states used/applied for receiving the beam indication DCI_a—i.e., TCI state(s) B" in this design example, and when/if the second indicated TCI state(s)—e.g., among the N=2 TCI states/pairs of TCI states used/applied for receiving the beam indication DCI_a—i.e., TCI state(s) B" in this design example is associated to PCI(s)/PCI index(es) other than the serving cell PCI/PCI index, the indicated second TCI state(s) as discussed in the present disclosure could correspond to the TCI state(s) B" for at least UE-dedicated PDSCH reception(s), and/or the first indicated TCI state(s)—e.g., among the N=2 TCI states/pairs of TCI states used/applied for receiving the beam indication DCI_a—i.e., TCI state(s) A" in this design example for at least non-UE-dedicated PDSCH reception(s) when/if the TCI state(s) A" is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the 2-bit indicator is set to '10' or '11' ('00' or '01') as specified herein in the present disclosure indicating the first and second indicated TCI states—e.g., among the N=2 TCI states/pairs of TCI states used/applied for receiving the beam indication DCI_a—i.e., TCI state(s) A"0 and TCI state(s) B" in this design example, and when/if at least one of the TCI state(s) A"0 and TCI state(s) B" is associated to the serving cell PCI/PCI index, the indicated second TCI state(s) as discussed in the present disclosure could correspond to both of the TCI state(s) A"0 and TCI state(s) B"—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the 2-bit indicator is set to '10' or '11' ('00' or '01') as specified herein in the present disclosure indicating the first and second indicated TCI states—e.g., among the N=2 TCI states/pairs of TCI states used/applied for receiving the beam indication DCI_a—i.e., TCI state(s) A"0 and TCI state(s) B" in this design example, and when/if both of the TCI state(s) A"0 and TCI state(s) B" are associated to PCI(s)/PCI index(es) other than the serving cell PCI/PCI index, the indicated second TCI state(s) as discussed in the present disclosure could correspond to the TCI state(s) A"0 and TCI state(s) B" for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the 2-bit indicator, e.g., provided in PDSCH-Config, could be set to value(s) such as '00' or '01' indicating that the first or second indicated TCI state(s)—e.g., among the N=2 TCI states/pairs of TCI states used/applied for receiving the beam indication DCI_a—i.e., TCI state(s) A"0 or TCI state(s) B" in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the 2-bit indicator, e.g., provided in PDSCH-Config, could be set to value(s) such as '10' or '11' indicating that both of the first and second indicated TCI states—e.g., among the N=2 TCI states/pairs of TCI states used/applied for receiving the beam indication DCI_a—i.e., TCI state(s) A"0 and TCI state(s) B" in this design example, could be used for PDSCH reception(s).

In yet another example, N=2 TCI states/pairs of TCI states—denoted by {TCI state(s) A", TCI state(s) B"}—could be used/applied for receiving the beam indication DCI_a; furthermore, the UE 116 could be indicated/configured/provided by the network 130, e.g., via higher layer RRC signaling/parameter ControlResourceSet, a 2-bit indicator for the corresponding CORESET. When/if the beam indication DCI_a is received in CORESET(s) with the corresponding/associated 2-bit indicator set to '00' ('01', '10' or '11'), the indicated second TCI state(s) could correspond to the first indicated TCI state(s)—e.g., among the N=2 TCI states/pairs of TCI states used/applied for receiving the beam indication DCI_a—i.e., TCI state(s) A" in this design example, when/if the beam indication DCI_a is received in CORESET(s) with the corresponding/associated 2-bit indicator set to '01' ('00', '10' or '11'), the indicated second TCI state(s) could correspond to the second indicated TCI state(s)—e.g., among the N=2 TCI states/pairs of TCI states used/applied for receiving the beam indication DCI_a—i.e., TCI state(s) B" in this design example, and when/if the beam indication DCI_a is received in CORESET(s) with the corresponding/associated 2-bit indicator set to '10' or '11' ('00' or '01'), the indicated second TCI states could correspond to both of the first and second indicated TCI states—e.g., among the N=2 TCI states/pairs of TCI states used/applied for receiving the beam indication DCI_a—i.e., TCI state(s) A"0 and TCI state(s) B" in this design example.

When/if the (SDCI based) inter-cell multi-TRP operation is enabled, and when/if the beam indication DCI_a is received in CORESET(s) with the corresponding/associated 2-bit indicator set to '00' ('01', '10' or '11') indicating the first indicated TCI state(s)—e.g., among the N=2 TCI states/pairs of TCI states used/applied for receiving the beam indication DCI_a—i.e., TCI state(s) A" in this design example, and when/if the first indicated TCI state(s)—e.g., among the N=2 TCI states/pairs of TCI states used/applied for receiving the beam indication DCI_a—i.e., TCI state(s) A" in this design example is associated to the serving cell PCI/PCI index, the indicated second TCI state(s) as discussed in the present disclosure could correspond to the TCI state(s) A". When/if the (SDCI based) inter-cell multi-TRP operation is enabled, and when/if the beam indication DCI_a is received in CORESET(s) with the corresponding/associated 2-bit indicator set to '00' ('01', '10' or '11') indicating the first indicated TCI state(s)—e.g., among the N=2 TCI states/pairs of TCI states used/applied for receiving the beam indication DCI_a—i.e., TCI state(s) A" in this design example, and when/if the first indicated TCI state(s)—e.g., among the N=2 TCI states/pairs of TCI states used/applied for receiving the beam indication DCI_a—i.e., TCI state(s) A" in this design example is associated to PCI(s)/PCI index(es) other than the serving cell PCI/PCI index, the indicated second TCI state(s) as discussed in the present disclosure could correspond to the TCI state(s) A" for at least UE-dedicated PDSCH reception(s) and/or the second indicated TCI state(s)—e.g., among the N=2 TCI states/pairs of TCI states used/applied for receiving the beam indication DCI_a—i.e., TCI state(s) B" in this design example for at least non-UE-dedicated PDSCH reception(s) when/if the TCI state(s) B" is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the beam indication DCI_a is received in CORESET(s) with the corresponding/associated 2-bit indicator set to '01' ('00', '10' or '11') indicating the second indicated TCI state(s)—e.g., among the N=2 TCI states/pairs of TCI states used/applied for receiving the beam indication DCI_a—i.e., TCI state(s) B" in this design example, and when/if the second indicated TCI state(s)—e.g., among the N=2 TCI states/pairs of TCI states used/applied for receiving the beam indication DCI_a—i.e., TCI state(s) B" in this design example is associated to the serving cell PCI/PCI index, the indicated second TCI state(s) as discussed in the present disclosure could correspond to the TCI state(s) B". When/if the (SDCI based) inter-cell multi-TRP operation is enabled, and when/if the beam indication DCI_a is received in CORESET(s) with the corresponding/associated 2-bit indicator set to '01' ('00', '10' or '11') indicating the second indicated TCI state(s)—e.g., among the N=2 TCI states/pairs of TCI states used/applied for receiving the beam indication DCI_a—i.e., TCI state(s) B" in this design example, and when/if the second indicated TCI state(s)—e.g., among the N=2 TCI states/pairs of TCI states used/applied for receiving the beam indication DCI_a—i.e., TCI state(s) B" in this design example is associated to PCI(s)/PCI index(es) other than the serving cell PCI/PCI index, the indicated second TCI state(s) as discussed in the present disclosure could correspond to the TCI state(s) B" for at least UE-dedicated PDSCH reception(s), and/or the first indicated TCI state(s)—e.g., among the N=2 TCI states/pairs of TCI states used/applied for receiving the beam indication DCI_a—i.e., TCI state(s) A" in this design example for at least non-UE-dedicated PDSCH reception(s) when/if the TCI state(s) A" is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the beam indication DCI_a is received in CORESET(s) with the corresponding/associated 2-bit indicator set to '10' or '11' ('00' or '01') indicating the first and second indicated TCI states—e.g., among the N=2 TCI states/pairs of TCI states used/applied for receiving the beam indication DCI_a—i.e., TCI state(s) A"0 and TCI state(s) B" in this design example, and when/if at least one of the TCI state(s) A"0 and TCI state(s) B" is associated to the serving cell PCI/PCI index, the indicated second TCI state(s) as discussed in the present disclosure could correspond to both of the TCI state(s) A"0 and TCI state(s) B"—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the beam indication DCI_a is received in CORESET(s) with the corresponding/associated 2-bit indicator set to '10' or '11' ('00' or '01') indicating the first and second indicated TCI states—e.g., among the N=2 TCI states/pairs of TCI states used/applied for receiving the beam indication DCI_a—i.e., TCI state(s) A"0 and TCI state(s) B" in this design example, and when/if both of the TCI state(s) A"0 and TCI state(s) B" are associated to PCI(s)/PCI index(es) other than the serving cell PCI/PCI index, the indicated second TCI state(s) as discussed in the present disclosure could correspond to the TCI state(s) A"0 and TCI state(s) B" for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the 2-bit indicator, e.g., configured/associated to the CORESET(s), could be set to value(s) such as '00' or '01' indicating that the first or second indicated TCI state(s)—e.g., among the N=2 TCI states/pairs of TCI states used/applied for receiving the beam indication DCI_a—i.e., TCI state(s) A"0 or TCI state(s) B" in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the 2-bit indicator, e.g., configured/associated to the CORESET(s), could be set to value(s) such as '10' or '11' indicating that both of the first and second indicated TCI states—e.g., among the N=2 TCI states/pairs of TCI states used/applied for receiving the beam indication DCI_a—i.e., TCI state(s) A"0 and TCI state(s) B" in this design example, could be used for PDSCH reception(s).

In yet another example, N=2 TCI states/pairs of TCI states—denoted by {TCI state(s) A", TCI state(s) B"}—could be used/applied for receiving the beam indication DCI_a; for this case, when/if the most recent applicable second indicator or the second indicator received the latest in time that is applicable is set to '00' as specified herein in the present disclosure, the indicated second TCI state(s) could correspond to the first indicated TCI state(s)—e.g., among the N=2 TCI states/pairs of TCI states used/applied for receiving the beam indication DCI_a—i.e., TCI state(s) A" in this design example; when/if the most recent applicable second indicator or the second indicator received the latest in time that is applicable is set to '01' as specified herein in the present disclosure, the indicated second TCI state(s) could correspond to the second indicated TCI state(s)—e.g., among the N=2 TCI states/pairs of TCI states used/applied for receiving the beam indication DCI_a—i.e., TCI state(s) B" in this design example; when/if the most recent applicable second indicator or the second indicator received the latest in time that is applicable is set to '10' or '11' as specified herein in the present disclosure, the indicated second TCI states could correspond to both of the first and second indicated TCI states—e.g., among the N=2 TCI states/pairs of TCI states used/applied for receiving the beam indication DCI_a—i.e., TCI state(s) A"0 and TCI state(s) B" in this design example.

When/if the (SDCI based) inter-cell multi-TRP operation is enabled, and when/if the most recent applicable second indicator or the second indicator received the latest in time that is applicable is set to '00' as specified herein in the present disclosure indicating the first indicated TCI state(s)—e.g., among the N=2 TCI states/pairs of TCI states used/applied for receiving the beam indication DCI_a—i.e., TCI state(s) A" in this design example, and when/if the first indicated TCI state(s)—e.g., among the N=2 TCI states/pairs of TCI states used/applied for receiving the beam indication DCI_a—i.e., TCI state(s) A" in this design example is associated to the serving cell PCI/PCI index, the indicated second TCI state(s) as discussed in the present disclosure could correspond to the TCI state(s) A". When/if the (SDCI based) inter-cell multi-TRP operation is enabled, and when/if the most recent applicable second indicator or the second indicator received the latest in time that is applicable is set to '00' as specified herein in the present disclosure indicating the first indicated TCI state(s)—e.g., among the N=2 TCI states/pairs of TCI states used/applied for receiving the beam indication DCI_a—i.e., TCI state(s) A" in this design example, and when/if the first indicated TCI state(s)—e.g., among the N=2 TCI states/pairs of TCI states used/applied for receiving the beam indication DCI_a—i.e., TCI state(s) A" in this design example is associated to PCI(s)/PCI index(es) other than the serving cell PCI/PCI index the indicated second TCI state(s) as discussed in the present disclosure could correspond to the TCI state(s) A" for at least UE-dedicated PDSCH reception(s), and/or the second indicated TCI state(s)—e.g., among the N=2 TCI states/pairs of TCI states used/applied for receiving the beam indication DCI_a—i.e., TCI state(s) B" in this design example for at least non-UE-dedicated PDSCH reception(s) when/if the TCI state(s) B" is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the most recent applicable second indicator or the second indicator received the latest in time that is applicable is set to ‘01’ as specified herein in the present disclosure indicating the second indicated TCI state(s)—e.g., among the N=2 TCI states/pairs of TCI states used/applied for receiving the beam indication DCI_a—i.e., TCI state(s) B" in this design example, and when/if the second indicated TCI state(s)—e.g., among the N=2 TCI states/pairs of TCI states used/applied for receiving the beam indication DCI_a—i.e., TCI state(s) B" in this design example is associated to the serving cell PCI/PCI index, the indicated second TCI state(s) as discussed in the present disclosure could correspond to the TCI state(s) B". When/if the (SDCI based) inter-cell multi-TRP operation is enabled, and when/if the most recent applicable second indicator or the second indicator received the latest in time that is applicable is set to ‘01’ as specified herein in the present disclosure indicating the second indicated TCI state(s)—e.g., among the N=2 TCI states/pairs of TCI states used/applied for receiving the beam indication DCI_a—i.e., TCI state(s) B" in this design example, and when/if the second indicated TCI state(s)—e.g., among the N=2 TCI states/pairs of TCI states used/applied for receiving the beam indication DCI_a—i.e., TCI state(s) B" in this design example is associated to PCI(s)/PCI index(es) other than the serving cell PCI/PCI index, the indicated second TCI state(s) as discussed in the present disclosure could correspond to the TCI state(s) B" for at least UE-dedicated PDSCH reception(s) and/or the first indicated TCI state(s)—e.g., among the N=2 TCI states/pairs of TCI states used/applied for receiving the beam indication DCI_a—i.e., TCI state(s) A" in this design example for at least non-UE-dedicated PDSCH reception(s) when/if the TCI state(s) A" is associated to the serving cell PCI/PCI index and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the most recent applicable second indicator or the second indicator received the latest in time that is applicable is set to ‘10’ or ‘11’ as specified herein in the present disclosure indicating the first and second indicated TCI states—e.g., among the N=2 TCI states/pairs of TCI states used/applied for receiving the beam indication DCI_a—i.e., TCI state(s) A"0 and TCI state(s) B" in this design example, and when/if at least one of the TCI state(s) A"0 and TCI state(s) B" is associated to the serving cell PCI/PCI index, the indicated second TCI state(s) as discussed in the present disclosure could correspond to both of the TCI state(s) A"0 and TCI state(s) B"—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the most recent applicable second indicator or the second indicator received the latest in time that is applicable is set to ‘10’ or ‘11’ as specified herein in the present disclosure indicating the first and second indicated TCI states—e.g., among the N=2 TCI states/pairs of TCI states used/applied for receiving the beam indication DCI_a—i.e., TCI state(s) A"0 and TCI state(s) B" in this design example, and when/if both of the TCI state(s) A"0 and TCI state(s) B" are associated to PCI(s)/PCI index(es) other than the serving cell PCI/PCI index, the indicated second TCI state(s) as discussed in the present disclosure could correspond to the TCI state(s) A"0 and TCI state(s) B" for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the most recent applicable second indicator or the second indicator received the latest in time that is applicable could be set to value(s) such as ‘00’ or ‘01’ indicating that the first or second indicated TCI state(s)—e.g., among the N=2 TCI states/pairs of TCI states used/applied for receiving the beam indication DCI_a—i.e., TCI state(s) A"0 or TCI state(s) B" in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the most recent applicable second indicator or the second indicator received the latest in time that is applicable could be set to value(s) such as ‘10’ or ‘11’ indicating that both of the first and second indicated TCI states—e.g., among the N=2 TCI states/pairs of TCI states used/applied for receiving the beam indication DCI_a—i.e., TCI state(s) A" and TCI state(s) B" in this design example, could be used for PDSCH reception(s). Furthermore, in the present disclosure, the most recent applicable second indicator or the second indicator received the latest in time that is applicable could be provided/indicated in a DCI_b', wherein (1) the time offset between the DCI_b'0 and the PDSCH scheduled by the beam indication DCI_a or DCI_b'—e.g., the time duration/difference between the last symbol/slot of the PDCCH/PDCCH candidate that carries the DCI_b'0 and the first symbol/slot of the PDSCH scheduled by the beam indication DCI_a or DCI_b'—is greater than or equal to t_0 associated to the DCI_b', and/or (2) the DCI_b' is received the most recent in time relative to the beam indication DCI_a.

Yet for another example, the indicated second TCI state(s) could correspond to one or more of the TCI state(s) indicated/activated by the lowest (TCI) codepoint in the TCI state(s) indication/activation MAC CE that comprises/includes/contains one or two TCI states/pairs of TCI states. Furthermore, the TCI state(s) indicated/activated by the lowest (TCI) codepoint in the TCI state(s) indication/activation MAC CE could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled.

In one example, the aforementioned lowest (TCI) codepoint could comprise/contain/include a single TCI state/pair of TCI states; for this case, the indicated second TCI state(s) as discussed in the present disclosure could correspond to the TCI state/pair of TCI states of the aforementioned lowest (TCI) codepoint. When/if the (SDCI based) inter-cell multi-TRP operation is enabled, and when/if the TCI state/pair of TCI states of the aforementioned lowest (TCI) codepoint is associated to the serving cell PCI/PCI index, the indicated second TCI state(s) as discussed in the present disclosure could correspond to the TCI state/pair of TCI states of the aforementioned lowest (TCI) codepoint. When/if the (SDCI based) inter-cell multi-TRP operation is enabled, and when/if the TCI state/pair of TCI states of the aforementioned lowest (TCI) codepoint is associated to PCI(s)/PCI index(es) other than the serving cell PCI/PCI index, the indicated second TCI state(s) as discussed in the present disclosure could correspond to the TCI state/pair of TCI states of the aforementioned lowest (TCI) codepoint for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

In another example, the aforementioned lowest (TCI) codepoint could comprise/contain/include N=2 TCI states/pairs of TCI states—denoted by {TCI state(s) C, TCI state(s) D}; for this case, the indicated second TCI states as discussed in the present disclosure could correspond to both of the TCI state(s) C and TCI state(s) D of the aforementioned lowest (TCI) codepoint. When/if the (SDCI based) inter-cell multi-TRP operation is enabled, and when/if at least one of the TCI state(s) C and TCI state(s) D is associated to the serving cell PCI/PCI index, the indicated second TCI state(s) as discussed in the present disclosure could correspond to both of the TCI state(s) C and TCI state(s) D—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if both of the TCI state(s) C and TCI state(s) D are associated to PCI(s)/PCI index(es) other than the serving cell PCI/PCI index, the indicated second TCI state(s) as discussed in the present disclosure could correspond to the TCI state(s) C and TCI state(s) D for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling twoDefaultTCI-States, or the UE 116 could be configured with enableTwoDefaultTCI-States as specified herein in the present disclosure.

In yet another example, the aforementioned lowest (TCI) codepoint could comprise/include/contain N=2 TCI states/pairs of TCI states—denoted by {TCI state(s) C, TCI state(s) D}; for this case, the indicated second TCI state(s) could correspond to the first indicated TCI state(s)—e.g., among the N=2 TCI states/pairs of TCI states of the aforementioned lowest (TCI) codepoint—i.e., TCI state(s) C in this design example. When/if the (SDCI based) inter-cell multi-TRP operation is enabled, and when/if the first indicated TCI state(s)—e.g., among the N=2 TCI states/pairs of TCI states of the aforementioned lowest (TCI) codepoint—i.e., TCI state(s) C in this design example is associated to the serving cell PCI/PCI index, the indicated second TCI state(s) as discussed in the present disclosure could correspond to the TCI state(s) C. When/if the (SDCI based) inter-cell multi-TRP operation is enabled, and when/if the first indicated TCI state(s)—e.g., among the N=2 TCI states/pairs of TCI states of the aforementioned lowest (TCI) codepoint—i.e., TCI state(s) C in this design example is associated to PCI(s)/PCI index(es) other than the serving cell PCI/PCI index, the indicated second TCI state(s) as discussed in the present disclosure could correspond to the TCI state(s) C for at least UE-dedicated PDSCH reception(s) and/or the second indicated TCI state(s)—e.g., among the N=2 TCI states/pairs of TCI states of the aforementioned lowest (TCI) codepoint—i.e., TCI state(s) D in this design example for at least non-UE-dedicated PDSCH reception(s) when/if the TCI state(s) D is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling oneDefaultTCI-State, or the UE 116 does not report to the network 130 the capability signaling twoDefault-TCI-States, or the UE 116 is not configured with enableTwoDefaultTCI-States as specified herein in the present disclosure. Alternatively, the UE 116 could report to the network 130 the capability signaling twoDefaultTCI-States, or the UE 116 could be configured with enableTwoDefaultTCI-States as specified herein in the present disclosure.

In yet another example, the aforementioned lowest (TCI) codepoint could comprise/include/contain N=2 TCI states/pairs of TCI states—denoted by {TCI state(s) C, TCI state(s) D}; for this case, the indicated second TCI state(s) could correspond to the second indicated TCI state(s)—e.g., among the N=2 TCI states/pairs of TCI states of the aforementioned lowest (TCI) codepoint—i.e., TCI state(s) D in this design example. When/if the (SDCI based) inter-cell multi-TRP operation is enabled, and when/if the second indicated TCI state(s)—e.g., among the N=2 TCI states/pairs of TCI states of the aforementioned lowest (TCI) codepoint—i.e., TCI state(s) D in this design example is associated to the serving cell PCI/PCI index, the indicated second TCI state(s) as discussed in the present disclosure could correspond to the TCI state(s) D. When/if the (SDCI based) inter-cell multi-TRP operation is enabled, and when/if the second indicated TCI state(s)—e.g., among the N=2 TCI states/pairs of TCI states of the aforementioned lowest (TCI) codepoint—i.e., TCI state(s) D in this design example is associated to PCI(s)/PCI index(es) other than the serving cell PCI/PCI index, the indicated second TCI state(s) as discussed in the present disclosure could correspond to the TCI state(s) D for at least UE-dedicated PDSCH reception(s), and/or the first indicated TCI state(s)—e.g., among the N=2 TCI states/pairs of TCI states of the aforementioned lowest (TCI) codepoint—i.e., TCI state(s) C in this design example for at least non-UE-dedicated PDSCH reception(s) when/if the TCI state(s) C is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling oneDefaultTCI-State, or the UE 116 does not report to the network 130 the capability signaling twoDefault-TCI-States, or the UE 116 is not configured with enableTwoDefaultTCI-States as specified herein in the present disclosure. Alternatively, the UE 116 could report to the network 130 the capability signaling twoDefaultTCI-States, or the UE 116 could be configured with enableTwoDefaultTCI-States as specified herein in the present disclosure.

In yet another example, the aforementioned lowest (TCI) codepoint could comprise/contain/include N=2 TCI states/pairs of TCI states—denoted by {TCI state(s) C, TCI state(s) D}; furthermore, the UE 116 could be indicated/configured/provided by the network 130, e.g., via higher layer RRC signaling/parameter (e.g., in the higher layer parameter PDSCH-Config that configures the PDSCH) and/or MAC CE command, a 2-bit indicator with ‘00’ (‘01’, ‘10’ or ‘11’) indicating that the indicated second TCI state(s) could correspond to the first indicated TCI state(s)—e.g., among the N=2 TCI states/pairs of TCI states of the aforementioned lowest (TCI) codepoint—i.e., TCI state(s) C in this design example, ‘01’ (‘00’, ‘10’ or ‘11’) indicating that the indicated second TCI state(s) could correspond to the second indicated TCI state(s)—e.g., among the N=2 TCI states/pairs of TCI states of the aforementioned lowest (TCI) codepoint—i.e., TCI state(s) D in this design example, and ‘10’ or ‘11’ (‘00’ or ‘01’) indicating that the indicated second TCI states could correspond to both of the first and second indicated TCI states—e.g., among the N=2 TCI states/pairs of TCI states of the aforementioned lowest (TCI) codepoint—i.e., TCI state(s) C and TCI state(s) D in this design example.

When/if the (SDCI based) inter-cell multi-TRP operation is enabled, and when/if the 2-bit indicator is set to ‘00’ (‘01’, ‘10’ or ‘11’) as specified herein in the present disclosure indicating the first indicated TCI state(s)—e.g., among the N=2 TCI states/pairs of TCI states of the aforementioned lowest (TCI) codepoint—i.e., TCI state(s) C in this design example, and when/if the first indicated TCI state(s)—e.g., among the N=2 TCI states/pairs of TCI states of the aforementioned lowest (TCI) codepoint—i.e., TCI state(s) C in this design example is associated to the serving cell PCI/PCI index, the indicated second TCI state(s) as discussed in the present disclosure could correspond to the TCI state(s) C. When/if the (SDCI based) inter-cell multi-TRP operation is enabled, and when/if the 2-bit indicator is set to ‘00’ (‘01’, ‘10’ or ‘11’) as specified herein in the present disclosure indicating the first indicated TCI state(s)—e.g., among the N=2 TCI states/pairs of TCI states of the aforementioned lowest (TCI) codepoint—i.e., TCI state(s) C in this design example, and when/if the first indicated TCI state(s)—e.g., among the N=2 TCI states/pairs of TCI states of the aforementioned lowest (TCI) codepoint—i.e., TCI state(s) C in this design example is associated to PCI(s)/PCI index(es) other than the serving cell PCI/PCI index, the indicated second TCI state(s) as discussed in the present disclosure could correspond to the TCI state(s) C for at least UE-dedicated PDSCH reception(s) and/or the second indicated TCI state(s)—e.g., among the N=2 TCI states/pairs of TCI states of the aforementioned lowest (TCI) codepoint—i.e., TCI state(s) D in this design example for at least non-UE-dedicated PDSCH reception(s) when/if the TCI state(s) D is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the 2-bit indicator is set to ‘01’ (‘00’, ‘10’ or ‘11’) as specified herein in the present disclosure indicating the second indicated TCI state(s)—e.g., among the N=2 TCI states/pairs of TCI states of the aforementioned lowest (TCI) codepoint—i.e., TCI state(s) D in this design example, and when/if the second indicated TCI state(s)—e.g., among the N=2 TCI states/pairs of TCI states of the aforementioned lowest (TCI) codepoint—i.e., TCI state(s) D in this design example is associated to the serving cell PCI/PCI index, the indicated second TCI state(s) as discussed in the present disclosure could correspond to the TCI state(s) D. When/if the (SDCI based) inter-cell multi-TRP operation is enabled, and when/if the 2-bit indicator is set to '01' ('00', '10' or '11') as specified herein in the present disclosure indicating the second indicated TCI state(s)—e.g., among the N=2 TCI states/pairs of TCI states of the aforementioned lowest (TCI) codepoint—i.e., TCI state(s) D in this design example, and when/if the second indicated TCI state(s)—e.g., among the N=2 TCI states/pairs of TCI states of the aforementioned lowest (TCI) codepoint—i.e., TCI state(s) D in this design example is associated to PCI(s)/PCI index(es) other than the serving cell PCI/PCI index, the indicated second TCI state(s) as discussed in the present disclosure could correspond to the TCI state(s) D for at least UE-dedicated PDSCH reception(s), and/or the first indicated TCI state(s)—e.g., among the N=2 TCI states/pairs of TCI states of the aforementioned lowest (TCI) codepoint—i.e., TCI state(s) C in this design example for at least non-UE-dedicated PDSCH reception(s) when/if the TCI state(s) C is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the 2-bit indicator is set to '10' or '11' ('00' or '01') as specified herein in the present disclosure indicating the first and second indicated TCI states—e.g., among the N=2 TCI states/pairs of TCI states of the aforementioned lowest (TCI) codepoint—i.e., TCI state(s) C and TCI state(s) D in this design example, and when/if at least one of the TCI state(s) C and TCI state(s) D is associated to the serving cell PCI/PCI index, the indicated second TCI state(s) as discussed in the present disclosure could correspond to both of the TCI state(s) C and TCI state(s) D—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the 2-bit indicator is set to '10' or '11' ('00' or '01') as specified herein in the present disclosure indicating the first and second indicated TCI states—e.g., among the N=2 TCI states/pairs of TCI states of the aforementioned lowest (TCI) codepoint—i.e., TCI state(s) C and TCI state(s) D in this design example, and when/if both of the TCI state(s) C and TCI state(s) D are associated to PCI(s)/PCI index(es) other than the serving cell PCI/PCI index, the indicated second TCI state(s) as discussed in the present disclosure could correspond to the TCI state(s) C and TCI state(s) D for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the 2-bit indicator, e.g., provided in PDSCH-Config, could be set to value(s) such as '00' or '01' indicating that the first or second indicated TCI state(s)—e.g., among the N=2 TCI states/pairs of TCI states of the aforementioned lowest (TCI) codepoint—i.e., TCI state(s) C or TCI state(s) D in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the 2-bit indicator, e.g., provided in PDSCH-Config, could be set to value(s) such as '10' or '11' indicating that both of the first and second indicated TCI states—e.g., among the N=2 TCI states/pairs of TCI states of the aforementioned lowest (TCI) codepoint—i.e., TCI state(s) C and TCI state(s) D in this design example, could be used for PDSCH reception(s).

In yet another example, the aforementioned lowest (TCI) codepoint could comprise/include/contain N=2 TCI states/pairs of TCI states—denoted by {TCI state(s) C, TCI state(s) D}; furthermore, the UE 116 could be indicated/configured/provided by the network 130, e.g., via higher layer RRC signaling/parameter ControlResourceSet, a 2-bit indicator for the corresponding CORESET. When/if the beam indication DCI_a is received in CORESET(s) with the corresponding/associated 2-bit indicator set to '00' ('01', '10' or '11'), the indicated second TCI state(s) could correspond to the first indicated TCI state(s)—e.g., among the N=2 TCI states/pairs of TCI states of the aforementioned lowest (TCI) codepoint—i.e., TCI state(s) C in this design example. When/if the beam indication DCI_a is received in CORESET(s) with the corresponding/associated 2-bit indicator set to '01' ('00', '10' or '11'), the indicated second TCI state(s) could correspond to the second indicated TCI state(s)—e.g., among the N=2 TCI states/pairs of TCI states of the aforementioned lowest (TCI) codepoint—i.e., TCI state(s) C in this design example, and when/if the beam indication DCI_a is received in CORESET(s) with the corresponding/associated 2-bit indicator set to '10' or '11' ('00' or '01'), the indicated second TCI states could correspond to both of the first and second indicated TCI states—e.g., among the N=2 TCI states/pairs of TCI states of the aforementioned lowest (TCI) codepoint—i.e., TCI state(s) C and TCI state(s) D in this design example.

When/if the (SDCI based) inter-cell multi-TRP operation is enabled, and when/if the beam indication DCI_a is received in CORESET(s) with the corresponding/associated 2-bit indicator set to '00' ('01', '10' or '11') indicating the first indicated TCI state(s)—e.g., among the N=2 TCI states/pairs of TCI states of the aforementioned lowest (TCI) codepoint—i.e., TCI state(s) C in this design example, and when/if the first indicated TCI state(s)—e.g., among the N=2 TCI states/pairs of TCI states of the aforementioned lowest (TCI) codepoint—i.e., TCI state(s) C in this design example is associated to the serving cell PCI/PCI index, the indicated second TCI state(s) as discussed in the present disclosure could correspond to the TCI state(s) C. When/if the (SDCI based) inter-cell multi-TRP operation is enabled, and when/if the beam indication DCI_a is received in CORESET(s) with the corresponding/associated 2-bit indicator set to ‘00’ (‘01’, ‘10’ or ‘11’) indicating the first indicated TCI state(s)—e.g., among the N=2 TCI states/pairs of TCI states of the aforementioned lowest (TCI) codepoint—i.e., TCI state(s) C in this design example, and when/if the first indicated TCI state(s)—e.g., among the N=2 TCI states/pairs of TCI states of the aforementioned lowest (TCI) codepoint—i.e., TCI state(s) C in this design example is associated to PCI(s)/PCI index(es) other than the serving cell PCI/PCI index, the indicated second TCI state(s) as discussed in the present disclosure could correspond to the TCI state(s) C for at least UE-dedicated PDSCH reception(s) and/or the second indicated TCI state(s)—e.g., among the N=2 TCI states/pairs of TCI states of the aforementioned lowest (TCI) codepoint—i.e., TCI state(s) D in this design example for at least non-UE-dedicated PDSCH reception(s) when/if the TCI state(s) D is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the beam indication DCI_a is received in CORESET(s) with the corresponding/associated 2-bit indicator set to ‘01’ (‘00’, ‘10’ or ‘11’) indicating the second indicated TCI state(s)—e.g., among the N=2 TCI states/pairs of TCI states of the aforementioned lowest (TCI) codepoint—i.e., TCI state(s) D in this design example, and when/if the second indicated TCI state(s)—e.g., among the N=2 TCI states/pairs of TCI states of the aforementioned lowest (TCI) codepoint—i.e., TCI state(s) D in this design example is associated to the serving cell PCI/PCI index, the indicated second TCI state(s) as discussed in the present disclosure could correspond to the TCI state(s) D. When/if the (SDCI based) inter-cell multi-TRP operation is enabled, and when/if the beam indication DCI_a is received in CORESET(s) with the corresponding/associated 2-bit indicator set to ‘01’ (‘00’, ‘10’ or ‘11’) indicating the second indicated TCI state(s)—e.g., among the N=2 TCI states/pairs of TCI states of the aforementioned lowest (TCI) codepoint—i.e., TCI state(s) D in this design example, and when/if the second indicated TCI state(s)—e.g., among the N=2 TCI states/pairs of TCI states of the aforementioned lowest (TCI) codepoint—i.e., TCI state(s) D in this design example is associated to PCI(s)/PCI index(es) other than the serving cell PCI/PCI index, the indicated second TCI state(s) as discussed in the present disclosure could correspond to the TCI state(s) D for at least UE-dedicated PDSCH reception(s), and/or the first indicated TCI state(s)—e.g., among the N=2 TCI states/pairs of TCI states of the aforementioned lowest (TCI) codepoint—i.e., TCI state(s) C in this design example for at least non-UE-dedicated PDSCH reception(s) when/if the TCI state(s) C is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and the beam indication DCI_a is received in CORESET(s) with the corresponding/associated 2-bit indicator set to ‘10’ or ‘11’ (‘00’ or ‘01’) indicating the first and second indicated TCI states—e.g., among the N=2 TCI states/pairs of TCI states of the aforementioned lowest (TCI) codepoint—i.e., TCI state(s) C and TCI state(s) D in this design example, and when/if at least one of the TCI state(s) C and TCI state(s) D is associated to the serving cell PCI/PCI index, the indicated second TCI state(s) as discussed in the present disclosure could correspond to both of the TCI state(s) C and TCI state(s) D—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the beam indication DCI_a is received in CORESET(s) with the corresponding/associated 2-bit indicator set to ‘10’ or ‘11’ (‘00’ or ‘01’) indicating the first and second indicated TCI states—e.g., among the N=2 TCI states/pairs of TCI states of the aforementioned lowest (TCI) codepoint—i.e., TCI state(s) C and TCI state(s) D in this design example, and when/if both of the TCI state(s) C and TCI state(s) D are associated to PCI(s)/PCI index(es) other than the serving cell PCI/PCI index, the indicated second TCI state(s) as discussed in the present disclosure could correspond to the TCI state(s) C and TCI state(s) D for at least UE-dedicated PDSCH reception(s), and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the 2-bit indicator, e.g., configured/associated to the CORESET(s), could be set to value(s) such as ‘00’ or ‘01’ indicating that the first or second indicated TCI state(s)—e.g., among the N=2 TCI states/pairs of TCI states of the aforementioned lowest (TCI) codepoint—i.e., TCI state(s) C or TCI state(s) D in this design example, could be used for PDSCH reception(s). When/if the UE 116 reports to the network 130 the capability signaling twoDefaultTCI-States, or the UE 116 is configured with enableTwoDefault-TCI-States as specified herein in the present disclosure, the 2-bit indicator, e.g., configured/associated to the CORESET(s), could be set to value(s) such as ‘10’ or ‘11’ indicating that both of the first and second indicated TCI states—e.g., among the N=2 TCI states/pairs of TCI states of the aforementioned lowest (TCI) codepoint—i.e., TCI state(s) C and TCI state(s) D in this design example, could be used for PDSCH reception(s).

In this design example, the aforementioned lowest (TCI) codepoint could comprise/contain/include N=2 TCI states/pairs of TCI states—denoted by {TCI state(s) C, TCI state(s) D}; for this case, when/if the most recent applicable second indicator or the second indicator received the latest in time that is applicable is set to '00' as specified herein in the present disclosure, the indicated second TCI state(s) could correspond to the first indicated TCI state(s)—e.g., among the N=2 TCI states/pairs of TCI states of the aforementioned lowest (TCI) codepoint—i.e., TCI state(s) C in this design example; when/if the most recent applicable second indicator or the second indicator received the latest in time that is applicable is set to '01' as specified herein in the present disclosure, the indicated second TCI state(s) could correspond to the second indicated TCI state(s)—e.g., among the N=2 TCI states/pairs of TCI states of the aforementioned lowest (TCI) codepoint—i.e., TCI state(s) D in this design example; when/if the most recent applicable second indicator or the second indicator received the latest in time that is applicable, the indicated second TCI states could correspond to both of the first and second indicated TCI states—e.g., among the N=2 TCI states/pairs of TCI states of the aforementioned lowest (TCI) codepoint—i.e., TCI state(s) C and TCI state(s) D in this design example.

When/if the (SDCI based) inter-cell multi-TRP operation is enabled, and when/if the most recent applicable second indicator or the second indicator received the latest in time that is applicable is set to '00' as specified herein in the present disclosure indicating the first indicated TCI state(s)—e.g., among the N=2 TCI states/pairs of TCI states of the aforementioned lowest (TCI) codepoint—i.e., TCI state(s) C in this design example, and when/if the first indicated TCI state(s)—e.g., among the N=2 TCI states/pairs of TCI states of the aforementioned lowest (TCI) codepoint—i.e., TCI state(s) C in this design example is associated to the serving cell PCI/PCI index, the indicated second TCI state(s) as discussed in the present disclosure could correspond to the TCI state(s) C. When/if the (SDCI based) inter-cell multi-TRP operation is enabled, and when/if the most recent applicable second indicator or the second indicator received the latest in time that is applicable is set to '00' as specified herein in the present disclosure indicating the first indicated TCI state(s)—e.g., among the N=2 TCI states/pairs of TCI states of the aforementioned lowest (TCI) codepoint—i.e., TCI state(s) C in this design example, and when/if the first indicated TCI state(s)—e.g., among the N=2 TCI states/pairs of TCI states of the aforementioned lowest (TCI) codepoint—i.e., TCI state(s) C in this design example is associated to PCI(s)/PCI index(es) other than the serving cell PCI/PCI index, the indicated second TCI state(s) as discussed in the present disclosure could correspond to the TCI state(s) C for at least UE-dedicated PDSCH reception(s) and/or the second indicated TCI state(s)—e.g., among the N=2 TCI states/pairs of TCI states of the aforementioned lowest (TCI) codepoint—i.e., TCI state(s) D in this design example for at least non-UE-dedicated PDSCH reception(s) when/if the TCI state(s) D is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the most recent applicable second indicator or the second indicator received the latest in time that is applicable is set to '01' as specified herein in the present disclosure indicating the second indicated TCI state(s)—e.g., among the N=2 TCI states/pairs of TCI states of the aforementioned lowest (TCI) codepoint—i.e., TCI state(s) D in this design example, and when/if the second indicated TCI state(s)—e.g., among the N=2 TCI states/pairs of TCI states of the aforementioned lowest (TCI) codepoint—i.e., TCI state(s) D in this design example is associated to the serving cell PCI/PCI index, the indicated second TCI state(s) as discussed in the present disclosure could correspond to the TCI state(s) D. When/if the (SDCI based) inter-cell multi-TRP operation is enabled, and when/if the most recent applicable second indicator or the second indicator received the latest in time that is applicable is set to '01' as specified herein in the present disclosure indicating the second indicated TCI state(s)—e.g., among the N=2 TCI states/pairs of TCI states of the aforementioned lowest (TCI) codepoint—i.e., TCI state(s) D in this design example, and when/if the second indicated TCI state(s)—e.g., among the N=2 TCI states/pairs of TCI states of the aforementioned lowest (TCI) codepoint—i.e., TCI state(s) D in this design example is associated to PCI(s)/PCI index(es) other than the serving cell PCI/PCI index, the indicated second TCI state(s) as discussed in the present disclosure could correspond to the TCI state(s) D for at least UE-dedicated PDSCH reception(s) and/or the first indicated TCI state(s)—e.g., among the N=2 TCI states/pairs of TCI states of the aforementioned lowest (TCI) codepoint—i.e., TCI state(s) C in this design example for at least non-UE-dedicated PDSCH reception(s) when/if the TCI state(s) C is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the most recent applicable second indicator or the second indicator received the latest in time that is applicable is set to '10' or '11' as specified herein in the present disclosure indicating the first and second indicated TCI states—e.g., among the N=2 TCI states/pairs of TCI states of the aforementioned lowest (TCI) codepoint—i.e., TCI state(s) C and TCI state(s) D in this design example, and when/if at least one of the TCI state(s) C and TCI state(s) D is associated to the serving cell PCI/PCI index, the indicated second TCI state(s) as discussed in the present disclosure could correspond to both of the TCI state(s) C and TCI state(s) D—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the most recent applicable second indicator or the second indicator received the latest in time that is applicable is set to '10' or '11' as specified herein in the present disclosure indicating the first and second indicated TCI states—e.g., among the N=2 TCI states/pairs of TCI states of the aforementioned lowest (TCI) codepoint—i.e., TCI state(s) C and TCI state(s) D in this design example, and when/if both of the TCI state(s) C and TCI state(s) D are associated to PCI(s)/PCI index(es) other than the serving cell PCI/PCI index, the indicated second TCI state(s) as discussed in the present disclosure could correspond to the TCI state(s) C and TCI state(s) D for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the most recent applicable second indicator or the second indicator received the latest in time that is applicable could be set to value(s) such as '00' or '01' indicating that the first or second indicated TCI state(s)—e.g., among the N=2 TCI states/pairs of TCI states of the aforementioned lowest (TCI) codepoint—i.e., TCI state(s) C or TCI state(s) D in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the most recent applicable second indicator or the second indicator received the latest in time that is applicable could be set to value(s) such as '10' or '11' indicating that both of the first and second indicated TCI states—e.g., among the N=2 TCI states/pairs of TCI states of the aforementioned lowest (TCI) codepoint—i.e., TCI state(s) C and TCI state(s) D in this design example, could be used for PDSCH reception(s). Furthermore, in the present disclosure, the most recent applicable second indicator or the second indicator received the latest in time that is applicable could be provided/indicated in a DCI_b', wherein (1) the time offset between the DCI_b'0 and the PDSCH scheduled by the beam indication DCI_a or DCI_b'—e.g., the time duration/difference between the last symbol/slot of the PDCCH/PDCCH candidate that carries the DCI_b'0 and the first symbol/slot of the PDSCH scheduled by the beam indication DCI_a or DCI_b'—is greater than or equal to t_0 associated to the DCI_b' and/or (2) the DCI_b' is received the most recent in time relative to the beam indication DCI_a.

As specified herein in the present disclosure, the presence or absence of the second indicator in a beam indication/scheduling DCI could be configured/provided by RRC signaling/parameter. One or more examples described herein could be applied to when the second indicator is RRC configured to be present or absent in the corresponding beam indication/scheduling DCI.

In yet another example, when/if the scheduling offset—e.g., the time duration/difference between the last symbol/slot of the PDCCH/PDCCH candidate that carries the beam indication DCI_a and the first symbol/slot of the PDSCH scheduled by the beam indication DCI_a—is less than or equal to t_1—i.e., the beam application time, the UE 116 could use/apply one or more indicated third TCI states to receive the PDSCH, wherein the one or more indicated third TCI states could be determined according to one or more design examples specified herein in the present disclosure, or the one or more indicated third TCI states could correspond to or could be determined according to the one or more indicated second TCI states as specified herein in the present disclosure. Furthermore, the indicated third TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. In addition, the PDSCH could be UE-dedicated PDSCH and/or non-UE-dedicated PDSCH as specified herein in the present disclosure. As specified herein in the present disclosure, the presence or absence of the second indicator in a beam indication/scheduling DCI could be configured/provided by RRC signaling/parameter. The design example described herein (and therefore, the indicated third TCI state(s)) could be applied to when the second indicator is RRC configured to be present or absent in the corresponding beam indication/scheduling DCI.

In yet another example, when/if the scheduling offset—e.g., the time duration/difference between the last symbol/slot of the PDCCH/PDCCH candidate that carries the beam indication DCI_a and the first symbol/slot of the PDSCH scheduled by the beam indication DCI_a—is less than or equal to t_0 or is less than or equal to t_1 or is greater than or equal to t_0 but less than or equal to t_1—i.e., the beam application time, the UE 116 could use/apply one or more indicated fourth TCI states to receive the PDSCH, wherein the one or more indicated fourth TCI states could be determined according to one or more design examples specified herein in the present disclosure, or the one or more indicated fourth TCI states could correspond to or could be determined according to the one or more indicated second and/or third TCI states as specified herein in the present disclosure. Furthermore, the indicated fourth TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. In addition, the PDSCH could be UE-dedicated PDSCH and/or non-UE-dedicated PDSCH as specified herein in the present disclosure. Optionally, the one or more indicated fourth TCI states could be determined according to one or more of the following.

For example, the indicated fourth TCI state(s) could correspond to one or more of the TCI state(s) indicated in a beam indication DCI_b, wherein (1) the time offset between the beam indication DCI_b and the PDSCH scheduled by the beam indication DCI_a—e.g., the time duration/difference between the last symbol/slot of the PDCCH/PDCCH candidate that carries the beam indication DCI_b and the first symbol/slot of the PDSCH scheduled by the beam indication DCI_a—is greater than or equal to t_1 associated to the beam indication DCI_b, and/or (2) the beam indication DCI_b is received the most recent in time relative to the beam indication DCI_a, and/or (3) the one or more of the TCI state(s) indicated in the beam indication DCI_b is joint or (separate) DL TCI state(s) provided by TCI-State or DLorJoint-TCIState, and/or (4) the number of the one or more of the TCI state(s) indicated in the beam indication DCI_b is one or two. Furthermore, the TCI state(s) indicated in the beam indication DCI_b could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. For instance, N=2 TCI states/pairs of TCI states—denoted by {TCI state(s) A, TCI state(s) B}—could be indicated by a TCI codepoint of a TCI field in the beam indication DCI_b; for this case, when/if the second indicator indicated in the beam indication DCI_a is set to '00' as specified herein in the present disclosure, the indicated fourth TCI state(s) could correspond to the first indicated TCI state(s)—e.g., among the N=2 TCI states/pairs of TCI states indicated in the DCI_b—i.e., TCI state(s) A in this design example; when/if the second indicator indicated in the beam indication DCI_a is set to '01' as specified herein in the present disclosure, the indicated fourth TCI state(s) could correspond to the second indicated TCI state(s)—e.g., among the N=2 TCI states/pairs of TCI states indicated in the DCI_b—i.e., TCI state(s) B in this design example; when/if the second indicator indicated in the beam indication DCI_a is set to '10' or '11' as specified herein in the present disclosure, the indicated fourth TCI states could correspond to both of the first and second indicated TCI states—e.g., among the N=2 TCI states/pairs of TCI states indicated in the DCI_b—i.e., TCI state(s) A and TCI state(s) B in this design example.

When/if the (SDCI based) inter-cell multi-TRP operation is enabled, and when/if the second indicator indicated in the beam indication DCI_a is set to '00' as specified herein in the present disclosure indicating the first indicated TCI state(s)—e.g., among the N=2 TCI states/pairs of TCI states indicated in the DCI_b—i.e., TCI state(s) A in this design example, and when/if the first indicated TCI state(s)—e.g., among the N=2 TCI states/pairs of TCI states indicated in the DCI_b—i.e., TCI state(s) A in this design example is associated to the serving cell PCI/PCI index, the indicated fourth TCI state(s) as discussed in the present disclosure could correspond to the TCI state(s) A. When/if the (SDCI based) inter-cell multi-TRP operation is enabled, and when/if the second indicator indicated in the beam indication DCI_a is set to '00' as specified herein in the present disclosure indicating the first indicated TCI state(s)—e.g., among the N=2 TCI states/pairs of TCI states indicated in the DCI_b—i.e., TCI state(s) A in this design example, and when/if the first indicated TCI state(s)—e.g., among the N=2 TCI states/pairs of TCI states indicated in the DCI_b—i.e., TCI state(s) A in this design example is associated to PCI(s)/PCI index(es) other than the serving cell PCI/PCI index, the indicated fourth TCI state(s) as discussed in the present disclosure could correspond to the TCI state(s) A for at least UE-dedicated PDSCH reception(s) and/or the second indicated TCI state(s)—e.g., among the N=2 TCI states/pairs of TCI states indicated in the DCI_b—i.e., TCI state(s) B in this design example for at least non-UE-dedicated PDSCH reception(s) when/if the TCI state(s) B is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the second indicator indicated in the beam indication DCI_a is set to '01' as specified herein in the present disclosure indicating the second indicated TCI state(s)—e.g., among the N=2 TCI states/pairs of TCI states indicated in the DCI_b—i.e., TCI state(s) B in this design example, and when/if the second indicated TCI state(s)—e.g., among the N=2 TCI states/pairs of TCI states indicated in the DCI_b—i.e., TCI state(s) B in this design example is associated to the serving cell PCI/PCI index, the indicated fourth TCI state(s) as discussed in the present disclosure could correspond to the TCI state(s) B. When/if the (SDCI based) inter-cell multi-TRP operation is enabled, and when/if the second indicator indicated in the beam indication DCI_a is set to '01' as specified herein in the present disclosure indicating the second indicated TCI state(s)—e.g., among the N=2 TCI states/pairs of TCI states indicated in the DCI_b—i.e., TCI state(s) B in this design example, and when/if the second indicated TCI state(s)—e.g., among the N=2 TCI states/pairs of TCI states indicated in the DCI_b—i.e., TCI state(s) B in this design example is associated to PCI(s)/PCI index(es) other than the serving cell PCI/PCI index, the indicated fourth TCI state(s) as discussed in the present disclosure could correspond to the TCI state(s) B for at least UE-dedicated PDSCH reception(s), and/or the first indicated TCI state(s)—e.g., among the N=2 TCI states/pairs of TCI states indicated in the DCI_b—i.e., TCI state(s) A in this design example for at least non-UE-dedicated PDSCH reception(s) when/if the TCI state(s) A is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the second indicator indicated in the beam indication DCI_a is set to '10' or '11' as specified herein in the present disclosure indicating the first and second indicated TCI states—e.g., among the N=2 TCI states/pairs of TCI states indicated in the DCI_b—i.e., TCI state(s) A and TCI state(s) B in this design example, and when/if at least one of the TCI state(s) A and TCI state(s) B is associated to the serving cell PCI/PCI index, the indicated fourth TCI state(s) as discussed in the present disclosure could correspond to both of the TCI state(s) A and TCI state(s) B—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the second indicator indicated in the beam indication DCI_a is set to '10' or '11' as specified herein in the present disclosure indicating the first and second indicated TCI states—e.g., among the N=2 TCI states/pairs of TCI states indicated in the DCI_b—i.e., TCI state(s) A and TCI state(s) B in this design example, and when/if both of the TCI state(s) A and TCI state(s) B are associated to PCI(s)/PCI index(es) other than the serving cell PCI/PCI index, the indicated fourth TCI state(s) as discussed in the present disclosure could correspond to the TCI state(s) A and TCI state(s) B for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '00' or '01' indicating that the first or second indicated TCI state(s)—e.g., among the N=2 TCI states/pairs of TCI states indicated in the DCI_b—i.e., TCI state(s) A or TCI state(s) B in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '10' or '11' indicating that both of the first and second indicated TCI states—e.g., among the N=2 TCI states/pairs of TCI states indicated in the DCI_b—i.e., TCI state(s) A and TCI state(s) B in this design example, could be used for PDSCH reception(s).

Figure 10:
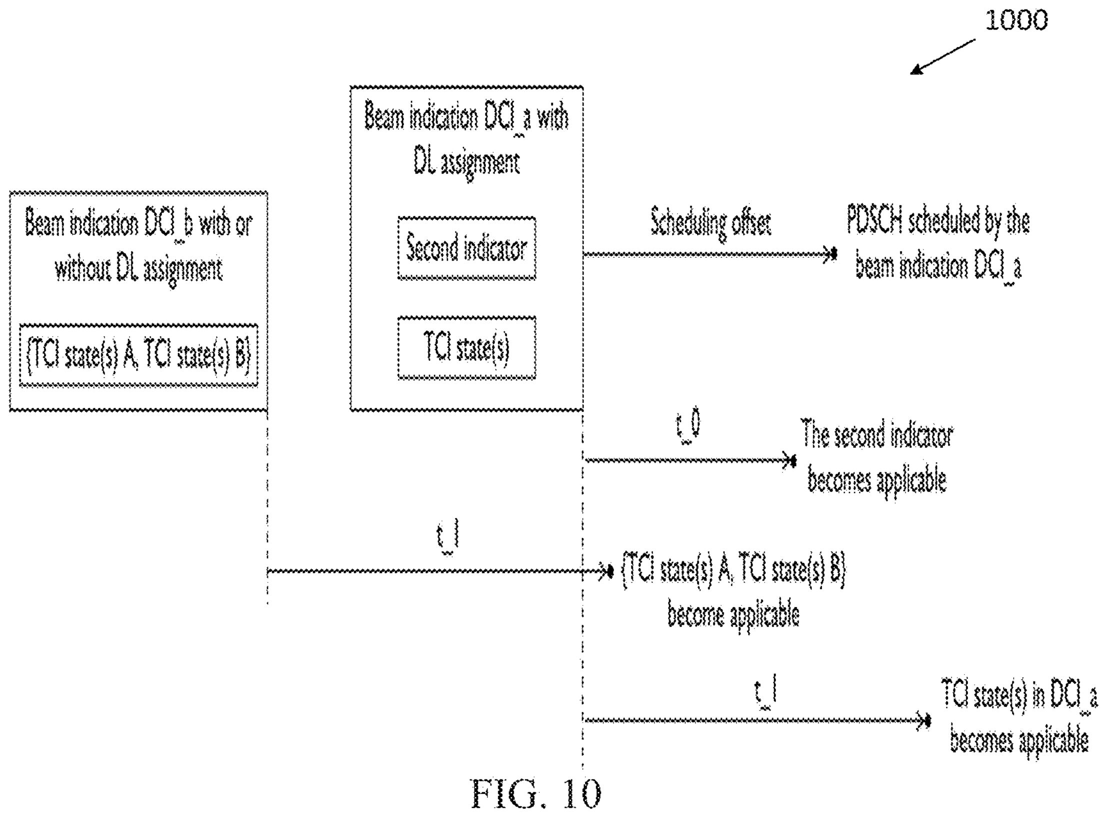
FIG. 10 illustrates a flow diagram for determining default beam(s) for PDSCH reception(s) with scheduling offset(s) less than or equal to a threshold according to embodiments of the present disclosure.

FIG. 10 illustrates a flow diagram 1000 for determining default beam(s) for PDSCH reception(s) with scheduling offset(s) less than or equal to a threshold according to embodiments of the present disclosure. For example, flow diagram 1000 for determining default beam(s) for PDSCH reception(s) with scheduling offset(s) less than or equal to a threshold can be adhered to by the UE 115 of FIG. 1. This example is for illustration only and other embodiments can be used without departing from the scope of the present disclosure With reference to FIG. 10, the UE 116 could apply TCI state(s) A and/or TCI state(s) B indicated in the beam indication DCI_b according to the second indicator indicated in the beam indication DCI_a to receive the PDSCH scheduled by the beam indication DCI_a when the corresponding scheduling offset is greater than t_0 but less than t_1 associated to the beam indication DCI_a.

For another example, the indicated fourth TCI state(s) could correspond to one or more of the TCI state(s) indicated in one or more beam indication DCIs received prior to the beam indication DCI_a in time, wherein (1) the time offset between the one or more previously received beam indication DCIs and the PDSCH scheduled by the beam indication DCI_a—e.g., the time duration(s)/difference(s) between the last symbol(s)/slot(s) of the PDCCH(s)/PDCCH candidate(s) that carries the previously received one or more DCIs and the first symbol/slot of the PDSCH scheduled by the beam indication DCI_a—is greater than or equal to t_1's associated to the previously received one or more beam indication DCIs, and/or (2) the previously received one or more beam indication DCIs are received the most recent in time relative to the beam indication DCI_a, and/or (3) the one or more of the TCI state(s) indicated in the previously received one or more beam indication DCIs is joint or (separate) DL TCI state(s) provided by TCI-State or DLorJoint-TCIState, and/or (4) the number of TCI state(s) indicated in each of the previously received one or more beam indication DCIs is one or two. For instance, the previously received one or more beam indication DCIs could include/comprise a beam indication DCI_b and a beam indication DCI_c each carrying one or more unified TCI states; the beam indication DCI_b could be received later in time than the beam indication DCI_c, and the TCI state(s)—indicated in the beam indication DCI_b and DCI_c-used for determining the indicated fourth TCI state(s) could be determined according to one or more of the design examples specified herein in the present disclosure. For instance, N=2 TCI states/pairs of TCI states—denoted by {TCI state(s) A', TCI state(s) B'}—could be indicated by an effective TCI codepoint specified herein in the present disclosure; for this case, when/if the second indicator indicated in the beam indication DCI_a is set to '00' as specified herein in the present disclosure, the indicated fourth TCI state(s) could correspond to the first indicated TCI state(s)—e.g., among the N=2 TCI states/pairs of TCI states indicated by the effective TCI codepoint—i.e., TCI state(s) A' in this design example; when/if the second indicator indicated in the beam indication DCI_a is set to '01' as specified herein in the present disclosure, the indicated fourth TCI state(s) could correspond to the second indicated TCI state(s)—e.g., among the N=2 TCI states/pairs of TCI states indicated by the effective TCI codepoint—i.e., TCI state(s) B' in this design example; when/if the second indicator indicated in the beam indication DCI_a is set to '10' or '11' as specified herein in the present disclosure, the indicated fourth TCI states could correspond to both of the first and second indicated TCI states—e.g., among the N=2 TCI states/pairs of TCI states indicated by the effective TCI codepoint—i.e., TCI state(s) A'0 and TCI state(s) B' in this design example.

When/if the (SDCI based) inter-cell multi-TRP operation is enabled, and when/if the second indicator indicated in the beam indication DCI_a is set to '00' as specified herein in the present disclosure indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to the serving cell PCI/PCI index, the indicated fourth TCI state(s) as discussed in the present disclosure could correspond to the TCI state(s) A'. When/if the (SDCI based) inter-cell multi-TRP operation is enabled, and when/if the second indicator indicated in the beam indication DCI_a is set to '00' as specified herein in the present disclosure indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to PCI(s)/PCI index(es) other than the serving cell PCI/PCI index, the indicated fourth TCI state(s) as discussed in the present disclosure could correspond to the TCI state(s) A' for at least UE-dedicated PDSCH reception(s), and/or the second indicated TCI state(s)—e.g., among the N=2 TCI states/pairs of TCI states indicated by the effective TCI codepoint—i.e., TCI state(s) B' in this design example for at least non-UE-dedicated PDSCH reception(s) when/if the TCI state(s) B' is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the second indicator indicated in the beam indication DCI_a is set to '01' as specified herein in the present disclosure indicating the second indicated TCI state(s)—e.g., among the N=2 TCI states/pairs of TCI states indicated by the effective TCI codepoint—i.e., TCI state(s) B' in this design example, and when/if the second indicated TCI state(s)—e.g., among the N=2 TCI states/pairs of TCI states indicated by the effective TCI codepoint—i.e., TCI state(s) B' in this design example is associated to the serving cell PCI/PCI index, the indicated fourth TCI state(s) as discussed in the present disclosure could correspond to the TCI state(s) B'. When/if the (SDCI based) inter-cell multi-TRP operation is enabled, and when/if the second indicator indicated in the beam indication DCI_a is set to '01' as specified herein in the present disclosure indicating the second indicated TCI state(s)—e.g., among the N=2 TCI states/pairs of TCI states indicated by the effective TCI codepoint—i.e., TCI state(s) B' in this design example, and when/if the second indicated TCI state(s)—e.g., among the N=2 TCI states/pairs of TCI states indicated by the effective TCI codepoint—i.e., TCI state(s) B' in this design example is associated to PCI(s)/PCI index(es) other than the serving cell PCI/PCI index, the indicated fourth TCI state(s) as discussed in the present disclosure could correspond to the TCI state(s) B' for at least UE-dedicated PDSCH reception(s) and/or the first indicated TCI state(s)—e.g., among the N=2 TCI states/pairs of TCI states indicated by the effective TCI codepoint—i.e., TCI state(s) A' in this design example for at least non-UE-dedicated PDSCH reception(s) when/if the TCI state(s) A' is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the second indicator indicated in the beam indication DCI_a is set to '10' or '11' as specified herein in the present disclosure indicating the first and second indicated TCI states—e.g., among the N=2 TCI states/pairs of TCI states indicated by the effective TCI codepoint—i.e., TCI state(s) A'0 and TCI state(s) B' in this design example, and when/if at least one of the TCI state(s) A'0 and TCI state(s) B' is associated to the serving cell PCI/PCI index, the indicated fourth TCI state(s) as discussed in the present disclosure could correspond to both of the TCI state(s) A'0 and TCI state(s) B'—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the second indicator indicated in the beam indication DCI_a is set to '10' or '11' as specified herein in the present disclosure indicating the first and second indicated TCI states—e.g., among the N=2 TCI states/pairs of TCI states indicated by the effective TCI codepoint—i.e., TCI state(s) A'0 and TCI state(s) B' in this design example, and when/if both of the TCI state(s) A'0 and TCI state(s) B' are associated to PCI(s)/PCI index(es) other than the serving cell PCI/PCI index, the indicated fourth TCI state(s) as discussed in the present disclosure could correspond to the TCI state(s) A'0 and TCI state(s) B' for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '00' or '01' indicating that the first or second indicated TCI state(s)—e.g., among the N=2 TCI states/pairs of TCI states indicated by the effective TCI codepoint—i.e., TCI state(s) A'0 or TCI state(s) B' in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '10' or '11' indicating that both of the first and second indicated TCI states—e.g., among the N=2 TCI states/pairs of TCI states indicated by the effective TCI codepoint—i.e., TCI state(s) A'0 and TCI state(s) B' in this design example, could be used for PDSCH reception(s).

Yet for another example, the indicated fourth TCI state(s) could correspond to one or more of the TCI state(s) used/applied for receiving/monitoring the PDCCH(s)/PDCCH candidate(s) that carries the scheduling DCI_a. For instance, N=2 TCI states/pairs of TCI states—denoted by {TCI state(s) A", TCI state(s) B"}—could be used/applied for receiving the beam indication DCI_a; for this case, when/if the second indicator indicated in the beam indication DCI_a is set to '00' as specified herein in the present disclosure, the indicated fourth TCI state(s) could correspond to the first indicated TCI state(s)—e.g., among the N=2 TCI states/pairs of TCI states used/applied for receiving the beam indication DCI_a—i.e., TCI state(s) A" in this design example; when/if the second indicator indicated in the beam indication DCI_a is set to '01' as specified herein in the present disclosure, the indicated fourth TCI state(s) could correspond to the second indicated TCI state(s)—e.g., among the N=2 TCI states/pairs of TCI states used/applied for receiving the beam indication DCI_a—i.e., TCI state(s) B" in this design example; when/if the second indicator indicated in the beam indication DCI_a is set to '10' or '11' as specified herein in the present disclosure, the indicated fourth TCI states could correspond to both of the first and second indicated TCI states—e.g., among the N=2 TCI states/pairs of TCI states used/applied for receiving the beam indication DCI_a—i.e., TCI state(s) A"0 and TCI state(s) B" in this design example.

When/if the (SDCI based) inter-cell multi-TRP operation is enabled, and when/if the second indicator indicated in the beam indication DCI_a is set to '00' as specified herein in the present disclosure indicating the first indicated TCI state(s)—e.g., among the N=2 TCI states/pairs of TCI states used/applied for receiving the beam indication DCI_a—i.e., TCI state(s) A" in this design example, and when/if the first indicated TCI state(s)—e.g., among the N=2 TCI states/pairs of TCI states used/applied for receiving the beam indication DCI_a—i.e., TCI state(s) A" in this design example is associated to the serving cell PCI/PCI index, the indicated fourth TCI state(s) as discussed in the present disclosure could correspond to the TCI state(s) A". When/if the (SDCI based) inter-cell multi-TRP operation is enabled, and when/if the second indicator indicated in the beam indication DCI_a is set to '00' as specified herein in the present disclosure indicating the first indicated TCI state(s)—e.g., among the N=2 TCI states/pairs of TCI states used/applied for receiving the beam indication DCI_a—i.e., TCI state(s) A" in this design example, and when/if the first indicated TCI state(s)—e.g., among the N=2 TCI states/pairs of TCI states used/applied for receiving the beam indication DCI_a—i.e., TCI state(s) A" in this design example is associated to PCI(s)/PCI index(es) other than the serving cell PCI/PCI index, the indicated fourth TCI state(s) as discussed in the present disclosure could correspond to the TCI state(s) A" for at least UE-dedicated PDSCH reception(s), and/or the second indicated TCI state(s)—e.g., among the N=2 TCI states/pairs of TCI states used/applied for receiving the beam indication DCI_a—i.e., TCI state(s) B" in this design example for at least non-UE-dedicated PDSCH reception(s) when/if the TCI state(s) B" is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the second indicator indicated in the beam indication DCI_a is set to '01' as specified herein in the present disclosure indicating the second indicated TCI state(s)—e.g., among the N=2 TCI states/pairs of TCI states used/applied for receiving the beam indication DCI_a—i.e., TCI state(s) B" in this design example, and when/if the second indicated TCI state(s)—e.g., among the N=2 TCI states/pairs of TCI states used/applied for receiving the beam indication DCI_a—i.e., TCI state(s) B" in this design example is associated to the serving cell PCI/PCI index, the indicated fourth TCI state(s) as discussed in the present disclosure could correspond to the TCI state(s) B". When/if the (SDCI based) inter-cell multi-TRP operation is enabled, and when/if the second indicator indicated in the beam indication DCI_a is set to '01' as specified herein in the present disclosure indicating the second indicated TCI state(s)—e.g., among the N=2 TCI states/pairs of TCI states used/applied for receiving the beam indication DCI_a—i.e., TCI state(s) B" in this design example, and when/if the second indicated TCI state(s)—e.g., among the N=2 TCI states/pairs of TCI states used/applied for receiving the beam indication DCI_a—i.e., TCI state(s) B" in this design example is associated to PCI(s)/PCI index(es) other than the serving cell PCI/PCI index, the indicated fourth TCI state(s) as discussed in the present disclosure could correspond to the TCI state(s) B" for at least UE-dedicated PDSCH reception(s), and/or the first indicated TCI state(s)—e.g., among the N=2 TCI states/pairs of TCI states used/applied for receiving the beam indication DCI_a—i.e., TCI state(s) A" in this design example for at least non-UE-dedicated PDSCH reception(s) when/if the TCI state(s) A" is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the second indicator indicated in the beam indication DCI_a is set to '10' or '11' as specified herein in the present disclosure indicating the first and second indicated TCI states—e.g., among the N=2 TCI states/pairs of TCI states used/applied for receiving the beam indication DCI_a—i.e., TCI state(s) A"0 and TCI state(s) B" in this design example, and when/if at least one of the TCI state(s) A"0 and TCI state(s) B" is associated to the serving cell PCI/PCI index, the indicated fourth TCI state(s) as discussed in the present disclosure could correspond to both of the TCI state(s) A"0 and TCI state(s) B"—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the second indicator indicated in the beam indication DCI_a is set to '10' or '11' as specified herein in the present disclosure indicating the first and second indicated TCI states—e.g., among the N=2 TCI states/pairs of TCI states used/applied for receiving the beam indication DCI_a—i.e., TCI state(s) A"0 and TCI state(s) B" in this design example, and when/if both of the TCI state(s) A"0 and TCI state(s) B" are associated to PCI(s)/PCI index(es) other than the serving cell PCI/PCI index, the indicated fourth TCI state(s) as discussed in the present disclosure could correspond to the TCI state(s) A"0 and TCI state(s) B" for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '00' or '01' indicating that the first or second indicated TCI state(s)—e.g., among the N=2 TCI states/pairs of TCI states used/applied for receiving the beam indication DCI_a—i.e., TCI state(s) A"0 or TCI state(s) B" in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '10' or '11' indicating that both of the first and second indicated TCI states—e.g., among the N=2 TCI states/pairs of TCI states used/applied for receiving the beam indication DCI_a—i.e., TCI state(s) A"0 and TCI state(s) B" in this design example, could be used for PDSCH reception(s).

Yet for another example, the indicated fourth TCI state(s) could correspond to one or more of the TCI state(s) indicated/activated by the lowest (TCI) codepoint in the TCI state(s) indication/activation MAC CE that comprises/includes/contains one or two TCI states/pairs of TCI states. For instance, the aforementioned lowest (TCI) codepoint could comprise/contain/include N=2 TCI states/pairs of TCI states—denoted by {TCI state(s) C, TCI state(s) D}; for this case, when/if the second indicator indicated in the beam indication DCI_a is set to '00' as specified herein in the present disclosure, the indicated fourth TCI state(s) could correspond to the first indicated TCI state(s)—e.g., among the N=2 TCI states/pairs of TCI states of the aforementioned lowest (TCI) codepoint—i.e., TCI state(s) C in this design example; when/if the second indicator indicated in the beam indication DCI_a is set to '01' as specified herein in the present disclosure, the indicated fourth TCI state(s) could correspond to the second indicated TCI state(s)—e.g., among the N=2 TCI states/pairs of TCI states of the aforementioned lowest (TCI) codepoint—i.e., TCI state(s) D in this design example; when/if the second indicator indicated in the beam indication DCI_a is set to '10' or '11' as specified herein in the present disclosure, the indicated fourth TCI states could correspond to both of the first and second indicated TCI states—e.g., among the N=2 TCI states/pairs of TCI states of the aforementioned lowest (TCI) codepoint—i.e., TCI state(s) C and TCI state(s) D in this design example.

When/if the (SDCI based) inter-cell multi-TRP operation is enabled, and when/if the second indicator indicated in the beam indication DCI_a is set to '00' as specified herein in the present disclosure indicating the first indicated TCI state(s)—e.g., among the N=2 TCI states/pairs of TCI states of the aforementioned lowest (TCI) codepoint—i.e., TCI state(s) C in this design example, and when/if the first indicated TCI state(s)—e.g., among the N=2 TCI states/pairs of TCI states of the aforementioned lowest (TCI) codepoint—i.e., TCI state(s) C in this design example is associated to the serving cell PCI/PCI index, the indicated fourth TCI state(s) as discussed in the present disclosure could correspond to the TCI state(s) C. When/if the (SDCI based) inter-cell multi-TRP operation is enabled, and when/if the second indicator indicated in the beam indication DCI_a is set to '00' as specified herein in the present disclosure indicating the first indicated TCI state(s)—e.g., among the N=2 TCI states/pairs of TCI states of the aforementioned lowest (TCI) codepoint—i.e., TCI state(s) C in this design example, and when/if the first indicated TCI state(s)—e.g., among the N=2 TCI states/pairs of TCI states of the aforementioned lowest (TCI) codepoint—i.e., TCI state(s) C in this design example is associated to PCI(s)/PCI index(es) other than the serving cell PCI/PCI index, the indicated fourth TCI state(s) as discussed in the present disclosure could correspond to the TCI state(s) C for at least UE-dedicated PDSCH reception(s) and/or the second indicated TCI state(s)—e.g., among the N=2 TCI states/pairs of TCI states of the aforementioned lowest (TCI) codepoint—i.e., TCI state(s) D in this design example for at least non-UE-dedicated PDSCH reception(s) when/if the TCI state(s) D is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the second indicator indicated in the beam indication DCI_a is set to '01' as specified herein in the present disclosure indicating the second indicated TCI state(s)—e.g., among the N=2 TCI states/pairs of TCI states of the aforementioned lowest (TCI) codepoint—i.e., TCI state(s) D in this design example, and when/if the second indicated TCI state(s)—e.g., among the N=2 TCI states/pairs of TCI states of the aforementioned lowest (TCI) codepoint—i.e., TCI state(s) D in this design example is associated to the serving cell PCI/PCI index, the indicated fourth TCI state(s) as discussed in the present disclosure could correspond to the TCI state(s) D. When/if the (SDCI based) inter-cell multi-TRP operation is enabled, and when/if the second indicator indicated in the beam indication DCI_a is set to '01' as specified herein in the present disclosure indicating the second indicated TCI state(s)—e.g., among the N=2 TCI states/pairs of TCI states of the aforementioned lowest (TCI) codepoint—i.e., TCI state(s) D in this design example, and when/if the second indicated TCI state(s)—e.g., among the N=2 TCI states/pairs of TCI states of the aforementioned lowest (TCI) codepoint—i.e., TCI state(s) D in this design example is associated to PCI(s)/PCI index(es) other than the serving cell PCI/PCI index, the indicated fourth TCI state(s) as discussed in the present disclosure could correspond to the TCI state(s) D for at least UE-dedicated PDSCH reception(s) and/or the first indicated TCI state(s)—e.g., among the N=2 TCI states/pairs of TCI states of the aforementioned lowest (TCI) codepoint—i.e., TCI state(s) C in this design example for at least non-UE-dedicated PDSCH reception(s) when/if the TCI state(s) C is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the second indicator indicated in the beam indication DCI_a is set to '10' or '11' as specified herein in the present disclosure indicating the first and second indicated TCI states—e.g., among the N=2 TCI states/pairs of TCI states of the aforementioned lowest (TCI) codepoint—i.e., TCI state(s) C and TCI state(s) D in this design example, and when/if at least one of the TCI state(s) C and TCI state(s) D is associated to the serving cell PCI/PCI index, the indicated fourth TCI state(s) as discussed in the present disclosure could correspond to both of the TCI state(s) C and TCI state(s) D—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the second indicator indicated in the beam indication DCI_a is set to '10' or '11' as specified herein in the present disclosure indicating the first and second indicated TCI states—e.g., among the N=2 TCI states/pairs of TCI states of the aforementioned lowest (TCI) codepoint—i.e., TCI state(s) C and TCI state(s) D in this design example, and when/if both of the TCI state(s) C and TCI state(s) D are associated to PCI(s)/PCI index(es) other than the serving cell PCI/PCI index, the indicated fourth TCI state(s) as discussed in the present disclosure could correspond to the TCI state(s) C and TCI state(s) D for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '00' or '01' indicating that the first or second indicated TCI state(s)—e.g., among the N=2 TCI states/pairs of TCI states of the aforementioned lowest (TCI) codepoint—i.e., TCI state(s) C or TCI state(s) D in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '10' or '11' indicating that both of the first and second indicated TCI states—e.g., among the N=2 TCI states/pairs of TCI states of the aforementioned lowest (TCI) codepoint—i.e., TCI state(s) C and TCI state(s) D in this design example, could be used for PDSCH reception(s)

As specified herein in the present disclosure, the presence or absence of the second indicator in a beam indication/scheduling DCI could be configured/provided by RRC signaling/parameter. The design examples as specified herein in the present disclosure could be applied when the second indicator is RRC configured to be present or absent in the corresponding beam indication/scheduling DCI.

For the design examples and the corresponding TCI state/beam association/application timelines (such as t_0 or t_1 discussed herein in the present disclosure) specified herein in the present disclosure:

- When/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States as specified herein in the present disclosure, the UE 116 could use one of the two indicated TCI states/pairs of TCI states (e.g., the first indicated TCI state(s) or the second indicated TCI state(s) among the two indicated TCI states/pairs of TCI states) for the corresponding PDSCH reception/buffering, wherein the two indicated TCI states/pairs of TCI states could be determined according to one or more examples described herein. Here, the UE 116 could determine/select or determine to use/apply the one of the two indicated TCI states/pairs of TCI states (e.g., the first indicated TCI state(s) or the second indicated TCI state(s) among the two indicated TCI states/pairs of TCI states) according to one or more examples described herein.
- When/if the UE 116 reports to the network 130 the capability signaling twoDefaultTCI-States, or the UE 116 is configured with enableTwoDefaultTCI-States as specified herein in the present disclosure, the UE 116 could use both of the two indicated TCI states/pairs of TCI states (e.g., the first indicated TCI state(s) and the second indicated TCI state(s) among the two indicated TCI states/pairs of TCI states) for the corresponding PDSCH reception/buffering, wherein the two indicated TCI states/pairs of TCI states could be determined according to one or more examples described herein. Here, the UE 116 could determine to use/apply both of the two indicated TCI states/pairs of TCI states (e.g., the first indicated TCI state(s) and the second indicated TCI state(s) among the two indicated TCI states/pairs of TCI states) according to one or more examples described herein. For this case, after the second indicator (if configured to be present) indicated in the corresponding beam indication DCI as specified herein in the present disclosure becomes applicable, the UE 116 could apply the first indicated TCI state(s), the second indicated TCI state(s) or both of the first and second indicated TCI states indicated by the second indicator as specified herein in the present disclosure on the PDSCH(s) received/buffered by using both of the two indicated TCI states/pairs of TCI states before the second indicator (if configured to be present) indicated in the corresponding beam indication DCI becomes applicable as described/discussed herein.

When/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the UE 116 could separately use the two indicated TCI states/pairs of TCI states (e.g., the first indicated TCI state(s) and the second indicated TCI state(s) among the two indicated TCI states/pairs of TCI states) in a time-division multiplexing (TDM) manner—e.g., across different symbols/slots/etc.—for the corresponding PDSCH reception/buffering, wherein the two indicated TCI states/pairs of TCI states could be determined according to one or more examples described herein. Here, the UE 116 could determine/select or determine to use/apply one or more of the two indicated TCI states/pairs of TCI states (e.g., the first indicated TCI state(s) and the second indicated TCI state(s) among the two indicated TCI states/pairs of TCI states) according to one or more examples described herein.

In one embodiment, as specified herein in the present disclosure, the UE 116 could be indicated/provided/configured by the network 130, in a beam indication DCI without DL assignment (e.g., DCI format 1_1 or 1_2 without PDSCH assignment)—denoted by beam indication DCI_a', one or more (e.g., N=2) first TCI states/pairs of TCI states by one or more TCI codepoints of one or more TCI fields, for PDSCH reception(s) in a SDCI based multi-TRP system. Optionally, the UE 116 could be indicated/provided/configured by the network 130, in a beam indication DCI with DL assignment (e.g., DCI format 1_1 or 1_2 with PDSCH assignment)—denoted by beam indication DCI_a', one or more (e.g., N=2) first TCI states/pairs of TCI states by one or more TCI codepoints of one or more TCI fields, for PDSCH reception(s) in a SDCI based multi-TRP system, wherein the beam indication DCI_a' does not include/indicate/provide the second indicator according to RRC configuration/signaling/parameter (i.e., the second indicator is (RRC configured to be) absent or not present or not configured in the corresponding DCI format) as specified herein in the present disclosure.

The UE 116 could be able to use/apply one or more of the indicated first TCI states/pairs of TCI states for PDSCH reception(s) t_1 (e.g., in terms of slots, symbols, etc.) after reception of the beam indication DCI_a' (e.g., t_1 slots/symbols after the last symbol/slot of the PDCCH/PDCCH candidate that carries the beam indication DCI_a'). For instance, t_1 could correspond to the beam application time specified under the unified TCI framework, which is defined as follows: when the UE 116 would transmit the last symbol of a PUCCH with HARQ-ACK information corresponding to the beam indication DCI_a' carrying the one or more first TCI states/pairs of TCI states and without DL assignment, and if the one or more of the indicated first TCI states is different from the previously indicated one(s), the one or more of the indicated first TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s) applying the beam indication. When/if the time offset—e.g., the time duration/difference between the last symbol/slot of the PDCCH/PDCCH candidate that carries the beam indication DCI_a'0 and the first symbol/slot of an applicable PDSCH—is less than or equal to t_1—i.e., the beam application time, the UE 116 could use/apply one or more indicated fifth TCI states to receive the PDSCH, wherein the one or more indicated fifth TCI states could be determined according to one or more examples described herein, or the one or more indicated fifth TCI states could correspond to or could be determined according to the one or more indicated second, third and/or fourth TCI states as specified herein in the present disclosure. Furthermore, the indicated fifth TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. When/if the time offset—e.g., the time duration/difference between the last symbol/slot of the PDCCH/PDCCH candidate that carries the beam indication DCI_a'0 and the first symbol/slot of an applicable PDSCH—is less than or equal to t_0, the UE 116 could use/apply one or more indicated type-1 TCI states to receive the PDSCH, wherein the one or more indicated type-1 TCI states could be determined according to one or more examples described herein, or the one or more indicated type-1 TCI states could correspond to or could be determined according to the one or more indicated second, third and/or fourth TCI states as specified herein in the present disclosure. Furthermore, the indicated type-1 TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. When/if the time offset—e.g., the time duration/difference between the last symbol/slot of the PDCCH/PDCCH candidate that carries the beam indication DCI_a'0 and the first symbol/slot of an applicable PDSCH—is greater than or equal to t_0 but less than or equal to t_1, the UE 116 could use/apply one or more indicated type-2 TCI states to receive the PDSCH, wherein the one or more indicated type-2 TCI states could be determined according to one or more examples described herein, or the one or more indicated type-2 TCI states could correspond to or could be determined according to the one or more indicated second, third and/or fourth TCI states as specified herein in the present disclosure. Furthermore, the indicated type-2 TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. Here, t_0 could be: (1) configured/provided/indicated by the network 130, e.g., via higher layer RRC signaling/parameter and/or MAC CE command and/or dynamic DCI based L1 signaling, e.g., t_0=timeDurationForQCL, (2) fixed in the system specifications, e.g., t_0=timeDurationForQCL and/or (3) autonomously determined by the UE 116 and reported to the network 130. When/if the time offset—e.g., the time duration/difference between the last symbol/slot of the PDCCH/PDCCH candidate that carries the beam indication DCI_a'0 and the first symbol/slot of an applicable PDSCH—is greater than or equal to t_1, the UE 116 could use/apply one or more indicated type-3 TCI states to receive the PDSCH, wherein the one or more indicated type-3 TCI states could be determined according to one or more examples described herein, or the one or more indicated type-3 TCI states could correspond to or could be determined according to the one or more indicated second, third and/or fourth TCI states as specified herein in the present disclosure. Furthermore, the indicated type-3 TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. In addition, the PDSCH could be UE-dedicated PDSCH and/or non-UE-dedicated PDSCH as specified herein in the present disclosure. One or more of the indicated fifth TCI state(s), the indicated type-1 TCI state(s), the indicated type-2 TCI state(s), and the indicated type-3 TCI state(s) specified herein in the present disclosure could be the same/common or different from each other. As specified herein in the present disclosure, the presence or absence of the second indicator in a beam indication/scheduling DCI could be configured/provided by RRC signaling/parameter. The design example described herein could be applied to when the second indicator is RRC configured to be present or absent in the corresponding beam indication/scheduling DCI.

In one embodiment, as specified herein in the present disclosure, the UE 116 could be indicated/provided/configured by the network 130, in a beam indication DCI with DL assignment (e.g., DCI format 1_1 or 1_2 with PDSCH assignment)—denoted by beam indication DCI_a, one or more (e.g., N=1) first TCI states/pairs of TCI states by one or more TCI codepoints of one or more TCI fields, and/or a second indicator as specified herein in the present disclosure, for PDSCH reception(s) in a SDCI based multi-TRP system. The one or more first TCI states/pairs of TCI states could be used/applied to update/replace one or more of the previously indicated/applied TCI states/pairs of TCI states. For this case, the UE 116 could use/apply the one or more first TCI states/pairs of TCI states indicated in the DCI_a and/or one or more of the previously indicated/applied TCI states/pairs of TCI states that are not updated/replaced by the first TCI states/pairs of TCI states—denoted by applicable previously indicated/applied TCI state(s)/pair(s) of TCI states—for PDSCH reception(s) in a SDCI based multi-TRP system; in this embodiment, the one or more first TCI states/pairs of TCI states and the applicable previously indicated/applied TCI state(s)/pair(s) of TCI states could be referred to as indicated sixth TCI state(s)/pair(s) of TCI states in the present disclosure. The one or more first TCI states/pairs of TCI states, the one or more applicable previously indicated/applied TCI state(s)/pair(s) of TCI states and/or the indicated sixth TCI state(s)/pair(s) of TCI states could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled.

The UE 116 could be able to determine which one or more of the previously indicated/applied TCI states/pairs of TCI states to be updated/replaced by the one or more first TCI states/pairs of TCI states (and therefore, the UE 116 could determine the applicable previously indicated/applied TCI state(s)/pair(s) of TCI states), and/or which one or more of the indicated sixth TCI states/pairs of TCI states to use/apply for PDSCH reception(s) according to the second indicator indicated in the corresponding beam indication DCI_a t_0 (e.g., in terms of slots, symbols, etc.) after reception of the beam indication DCI_a (e.g., t_0 slots/symbols after the last symbol/slot of the PDCCH/PDCCH candidate that carries the beam indication DCI_a). Furthermore, the UE 116 could be able to use/apply the determined one or more of the indicated sixth TCI states/pairs of TCI states for PDSCH reception(s) t_1 (e.g., in terms of slots, symbols, etc.) after reception of the beam indication DCI_a (e.g., t_1 slots/symbols after the last symbol/slot of the PDCCH/PDCCH candidate that carries the beam indication DCI_a). In one example, t_0 could be: (1) configured/provided/indicated by the network 130, e.g., via higher layer RRC signaling/parameter and/or MAC CE command and/or dynamic DCI based L1 signaling, e.g., t_0=timeDurationForQCL, (2) fixed in the system specifications, e.g., t_0=timeDurationForQCL and/or (3) autonomously determined by the UE 116 and reported to the network 130. In another example, t_1 could correspond to the beam application time specified under the unified TCI framework, which is defined as follows: when the UE 116 would transmit the last symbol of a PUCCH with HARQ-ACK information corresponding to the PDSCH scheduled by the beam indication DCI_a, and if the one or more indicated first TCI states is different from the previously indicated one(s), the one or more indicated first TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s) applying the beam indication.

In one example, when/if the scheduling offset—e.g., the time duration/difference between the last symbol/slot of the PDCCH/PDCCH candidate that carries the beam indication DCI_a and the first symbol/slot of the PDSCH scheduled by the beam indication DCI_a—is greater than or equal to t_1 associated to the beam indication DCI_a, and when/if the second indicator is RRC configured to be present in the corresponding beam indication/scheduling DCI, the UE 116 could follow the second indicator to use/apply one or more of the indicated sixth TCI states as specified herein in the present disclosure, to receive the PDSCH.

For instance, for N=2 indicated sixth TCI states/pairs of TCI states—denoted by {TCI state(s) X', TCI state(s) Y'}, when/if the second indicator indicated in the beam indication DCI_a is set to '00' as specified herein in the present disclosure, the UE 116 could use/apply the first indicated TCI state(s)—e.g., among the N=2 indicated sixth TCI states/pairs of TCI states—i.e., TCI state(s) X' in this design example to receive the PDSCH(s); when/if the second indicator indicated in the beam indication DCI_a is set to '01' as specified herein in the present disclosure, the UE 116 could use/apply the second indicated TCI state(s)—e.g., among the N=2 indicated sixth TCI states/pairs of TCI states—i.e., TCI state(s) Y' in this design example to receive the PDSCH(s); when/if the second indicator indicated in the beam indication DCI_a is set to '10' or '11' as specified herein in the present disclosure, the UE 116 could use/apply both of the first and second indicated TCI states—e.g., among the N=2 indicated sixth TCI states/pairs of TCI states—i.e., TCI state(s) X'0 and TCI state(s) Y' in this design example to receive the PDSCH(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '00' or '01' indicating that the first or second indicated TCI state(s)—e.g., among the N=2 indicated sixth TCI states/pairs of TCI states—i.e., TCI state(s) X'0 or TCI state(s) Y' in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '10' or '11' indicating that both of the first and second indicated TCI states—e.g., among the N=2 indicated sixth TCI states/pairs of TCI states—i.e., TCI state(s) X'0 and TCI state(s) Y' in this design example, could be used for PDSCH reception(s).

In another example, when/if the scheduling offset—e.g., the time duration/difference between the last symbol/slot of the PDCCH/PDCCH candidate that carries the beam indication DCI_a and the first symbol/slot of the PDSCH scheduled by the beam indication DCI_a—is less than or equal to t_0, the UE 116 could use/apply one or more indicated seventh TCI states to receive the PDSCH, wherein the one or more indicated seventh TCI states could be determined according to one or more examples described herein, or the one or more indicated seventh TCI states could correspond to or could be determined according to the one or more indicated second, third, fourth and/or fifth TCI states as specified herein in the present disclosure. Furthermore, the indicated seventh TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. In addition, the PDSCH could be UE-dedicated PDSCH and/or non-UE-dedicated PDSCH as specified herein in the present disclosure.

In yet another example, when/if the scheduling offset—e.g., the time duration/difference between the last symbol/slot of the PDCCH/PDCCH candidate that carries the beam indication DCI_a and the first symbol/slot of the PDSCH scheduled by the beam indication DCI_a—is less than or equal to t_1—i.e., the beam application time, the UE 116 could use/apply one or more indicated eight TCI states to receive the PDSCH, wherein the one or more indicated eight TCI states could be determined according to one or more examples described herein, or the one or more indicated eight TCI states could correspond to or could be determined according to the one or more indicated second, third, fourth, fifth and/or seventh TCI states as specified herein in the present disclosure. Furthermore, the indicated eight TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. In addition, the PDSCH could be UE-dedicated PDSCH and/or non-UE-dedicated PDSCH as specified herein in the present disclosure.

In yet another example, when/if the scheduling offset—e.g., the time duration/difference between the last symbol/slot of the PDCCH/PDCCH candidate that carries the beam indication DCI_a and the first symbol/slot of the PDSCH scheduled by the beam indication DCI_a—is less than or equal to t_0 or is less than or equal to t_1 or is greater than or equal to t_0, but less than or equal to t_1—i.e., the beam application time, the UE 116 could use/apply one or more indicated ninth TCI states to receive the PDSCH, wherein the one or more indicated ninth TCI states could be determined according to one or more examples described herein, or the one or more indicated ninth TCI states could correspond to or could be determined according to the one or more indicated second, third, fourth, fifth, seventh and/or eighth TCI states as specified herein in the present disclosure. Furthermore, the indicated ninth TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. In addition, the PDSCH could be UE-dedicated PDSCH and/or non-UE-dedicated PDSCH as specified herein in the present disclosure. Optionally, the indicated ninth TCI state(s) could correspond to one or more of the TCI state(s) indicated in one or more beam indication DCIs received prior to the beam indication DCI_a in time, wherein (1) the time offset between the one or more previously received beam indication DCIs and the PDSCH scheduled by the beam indication DCI_a—e.g., the time duration(s)/difference(s) between the last symbol(s)/slot(s) of the PDCCH(s)/PDCCH candidate(s) that carries the previously received one or more DCIs and the first symbol/slot of the PDSCH scheduled by the beam indication DCI_a—is greater than or equal to t_1's associated to the previously received one or more beam indication DCIs, and/or (2) the previously received one or more beam indication DCIs are received the most recent in time relative to the beam indication DCI_a, and/or (3) the one or more of the TCI state(s) indicated in the previously received one or more beam indication DCIs is joint or (separate) DL TCI state(s) provided by TCI-State or DLorJoint-TCIState, and/or (4) the number of TCI state(s) indicated in each of the previously received one or more beam indication DCIs is one or two. For N=2, the TCI state(s) indicated in the one or more previously received beam indication DCIs (e.g., determined according to one or more examples described herein) could be denoted by {TCI state(s) A, TCI state(s) B}. Furthermore, the TCI state(s) indicated in the one or more previously received one or more beam indication DCIs could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. In addition, the PDSCH could be UE-dedicated PDSCH and/or non-UE-dedicated PDSCH as specified herein in the present disclosure.

Figure 11:
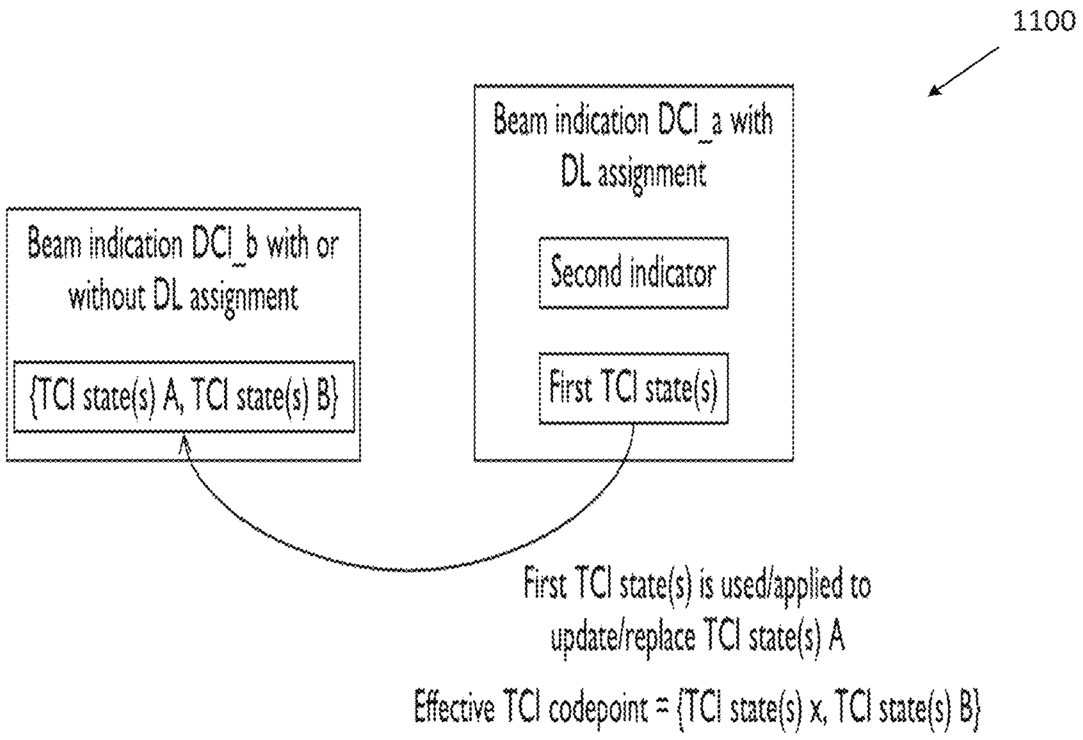
FIG. 11 illustrates a flow diagram for determining the effective transmission configuration indication (TCI) codepoint according to embodiments of the present disclosure.

FIG. 11 illustrates a flow diagram 1100 for determining the effective TCI codepoint according to embodiments of the present disclosure. For example, flow diagram 1100 for determining the effective TCI codepoint can be adhered to by any of the UEs 111-116 of FIG. 1. This example is for illustration only and other embodiments can be used without departing from the scope of the present disclosure.

In one example, the UE 116 could know that the indicated first TCI state(s) in the beam indication DCI_a could be used/applied to update/replace TCI state(s) A, and therefore, TCI state(s) B could correspond to the applicable previously indicated/applied TCI state(s) as specified herein in the present disclosure. An effective TCI codepoint could comprise/contain/include both of the TCI state(s) A and TCI state(s) B, which could be denoted by {TCI state(s) A, TCI state(s) B}.

In another example, the UE 116 could know that the indicated first TCI state(s) in the beam indication DCI_a could be used/applied to update/replace TCI state(s) B, and therefore, TCI state(s) A could correspond to the applicable previously indicated/applied TCI state(s) as specified herein in the present disclosure. An effective TCI codepoint could comprise/contain/include both of the TCI state(s) A and TCI state(s) B, which could be denoted by {TCI state(s) A, TCI state(s) B}.

In yet another example, the UE 116 could know that the indicated first TCI state(s) in the beam indication DCI_a could be used/applied to update/replace TCI state(s) A, and therefore, TCI state(s) B could correspond to the applicable previously indicated/applied TCI state(s) as specified herein in the present disclosure. Furthermore, the UE 116 could know that one (e.g., {TCI state(s) A'}) or more (e.g., {TCI state(s) A', TCI state(s) B'}) TCI states/pairs of TCI states are used/applied for receiving/monitoring the PDCCH(s)/PDCCH candidate(s) that carriers the beam indication DCI_a. For this case, an effective TCI codepoint could comprise/contain/include both of the TCI state(s) A'0 and TCI state(s) B, which could be denoted by {TCI state(s) A', TCI state(s) B}.

In yet another example, the UE 116 could know that the indicated first TCI state(s) in the beam indication DCI_a could be used/applied to update/replace TCI state(s) B, and therefore, TCI state(s) A could correspond to the applicable previously indicated/applied TCI state(s) as specified herein in the present disclosure. Furthermore, the UE 116 could know that one (e.g., {TCI state(s) B'}) or more (e.g., {TCI state(s) A', TCI state(s) B'}) TCI states/pairs of TCI states are used/applied for receiving/monitoring the PDCCH(s)/PDCCH candidate(s) that carriers the beam indication DCI_a. For this case, an effective TCI codepoint could comprise/contain/include both of the TCI state(s) A and TCI state(s) B', which could be denoted by {TCI state(s) A, TCI state(s) B'}.

In yet another example, the UE 116 could know that the indicated first TCI state(s) in the beam indication DCI_a could be used/applied to update/replace TCI state(s) A, and therefore, TCI state(s) B could correspond to the applicable previously indicated/applied TCI state(s) as specified herein in the present disclosure. Furthermore, the UE 116 could know that the lowest (TCI) codepoint that comprises/includes/contains one or two TCI states/pairs of TCI states in the TCI state(s) indication/activation MAC CE could comprise/contain/include one (e.g., {TCI state(s) A'}) or more (e.g., {TCI state(s) A', TCI state(s) B'}) TCI states/pairs of TCI states. For this case, an effective TCI codepoint could comprise/contain/include both of the TCI state(s) A'0 and TCI state(s) B, which could be denoted by {TCI state(s) A', TCI state(s) B}.

In yet another example, the UE 116 could know that the indicated first TCI state(s) in the beam indication DCI_a could be used/applied to update/replace TCI state(s) B, and therefore, TCI state(s) A could correspond to the applicable previously indicated/applied TCI state(s) as specified herein in the present disclosure. Furthermore, the UE 116 could know that the lowest (TCI) codepoint that comprises/includes/contains one or two TCI states/pairs of TCI states in the TCI state(s) indication/activation MAC CE could comprise/contain/include one (e.g., {TCI state(s) B'}) or more (e.g., {TCI state(s) A', TCI state(s) B'}) TCI states/pairs of TCI states. For this case, an effective TCI codepoint could comprise/contain/include both of the TCI state(s) A and TCI state(s) B', which could be denoted by {TCI state(s) A, TCI state(s) B'}.

With reference to FIG. 11, the indicated first TCI state(s) in the beam indication DCI_a is used/applied to update/replace TCI state(s) A of {TCI state(s) A, TCI state(s) B} indicated in a previously received beam indication DCI_b. For this case, TCI state(s) B could correspond to the applicable previously indicated/applied TCI state(s) as specified herein in the present disclosure, and the effective TCI codepoint could comprise/contain/include N=2 TCI states/pairs of TCI states denoted by {TCI state(s) x, TCI state(s) B}, where TCI state(s) x could be determined according to one or more examples described herein. In one example, TCI state(s) x could correspond to TCI state(s) A'. For an effective TCI codepoint as specified herein in the present disclosure.

Figure 12:
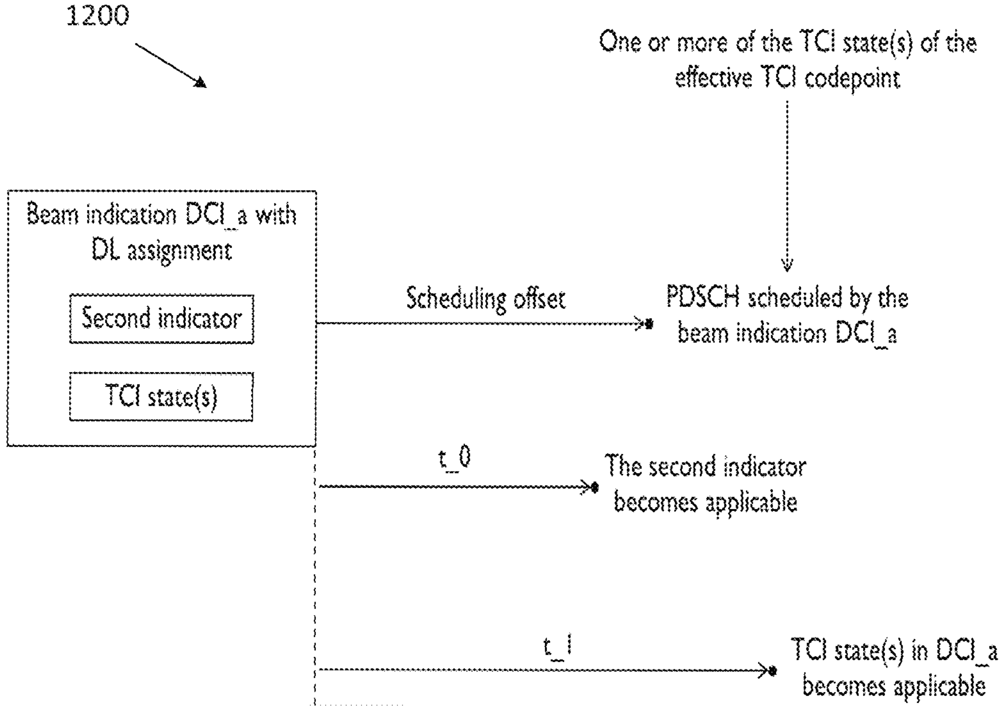
FIG. 12 illustrates a flow diagram for determining default TCI states for PDSCH reception(s) with scheduling offset(s) less than or equal to a threshold according to embodiments of the present disclosure.

FIG. 12 illustrates a flow diagram 1200 for determining default TCI states for PDSCH reception(s) with scheduling offset(s) less than or equal to a threshold according to embodiments of the present disclosure. For example, flow diagram 1200 for determining default TCI states for PDSCH reception(s) with scheduling offset(s) less than or equal to a threshold can be utilized by the UE 115 of FIG. 1. This example is for illustration only and other embodiments can be used without departing from the scope of the present disclosure.

In one example, as specified herein in the present disclosure, N=2 TCI states/pairs of TCI states—e.g., denoted by {TCI state(s) A', TCI state(s) B}—could be indicated by the effective TCI codepoint; for this case, the indicated ninth TCI states as discussed in the present disclosure could correspond to both of the TCI state(s) A'0 and TCI state(s) B. When/if the (SDCI based) inter-cell multi-TRP operation is enabled, and when/if at least one of the TCI state(s) A'0 and TCI state(s) B is associated to the serving cell PCI/PCI index, the indicated ninth TCI state(s) as discussed in the present disclosure could correspond to both of the TCI state(s) A'0 and TCI state(s) B—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if both of the TCI state(s) A'0 and TCI state(s) B are associated to PCI(s)/PCI index(es) other than the serving cell PCI/PCI index, the indicated ninth TCI state(s) as discussed in the present disclosure could correspond to the TCI state(s) A'0 and TCI state(s) B for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling twoDefaultTCI-States, or the UE 116 could be configured with enableTwoDefaultTCI-States as specified herein in the present disclosure.

In another example, as specified herein in the present disclosure, N=2 TCI states/pairs of TCI states—e.g., denoted by {TCI state(s) A', TCI state(s) B}—could be indicated by the effective TCI codepoint; for this case, the indicated ninth TCI state(s) could correspond to the first indicated TCI state(s)—e.g., among the N=2 TCI states/pairs of TCI states indicated by the effective TCI codepoint—i.e., TCI state(s) A' in this design example. When/if the (SDCI based) inter-cell multi-TRP operation is enabled, and when/if the first indicated TCI state(s)—e.g., among the N=2 TCI states/pairs of TCI states indicated by the effective TCI codepoint—i.e., TCI state(s) A' in this design example is associated to the serving cell PCI/PCI index, the indicated ninth TCI state(s) as discussed in the present disclosure could correspond to the TCI state(s) A'. When/if the (SDCI based) inter-cell multi-TRP operation is enabled, and when/if the first indicated TCI state(s)—e.g., among the N=2 TCI states/pairs of TCI states indicated by the effective TCI codepoint—i.e., TCI state(s) A' in this design example is associated to PCI(s)/PCI index(es) other than the serving cell PCI/PCI index, the indicated ninth TCI state(s) as discussed in the present disclosure could correspond to the TCI state(s) A' for at least UE-dedicated PDSCH reception(s) and/or the second indicated TCI state(s)—e.g., among the N=2 TCI states/pairs of TCI states indicated by the effective TCI codepoint—i.e., TCI state(s) B in this design example for at least non-UE-dedicated PDSCH reception(s) when/if the TCI state(s) B is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling oneDefaultTCI-State, or the UE 116 does not report to the network 130 the capability signaling twoDefaultTCI-States, or the UE 116 is not configured with enableTwoDefaultTCI-States as specified herein in the present disclosure. Alternatively, the UE 116 could report to the network 130 the capability signaling twoDefaultTCI-States, or the UE 116 could be configured with enableTwoDefaultTCI-States as specified herein in the present disclosure.

In yet another example, as specified herein in the present disclosure, N=2 TCI states/pairs of TCI states—e.g., denoted by {TCI state(s) A', TCI state(s) B}—could be indicated by the effective TCI codepoint; for this case, the indicated ninth TCI state(s) could correspond to the second indicated TCI state(s)—e.g., among the N=2 TCI states/pairs of TCI states indicated by the effective TCI codepoint—i.e., TCI state(s) B in this design example. When/if the (SDCI based) inter-cell multi-TRP operation is enabled, and when/if the second indicated TCI state(s)—e.g., among the N=2 TCI states/pairs of TCI states indicated by the effective TCI codepoint—i.e., TCI state(s) B in this design example is associated to the serving cell PCI/PCI index, the indicated ninth TCI state(s) as discussed in the present disclosure could correspond to the TCI state(s) B. When/if the (SDCI based) inter-cell multi-TRP operation is enabled, and when/if the second indicated TCI state(s)—e.g., among the N=2 TCI states/pairs of TCI states indicated by the effective TCI codepoint—i.e., TCI state(s) B in this design example is associated to PCI(s)/PCI index(es) other than the serving cell PCI/PCI index, the indicated ninth TCI state(s) as discussed in the present disclosure could correspond to the TCI state(s) B for at least UE-dedicated PDSCH reception(s) and/or the first indicated TCI state(s)—e.g., among the N=2 TCI states/pairs of TCI states indicated by the effective TCI codepoint—i.e., TCI state(s) A' in this design example for at least non-UE-dedicated PDSCH reception(s) when/if the TCI state(s) A' is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s). For this design example, the UE 116 could report to the network 130 the capability signaling oneDefaultTCI-State, or the UE 116 does not report to the network 130 the capability signaling twoDefaultTCI-States, or the UE 116 is not configured with enableTwoDefaultTCI-States as specified herein in the present disclosure. Alternatively, the UE 116 could report to the network 130 the capability signaling twoDefaultTCI-States, or the UE 116 could be configured with enableTwoDefaultTCI-States as specified herein in the present disclosure.

In yet another example, as specified herein in the present disclosure, N=2 TCI states/pairs of TCI states—e.g., denoted by {TCI state(s) A', TCI state(s) B}—could be indicated by the effective TCI codepoint; furthermore, the UE 116 could be indicated/configured/provided by the network 130, e.g., via higher layer RRC signaling/parameter (e.g., in the higher layer parameter PDSCH-Config that configures the PDSCH) and/or MAC CE command, a 2-bit indicator with '00' ('01', '10' or '11') indicating that the indicated ninth TCI state(s) could correspond to the first indicated TCI state(s)—e.g., among the N=2 TCI states/pairs of TCI states indicated by the effective TCI codepoint—i.e., TCI state(s) A' in this design example, '01' ('00', '10' or '11') indicating that the indicated ninth TCI state(s) could correspond to the second indicated TCI state(s)—e.g., among the N=2 TCI states/pairs of TCI states indicated by the effective TCI codepoint—i.e., TCI state(s) B in this design example, and '10' or '11' ('00' or '01') indicating that the indicated ninth TCI states could correspond to both of the first and second indicated TCI states—e.g., among the N=2 TCI states/pairs of TCI states indicated by the effective TCI codepoint—i.e., TCI state(s) A'0 and TCI state(s) B in this design example.

When/if the (SDCI based) inter-cell multi-TRP operation is enabled, and when/if the 2-bit indicator is set to '00' ('01', '10' or '11') as specified herein in the present disclosure indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to the serving cell PCI/PCI index, the indicated ninth TCI state(s) as discussed in the present disclosure could correspond to the TCI state(s) A'. When/if the (SDCI based) inter-cell multi-TRP operation is enabled, and when/if the 2-bit indicator is set to '00' ('01', '10' or '11') as specified herein in the present disclosure indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to PCI(s)/PCI index(es) other than the serving cell PCI/PCI index, the indicated ninth TCI state(s) as discussed in the present disclosure could correspond to the TCI state(s) A' for at least UE-dedicated PDSCH reception(s) and/or the second indicated TCI state(s)—e.g., among the N=2 TCI states/pairs of TCI states indicated by the effective TCI codepoint—i.e., TCI state(s) B in this design example for at least non-UE-dedicated PDSCH reception(s) when/if the TCI state(s) B is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the 2-bit indicator is set to '01' ('00', '10' or '11') as specified herein in the present disclosure indicating the second indicated TCI state(s)—e.g., among the N=2 TCI states/pairs of TCI states indicated by the effective TCI codepoint—i.e., TCI state(s) B in this design example, and when/if the second indicated TCI state(s)—e.g., among the N=2 TCI states/pairs of TCI states indicated by the effective TCI codepoint—i.e., TCI state(s) B in this design example is associated to the serving cell PCI/PCI index, the indicated ninth TCI state(s) as discussed in the present disclosure could correspond to the TCI state(s) B. When/if the (SDCI based) inter-cell multi-TRP operation is enabled, and when/if the 2-bit indicator is set to '01' ('00', '10' or '11') as specified herein in the present disclosure indicating the second indicated TCI state(s)—e.g., among the N=2 TCI states/pairs of TCI states indicated by the effective TCI codepoint—i.e., TCI state(s) B in this design example, and when/if the second indicated TCI state(s)—e.g., among the N=2 TCI states/pairs of TCI states indicated by the effective TCI codepoint—i.e., TCI state(s) B in this design example is associated to PCI(s)/PCI index(es) other than the serving cell PCI/PCI index, the indicated ninth TCI state(s) as discussed in the present disclosure could correspond to the TCI state(s) B for at least UE-dedicated PDSCH reception(s) and/or the first indicated TCI state(s)—e.g., among the N=2 TCI states/pairs of TCI states indicated by the effective TCI codepoint—i.e., TCI state(s) A' in this design example for at least non-UE-dedicated PDSCH reception(s) when/if the TCI state(s) A' is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the 2-bit indicator is set to '10' or '11' ('00' or '01') as specified herein in the present disclosure indicating the first and second indicated TCI states—e.g., among the N=2 TCI states/pairs of TCI states indicated by the effective TCI codepoint—i.e., TCI state(s) A'0 and TCI state(s) B in this design example, and when/if at least one of the TCI state(s) A'0 and TCI state(s) B is associated to the serving cell PCI/PCI index, the indicated ninth TCI state(s) as discussed in the present disclosure could correspond to both of the TCI state(s) A'0 and TCI state(s) B—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the 2-bit indicator is set to '10' or '11' ('00' or '01') as specified herein in the present disclosure indicating the first and second indicated TCI states—e.g., among the N=2 TCI states/pairs of TCI states indicated by the effective TCI codepoint—i.e., TCI state(s) A'0 and TCI state(s) B in this design example, and when/if both of the TCI state(s) A'0 and TCI state(s) B are associated to PCI(s)/PCI index(es) other than the serving cell PCI/PCI index, the indicated ninth TCI state(s) as discussed in the present disclosure could correspond to the TCI state(s) A'0 and TCI state(s) B for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the 2-bit indicator, e.g., provided in PDSCH-Config, could be set to value(s) such as '00' or '01' indicating that the first or second indicated TCI state(s)—e.g., among the N=2 TCI states/pairs of TCI states indicated by the effective TCI codepoint—i.e., TCI state(s) A'0 or TCI state(s) B in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the 2-bit indicator, e.g., provided in PDSCH-Config, could be set to value(s) such as '10' or '11' indicating that both of the first and second indicated TCI states—e.g., among the N=2 TCI states/pairs of TCI states indicated by the effective TCI codepoint—i.e., TCI state(s) A'0 and TCI state(s) B in this design example, could be used for PDSCH reception(s).

In yet another example, as specified herein in the present disclosure, N=2 TCI states/pairs of TCI states—e.g., denoted by {TCI state(s) A', TCI state(s) B}—could be indicated by the effective TCI codepoint; furthermore, the UE 116 could be indicated/configured/provided by the network 130, e.g., via higher layer RRC signaling/parameter ControlResourceSet, a 2-bit indicator for the corresponding CORESET. When/if the beam indication DCI_a is received in CORESET(s) with the corresponding/associated 2-bit indicator set to '00' ('01', '10' or '11'), the indicated ninth TCI state(s) could correspond to the first indicated TCI state(s)—e.g., among the N=2 TCI states/pairs of TCI states indicated by the effective TCI codepoint—i.e., TCI state(s) A' in this design example, when/if the beam indication DCI_a is received in CORESET(s) with the corresponding/associated 2-bit indicator set to '01' ('00', '10' or '11'), the indicated ninth TCI state(s) could correspond to the second indicated TCI state(s)—e.g., among the N=2 TCI states/pairs of TCI states indicated by the effective TCI codepoint—i.e., TCI state(s) B in this design example, and when/if the beam indication DCI_a is received in CORESET(s) with the corresponding/associated 2-bit indicator set to '10' or '11' ('00' or '01'), the indicated ninth TCI states could correspond to both of the first and second indicated TCI states—e.g., among the N=2 TCI states/pairs of TCI states indicated by the effective TCI codepoint—i.e., TCI state(s) A' and TCI state(s) B in this design example.

When/if the (SDCI based) inter-cell multi-TRP operation is enabled, and when/if the beam indication DCI_a is received in CORESET(s) with the corresponding/associated 2-bit indicator set to '00' ('01', '10' or '11') indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to the serving cell PCI/PCI index, the indicated ninth TCI state(s) as discussed in the present disclosure could correspond to the TCI state(s) A'. When/if the (SDCI based) inter-cell multi-TRP operation is enabled, and when/if the beam indication DCI_a is received in CORESET(s) with the corresponding/associated 2-bit indicator set to '00' ('01', '10' or '11') indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to PCI(s)/PCI index(es) other than the serving cell PCI/PCI index, the indicated ninth TCI state(s) as discussed in the present disclosure could correspond to the TCI state(s) A' for at least UE-dedicated PDSCH reception(s), and/or the second indicated TCI state(s)—e.g., among the N=2 TCI states/pairs of TCI states indicated by the effective TCI codepoint—i.e., TCI state(s) B in this design example for at least non-UE-dedicated PDSCH reception(s) when/if the TCI state(s) B is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the beam indication DCI_a is received in CORESET(s) with the corresponding/associated 2-bit indicator set to '01' ('00', '10' or '11') indicating the second indicated TCI state(s)—e.g., among the N=2 TCI states/pairs of TCI states indicated by the effective TCI codepoint—i.e., TCI state(s) B in this design example, and when/if the second indicated TCI state(s)—e.g., among the N=2 TCI states/pairs of TCI states indicated by the effective TCI codepoint—i.e., TCI state(s) B in this design example is associated to the serving cell PCI/PCI index, the indicated ninth TCI state(s) as discussed in the present disclosure could correspond to the TCI state(s) B. When/if the (SDCI based) inter-cell multi-TRP operation is enabled, and when/if the beam indication DCI_a is received in CORESET(s) with the corresponding/associated 2-bit indicator set to '01' ('00', '10' or '11') indicating the second indicated TCI state(s)—e.g., among the N=2 TCI states/pairs of TCI states indicated by the effective TCI codepoint—i.e., TCI state(s) B in this design example, and when/if the second indicated TCI state(s)—e.g., among the N=2 TCI states/pairs of TCI states indicated by the effective TCI codepoint—i.e., TCI state(s) B in this design example is associated to PCI(s)/PCI index(es) other than the serving cell PCI/PCI index, the indicated ninth TCI state(s) as discussed in the present disclosure could correspond to the TCI state(s) B for at least UE-dedicated PDSCH reception(s), and/or the first indicated TCI state(s)—e.g., among the N=2 TCI states/pairs of TCI states indicated by the effective TCI codepoint—i.e., TCI state(s) A' in this design example for at least non-UE-dedicated PDSCH reception(s) when/if the TCI state(s) A' is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the beam indication DCI_a is received in CORESET(s) with the corresponding/associated 2-bit indicator set to '10' or '11' ('00' or '01') indicating the first and second indicated TCI states—e.g., among the N=2 TCI states/pairs of TCI states indicated by the effective TCI codepoint—i.e., TCI state(s) A'0 and TCI state(s) B in this design example, and when/if at least one of the TCI state(s) A'0 and TCI state(s) B is associated to the serving cell PCI/PCI index, the indicated ninth TCI state(s) as discussed in the present disclosure could correspond to both of the TCI state(s) A'0 and TCI state(s) B—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the beam indication DCI_a is received in CORESET(s) with the corresponding/associated 2-bit indicator set to '10' or '11' ('00' or '01') indicating the first and second indicated TCI states—e.g., among the N=2 TCI states/pairs of TCI states indicated by the effective TCI codepoint—i.e., TCI state(s) A'0 and TCI state(s) B in this design example, and when/if both of the TCI state(s) A'0 and TCI state(s) B are associated to PCI(s)/PCI index(es) other than the serving cell PCI/PCI index, the indicated ninth TCI state(s) as discussed in the present disclosure could correspond to the TCI state(s) A'0 and TCI state(s) B for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the 2-bit indicator, e.g., configured/associated to the CORESET(s), could be set to value(s) such as '00' or '01' indicating that the first or second indicated TCI state(s)—e.g., among the N=2 TCI states/pairs of TCI states indicated by the effective TCI codepoint—i.e., TCI state(s) A'0 or TCI state(s) B in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the 2-bit indicator, e.g., configured/associated to the CORESET(s), could be set to value(s) such as '10' or '11' indicating that both of the first and second indicated TCI states—e.g., among the N=2 TCI states/pairs of TCI states indicated by the effective TCI codepoint—i.e., TCI state(s) A'0 and TCI state(s) B in this design example, could be used for PDSCH reception(s).

In yet another example, as specified herein in the present disclosure, N=2 TCI states/pairs of TCI states—e.g., denoted by {TCI state(s) A', TCI state(s) B}—could be indicated by the effective TCI codepoint; for this case, when/if the second indicator indicated in the beam indication DCI_a is set to '00' as specified herein in the present disclosure, the indicated ninth TCI state(s) could correspond to the first indicated TCI state(s)—e.g., among the N=2 TCI states/pairs of TCI states indicated by the effective TCI codepoint—i.e., TCI state(s) A' in this design example; when/if the second indicator indicated in the beam indication DCI_a is set to '01' as specified herein in the present disclosure, the indicated ninth TCI state(s) could correspond to the second indicated TCI state(s)—e.g., among the N=2 TCI states/pairs of TCI states indicated by the effective TCI codepoint—i.e., TCI state(s) B in this design example; when/if the second indicator indicated in the beam indication DCI_a is set to '10' or '11' as specified herein in the present disclosure, the indicated ninth TCI states could correspond to both of the first and second indicated TCI states—e.g., among the N=2 TCI states/pairs of TCI states indicated by the effective TCI codepoint—i.e., TCI state(s) A'0 and TCI state(s) B in this design example.

When/if the (SDCI based) inter-cell multi-TRP operation is enabled, and when/if the second indicator indicated in the beam indication DCI_a is set to '00' as specified herein in the present disclosure indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to the serving cell PCI/PCI index, the indicated ninth TCI state(s) as discussed in the present disclosure could correspond to the TCI state(s) A'. When/if the (SDCI based) inter-cell multi-TRP operation is enabled, and when/if the second indicator indicated in the beam indication DCI_a is set to '00' as specified herein in the present disclosure indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to PCI(s)/PCI index(es) other than the serving cell PCI/PCI index, the indicated ninth TCI state(s) as discussed in the present disclosure could correspond to the TCI state(s) A' for at least UE-dedicated PDSCH reception(s) and/or the second indicated TCI state(s)—e.g., among the N=2 TCI states/pairs of TCI states indicated by the effective TCI codepoint—i.e., TCI state(s) B in this design example for at least non-UE-dedicated PDSCH reception(s) when/if the TCI state(s) B is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the second indicator indicated in the beam indication DCI_a is set to '01' as specified herein in the present disclosure indicating the second indicated TCI state(s)—e.g., among the N=2 TCI states/pairs of TCI states indicated by the effective TCI codepoint—i.e., TCI state(s) B in this design example, and when/if the second indicated TCI state(s)—e.g., among the N=2 TCI states/pairs of TCI states indicated by the effective TCI codepoint—i.e., TCI state(s) B in this design example is associated to the serving cell PCI/PCI index, the indicated ninth TCI state(s) as discussed in the present disclosure could correspond to the TCI state(s) B. When/if the (SDCI based) inter-cell multi-TRP operation is enabled, and when/if the second indicator indicated in the beam indication DCI_a is set to '01' as specified herein in the present disclosure indicating the second indicated TCI state(s)—e.g., among the N=2 TCI states/pairs of TCI states indicated by the effective TCI codepoint—i.e., TCI state(s) B in this design example, and when/if the second indicated TCI state(s)—e.g., among the N=2 TCI states/pairs of TCI states indicated by the effective TCI codepoint—i.e., TCI state(s) B in this design example is associated to PCI(s)/PCI index(es) other than the serving cell PCI/PCI index, the indicated ninth TCI state(s) as discussed in the present disclosure could correspond to the TCI state(s) B for at least UE-dedicated PDSCH reception(s) and/or the first indicated TCI state(s)—e.g., among the N=2 TCI states/pairs of TCI states indicated by the effective TCI codepoint—i.e., TCI state(s) A' in this design example for at least non-UE-dedicated PDSCH reception(s) when/if the TCI state(s) A' is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the second indicator indicated in the beam indication DCI_a is set to '10' or '11' as specified herein in the present disclosure indicating the first and second indicated TCI states—e.g., among the N=2 TCI states/pairs of TCI states indicated by the effective TCI codepoint—i.e., TCI state(s) A'0 and TCI state(s) B in this design example, and when/if at least one of the TCI state(s) A'0 and TCI state(s) B is associated to the serving cell PCI/PCI index, the indicated ninth TCI state(s) as discussed in the present disclosure could correspond to both of the TCI state(s) A'0 and TCI state(s) B—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the second indicator indicated in the beam indication DCI_a is set to '10' or '11' as specified herein in the present disclosure indicating the first and second indicated TCI states—e.g., among the N=2 TCI states/pairs of TCI states indicated by the effective TCI codepoint—i.e., TCI state(s) A'0 and TCI state(s) B in this design example, and when/if both of the TCI state(s) A'0 and TCI state(s) B are associated to PCI(s)/PCI index(es) other than the serving cell PCI/PCI index, the indicated ninth TCI state(s) as discussed in the present disclosure could correspond to the TCI state(s) A'0 and TCI state(s) B for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '00' or '01' indicating that the first or second indicated TCI state(s)—e.g., among the N=2 TCI states/pairs of TCI states indicated by the effective TCI codepoint—i.e., TCI state(s) A'0 or TCI state(s) B in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the second indicator indicated in the beam indication DCI_a could be set to value(s) such as '10' or '11' indicating that both of the first and second indicated TCI states—e.g., among the N=2 TCI states/pairs of TCI states indicated by the effective TCI codepoint—i.e., TCI state(s) A'0 and TCI state(s) B in this design example, could be used for PDSCH reception(s).

In yet another example, as specified herein in the present disclosure, N=2 TCI states/pairs of TCI states—e.g., denoted by {TCI state(s) A', TCI state(s) B}—could be indicated by the effective TCI codepoint; for this case, when/if the most recent applicable second indicator or the second indicator received the latest in time that is applicable is set to '00' as specified herein in the present disclosure, the indicated ninth TCI state(s) could correspond to the first indicated TCI state(s)—e.g., among the N=2 TCI states/pairs of TCI states indicated by the effective TCI codepoint—i.e., TCI state(s) A' in this design example; when/if the most recent applicable second indicator or the second indicator received the latest in time that is applicable is set to '01' as specified herein in the present disclosure, the indicated ninth TCI state(s) could correspond to the second indicated TCI state(s)—e.g., among the N=2 TCI states/pairs of TCI states indicated by the effective TCI codepoint—i.e., TCI state(s) B in this design example; when/if the most recent applicable second indicator or the second indicator received the latest in time that is applicable is set to '10' or '11' as specified herein in the present disclosure, the indicated ninth TCI states could correspond to both of the first and second indicated TCI states—e.g., among the N=2 TCI states/pairs of TCI states indicated by the effective TCI codepoint—i.e., TCI state(s) A'0 and TCI state(s) B in this design example.

When/if the (SDCI based) inter-cell multi-TRP operation is enabled, and when/if the most recent applicable second indicator or the second indicator received the latest in time that is applicable is set to '00' as specified herein in the present disclosure indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to the serving cell PCI/PCI index, the indicated ninth TCI state(s) as discussed in the present disclosure could correspond to the TCI state(s) A'. When/if the (SDCI based) inter-cell multi-TRP operation is enabled, and when/if the most recent applicable second indicator or the second indicator received the latest in time that is applicable is set to '00' as specified herein in the present disclosure indicating the first indicated TCI state(s)—e.g., among the N=2 TCI states/pairs of TCI states indicated by the effective TCI codepoint—i.e., TCI state(s) A' in this design example, and when/if the first indicated TCI state(s)—e.g., among the N=2 TCI states/pairs of TCI states indicated by the effective TCI codepoint—i.e., TCI state(s) A' in this design example is associated to PCI(s)/PCI index(es) other than the serving cell PCI/PCI index, the indicated ninth TCI state(s) as discussed in the present disclosure could correspond to the TCI state(s) A' for at least UE-dedicated PDSCH reception(s) and/or the second indicated TCI state(s)—e.g., among the N=2 TCI states/pairs of TCI states indicated by the effective TCI codepoint—i.e., TCI state(s) B in this design example for at least non-UE-dedicated PDSCH reception(s) when/if the TCI state(s) B is associated to the serving cell PCI/PCI index, and/or one or more TCI states/pairs of TCI states that are (i) indicated in one or more previously received beam indication DCIs, (ii) used/applied for receiving the beam indication DCI_a, and/ or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the most recent applicable second indicator or the second indicator received the latest in time that is applicable is set to '01' as specified herein in the present disclosure indicating the second indicated TCI state(s)—e.g., among the N=2 TCI states/pairs of TCI states indicated by the effective TCI codepoint—i.e., TCI state(s) B in this design example, and when/if the second indicated TCI state(s)—e.g., among the N=2 TCI states/pairs of TCI states indicated by the effective TCI codepoint—i.e., TCI state(s) B in this design example is associated to the serving cell PCI/PCI index, the indicated ninth TCI state(s) as discussed in the present disclosure could correspond to the TCI state(s) B. When/if the (SDCI based) inter-cell multi-TRP operation is enabled, and when/if the most recent applicable second indicator or the second indicator received the latest in time that is applicable is set to '01' as specified herein in the present disclosure indicating the second indicated TCI state(s)—e.g., among the N=2 TCI states/pairs of TCI states indicated by the effective TCI codepoint—i.e., TCI state(s) B in this design example, and when/if the second indicated TCI state(s)—e.g., among the N=2 TCI states/pairs of TCI states indicated by the effective TCI codepoint—i.e., TCI state(s) B in this design example is associated to PCI(s)/PCI index(es) other than the serving cell PCI/PCI index, the indicated ninth TCI state(s) as discussed in the present disclosure could correspond to the TCI state(s) B for at least UE-dedicated PDSCH reception(s) and/or the first indicated TCI state(s)—e.g., among the N=2 TCI states/pairs of TCI states indicated by the effective TCI codepoint—i.e., TCI state(s) A' in this design example for at least non-UE-dedicated PDSCH reception(s) when/if the TCI state(s) A' is associated to the serving cell PCI/PCI index, and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

When/if the (SDCI based) inter-cell multi-TRP operation is enabled, and when/if the most recent applicable second indicator or the second indicator received the latest in time that is applicable is set to '10' or '11' as specified herein in the present disclosure indicating the first and second indicated TCI states—e.g., among the N=2 TCI states/pairs of TCI states indicated by the effective TCI codepoint—i.e., TCI state(s) A' and TCI state(s) B in this design example, and when/if at least one of the TCI state(s) A'0 and TCI state(s) B is associated to the serving cell PCI/PCI index, the indicated ninth TCI state(s) as discussed in the present disclosure could correspond to both of the TCI state(s) A'0 and TCI state(s) B—with the TCI state(s) associated to the serving cell PCI/PCI index for at least non-UE-dedicated PDSCH reception(s) and the TCI state(s) associated to PCI(s)/PCI index(es) other than the serving cell PCI/PCI index for at least UE-dedicated PDSCH reception(s). When/if the (SDCI based) inter-cell multi-TRP operation is enabled, and when/if the most recent applicable second indicator or the second indicator received the latest in time that is applicable is set to '10' or '11' as specified herein in the present disclosure indicating the first and second indicated TCI states—e.g., among the N=2 TCI states/pairs of TCI states indicated by the effective TCI codepoint—i.e., TCI state(s) A' and TCI state(s) B in this design example, and when/if both of the TCI state(s) A'0 and TCI state(s) B are associated to PCI(s)/PCI index(es) other than the serving cell PCI/PCI index, the indicated ninth TCI state(s) as discussed in the present disclosure could correspond to the TCI state(s) A'0 and TCI state(s) B for at least UE-dedicated PDSCH reception(s) and/or one or more TCI states/pairs of TCI states that are (i) indicated in one or more previously received beam indication DCIs, (ii) used/applied for receiving the beam indication DCI_a, and/or (iii) indicated/activated by the lowest (TCI) codepoint in the TCI state(s) indication/activation MAC CE that comprises/includes/contains one or two TCI states/pairs of TCI states, which could be further associated to the serving cell PCI/PCI index and used/applied for at least non-UE-dedicated PDSCH reception(s).

For this design example, when/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the most recent applicable second indicator or the second indicator received the latest in time that is applicable could be set to value(s) such as '00' or '01' indicating that the first or second indicated TCI state(s)—e.g., among the N=2 TCI states/pairs of TCI states indicated by the effective TCI codepoint—i.e., TCI state(s) A'0 or TCI state(s) B in this design example, could be used for PDSCH reception(s). When/if the UE 116 reports to the network 130 the capability signaling twoDefaultTCI-States, or the UE 116 is configured with enableTwoDefaultTCI-States as specified herein in the present disclosure, the most recent applicable second indicator or the second indicator received the latest in time that is applicable could be set to value(s) such as '10' or '11' indicating that both of the first and second indicated TCI states—e.g., among the N=2 TCI states/pairs of TCI states indicated by the effective TCI codepoint—i.e., TCI state(s) A'0 and TCI state(s) B in this design example, could be used for PDSCH reception(s). Furthermore, in the present disclosure, the most recent applicable second indicator or the second indicator received the latest in time that is applicable could be provided/indicated in a DCI_b', wherein (1) the time offset between the DCI_b'0 and the PDSCH scheduled by the beam indication DCI_a or DCI_b'—e.g., the time duration/difference between the last symbol/slot of the PDCCH/PDCCH candidate that carries the DCI_b'0 and the first symbol/slot of the PDSCH scheduled by the beam indication DCI_a or DCI_b'—is greater than or equal to t_0 associated to the DCI_b', and/or (2) the DCI_b' is received the most recent in time relative to the beam indication DCI_a.

With reference to FIG. 12, one or more of the TCI state(s) of the effective TCI codepoint could be used/applied to receive the PDSCH with the corresponding scheduling offset greater than t_0 but less than t_1.

As specified herein in the present disclosure, the presence or absence of the second indicator in a beam indication/scheduling DCI could be configured/provided by RRC signaling/parameter. One or more examples described herein could be applied to when the second indicator is RRC configured to be present or absent in the corresponding beam indication/scheduling DCI.f For the design examples and the corresponding TCI state/beam association/application timelines (such as t_0 or t_1 discussed herein in the present disclosure) specified herein in the present disclosure:

When/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States as specified herein in the present disclosure, the UE 116 could use one of the two indicated TCI states/pairs of TCI states (e.g., the first indicated TCI state(s) or the second indicated TCI state(s) among the two indicated TCI states/pairs of TCI states) for the corresponding PDSCH reception/buffering, wherein the two indicated TCI states/pairs of TCI states could be determined according to one or more examples described herein. Here, the UE 116 could determine/select or determine to use/apply the one of the two indicated TCI states/pairs of TCI states (e.g., the first indicated TCI state(s) or the second indicated TCI state(s) among the two indicated TCI states/pairs of TCI states) according to one or more examples described herein specified herein in the present disclosure.

When/if the UE 116 reports to the network 130 the capability signaling twoDefaultTCI-States, or the UE 116 is configured with enableTwoDefaultTCI-States as specified herein in the present disclosure, the UE 116 could use both of the two indicated TCI states/pairs of TCI states (e.g., the first indicated TCI state(s) and the second indicated TCI state(s) among the two indicated TCI states/pairs of TCI states) for the corresponding PDSCH reception/buffering, wherein the two indicated TCI states/pairs of TCI states could be determined according to one or more examples described herein specified herein in the present disclosure. Here, the UE 116 could determine to use/apply both of the two indicated TCI states/pairs of TCI states (e.g., the first indicated TCI state(s) and the second indicated TCI state(s) among the two indicated TCI states/pairs of TCI states) according to one or more examples described herein. For this case, after the second indicator (if configured to be present) indicated in the corresponding beam indication DCI as specified herein in the present disclosure becomes applicable, the UE 116 could apply the first indicated TCI state(s), the second indicated TCI state(s) or both of the first and second indicated TCI states indicated by the second indicator as specified herein in the present disclosure on the PDSCH(s) received/buffered by using both of the two indicated TCI states/pairs of TCI states before the second indicator (if configured to be present) indicated in the corresponding beam indication DCI becomes applicable as described/discussed herein.

When/if the UE 116 reports to the network 130 the capability signaling oneDefaultTCI-State, or the UE 116 is configured with enableOneDefaultTCI-State, or the UE 116 does not report to the network 130 the capability signaling twoDefaultTCI-States, or the UE 116 is not configured with enableTwoDefaultTCI-States, or the UE 116 reports to the network 130 the capability signaling twoDefaultTCI-States, or the UE 116 is configured with enableTwoDefaultTCI-States as specified herein in the present disclosure, the UE 116 could separately use the two indicated TCI states/pairs of TCI states (e.g., the first indicated TCI state(s) and the second indicated TCI state(s) among the two indicated TCI states/pairs of TCI states) in a time-division multiplexing (TDM) manner—e.g., across different symbols/slots/etc.—for the corresponding PDSCH reception/buffering, wherein the two indicated TCI states/pairs of TCI states could be determined according one or more examples described herein. Here, the UE 116 could determine/select or determine to use/apply one or more of the two indicated TCI states/pairs of TCI states (e.g., the first indicated TCI state(s) and the second indicated TCI state(s) among the two indicated TCI states/pairs of TCI states) according to one or more examples described herein.

In one embodiment, as specified herein in the present disclosure, the UE 116 could be indicated/provided/configured by the network 130, in a beam indication DCI without DL assignment (e.g., DCI format 1_1 or 1_2 without PDSCH assignment)—denoted by beam indication DCI_a', one or more (e.g., N=1) first TCI states/pairs of TCI states by one or more TCI codepoints of one or more TCI fields, for PDSCH reception(s) in a SDCI based multi-TRP system. Optionally, the UE 116 could be indicated/provided/configured by the network 130, in a beam indication DCI with DL assignment (e.g., DCI format 1_1 or 1_2 with PDSCH assignment)—denoted by beam indication DCI_a', one or more (e.g., N=1) first TCI states/pairs of TCI states by one or more TCI codepoints of one or more TCI fields, for PDSCH reception(s) in a SDCI based multi-TRP system, wherein the beam indication DCI_a' does not include/indicate/provide the second indicator according to RRC configuration/signaling/parameter (i.e., the second indicator is (RRC configured to be) absent or not present or not configured in the corresponding DCI format) as specified herein in the present disclosure. The one or more first TCI states/pairs of TCI states could be used/applied to update/replace one or more of the previously indicated/applied TCI states/pairs of TCI states. For this case, the UE 116 could use/apply the one or more first TCI states/pairs of TCI states indicated in the DCI_a'0 and/or one or more of the previously indicated/applied TCI states/pairs of TCI states that are not updated/replaced by the first TCI states/pairs of TCI states—denoted by applicable previously indicated/applied TCI state(s)/pair(s) of TCI states—for PDSCH reception(s) in a SDCI based multi-TRP system; in this embodiment, the one or more first TCI states/pairs of TCI states and the applicable previously indicated/applied TCI state(s)/pair(s) of TCI states could be referred to as indicated sixth TCI state(s)/pair(s) of TCI states in the present disclosure. The one or more first TCI states/pairs of TCI states, the one or more applicable previously indicated/applied TCI state(s)/pair(s) of TCI states and/or the indicated sixth TCI state(s)/pair(s) of TCI states could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled.

The UE 116 could be able to determine which one or more of the previously indicated/applied TCI states/pairs of TCI states to be updated/replaced by the one or more first TCI states/pairs of TCI states (and therefore, the UE 116 could determine the applicable previously indicated/applied TCI state(s)/pair(s) of TCI states) t_0 (e.g., in terms of slots, symbols, etc.) after reception of the beam indication DCI_a'

(e.g., t_0 slots/symbols after the last symbol/slot of the PDCCH/PDCCH candidate that carries the beam indication DCI_a'). Furthermore, the UE 116 could be able to use/apply the determined one or more of the indicated sixth TCI states/pairs of TCI states for PDSCH reception(s) t_1 (e.g., in terms of slots, symbols, etc.) after reception of the beam indication DCI_a' (e.g., t_1 slots/symbols after the last symbol/slot of the PDCCH/PDCCH candidate that carries the beam indication DCI_a'). In one example, t_0 could be: (1) configured/provided/indicated by the network 130, e.g., via higher layer RRC signaling/parameter and/or MAC CE command and/or dynamic DCI based L1 signaling, e.g., t_0=timeDurationForQCL, (2) fixed in the system specifications, e.g., t_0=timeDurationForQCL and/or (3) autonomously determined by the UE 116 and reported to the network 130. In another example, t_1 could correspond to the beam application time specified under the unified TCI framework, which is defined as follows: when the UE 116 would transmit the last symbol of a PUCCH with HARQ-ACK information corresponding to the beam indication DCI_a' carrying the one or more first TCI states/pairs of TCI states and without DL assignment, and if the one or more indicated first TCI states is different from the previously indicated one(s), the one or more indicated first TCI states could be applied starting from the first slot that is at least BeamAppTime_r17 symbols after the last symbol of the PUCCH; the first slot and the BeamAppTime_r17 symbols could be both determined on the carrier with the smallest SCS among the carrier(s) applying the beam indication. When/if the time offset—e.g., the time duration/difference between the last symbol/slot of the PDCCH/PDCCH candidate that carries the beam indication DCI_a'0 and the first symbol/slot of an applicable PDSCH—is less than or equal to t_0 or t_1—i.e., the beam application time, the UE 116 could use/apply one or more indicated tenth TCI states to receive the PDSCH, wherein the one or more indicated tenth TCI states could be determined according to one or more examples described herein, or the one or more indicated tenth TCI states could correspond to or could be determined according to the one or more indicated second, third, fourth, fifth, seventh, eighth and/or ninth TCI states as specified herein in the present disclosure. Furthermore, the indicated tenth TCI state(s)/pair(s) of TCI states could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. When/if the time offset—e.g., the time duration/difference between the last symbol/slot of the PDCCH/PDCCH candidate that carries the beam indication DCI_a'0 and the first symbol/slot of an applicable PDSCH—is less than or equal to t_0, the UE 116 could use/apply one or more indicated type-4 TCI states to receive the PDSCH, wherein the one or more indicated type-4 TCI states could be determined according to one or more examples described herein, or the one or more indicated type-4 TCI states could correspond to or could be determined according to the one or more indicated second, third, fourth, fifth, seventh, eighth and/or ninth TCI states as specified herein in the present disclosure. Furthermore, the indicated type-4 TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. When/if the time offset—e.g., the time duration/difference between the last symbol/slot of the PDCCH/PDCCH candidate that carries the beam indication DCI_a'0 and the first symbol/slot of an applicable PDSCH—is greater than or equal to t_0 but less than or equal to t_1, the UE 116 could use/apply one or more indicated type-5 TCI states to receive the PDSCH, wherein the one or more indicated type-5 TCI states could be determined according to one or more examples described herein, or the one or more indicated type-5 TCI states could correspond to or could be determined according to the one or more indicated second, third, fourth, fifth, seventh, eighth and/or ninth TCI states as specified herein in the present disclosure. Furthermore, the indicated type-5 TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. When/if the time offset—e.g., the time duration/difference between the last symbol/slot of the PDCCH/PDCCH candidate that carries the beam indication DCI_a'0 and the first symbol/slot of an applicable PDSCH—is greater than or equal to t_1, the UE 116 could use/apply one or more indicated type-6 TCI states to receive the PDSCH, wherein the one or more indicated type-6 TCI states could be determined according to one or more design examples specified herein in the present disclosure, or the one or more indicated type-6 TCI states could correspond to or could be determined according to the one or more indicated second, third, fourth, fifth, seventh, eighth and/or ninth TCI states as specified herein in the present disclosure. Furthermore, the indicated type-6 TCI state(s) could be associated to different PCIs/PCI indexes including the serving cell PCI/PCI index and/or PCI(s)/PCI index(es) other than the serving cell PCI/PCI index as specified herein in the present disclosure, e.g., when/if the (SDCI based) inter-cell multi-TRP operation is enabled. As specified herein in the present disclosure, the presence or absence of the second indicator in a beam indication/scheduling DCI could be configured/provided by RRC signaling/parameter. The design example as described/specified herein could be applied to when the second indicator is RRC configured to be present or absent in the corresponding beam indication/scheduling DCI. In addition, the PDSCH could be UE-dedicated PDSCH and/or non-UE-dedicated PDSCH as specified herein in the present disclosure. One or more of the indicated tenth TCI state(s), the indicated type-4 TCI state(s), the indicated type-5 TCI state(s), and the indicated type-6 TCI state(s) specified herein in the present disclosure could be the same/common or different from each other.

For all the design examples specified herein in the present disclosure, a UE could report a capability signaling indicating that they are capable of using/applying two or more joint/DL TCI states to simultaneously receive one or more PDSCHs (UE-dedicated PDSCH(s) and/or non-UE-dedicated PDSCH(s)), e.g., when the scheduling/time offset of the PDSCH(s) is less than or equal to t_0 and/or t_1 as specified herein in the present disclosure. The capability signaling oneDefaultTCI-State could be different or reported separately for (1) when the scheduling/time offset of the PDSCH(s) is less than or equal to t_0, (2) when the scheduling/time offset of the PDSCH(s) is less than or equal to t_1, (3) when the scheduling/time offset of the PDSCH(s) is greater than or equal to t_0 but less than or equal to t_1, and (4) when the scheduling/time offset of the PDSCH(s) is greater than t_1. The capability signaling twoDefaultTCI-States could be different or reported separately for (1) when the scheduling/time offset of the PDSCH(s) is less than or equal to t_0, (2) when the scheduling/time offset of the PDSCH(s) is less than or equal to t_1, (3) when the scheduling/time offset of the PDSCH(s) is greater than or equal to t_0 but less than or equal to t_1, and (4) when the scheduling/time offset of the PDSCH(s) is greater than t_1. The configuration enableTwoDefaultTCI-States could be different or configured separately for (1) when the scheduling/time offset of the PDSCH(s) is less than or equal to t_0, (2) when the scheduling/time offset of the PDSCH(s) is less than or equal to t_1, (3) when the scheduling/time offset of the PDSCH(s) is greater than or equal to t_0 but less than or equal to t_1, and (4) when the scheduling/time offset of the PDSCH(s) is greater than t_1. Furthermore, the design examples/solutions specified herein in the present disclosure for determining the default TCI state(s) for PDSCH reception(s)—when the scheduling/time offset between the PDSCH(s) and the scheduling DCI is less than or equal to t_0 and/or t_1 as specified herein in the present disclosure—could be applied to determining default TCI state(s) for aperiodic CSI-RS (AP CSI-RS) reception(s)—e.g., when the time offset between the AP CSI-RS(s) and the triggering DCI is less than or equal to t_0 and/or t_1 as specified herein in the present disclosure.

In one embodiment, according to those specified herein in the present disclosure, when/if a UE is provided/configured by the network 130, e.g., via higher layer RRC signaling(s)/parameter(s) such as dl-OrJoint-TCIStateList-r17 and/or MAC CE command(s) and/or dynamic DCI based L1 signaling(s), one or more lists/set/pools of joint/DL/UL TCI states, and/or when/if the UE 116 receives from the network 130 a Rel-18 (unified) TCI state(s) activation/deactivation MAC CE providing/indicating one or more sets of joint/DL/UL TCI states each mapped to a TCI codepoint of a TCI field in a beam indication DCI, wherein a TCI codepoint could indicate a full set or any subset(s) of {joint TCI state 1, joint TCI state 2} and/or a full set or any subset(s) of {separate DL TCI state 1, separate UL TCI state 1, separate DL TCI state 2, separate UL TCI state 2}, and/or when/if the UE 116 applies first joint/DL/UL TCI state(s) and/or second joint/DL/UL TCI state(s) for PDSCH(s) reception(s), and/or when/if inter-cell MTRP operation is enabled (e.g., via RRC, MAC CE and/or DCI-configuration/activation/indication of the serving cell PCI/PCI index and/or PCI(s)/PCI index(es) other than the serving cell PCI/PCI index and/or configuration/activation/indication of TCI state(s) associated/corresponding to the serving cell PCI/PCI index and/or PCI(s)/PCI index(es) other than the serving cell PCI/PCI index), and/or when/if the offset between the reception of the DL DCI and the corresponding PDSCH is less than the threshold timeDurationForQCL, and/or at least one configured TCI state for the serving cell of scheduled PDSCH contains qcl-Type set to 'typeD':

In one example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enableOneDefaultTCI-State, or the UE 116 reports to the network 130 the capability signaling twoDefaultTCI-States, or the UE 116 is configured with enableTwoDefaultTCI-States as specified herein in the present disclosure, and/or when/if at least one of the first TCI state(s) and the second TCI state(s) is associated/corresponding to the serving cell PCI/PCI index, and/or when/if the UE 116 is not configured with sfnSchemePdsch, and the UE 116 is configured with sfnSchemePdcch set to 'sfnSchemeA', the UE 116 may assume that the DM-RS ports of PDSCH or PDSCH transmission occasions are quasi co-located with the RS(s) with respect to the QCL parameter(s) associated with either the first TCI state(s) or the second TCI state(s), e.g., that is associated/corresponding to the serving cell PCI/PCI index. Here, the PDSCH or PDSCH transmission occasions could be non-UE-dedicated PDSCH or PDSCH transmission occasions. Furthermore, when/if the PDSCH DM-RS with the qcl-Type set to 'typeD' is different from that of the PDCCH DM-RS with which they overlap in at least one symbol, the UE 116 could be expected to prioritize the reception of PDCCH associated with that CORESET—this could also apply to the intra-band carrier aggregation (CA) case (e.g., when PDSCH and the CORESET are in different component carriers).

In another example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enableOneDefaultTCI-State, or the UE 116 reports to the network 130 the capability signaling twoDefaultTCI-States, or the UE 116 is configured with enableTwoDefaultTCI-States as specified herein in the present disclosure, and/or when/if none of the first TCI state(s) and the second TCI state(s) is associated/corresponding to the serving cell PCI/PCI index, and/or when/if the UE 116 is not configured with sfnSchemePdsch, and the UE 116 is configured with sfnSchemePdcch set to 'sfnSchemeA', the UE 116 may assume that the DM-RS ports of PDSCH or PDSCH transmission occasions are quasi co-located with the RS(s) with respect to the QCL parameter(s) associated with one or more TCI states associated/corresponding to the serving cell PCI/PCI index, wherein the one or more TCI states could be used/applied/indicated the latest in time prior to the use/application/indication of the first TCI state(s) and/or the second TCI state(s). Here, the PDSCH or PDSCH transmission occasions could be non-UE-dedicated PDSCH or PDSCH transmission occasions. Furthermore, when/if the PDSCH DM-RS with the qcl-Type set to 'typeD' is different from that of the PDCCH DM-RS with which they overlap in at least one symbol, the UE 116 could be expected to prioritize the reception of PDCCH associated with that CORESET—this could also apply to the intra-band CA case (e.g., when PDSCH and the CORESET are in different component carriers).

In yet another example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enableOneDefaultTCI-State, or the UE 116 reports to the network 130 the capability signaling twoDefaultTCI-States, or the UE 116 is configured with enableTwoDefaultTCI-States as specified herein in the present disclosure, and/or when/if none of the first TCI state(s) and the second TCI state(s) is associated/corresponding to the serving cell PCI/PCI index, and/or when/if the UE 116 is not configured with sfnSchemePdsch, and the UE 116 is configured with sfnSchemePdcch set to 'sfnSchemeA', the UE 116 may assume that the DM-RS ports of PDSCH or PDSCH transmission occasions are quasi co-located with the RS(s) with respect to the QCL parameter(s) associated with one or more TCI states (e.g., associated/corresponding to the serving cell PCI/PCI index), wherein the one or more TCI states could be used/applied/indicated for PDCCH quasi co-location indication of the CORESET associated with a monitored search space with the lowest controlResourceSetId in the latest slot in which one or more CORESETs within the active BWP of the serving cell are monitored by the UE 116. Here, the PDSCH or PDSCH transmission occasions could be non-UE-dedicated PDSCH or PDSCH transmission occasions. Furthermore, when/if the PDSCH DM-RS with the qcl-Type set to 'typeD' is different from that of the PDCCH DM-RS with which they overlap in at least one symbol, the UE 116 could be expected to prioritize the reception of PDCCH associated with that CORESET—this could also apply to the intra-band CA case (e.g., when PDSCH and the CORESET are in different component carriers).

In yet another example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enable-OneDefaultTCI-State, or the UE 116 reports to the network 130 the capability signaling twoDefaultTCI-States, or the UE 116 is configured with enableTwo-DefaultTCI-States as specified herein in the present disclosure, and/or when/if none of the first TCI state(s) and the second TCI state(s) is associated/corresponding to the serving cell PCI/PCI index, and/or when/if the UE 116 is not configured with sfnSchemePdsch, and the UE 116 is configured with sfnSchemePdcch set to 'sfnSchemeA', the UE 116 may assume that the DM-RS ports of PDSCH or PDSCH transmission occasions are quasi co-located with the RS(s) with respect to the QCL parameter(s) associated with one or more TCI states (e.g., associated/corresponding to the serving cell PCI/PCI index), wherein the one or more TCI states could correspond to the lowest TCI codepoint among the TCI codepoints containing at least one or two different joint/DL TCI states with at least one joint/DL TCI state associated/corresponding to the serving cell PCI/PCI index. Here, the PDSCH or PDSCH transmission occasions could be non-UE-dedicated PDSCH or PDSCH transmission occasions. Furthermore, when/if the PDSCH DM-RS with the qcl-Type set to 'typeD' is different from that of the PDCCH DM-RS with which they overlap in at least one symbol, the UE 116 could be expected to prioritize the reception of PDCCH associated with that CORESET—this could also apply to the intra-band CA case (e.g., when PDSCH and the CORESET are in different component carriers).

In yet another example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enable-OneDefaultTCI-State, or the UE 116 reports to the network 130 the capability signaling twoDefaultTCI-States, or the UE 116 is configured with enableTwo-DefaultTCI-States as specified herein in the present disclosure, and/or when/if at least one of the first TCI state(s) and the second TCI state(s) is associated/corresponding to the serving cell PCI/PCI index, the UE 116 may assume that the DM-RS ports of PDSCH or PDSCH transmission occasions are quasi co-located with the RS(s) with respect to the QCL parameter(s) associated with both of the first TCI state(s) and the second TCI state(s) or associated at least with the first TCI state(s) or the second TCI state(s), e.g., that is associated/corresponding to the serving cell PCI/PCI index. Here, the PDSCH or PDSCH transmission occasions could be non-UE-dedicated PDSCH or PDSCH transmission occasions. Furthermore, when/if the PDSCH DM-RS(s) with the qcl-Type set to 'typeD'—associated with both of the first TCI state(s) and the second TCI state(s) or associated at least with the first TCI state(s) or the second TCI state(s), e.g., that is associated/corresponding to the serving cell PCI/PCI index—is different from that of the PDCCH DM-RS with which they overlap in at least one symbol, the UE 116 could be expected to prioritize the reception of PDCCH associated with that CORESET—this could also apply to the intra-band CA case (e.g., when PDSCH and the CORESET are in different component carriers).

In yet another example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enable-OneDefaultTCI-State, or the UE 116 reports to the network 130 the capability signaling twoDefaultTCI-States, or the UE 116 is configured with enableTwo-DefaultTCI-States as specified herein in the present disclosure, and/or when/if none of the first TCI state(s) and the second TCI state(s) is associated/corresponding to the serving cell PCI/PCI index, the UE 116 may assume that the DM-RS ports of PDSCH or PDSCH transmission occasions are quasi co-located with the RS(s) with respect to the QCL parameter(s) associated at least with one or more TCI states associated/corresponding to the serving cell PCI/PCI index, or associated with one or more TCI states associated/corresponding to the serving cell PCI/PCI index and at least one of the first TCI state(s) and the second TCI state(s), wherein the one or more TCI states could be used/applied/indicated the latest in time prior to the use/application/indication of the first TCI state(s) and/or the second TCI state(s). Here, the PDSCH or PDSCH transmission occasions could be non-UE-dedicated PDSCH or PDSCH transmission occasions. Furthermore, when/if the PDSCH DM-RS(s) with the qcl-Type set to 'typeD'—associated at least with the one or more TCI states associated/corresponding to the serving cell PCI/PCI index, or associated with the one or more TCI states associated/corresponding to the serving cell PCI/PCI index and at least one of the first TCI state(s) and the second TCI state(s)—is different from that of the PDCCH DM-RS with which they overlap in at least one symbol, the UE 116 could be expected to prioritize the reception of PDCCH associated with that CORESET—this could also apply to the intra-band CA case (e.g., when PDSCH and the CORESET are in different component carriers).

In yet another example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI- States, or the UE 116 is configured with enableOneDefaultTCI-State, or the UE 116 reports to the network 130 the capability signaling twoDefaultTCI-States, or the UE 116 is configured with enableTwoDefaultTCI-States as specified herein in the present disclosure, and/or when/if none of the first TCI state(s) and the second TCI state(s) is associated/corresponding to the serving cell PCI/PCI index, the UE 116 may assume that the DM-RS ports of PDSCH or PDSCH transmission occasions are quasi co-located with the RS(s) with respect to the QCL parameter(s) associated at least with one or more TCI states (e.g., associated/corresponding to the serving cell PCI/PCI index), or associated with one or more TCI states (e.g., associated/corresponding to the serving cell PCI/PCI index) and at least one of the first TCI state(s) and the second TCI state(s), wherein the one or more TCI states could be used/applied/indicated for PDCCH quasi co-location indication of the CORESET associated with a monitored search space with the lowest controlResourceSetId in the latest slot in which one or more CORESETs within the active BWP of the serving cell are monitored by the UE 116. Here, the PDSCH or PDSCH transmission occasions could be non-UE-dedicated PDSCH or PDSCH transmission occasions. Furthermore, when/if the PDSCH DM-RS(s) with the qcl-Type set to 'typeD'—associated at least with the one or more TCI states associated/corresponding to the serving cell PCI/PCI index, or associated with the one or more TCI states associated/corresponding to the serving cell PCI/PCI index and at least one of the first TCI state(s) and the second TCI state(s)—is different from that of the PDCCH DM-RS with which they overlap in at least one symbol, the UE 116 could be expected to prioritize the reception of PDCCH associated with that CORESET—this could also apply to the intra-band CA case (e.g., when PDSCH and the CORESET are in different component carriers).

In yet another example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enableOneDefaultTCI-State, or the UE 116 reports to the network 130 the capability signaling twoDefaultTCI-States, or the UE 116 is configured with enableTwoDefaultTCI-States as specified herein in the present disclosure, and/or when/if none of the first TCI state(s) and the second TCI state(s) is associated/corresponding to the serving cell PCI/PCI index, the UE 116 may assume that the DM-RS ports of PDSCH or PDSCH transmission occasions are quasi co-located with the RS(s) with respect to the QCL parameter(s) associated at least with one or more TCI states (e.g., associated/corresponding to the serving cell PCI/PCI index), or associated with one or more TCI states (e.g., associated/corresponding to the serving cell PCI/PCI index) and at least one of the first TCI state(s) and the second TCI state(s), wherein the one or more TCI states could correspond to the lowest TCI codepoint among the TCI codepoints containing at least one or two different joint/DL TCI states with at least one joint/DL TCI state associated/corresponding to the serving cell PCI/PCI index. Here, the PDSCH or PDSCH transmission occasions could be non-UE-dedicated PDSCH or PDSCH transmission occasions. Furthermore, when/if the PDSCH DM-RS(s) with the qcl-Type set to 'typeD'—associated at least with the one or more TCI states associated/corresponding to the serving cell PCI/PCI index, or associated with the one or more TCI states associated/corresponding to the serving cell PCI/PCI index and at least one of the first TCI state(s) and the second TCI state(s)—is different from that of the PDCCH DM-RS with which they overlap in at least one symbol, the UE 116 could be expected to prioritize the reception of PDCCH associated with that CORESET—this could also apply to the intra-band CA case (e.g., when PDSCH and the CORESET are in different component carriers).

In yet another example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enableOneDefaultTCI-State, or the UE 116 reports to the network 130 the capability signaling twoDefaultTCI-States, or the UE 116 is configured with enableTwoDefaultTCI-States as specified herein in the present disclosure, and/or when/if the UE 116 is configured by higher layer parameter repetitionScheme set to 'tdmSchemeA'0 or is configured with higher layer parameter repetitionNumber, and the offset between the reception of the DL DCI and the first PDSCH transmission occasion is less than the threshold timeDurationForQCL, the mapping of TCI states to PDSCH transmission occasions could be according to one or more of the following.

For example, when/if at least one of the first TCI state(s) and the second TCI state(s) is associated/corresponding to the serving cell PCI/PCI index, the first TCI state(s) could be applied to the first PDSCH transmission occasion and the second TCI state(s) could be applied to the second PDSCH transmission occasion.

For another example, when/if at least one of the first TCI state(s) and the second TCI state(s) is associated/corresponding to the serving cell PCI/PCI index, the first or second TCI state(s) that is associated/corresponding to the serving cell PCI/PCI index could be applied to the first PDSCH transmission occasion and the other TCI state(s)—e.g., the first or second TCI state(s) depending on which one is used for receiving the first PDSCH transmission occasion—could be applied to the second PDSCH transmission occasion.

Yet for another example, when/if at least one of the first TCI state(s) and the second TCI state(s) is associated/corresponding to the serving cell PCI/PCI index, the first or second TCI state(s) that is associated/corresponding to the serving cell PCI/PCI index could be applied to the second PDSCH transmission occasion and the other TCI state(s)—e.g., the first or second TCI state(s) depending on which one is used for receiving the second PDSCH transmission occasion—could be applied to the first PDSCH transmission occasion.

Yet for another example, when/if none of the first TCI state(s) and the second TCI state(s) is associated/corresponding to the serving cell PCI/PCI index, one or more TCI states associated/corresponding to the serving cell PCI/PCI index could be applied to at least the first PDSCH transmission occasion and/or the second TCI state(s) could be applied to the second PDSCH transmission occasion, wherein the one or more TCI states could be used/applied/indicated the latest in time prior to the use/application/indication of the first TCI state(s) and/or the second TCI state(s).

Yet for another example, when/if none of the first TCI state(s) and the second TCI state(s) is associated/corresponding to the serving cell PCI/PCI index, one or more TCI states associated/corresponding to the serving cell PCI/PCI index could be applied to at least the second PDSCH transmission occasion and/or the first TCI state(s) could be applied to the first PDSCH transmission occasion, wherein the one or more TCI states could be used/applied/indicated the latest in time prior to the use/application/indication of the first TCI state(s) and/or the second TCI state(s).

Yet for another example, when/if none of the first TCI state(s) and the second TCI state(s) is associated/corresponding to the serving cell PCI/PCI index, one or more TCI states (e.g., associated/corresponding to the serving cell PCI/PCI index) could be applied to at least the first PDSCH transmission occasion and/or the second TCI state(s) could be applied to the second PDSCH transmission occasion, wherein the one or more TCI states could be used/applied/indicated for PDCCH quasi co-location indication of the CORESET associated with a monitored search space with the lowest controlResourceSetId in the latest slot in which one or more CORESETs within the active BWP of the serving cell are monitored by the UE 116.

Yet for another example, when/if none of the first TCI state(s) and the second TCI state(s) is associated/corresponding to the serving cell PCI/PCI index, one or more TCI states (e.g., associated/corresponding to the serving cell PCI/PCI index) could be applied to at least the second PDSCH transmission occasion and/or the first TCI state(s) could be applied to the first PDSCH transmission occasion, wherein the one or more TCI states could be used/applied/indicated for PDCCH quasi co-location indication of the CORESET associated with a monitored search space with the lowest controlResourceSetId in the latest slot in which one or more CORESETs within the active BWP of the serving cell are monitored by the UE 116.

Yet for another example, when/if none of the first TCI state(s) and the second TCI state(s) is associated/corresponding to the serving cell PCI/PCI index, one or more TCI states (e.g., associated/corresponding to the serving cell PCI/PCI index) could be applied to at least the first PDSCH transmission occasion and/or the second TCI state(s) could be applied to the second PDSCH transmission occasion, wherein the one or more TCI states could correspond to the lowest TCI codepoint among the TCI codepoints containing at least one or two different joint/DL TCI states with at least one joint/DL TCI state associated/corresponding to the serving cell PCI/PCI index based on the activated TCI states in the slot with the first PDSCH transmission occasion.

Yet for another example, when/if none of the first TCI state(s) and the second TCI state(s) is associated/corresponding to the serving cell PCI/PCI index, one or more TCI states (e.g., associated/corresponding to the serving cell PCI/PCI index) could be applied to at least the second PDSCH transmission occasion and/or the first TCI state(s) could be applied to the first PDSCH transmission occasion, wherein the one or more TCI states could correspond to the lowest TCI codepoint among the TCI codepoints containing at least one or two different joint/DL TCI states with at least one joint/DL TCI state associated/corresponding to the serving cell PCI/PCI index based on the activated TCI states in the slot with the first PDSCH transmission occasion.

Yet for another example, when/if none of the first TCI state(s) and the second TCI state(s) is associated/corresponding to the serving cell PCI/PCI index, one or more 1st TCI states could be applied to the first (or second) PDSCH transmission occasion, and one or more 2nd TCI states could be applied to the second (or first) PDSCH transmission occasion, wherein the one or more 1st TCI states could correspond to the 1st TCI state(s) or the TCI state(s) associated/corresponding to the serving cell PCI/PCI index among the one or more TCI states corresponding to the lowest TCI codepoint among the TCI codepoints containing two different joint/DL TCI states with at least one joint/DL TCI state associated/corresponding to the serving cell PCI/PCI index, and the one or more 2nd TCI states could correspond to the 2nd TCI state(s) or the TCI state(s) associated/corresponding to a PCI/PCI index other than the serving cell PCI/PCI index among the one or more TCI states corresponding to the lowest TCI codepoint among the TCI codepoints containing two different joint/DL TCI states with at least one joint/DL TCI state associated/corresponding to the serving cell PCI/PCI index based on the activated TCI states in the slot with the first PDSCH transmission occasion.

When/if the UE 116 is configured by higher layer parameter repetitionScheme set to 'tdmSchemeA', the UE 116 could receive the first and the second PDSCH transmission occasions of the same transport block (TB), wherein the first PDSCH transmission occasion could have non-overlapping time domain resource allocation with respect to the second PDSCH transmission occasion and both of the first and second PDSCH transmission occasions could be received within a given slot. When/if the UE 116 is configured with higher layer parameter repetitionNumber and when/if the value indicated by repetitionNumber in PDSCH-TimeDomainResourceAllocation equals to one or two, the mapping of the TCI states and the PDSCH transmission occasions could be according to those described specified herein in the present disclosure; when/if the value indicated by repetitionNumber in PDSCH-TimeDomainResourceAllocation is larger than two, the UE 116 could be further configured to enable cyclicMapping or sequentialMapping in tciMapping.

When/if cyclicMapping is enabled, the described/specified mapping pattern between the TCI state(s) and the first/second PDSCH transmission occasions could continue to the remaining PDSCH transmission occasions.

When/if sequentialMapping is enabled, the TCI state(s) applied to the first PDSCH transmission occasion as specified in the described design examples herein could be applied to the first and the second PDSCH transmission occasions, the TCI state(s) applied to the second PDSCH transmission occasion as specified in the described design examples herein could be applied to the third and fourth PDSCH transmission occasions.

The same TCI mapping pattern could continue to the remaining PDSCH transmission occasions.

Here, the PDSCH in general and/or the first PDSCH transmission occasion and/or the second PDSCH transmission occasion and/or the third PDSCH transmission occasion and/or the fourth PDSCH transmission occasion and so on could be non-UE-dedicated PDSCH/PDSCH transmission occasion(s). Furthermore, when/if the PDSCH DM-RS(s) of the first transmission occasion, the second transmission occasion, the third transmission occasion, the fourth transmission occasion and/or so on with the qcl-Type set to 'typeD' is different from that of the PDCCH DM-RS with which they overlap in at least one symbol, the UE 116 could be expected to prioritize the reception of PDCCH associated with that CORESET—this could also apply to the intra-band CA case (e.g., when PDSCH and the CORESET are in different component carriers).

In one embodiment, according to those specified herein in the present disclosure, when/if a UE is provided/configured by the network 130, e.g., via higher layer RRC signaling(s)/parameter(s) such as dl-OrJoint-TCIStateList-r17 and/or MAC CE command(s) and/or dynamic DCI based L1 signaling(s), one or more lists/set/pools of joint/DL/UL TCI states, and/or when/if the UE 116 receives from the network 130 a (unified) TCI state(s) activation/deactivation MAC CE providing/indicating one or more sets of joint/DL/UL TCI states each mapped to a TCI codepoint of a TCI field in a beam indication DCI, wherein a TCI codepoint could indicate a joint/DL/UL TCI state or a pair of separate DL and TCI states, wherein the (unified) TCI state(s) activation/deactivation MAC CE could be associated to a value of coresetPoolIndex (e.g., by indicating/providing the value of coresetPoolIndex in the MAC CE by a new field or by repurposing an existing field), and/or when/if the UE 116 is configured with enableDefaultTCI-StatePerCoresetPoolIndex and the UE 116 is configured by higher layer parameter PDCCH-Config that contains two different values of coresetPoolIndex in different ControlResourceSets, and/or when/if inter-cell MTRP operation is enabled (e.g., via RRC, MAC CE and/or DCI-configuration/activation/indication of the serving cell PCI/PCI index and/or PCI(s)/PCI index(es) other than the serving cell PCI/PCI index and/or configuration/activation/indication of TCI state(s) associated/corresponding to the serving cell PCI/PCI index and/or PCI(s)/PCI index(es) other than the serving cell PCI/PCI index), and/or when/if the offset between the reception of the DL DCI and the corresponding PDSCH is less than the threshold timeDurationForQCL, and/or at least one configured TCI state for the serving cell of scheduled PDSCH contains qcl-Type set to 'typeD':

In one example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enableOneDefaultTCI-State, or the UE 116 reports to the network 130 the capability signaling twoDefaultTCI-States, or the UE 116 is configured with enableTwoDefaultTCI-States as specified herein in the present disclosure, the UE 116 may assume that the DM-RS ports of PDSCH—e.g., associated with at least a value of coresetPoolIndex of a serving cell (i.e., the value of coresetPoolIndex, e.g., 0, that is associated/corresponding to the serving cell PCI/PCI index)—are quasi co-located with the RS(s) provided/indicated in TCI state(s) specific to the value of coresetPoolIndex associated/corresponding to the serving cell PCI/PCI index, wherein an indicated TCI state is specific to a coresetPoolIndex value when it is indicated by the DCI field 'Transmission Configuration Indication' in DCI format 1_1/1_2 associated with the coresetPoolIndex value. Here, the PDSCH(s) could be non-UE-dedicated PDSCH(s).

In another example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enableOneDefaultTCI-State, or the UE 116 reports to the network 130 the capability signaling twoDefaultTCI-States, or the UE 116 is configured with enableTwoDefaultTCI-States as specified herein in the present disclosure, the UE 116 may assume that the DM-RS ports of PDSCH—e.g., associated with at least a value of coresetPoolIndex of a serving cell (i.e., the value of coresetPoolIndex, e.g., 0, that is associated/corresponding to the serving cell PCI/PCI index)—are quasi co-located with the RS(s) with respect to the QCL parameter(s) used for PDCCH quasi co-location indication of the CORESET configured with the value of coresetPoolIndex associated/corresponding to the serving cell PCI/PCI index. Here, the PDSCH(s) could be non-UE-dedicated PDSCH(s).

In yet another example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enableOneDefaultTCI-State, or the UE 116 reports to the network 130 the capability signaling twoDefaultTCI-States, or the UE 116 is configured with enableTwoDefaultTCI-States as specified herein in the present disclosure, the UE 116 may assume that the DM-RS ports of PDSCH—e.g., associated with at least a value of coresetPoolIndex of a serving cell (i.e., the value of coresetPoolIndex, e.g., 0, that is associated/corresponding to the serving cell PCI/PCI index)—are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE 116. Here, the PDSCH(s) could be non-UE-dedicated PDSCH(s).

In yet another example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enableOneDefaultTCI-State, or the UE 116 reports to the network 130 the capability signaling twoDefaultTCI-States, or the UE 116 is configured with enableTwoDefaultTCI-States as specified herein in the present disclosure, the UE 116 may assume that the DM-RS ports of PDSCH—e.g., associated with at least a value of coresetPoolIndex of a serving cell (i.e., the value of coresetPoolIndex, e.g., 0, that is associated/corresponding to the serving cell PCI/PCI index)—are quasi co-located with the RS(s) provided/indicated in TCI state(s) specific to the value of coresetPoolIndex associated/corresponding to the serving cell PCI/PCI index, and the UE 116 may assume the DM-RS ports of PDSCH—e.g., associated with at least a value of coresetPoolIndex of a non-serving cell (i.e., the value of coresetPoolIndex, e.g., 1, that is associated/corresponding to a PCI/PCI index other than the serving cell PCI/PCI index)—are quasi co-located with the RS(s) provided/indicated in TCI state(s) specific to the value of coresetPoolIndex associated/corresponding to the PCI/PCI index other than the serving cell PCI/PCI index, wherein an indicated TCI state is specific to a coresetPoolIndex value when it is indicated by the DCI field 'Transmission Configuration Indication' in DCI format 1_1/1_2 associated with the coresetPoolIndex value. Here, the PDSCH(s) could be UE-dedicated and/or non-UE-dedicated PDSCH(s).

In yet another example, when/if the UE 116 reports to the network 130 the capability signaling oneDefaultTCI-State, or the UE 116 does not report to the network 130 the capability signaling twoDefaultTCI-States, or the UE 116 is not configured with enableTwoDefaultTCI-States, or the UE 116 is configured with enableOneDefaultTCI-State, or the UE 116 reports to the network 130 the capability signaling twoDefaultTCI-States, or the UE 116 is configured with enableTwoDefaultTCI-States as specified herein in the present disclosure, the UE 116 may assume that the DM-RS ports of PDSCH—e.g., associated with at least a value of coresetPoolIndex of a serving cell (i.e., the value of coresetPoolIndex, e.g., 0, that is associated/corresponding to the serving cell PCI/PCI index)—are quasi co-located with the RS(s) with respect to the QCL parameter(s) used for PDCCH quasi co-location indication of the CORESET configured with the value of coresetPoolIndex associated/corresponding to the serving cell PCI/PCI index, and the UE 116 may assume that the DM-RS ports of PDSCH—e.g., associated with at least a value of coresetPoolIndex of a non-serving cell (i.e., the value of coresetPoolIndex, e.g., 1, that is associated/corresponding to the PCI/PCI index other than the serving cell PCI/PCI index)—are quasi co-located with the RS(s) with respect to the QCL parameter(s) used for PDCCH quasi co-location indication of the CORESET configured with the value of coresetPoolIndex associated/corresponding to the PCI/PCI index other than the serving cell PCI/PCI index. Here, the PDSCH(s) could be UE-dedicated and/or non-UE-dedicated PDSCH(s).

For the described design examples herein, when/if the PDSCH DM-RS with the qcl-Type set to 'typeD' is different from that of the PDCCH DM-RS with which they overlap in at least one symbol and they are associated with the same value of coresetPoolIndex, the UE 116 could be expected to prioritize the reception of PDCCH associated with that CORESET—this could also apply to the intra-band CA case (e.g., when PDSCH and the CORESET are in different component carriers).

As specified herein in the present disclosure, a UE could receive from the network 130 a first (unified) TCI state(s) activation MAC CE command used to map up to 8 TCI states and/or pairs of TCI states, with each pair comprising of one TCI state for DL channels/signals and/or one TCI state for UL channels/signals, to the codepoints of the DCI field 'Transmission Configuration Indication' for one or for a set of CCs/DL BWPs, and/or a second (unified) TCI state(s) activation MAC CE command used to map up to 8 sets of TCI states, wherein each set could be comprised of up to two (e.g., none, one or two) TCI states for DL and UL signals/channels, and/or up to two (e.g., none, one or two) TCI state(s) for DL channels/signals and/or up to two (e.g., none, one or two) TCI state(s) for UL channels/signals to the codepoints of the DCI field "Transmission Configuration Indication" for one or for a set of CCs/DL BWPs, and if applicable, for one or for a set of CCs/UL BWPs. When a set of TCI state IDs are activated for a set of CCs/DL BWPs and if applicable, for a set of CCs/UL BWPs, where the applicable list of CCs is determined by the indicated CC in the activation command, the same set of TCI state IDs are applied for all DL and/or UL BWPs in the indicated CCs. If the first/second MAC CE activation command maps TCI-State(s) and/or TCI-UL-State(s) to only one TCI codepoint, the UE 116 shall apply the indicated TCI-State(s) and/or TCI-UL-State(s) to one or to a set of CCs/DL BWPs, and if applicable, to one or to a set of CCs/UL BWPs once the indicated mapping for the one single TCI codepoint is applied. That is, e.g., when/if the UE 116 is provided/configured with dl-OrJointTCI-StateList and/or ul-TCI-StateList and/or is having one or two indicated TCI states and/or is having first and/or second indicated TCI states, an activated TCI codepoint in the second MAC CE activation command could be composed/comprised of one of:

- Case 1: a first TCI state for DL channel(s)/signal(s)
- Case 2: a first TCI state for DL channel(s)/signal(s) and a second TCI state for DL channel(s)/signal(s)
- Case 3: a first TCI state for DL channel(s)/signal(s) and a second TCI state for UL channel(s)/signal(s)
- Case 4: a first TCI state for DL channel(s)/signal(s) and a pair of a second TCI state for DL channel(s)/signal(s) and a second TCI state for UL channel(s)/signal(s)
- Case 5: a first TCI state for UL channel(s)/signal(s)
- Case 6: a first TCI state for UL channel(s)/signal(s) and a second TCI state for DL channel(s)/signal(s)
- Case 7: a first TCI state for UL channel(s)/signal(s) and a second TCI state for UL channel(s)/signal(s)
- Case 8: a first TCI state for UL channel(s)/signal(s) and a pair of a second TCI state for DL channel(s)/signal(s) and a second TCI state for UL channel(s)/signal(s)
- Case 9: a pair of a first TCI state for DL channel(s)/signal(s) and a first TCI state for UL channel(s)/signal(s)
- Case 10: a pair of a first TCI state for DL channel(s)/signal(s) and a first TCI state for UL channel(s)/signal(s) and a second TCI state for DL channel(s)/signal(s)
- Case 11: a pair of a first TCI state for DL channel(s)/signal(s) and a first TCI state for UL channel(s)/signal(s) and a second TCI state for UL channel(s)/signal(s)
- Case 12: a pair of a first TCI state for DL channel(s)/signal(s) and a first TCI state for UL channel(s)/signal(s) and a pair of a second TCI state for DL channel(s)/signal(s) and a second TCI state for UL channel(s)/signal(s)
- Case 13: a second TCI state for DL channel(s)/signal(s)
- Case 14: a second TCI state for UL channel(s)/signal(s)
- Case 15: a pair of a second TCI state for DL channel(s)/signal(s) and a second TCI state for UL channel(s)/signal(s)
- Case 16: a first TCI state for DL channel(s)/signal(s) and UL channel(s)/signal(s)

Case 17: a second TCI state for DL channel(s)/signal(s) and UL channel(s)/signal(s)

Case 18: a pair of a first TCI state for DL channel(s)/signal(s) and UL channel(s)/signal(s) and a second TCI state for DL channel(s)/signal(s) and UL channel(s)/signal(s)

Furthermore, when/if the UE 116 is configured by higher layer parameter PDCCH-Config that contains two different values of coresetPoolIndex (e.g., 0 and 1) in ControlResourceSet, the first/second (unified) TCI state(s) activation command as specified herein in the present disclosure could also incorporate/provide/indicate/include/contain a value of coresetPoolIndex (e.g., 0 or 1)—denoted by a third (unified) TCI state(s) activation command. For this case, the TCI state(s)/TCI codepoint(s) activated by/in a third (unified) TCI state(s) activation command could be specific to the same coresetPoolIndex value (i.e., 0 or 1) provided/indicated therein.

When a UE is configured with dl-OrJointTCI-StateList, is configured by higher layer parameter PDCCH-Config that contains two different values of coresetPoolIndex in ControlResourceSet, and is configured with SSB-MTC-AdditionalPCI, independent of the configuration of tci-PresentInDCI and tci-PresentDCI-1-2 in RRC connected mode, if the UE 116 does not report its capability of supporting default beam per coresetPoolIndex for M-DCI based MTRP in frequency range 2 (e.g., if the UE 116 does not report its capability of supporting using two default beams each per coresetPoolIndex for M-DCI based MTRP for simultaneous reception) and/or at least one configured TCI state for the serving cell of scheduled/activated PDSCH contains qcl-Type set to 'typeD'0 and/or regardless of configuration of followUnifiedTCIstate and/or regardless of whether applyIndicatedTCIState (or the first indicator as specified herein in the present disclosure) provided to/for the corresponding CORESET(s) is set to 'first', 'second', 'both'0 or 'none', when the offset between the reception of the scheduling/activation DCI format 1_0/1_1/1_2 in a CORESET associated with coresetPoolIndex value 0 and the scheduled or activated PDSCH reception is less than timeDurationForQCL in frequency range 2:

In one example, when/if coresetPoolIndex value 0 is associated/corresponding to the serving cell PCI and/or active TCI state(s) of/for the CORESET associated/configured with coresetPoolIndex value 0 is associated/corresponding to the serving cell PCI (or the UE 116 could expect or assume that coresetPoolIndex value 0 is associated/corresponding to the serving cell PCI and/or active TCI state(s) of/for the CORESET associated/configured with coresetPoolIndex value 0 is associated/corresponding to the serving cell PCI), the indicated joint/DL TCI state could be associated with the PCI of the serving cell and the UE 116 could apply the indicated joint/DL TCI state specific to coresetPoolIndex value 0 (and therefore, the serving cell PCI) to the scheduled or activated PDSCH reception, wherein the CORESET in which the scheduling/activation DCI format 1_0/1_1/1_2 is received could be a CORESET with index 0 and/or a CORESET (other than a CORESET with index 0) associated only with UE-specific search space (USS) sets and/or Type-3 PDCCH CSS sets and/or a CORESET (other than a CORESET with index 0) associated at least with CSS sets other than Type3-PDCCH CSS sets—the higher layer parameter applyIndicatedTCIState (or the first indicator as specified herein in the present disclosure) provided to/for the CORESET could be set to 'first', 'second', 'both'0 or 'none'.

In another example, when/if at least CORESET(s) with index 0 and CORESET(s)—other than CORESET(s) with index 0—associated at least with CSS sets other than Type3-PDCCH CSS sets are associated/configured with coresetPoolIndex value 0 and/or the higher layer parameter applyIndicatedTCIState (or the first indicator as specified herein in the present disclosure) provided to/for the CORESET(s) is set to 'first', 'second', 'both'0 or 'none' (or the UE 116 could expect or assume that at least CORESET(s) with index 0 and CORESET(s)—other than CORESET(s) with index 0—associated at least with CSS sets other than Type3-PDCCH CSS sets are associated/configured with coresetPoolIndex value 0 and/or the higher layer parameter applyIndicatedTCIState (or the first indicator as specified herein in the present disclosure) provided to/for the CORESET(s) is set to 'first', 'second', 'both'0 or 'none'), the UE 116 could apply the indicated joint/DL TCI state specific to coresetPoolIndex value 0 to the scheduled or activated PDSCH reception, wherein the CORESET in which the scheduling/activation DCI format 1_0/1_1/1_2 is received could be a CORESET with index 0 and/or a CORESET (other than a CORESET with index 0) associated only with USS sets and/or Type-3 PDCCH CSS sets and/or a CORESET (other than a CORESET with index 0) associated at least with CSS sets other than Type3-PDCCH CSS sets—the higher layer parameter applyIndicatedTCIState (or the first indicator as specified herein in the present disclosure) provided to/for the CORESET could be set to 'first', 'second', 'both'0 or 'none'.

In another example, when/if coresetPoolIndex value 0 is associated/corresponding to a PCI different from/other than the serving cell PCI and/or active TCI state(s) of/for the CORESET associated/configured with coresetPoolIndex value 0 is associated/corresponding to a PCI different from/other than the serving cell PCI (or the UE 116 could expect or assume that coresetPoolIndex value 0 is associated/corresponding to a PCI different from/other than the serving cell PCI and/or active TCI state(s) of/for the CORESET associated/configured with coresetPoolIndex value 0 is associated/corresponding to a PCI different from/other than the serving cell PCI), the indicated joint/DL TCI state could be associated with the PCI different from/other than the PCI of the serving cell, the UE 116 may assume that the DM-RS ports of PDSCH(s) of a serving cell PCI are quasi co-located (QCL'ed) with the RS(s) in a default (joint/DL) TCI state, wherein the default (joint/DL) TCI state could be one of:

The (joint/DL) TCI state (and therefore, the QCL parameter(s) provided/indicated therein) used for PDCCH quasi co-location indication of the CORESET associated with a monitored search space with the lowest controlResourceSetId in the latest slot in which one or more CORESETs within the active BWP of the serving cell are monitored by the UE 116;

The indicated joint/DL TCI state specific to coresetPoolIndex value 0, or equivalently, the indicated joint/DL TCI state associated with/to the PCI different from/other than the PCI of the serving cell;

The indicated joint/DL TCI state associated with/to the serving cell PCI;

The indicated joint/DL TCI state specific to coresetPoolIndex value 1, wherein coresetPoolIndex value 1 is associated/corresponding to the serving cell PCI and/or active TCI state(s) of/for the CORESET associated/configured with coresetPoolIndex value 1 is associated/corresponding to the serving cell PCI (or the UE 116 could expect or assume that coresetPoolIndex value 1 is associated/corresponding to the serving cell PCI and/or active TCI state(s) of/for the CORESET associated/configured with coresetPoolIndex value 1 is associated/corresponding to the serving cell PCI); and/or The indicated joint/DL TCI state specific to coresetPoolIndex value 1, wherein at least CORESET(s) with index 0 and CORESET(s)—other than CORESET(s) with index 0—associated at least with CSS sets other than Type3-PDCCH CSS sets are associated/configured with coresetPoolIndex value 0 and/or the higher layer parameter applyIndicatedTCIState (or the first indicator as specified herein in the present disclosure) provided to/for the CORESET(s) is set to 'first', 'second', 'both'0 or 'none' (or the UE 116 could expect or assume that at least CORESET(s) with index 0 and CORESET(s)—other than CORESET(s) with index 0—associated at least with CSS sets other than Type3-PDCCH CSS sets are associated/configured with coresetPoolIndex value 0 and/or the higher layer parameter applyIndicatedTCIState (or the first indicator as specified herein in the present disclosure) provided to/for the CORESET(s) is set to 'first', 'second', 'both'0 or 'none'). the UE 116 could also apply the default (joint/DL) TCI state to the scheduled or activated PDSCH reception, wherein the CORESET in which the scheduling/activation DCI format 1_0/1_1/1_2 is received could be at least a CORESET (other than a CORESET with index 0) associated only with USS sets and/or Type-3 PDCCH CSS sets—the higher layer parameter applyIndicatedTCIState (or the first indicator as specified herein in the present disclosure) provided to/for the CORESET could be set to 'first', 'second', 'both'0 or 'none'.

In another example, when/if only CORESET(s) (other than CORESET(s) with index 0) associated only with USS sets and/or Type-3 PDCCH CSS sets is associated/configured with coresetPoolIndex value 0 and/or the higher layer parameter applyIndicatedTCIState (or the first indicator as specified herein in the present disclosure) provided to/for the CORESET(s) is set to 'first', 'second', 'both'0 or 'none' (or the UE 116 could expect or assume that only CORESET(s) (other than CORESET(s) with index 0) associated only with USS sets and/or Type-3 PDCCH CSS sets is associated/configured with coresetPoolIndex value 0 and/or the higher layer parameter applyIndicatedTCIState (or the first indicator as specified herein in the present disclosure) provided to/for the CORESET(s) is set to 'first', 'second', 'both'0 or 'none'), the UE 116 may assume that the DM-RS ports of PDSCH(s) of a serving cell PCI are quasi co-located (QCL'ed) with the RS(s) in a default (joint/DL) TCI state, wherein the default (joint/DL) TCI state could be one of:

The (joint/DL) TCI state (and therefore, the QCL parameter(s) provided/indicated therein) used for PDCCH quasi co-location indication of the CORESET associated with a monitored search space with the lowest controlResourceSetId in the latest slot in which one or more CORESETs within the active BWP of the serving cell are monitored by the UE 116;

The indicated joint/DL TCI state specific to coresetPoolIndex value 0;

The indicated joint/DL TCI state associated with/to a PCI different from/other than the PCI of the serving cell;

The indicated joint/DL TCI state associated with/to the serving cell PCI;

The indicated joint/DL TCI state specific to coresetPoolIndex value 1, wherein coresetPoolIndex value 1 is associated/corresponding to the serving cell PCI and/or active TCI state(s) of/for the CORESET associated/configured with coresetPoolIndex value 1 is associated/corresponding to the serving cell PCI (or the UE 116 could expect or assume that coresetPoolIndex value 1 is associated/corresponding to the serving cell PCI and/or active TCI state(s) of/for the CORESET associated/configured with coresetPoolIndex value 1 is associated/corresponding to the serving cell PCI); and/or The indicated joint/DL TCI state specific to coresetPoolIndex value 1, wherein at least CORESET(s) with index 0 and CORESET(s)—other than CORESET(s) with index 0—associated at least with CSS sets other than Type3-PDCCH CSS sets are associated/configured with coresetPoolIndex value 0 and/or the higher layer parameter applyIndicatedTCIState (or the first indicator as specified herein in the present disclosure) provided to/for the CORESET(s) is set to 'first', 'second', 'both'0 or 'none' (or the UE 116 could expect or assume that at least CORESET(s) with index 0 and CORESET(s)—other than CORESET(s) with index 0—associated at least with CSS sets other than Type3-PDCCH CSS sets are associated/configured with coresetPoolIndex value 0 and/or the higher layer parameter applyIndicatedTCIState (or the first indicator as specified herein in the present disclosure) provided to/for the CORESET(s) is set to 'first', 'second', 'both'0 or 'none'). The UE 116 could also apply the default (joint/DL) TCI state to the scheduled or activated PDSCH reception, wherein the CORESET in which the scheduling/activation DCI format 1_0/1_1/1_2 is received could be at least a CORESET (other than a CORESET with index 0) associated only with USS sets and/or Type-3 PDCCH CSS sets—the higher layer parameter applyIndicatedTCIState (or the first indicator as specified herein in the present disclosure) provided to/for the CORESET could be set to 'first', 'second', 'both'0 or 'none'.

Furthermore, the UE 116 may not expect that the offset between reception of the scheduling/activation DCI format 1_0/1_1/1_2 in a CORESET associated with coresetPoolIndex value 1 and scheduled or activated PDSCH reception is less than timeDurationForQCL in frequency range 2, or the UE 116 could expect or assume that the offset between reception of the scheduling/activation DCI format 1_0/1_1/1_2 in a CORESET associated with coresetPoolIndex value 1 and scheduled or activated PDSCH reception is greater than or equal to timeDurationForQCL in frequency range 2, wherein: In one example, coresetPoolIndex value 1 could be associated/corresponding to the serving cell PCI and/or active TCI state(s) of/for the CORESET associated/configured with coresetPoolIndex value 1 could be associated/corresponding to the serving cell PCI (or the UE 116 could expect or assume that coresetPoolIndex value 1 is associated/corresponding to the serving cell PCI and/or active TCI state(s) of/for the CORESET associated/configured with coresetPoolIndex value 1 is associated/corresponding to the serving cell PCI).

In another example, coresetPoolIndex value 1 could be associated/corresponding to a PCI different from/other than the serving cell PCI and/or active TCI state(s) of/for the CORESET associated/configured with coresetPoolIndex value 1 could be associated/corresponding to a PCI different from/other than the serving cell PCI (or the UE 116 could expect or assume that coresetPoolIndex value 1 is associated/corresponding to a PCI different from/other than the serving cell PCI and/or active TCI state(s) of/for the CORESET associated/configured with coresetPoolIndex value 1 is associated/corresponding to a PCI different from/other than the serving cell PCI).

In another example, at least CORESET(s) with index 0 and CORESET(s)—other than CORESET(s) with index 0—associated at least with CSS sets other than Type3-PDCCH CSS sets could be associated/configured with coresetPoolIndex value 1 and/or the higher layer parameter applyIndicatedTCIState (or the first indicator as specified herein in the present disclosure) provided to/for the CORESET(s) could be set to 'first', 'second', 'both'0 or 'none' (or the UE 116 could expect or assume that at least CORESET(s) with index 0 and CORESET(s)—other than CORESET(s) with index 0—associated at least with CSS sets other than Type3-PDCCH CSS sets are associated/configured with coresetPoolIndex value 1 and/or the higher layer parameter applyIndicatedTCIState (or the first indicator as specified herein in the present disclosure) provided to/for the CORESET(s) is set to 'first', 'second', 'both'0 or 'none').

In another example, only CORESET(s) (other than CORESET(s) with index 0) associated only with USS sets and/or Type-3 PDCCH CSS sets could be associated/configured with coresetPoolIndex value 1 and/or the higher layer parameter applyIndicatedTCIState (or the first indicator as specified herein in the present disclosure) provided to/for the CORESET(s) could be set to 'first', 'second', 'both'0 or 'none' (or the UE 116 could expect or assume that only CORESET(s) (other than CORESET(s) with index 0) associated only with USS sets and/or Type-3 PDCCH CSS sets is associated/configured with coresetPoolIndex value 1 and/or the higher layer parameter applyIndicatedTCIState (or the first indicator as specified herein in the present disclosure) provided to/for the CORESET(s) is set to 'first', 'second', 'both'0 or 'none').

In the CA case, the UE 116 could be provided/configured with one or more first lists of CCs with each CC in a first list operating under single-TRP (STRP) mode—e.g., the UE 116 could receive from the network 130 a first (unified) TCI state(s) activation MAC CE command as specified herein in the present disclosure in/on one or more CCs in the first list(s), and/or one or more second lists of CCs with each CC in a second list operating under S-DCI MTRP mode—e.g., the UE 116 could receive from the network 130 a second (unified) TCI state(s) activation MAC CE command as specified herein in the present disclosure in/on one or more CCs in the second list(s), and/or one or more third lists of CCs with each CC in a third list operating under M-DCI MTRP mode—e.g., the UE 116 could be provided/configured by higher layer parameter PDCCH-Config that contains two different values of coresetPoolIndex in ControlResourceSet, and/or could receive from the network 130 a third (unified) TCI state(s) activation MAC CE command as specified herein in the present disclosure in/on one or more CCs in the third list(s). Furthermore, the same set of activated/indicated TCI state IDs could be applied for all DL and/or UL BWPs in the first list(s) of CCs, and/or the same set of activated/indicated TCI state IDs could be applied for all DL and/or UL BWPs in the second list(s) of CCs, and/or the same set of activated/indicated TCI state IDs could be applied for all DL and/or UL BWPs in the third list(s) of CCs. If the 'QCL-TypeD' of the PDSCH DM-RSs from respective CCs (e.g., CC(s) in the first list(s) and/or CC(s) in the second list(s) and/or CC(s) in the third list(s)) in a band are different in a slot, the 'QCL-TypeD' assumption of the PDSCH DM-RSs:

in the CC with lowest CC ID in the band, and/or in the CC with lowest CC ID in the first list(s) in the band, and/or in the CC with lowest CC ID in the second list(s) in the band, and/or in the CC with lowest CC ID in the third list(s) in the band is applied to all the PDSCH DM-RSs in the CCs in the band, and/or all the PDSCH DM-RSs in the first list(s) of CCs in the band, and/or all the PDSCH DM-RSs in the second list(s) of CCs in the band, and/or all the PDSCH DM-RSs in the third list(s) of CCs in the band. For the described design examples herein, when/if the PDSCH DM-RS with the qcl-Type set to 'typeD' is different from that of the PDCCH DM-RS with which they overlap in at least one symbol, the UE 116 could be expected to prioritize the reception of PDCCH associated with that CORESET—this could also apply to the intra-band CA case (e.g., when PDSCH and the CORESET are in different component carriers).

When a UE is configured with dl-OrJointTCI-StateList, is configured by higher layer parameter PDCCH-Config that contains two different values of coresetPoolIndex in ControlResourceSet, independent of the configuration of tci-PresetnInDCI and tci-PresentDCI-1-2 in RRC connected mode, if the UE 116 does not report its capability of supporting default beam per coresetPoolIndex for M-DCI based MTRP in frequency range 2 (e.g., if the UE 116 does not report its capability of supporting using two default beams each per coresetPoolIndex for M-DCI based MTRP for simultaneous reception) and/or if the UE 116 is configured with SSB-MTC-AdditionalPCI and/or at least one configured TCI state for the serving cell of scheduled/activated PDSCH contains qcl-Type set to 'typeD'0 and/or regardless of configuration of followUnifiedTCIstate and/or regardless of whether applyIndicatedTCIState (or the first indicator as specified herein in the present disclosure) provided to/for the corresponding CORESET(s) is set to 'first', 'second', 'both'0 or 'none':

the UE 116 may not expect that the offset between reception of the scheduling/activation DCI format 1_0/1_1/1_2 in a CORESET associated with coresetPoolIndex value 0 and scheduled or activated PDSCH reception is less than timeDurationForQCL in frequency range 2, or the UE 116 could expect or assume that the offset between reception of the scheduling/activation DCI format 1_0/1_1/1_2 in a CORESET associated with coresetPoolIndex value 0 and scheduled or activated PDSCH reception is greater than or equal to timeDurationForQCL in frequency range 2; and/or the UE 116 may not expect that the offset between reception of the scheduling/activation DCI format 1_0/1_1/1_2 in a CORESET associated with coresetPoolIndex value 1 and scheduled or activated PDSCH reception is less than timeDurationForQCL in frequency range 2, or the UE 116 could expect or assume that the offset between reception of the scheduling/activation DCI format 1_0/1_1/1_2 in a CORESET associated with coresetPoolIndex value 1 and scheduled or activated PDSCH reception is greater than or equal to timeDurationForQCL in frequency range 2, wherein:

In one example, coresetPoolIndex value(s) 0 and/or 1 could be associated/corresponding to the serving cell PCI and/or active TCI state(s) of/for the CORESET associated/configured with coresetPoolIndex value(s) 0 and/or 1 could be associated/corresponding to the serving cell PCI (or the UE 116 could expect or assume that coresetPoolIndex value(s) 0 and/or 1 is associated/corresponding to the serving cell PCI and/or active TCI state(s) of/for the CORESET associated/configured with coresetPoolIndex value(s) 0 and/or 1 is associated/corresponding to the serving cell PCI).

In another example, coresetPoolIndex value(s) 0 and/or 1 could be associated/corresponding to a PCI different from/other than the serving cell PCI and/or active TCI state(s) of/for the CORESET associated/configured with coresetPoolIndex value(s) 0 and/or 1 could be associated/corresponding to a PCI different from/other than the serving cell PCI (or the UE 116 could expect or assume that coresetPoolIndex value(s) 0 and/or 1 is associated/corresponding to a PCI different from/other than the serving cell PCI and/or active TCI state(s) of/for the CORESET associated/configured with coresetPoolIndex value(s) 0 and/or 1 is associated/corresponding to a PCI different from/other than the serving cell PCI).

In another example, at least CORESET(s) with index 0 and CORESET(s)—other than CORESET(s) with index 0—associated at least with CSS sets other than Type3-PDCCH CSS sets could be associated/configured with coresetPoolIndex value(s) 0 and/or 1 and/or the higher layer parameter applyIndicatedTCIState (or the first indicator as specified herein in the present disclosure) provided to/for the CORESET(s) could be set to 'first', 'second', 'both'0 or 'none' (or the UE 116 could expect or assume that at least CORESET(s) with index 0 and CORESET(s)—other than CORESET(s) with index 0—associated at least with CSS sets other than Type3-PDCCH CSS sets are associated/configured with coresetPoolIndex value(s) 0 and/or 1 and/or the higher layer parameter applyIndicatedTCIState (or the first indicator as specified herein in the present disclosure) provided to/for the CORESET(s) is set to 'first', 'second', 'both'0 or 'none').

In another example, only CORESET(s) (other than CORESET(s) with index 0) associated only with USS sets and/or Type-3 PDCCH CSS sets could be associated/configured with coresetPoolIndex value(s) 0 and/or 1 and/or the higher layer parameter applyIndicatedTCIState (or the first indicator as specified herein in the present disclosure) provided to/for the CORESET(s) could be set to 'first', 'second', 'both'0 or 'none' (or the UE 116 could expect or assume that only CORESET(s) (other than CORESET(s) with index 0) associated only with USS sets and/or Type-3 PDCCH CSS sets is associated/configured with coresetPoolIndex value(s) 0 and/or 1 and/or the higher layer parameter applyIndicatedTCIState (or the first indicator as specified herein in the present disclosure) provided to/for the CORESET(s) is set to 'first', 'second', 'both'0 or 'none').

When a UE is configured with dl-OrJointTCI-StateList, is configured by higher layer parameter PDCCH-Config that contains two different values of coresetPoolIndex in ControlResourceSet, independent of the configuration of tci-PresetnInDCI and tci-PresentDCI-1-2 in RRC connected mode, if at least one configured TCI state for the serving cell of scheduled/activated PDSCH contains qcl-Type set to 'typeD'0 and/or regardless of configuration of followUnifiedTCIstate and/or regardless of whether applyIndicatedTCIState (or the first indicator as specified herein in the present disclosure) provided to/for the corresponding CORESET(s) is set to 'first', 'second', 'both'0 or 'none':

- if the UE 116 does not report its capability of supporting default beam per coresetPoolIndex for M-DCI based MTRP in frequency range 2 (e.g., if the UE 116 does not report its capability of supporting using two default beams each per coresetPoolIndex for M-DCI based MTRP for simultaneous reception), the UE 116 may not expect to be configured with SSB-MTC-AdditionalPCI, and/or,
- if the UE 116 reports its capability of supporting default beam per coresetPoolIndex for M-DCI based MTRP in frequency range 2 (e.g., if the UE 116 reports its capability of supporting using two default beams each per coresetPoolIndex for M-DCI based MTRP for simultaneous reception), the UE 116 could expect to be configured with SSB-MTC-AdditionalPCI. In this case
  - when the offset between the reception of the scheduling/activation DCI format 1_0/1_1/1_2 in a CORESET associated with coresetPoolIndex value 0 and the scheduled or activated PDSCH reception is less than or greater than or equal to timeDurationForQCL in frequency range 2, the UE 116 could apply the indicated joint/DL TCI state specific to coresetPoolIndex value 0 to the scheduled or activated PDSCH reception
  - when the offset between the reception of the scheduling/activation DCI format 1_0/1_1/1_2 in a CORESET associated with coresetPoolIndex value 1 and the scheduled or activated PDSCH reception is less than or greater than or equal to timeDurationForQCL in frequency range 2, the UE 116 could apply the indicated joint/DL TCI state specific to coresetPoolIndex value 1 to the scheduled or activated PDSCH reception wherein:

In one example, coresetPoolIndex value(s) 0 and/or 1 could be associated/corresponding to the serving cell PCI and/or active TCI state(s) of/for the CORESET associated/configured with coresetPoolIndex value(s) 0 and/or 1 could be associated/corresponding to the serving cell PCI (or the UE 116 could expect or assume that coresetPoolIndex value(s) 0 and/or 1 is associated/corresponding to the serving cell PCI and/or active TCI state(s) of/for the CORESET associated/configured with coresetPoolIndex value(s) 0 and/or 1 is associated/corresponding to the serving cell PCI).

In another example, coresetPoolIndex value(s) 0 and/or 1 could be associated/corresponding to a PCI different from/other than the serving cell PCI and/or active TCI state(s) of/for the CORESET associated/configured with coresetPoolIndex value(s) 0 and/or 1 could be associated/corresponding to a PCI different from/other than the serving cell PCI (or the UE 116 could expect or assume that coresetPoolIndex value(s) 0 and/or 1 is associated/corresponding to a PCI different from/other than the serving cell PCI and/or active TCI state(s) of/for the CORESET associated/configured with coresetPoolIndex value(s) 0 and/or 1 is associated/corresponding to a PCI different from/other than the serving cell PCI).

In another example, at least CORESET(s) with index 0 and CORESET(s)—other than CORESET(s) with index 0—associated at least with CSS sets other than Type3-PDCCH CSS sets could be associated/configured with coresetPoolIndex value(s) 0 and/or 1 and/or the higher layer parameter applyIndicatedTCIState (or the first indicator as specified herein in the present disclosure) provided to/for the CORESET(s) could be set to 'first', 'second', 'both'0 or 'none' (or the UE 116 could expect or assume that at least CORESET(s) with index 0 and CORESET(s)—other than CORESET(s) with index 0—associated at least with CSS sets other than Type3-PDCCH CSS sets are associated/configured with coresetPoolIndex value(s) 0 and/or 1 and/or the higher layer parameter applyIndicatedTCIState (or the first indicator as specified herein in the present disclosure) provided to/for the CORESET(s) is set to 'first', 'second', 'both'0 or 'none').

In another example, only CORESET(s) (other than CORESET(s) with index 0) associated only with USS sets and/or Type-3 PDCCH CSS sets could be associated/configured with coresetPoolIndex value(s) 0 and/or 1 and/or the higher layer parameter applyIndicatedTCIState (or the first indicator as specified herein in the present disclosure) provided to/for the CORESET(s) could be set to 'first', 'second', 'both'0 or 'none' (or the UE 116 could expect or assume that only CORESET(s) (other than CORESET(s) with index 0) associated only with USS sets and/or Type-3 PDCCH CSS sets is associated/configured with coresetPoolIndex value(s) 0 and/or 1 and/or the higher layer parameter applyIndicatedTCIState (or the first indicator as specified herein in the present disclosure) provided to/for the CORESET(s) is set to 'first', 'second', 'both'0 or 'none').

In one embodiment, the UE 116 could determine the PUSCH for uplink control information (UCI) multiplexing, and therefore, the QCL assumption(s) for transmitting the PUSCH/UCI by applying the following procedure on the candidate PUSCHs.

If the UE 116 is provided enableSTx2PofmDCI, and/or is provided ackNackFeedbackMode=separate, and/or is provided/configured with dl-OrJointTCI-StateList and/or ul-TCI-StateList, and/or is configured by higher layer parameter PDCCH-Config that contains two different values of coresetPoolIndex in ControlResourceSet, wherein the UE 116 could be provided two coresetPoolIndex values 0 and 1 for the first and second CORESETs, or is not provided coresetPoolIndex value for the first CORESETs and is provided coresetPoolIndex value of 1 for the second CORESETs, respectively, and/or would multiplex UCI that includes HARQ-ACK information in a PUSCH, candidate PUSCHs for the UCI multiplexing are the ones associated with same CORESETs as for a PUCCH transmission with the HARQ-ACK information.

In one example, the PUCCH transmission with the HARQ-ACK information could be specific/associated to/with the first CORESET(s)—and/or equivalently, coresetPoolIndex value 0—as specified herein in the present disclosure. For example, the UE 116 could be provided an indicated apply-IndicatedTCIState (or the third indicator as specified herein in the present disclosure) set to 'first' (i.e., when/if apply-IndicatedTCIState='first') for PUCCH resource(s)/PUCCH resource group(s) corresponding to the PUCCH transmission with the HARQ-ACK information, resulting in that the UE 116 could transmit the PUCCH with the HARQ-ACK information using first spatial domain filters corresponding to the first TCI-State or TCI-UL-State specific to the first CORESET(s), wherein a TCI-State or TCI-UL-State is specific to the first CORESET(s) when it is indicated by the DCI field 'Transmission Configuration Indication' in DCI format 1_1/1_2 associated with the first CORESET(s)—and/or equivalently, coresetPoolIndex value 0. For this case/design example, candidate PUSCHs for the UCI multiplexing are the ones associated with the first CORESET(s)—e.g., via scheduling/activation, and the UE 116 could transmit the (candidate) PUSCH(s) multiplexed with the UCI that includes the HARQ-ACK information using the first spatial domain filters corresponding to the first TCI-State or TCI-UL-State specific to the first CORESET(s).

In another example, the PUCCH transmission with the HARQ-ACK information could be specific/associated to/with the second CORESET(s)—and/or equivalently, coresetPoolIndex value 1—as specified herein in the present disclosure. For example, the UE 116 could be provided an indicated apply-IndicatedTCIState (or the third indicator as specified herein in the present disclosure) set to 'second' (i.e., when/if apply-IndicatedTCIState='second') for PUCCH resource(s)/PUCCH resource group(s) corresponding to the PUCCH transmission with the HARQ-ACK information, resulting in that the UE 116 could transmit the PUCCH with the HARQ-ACK information using second spatial domain filters corresponding to the second TCI-State or TCI-UL-State specific to the second CORESET(s), wherein a TCI-State or TCI-UL-State is specific to the second CORESET(s) when it is indicated by the DCI field 'Transmission Configuration Indication' in DCI format 1_1/1_2 associated with the second CORESET(s)—and/or equivalently, coresetPoolIndex value 1. For this case/design example, candidate PUSCHs for the UCI multiplexing are the ones associated with the second CORESET(s)—e.g., via scheduling/activation, and the UE 116 could transmit the (candidate) PUSCH(s) multiplexed with the UCI that includes the HARQ-ACK information using the second spatial domain filters corresponding to the second TCI-State or TCI-UL-State specific to the second CORESET(s).

If the UE 116 is provided enableSTx2PofmDCI, and/or is provided ackNackFeedbackMode=joint or the UCI does not include HARQ-ACK information, and/or is provided/configured with dl-OrJointTCI-StateList and/or ul-TCI-StateList, and/or is configured by higher layer parameter PDCCH-Config that contains two different values of coresetPoolIndex in ControlResourceSet, wherein the UE 116 could be provided two coresetPoolIndex values 0 and 1 for the first and second CORESETs, or is not provided coresetPoolIndex value for the first CORESETs and is provided coresetPoolIndex value of 1 for the second CORESETs, respectively, and/or the UE 116 would transmit two PUSCHs in the slot that start at a same symbol on the serving cell with smallest ServCellIndex and fulfil the condition(s) for UCI multiplexing:

In one example, the UE 116 could multiplex the UCI in the PUSCH from the two PUSCHs-referred to as the reference PUSCH—associated with CORESETs that the UE 116 is not provided coresetPoolIndex or is provided coresetPoolIndex with a value of 0—i.e., the first CORESETs. The UE 116 could transmit the PUCCH/UCI using first spatial domain filters corresponding to the first TCI-State or TCI-UL-State specific to the first CORESET(s), wherein a TCI-State or TCI-UL-State is specific to the first CORESET(s) when it is indicated by the DCI field 'Transmission Configuration Indication' in DCI format 1_1/1_2 associated with the first CORESET(s)—and/or equivalently, coresetPoolIndex value 0. For this case/design example, the condition(s) for UCI multiplexing could also include/contain/comprise: the UE 116 may not expect that the higher layer RRC configuration/parameter apply-IndicatedTCIState (or the third indicator as specified herein in the present disclosure) is provided to/for the PUCCH resource(s)/PUCCH resource group(s) corresponding to the PUCCH/UCI transmission—or equivalently, the higher layer RRC configuration/parameter apply-IndicatedTCIState (or the third indicator as specified herein in the present disclosure) is not provided to/for the PUCCH resource(s)/PUCCH resource group(s) corresponding to the PUCCH/UCI transmission, or the UE 116 may ignore the value of the higher layer RRC configuration/parameter apply-IndicatedTCIState (or the third indicator as specified herein in the present disclosure), if provided to/for the PUCCH resource(s)/PUCCH resource group(s) corresponding to the PUCCH/UCI transmission. The condition(s) for UCI multiplexing could further include/contain/comprise: the UE 116 could expect that the higher layer RRC configuration/parameter apply-IndicatedTCIState (or the third indicator as specified herein in the present disclosure), if provided to/for the PUCCH resource(s)/PUCCH resource group(s) corresponding to the PUCCH/UCI transmission, is set to 'first'—or equivalently, the higher layer RRC configuration/parameter apply-IndicatedTCIState (or the third indicator as specified herein in the present disclosure) provided to/for the PUCCH resource(s)/PUCCH resource group(s) corresponding to the PUCCH/UCI transmission is set to 'first', or the UE 116 may not expect that the higher layer RRC configuration/parameter apply-IndicatedTCIState (or the third indicator as specified herein in the present disclosure), if provided to/for the PUCCH resource(s)/PUCCH resource group(s) corresponding to the PUCCH/UCI transmission, is set to 'second'—or equivalently, the higher layer RRC configuration/parameter apply-IndicatedTCIState (or the third indicator as specified herein in the present disclosure) provided to/for the PUCCH resource(s)/PUCCH resource group(s) corresponding to the PUCCH/UCI transmission is not set to 'second'. Furthermore, the UE 116 could transmit the reference PUSCH as specified herein in the present disclosure multiplexed with the UCI using the first spatial domain filters corresponding to the first TCI-State or TCI-UL-State specific to the first CORESET(s).

In another example, the UE 116 could multiplex the UCI in the PUSCH from the two PUSCHs—referred to as the reference PUSCH—associated with CORESETs that the UE 116 is provided coresetPoolIndex with a value of 1—i.e., the second CORESETs. the UE 116 could transmit the PUCCH/UCI using second spatial domain filters corresponding to the second TCI-State or TCI-UL-State specific to the second CORESET(s), wherein a TCI-State or TCI-UL-State is specific to the second CORESET(s) when it is indicated by the DCI field 'Transmission Configuration Indication' in DCI format 1_1/1_2 associated with the second CORESET(s)—and/or equivalently, coresetPoolIndex value 1. For this case/design example, the condition(s) for UCI multiplexing could also include/contain/comprise: the UE 116 may not expect that the higher layer RRC configuration/parameter apply-IndicatedTCIState (or the third indicator as specified herein in the present disclosure) is provided to/for the PUCCH resource(s)/PUCCH resource group(s) corresponding to the PUCCH/UCI transmission—or equivalently, the higher layer RRC configuration/parameter apply-IndicatedTCIState (or the third indicator as specified herein in the present disclosure) is not provided to/for the PUCCH resource(s)/PUCCH resource group(s) corresponding to the PUCCH/UCI transmission, or the UE 116 may ignore the value of the higher layer RRC configuration/parameter apply-IndicatedTCIState (or the third indicator as specified herein in the present disclosure) if provided to/for the PUCCH resource(s)/PUCCH resource group(s) corresponding to the PUCCH/UCI transmission. The condition(s) for UCI multiplexing could further include/contain/comprise: the UE 116 could expect that the higher layer RRC configuration/parameter apply-IndicatedTCIState (or the third indicator as specified herein in the present disclosure), if provided to/for the PUCCH resource(s)/PUCCH resource group(s) corresponding to the PUCCH/UCI transmission, is set to 'second'—or equivalently, the higher layer RRC configuration/parameter apply-IndicatedTCIState (or the third indicator as specified herein in the present disclosure) provided to/for the PUCCH resource(s)/PUCCH resource group(s) corresponding to the PUCCH/UCI transmission is set to 'second', or the UE 116 may not expect that the higher layer RRC configuration/parameter apply-IndicatedTCIState (or the third indicator as specified herein in the present disclosure), if provided to/for the PUCCH resource(s)/PUCCH resource group(s) corresponding to the PUCCH/UCI transmission, is set to 'first'—or equivalently, the higher layer RRC configuration/parameter apply-IndicatedTCIState (or the third indicator as specified herein in the present disclosure) provided to/for the PUCCH resource(s)/PUCCH resource group(s) corresponding to the PUCCH/UCI transmission is not set to 'first'. Furthermore, the UE 116 could transmit the reference PUSCH as specified herein in the present disclosure multiplexed with the UCI using the second spatial domain filters corresponding to the second TCI-State or TCI-UL-State specific to the second CORESET(s).

In another example, the UE 116 could be provided/indicated apply-IndicatedTCIState (or the third indicator as specified herein in the present disclosure) set to 'first' (i.e., when/if apply-IndicatedTCIState='first') for PUCCH resource(s)/PUCCH resource group(s) corresponding to the PUCCH/UCI transmission as specified herein in the present disclosure. For this case/design example, the UE 116 could multiplex the UCI in the PUSCH from the two PUSCHs-referred to as the reference PUSCH—associated with CORESETs that the UE 116 is not provided coresetPoolIndex or is provided coresetPoolIndex with a value of 0—i.e., the first CORESETs. Furthermore, the UE 116 could transmit the PUCCH/UCI and/or the reference PUSCH as specified herein in the present disclosure multiplexed with the UCI using first spatial domain filters corresponding to the first TCI-State or TCI-UL-State specific to the first CORESET(s), wherein a TCI-State or TCI-UL-State is specific to the first CORESET(s) when it is indicated by the DCI field 'Transmission Configuration Indication' in DCI format 1_1/1_2 associated with the first CORESET(s)—and/or equivalently, coresetPoolIndex value 0.

In another example, the UE 116 could be provided/indicated apply-IndicatedTCIState (or the third indicator as specified herein in the present disclosure) set to 'second' (i.e., when/if apply-IndicatedTCIState='second') for PUCCH resource(s)/PUCCH resource group(s) corresponding to the PUCCH/UCI transmission as specified herein in the present disclosure. For this case/design example, the UE 116 could multiplex the UCI in the PUSCH from the two PUSCHs-referred to as the reference PUSCH—associated with CORESETs that the UE 116 is provided coresetPoolIndex with a value of 1—i.e., the second CORESETs. Furthermore, the UE 116 could transmit the PUCCH/UCI and/or the reference PUSCH as specified herein in the present disclosure multiplexed with the UCI using second spatial domain filters corresponding to the second TCI-State or TCI-UL-State specific to the second CORESET(s), wherein a TCI-State or TCI-UL-State is specific to the second CORESET(s) when it is indicated by the DCI field 'Transmission Configuration Indication' in DCI format 1_1/1_2 associated with the second CORESET(s)—and/or equivalently, coresetPoolIndex value 1.

In one embodiment, if a UE is provided/configured with dl-OrJointTCI-StateList and/or ul-TCI-StateList, and is indicated a first TCI-State or TCI-UL-State and a second TCI-State or TCI-UL-State:

For a PDSCH scheduled/activated by a PDCCH/DCI in a CORESET, wherein the CORESET could be one of: a CORESET with index 0, a CORESET other than a CORESET with index 0 and associated only with USS sets and/or Type3-PDCCH CSS sets, and a CORESET other than a CORESET with index 0 and associated at least with CSS sets other than Type3-PDCCH CSS sets, and the UE 116 may not be provided followUnifiedTCI-State or apply-IndicatedTCIState for the CORESET and/or the UE 116 could be provided apply-IndicatedTCIState set to 'none' for the CORESET:

In one example, the UE 116 could apply the same QCL assumption(s) for receiving the scheduling/activation PDCCH/DCI in the CORESET to receive the PDSCH, or equivalently, the UE 116 could assume that DM-RS antenna ports for receiving the PDSCH are quasi co-located with the DM-RS antenna ports for receiving the scheduling/activation PDCCH/DCI in the CORESET, or equivalently, the UE 116 could assume that DM-RS antenna ports for receiving the PDSCH and DM-RS antenna ports for receiving the scheduling/activation PDCCH/DCI in the CORESET are quasi co-located with the reference signals provided by/in one or more TCI states specific to the CORESET.

For example, when/if one TCI state—e.g., denoted by a first TCI state or a second TCI state—is associated/specific with/to the CORESET, the UE 116 could assume that DM-RS antenna ports for receiving the PDSCH and DM-RS antenna ports for receiving the scheduling/activation PDCCH/DCI in the CORESET are quasi co-located with the reference signals provided by/in the first/second TCI state specific to the CORESET.

For another example, when/if two TCI states—e.g., denoted by a first TCI state and a second TCI state—are associated/specific with/to the CORESET, the UE 116 could assume that the DM-RS antenna ports for receiving the PDSCH are quasi co-located with the reference signals provided by/in the first, second or both of the first and second TCI states according to: (1) fixed rule(s) in system specification(s), e.g., always the first TCI state associated/specific with/to the CORESET, (2) network's configuration(s)/indication(s), e.g., via higher layer RRC signaling(s)/parameter(s) and/or MAC CE command(s) and/or dynamic DCI based L1 signaling(s), and/or (3) UE's autonomous decision/selection/determination, which could be further sent to the network 130, e.g., via/in CSI/beam report and/or UE's capability signaling(s).

In another example, when/if the UE 116 could expect that the TCI selection field (or the second indicator as specified herein in the present disclosure) for receiving the PDSCH is absent or not present in the corresponding DCI format(s), e.g., in the CORESET (i.e., the TCI selection field, or equivalently the second indicator as specified herein in the present disclosure, for receiving the PDSCH is not present or is absent or corresponds to a 0-bit field in the corresponding DCI format(s), e.g., in the CORESET)—e.g., the UE 116 may not report its capability of supporting the TCI selection field (or the second indicator as specified herein in the present disclosure) in the corresponding DCI format(s), e.g., in the CORESET, for receiving the PDSCH and/or the UE 116 is not provided/configured by the network 130 the higher layer parameter tciSelection-PresentInDCI—e.g., for the corresponding DCI format(s) in the CORESET, and/or when/if the UE 116 could ignore/omit—e.g., based on (i) fixed rule(s) in system specification(s) and/or (ii) network's configuration(s)/indication(s) via/by higher layer RRC signaling(s)/parameter(s) and/or MAC CE command(s) and/or dynamic DCI based L1 signaling(s) and/or (iii) UE's autonomous selection/decision/determination which could be further sent to the network 130 via/by CSI/beam report and/or UE's capability signaling(s)—the value(s) of the TCI selection field (or the value(s) of the second indicator as specified herein in the present disclosure) for receiving the PDSCH even if the TCI selection field/second indicator as specified herein in the present disclosure is present in the corresponding DCI format(s), e.g., in the CORESET—e.g., the UE 116 may or may not report its capability of supporting the TCI selection field (or the second indicator as specified herein in the present disclosure) in the corresponding DCI format(s), e.g., in the CORESET, for receiving the PDSCH and/or the UE 116 is or is not provided/configured by the network 130 the higher layer parameter tciSelection-PresentInDCI—e.g., for the corresponding DCI format(s) in the CORESET, the UE 116 could apply the same QCL assumption(s) for receiving the scheduling/activation PDCCH/DCI in the CORESET to receive the PDSCH, or equivalently, the UE 116 could assume that DM-RS antenna ports for receiving the PDSCH are quasi co-located with the DM-RS antenna ports for receiving the scheduling/activation PDCCH/DCI in the CORESET, or equivalently, the UE 116 could assume that DM-RS antenna ports for receiving the PDSCH and DM-RS antenna ports for receiving the scheduling/activation PDCCH/DCI in the CORESET are quasi co-located with the reference signals provided by/in one or more TCI states specific to the CORESET.

For example, when/if one TCI state—e.g., denoted by a first TCI state or a second TCI state—is associated/specific with/to the CORESET, the UE 116 could assume that DM-RS antenna ports for receiving the PDSCH and DM-RS antenna ports for receiving the scheduling/activation PDCCH/DCI in the CORESET are quasi co-located with the reference signals provided by/in the first/second TCI state specific to the CORESET.

For another example, when/if two TCI states—e.g., denoted by a first TCI state and a second TCI state—are associated/specific with/to the CORESET, the UE 116 could assume that the DM-RS antenna ports for receiving the PDSCH are quasi co-located with the reference signals provided by/in the first, second or both of the first and second TCI states according to: (1) fixed rule(s) in system specification(s), e.g., always the first TCI state associated/specific with/to the CORESET, (2) network's configuration(s)/indication(s), e.g., via higher layer RRC signaling(s)/parameter(s) and/or MAC CE command(s) and/or dynamic DCI based L1 signaling(s), and/or (3) UE's autonomous decision/selection/determination, which could be further sent to the network 130, e.g., via/in CSI/beam report and/or UE's capability signaling(s).

In another example, when/if the UE 116 could expect that the TCI selection field (or the second indicator as specified herein in the present disclosure) for receiving the PDSCH is (configured to be) present in the corresponding DCI format(s), e.g., in the CORESET (i.e., the TCI selection field, or equivalently the second indicator as specified herein in the present disclosure, for receiving the PDSCH is present or corresponds to a 2-bit field in the corresponding DCI format(s), e.g., in the CORESET)—e.g., the UE 116 could report its capability of supporting the TCI selection field (or the second indicator as specified herein in the present disclosure) in the corresponding DCI format(s), e.g., in the CORESET, for receiving the PDSCH and/or the UE 116 is provided/configured by the network 130 the higher layer parameter tciSelection-PresentInDCI—e.g., for the corresponding DCI format(s) in the CORESET:

For example, the UE 116 could determine the QCL assumption(s) for receiving the PDSCH according to the TCI selection field (or the second indicator as specified herein in the present disclosure) provided in the corresponding DCI format(s), e.g., in the CORESET. For instance, when/if the codepoint of the TCI selection field/second indicator as specified herein in the present disclosure is set to '00', the UE 116 could apply the first indicated joint/DL TCI state(s) to receive the PDSCH, or equivalently, the UE 116 could assume that a DM-RS antenna port for receiving the PDSCH is quasi co-located with the reference signals provided in/by the first indicated joint/DL TCI state(s), when/if the codepoint of the TCI selection field/second indicator as specified herein in the present disclosure is set to '01', the UE 116 could apply the second indicated joint/DL TCI state(s) to receive the PDSCH, or equivalently, the UE 116 could assume that a DM-RS antenna port for receiving the PDSCH is quasi co-located with the reference signals provided in/by the second indicated joint/DL TCI state(s), and/or when/if the codepoint of the TCI selection field/second indicator as specified herein in the present disclosure is set to '10', the UE 116 could apply both the first and second indicated joint/DL TCI states to receive the PDSCH, or equivalently, the UE 116 could assume that DM-RS antenna ports for receiving the PDSCH are quasi co-located with the reference signals provided in/by both the first and second indicated joint/DL TCI states.

For another example, the UE 116 could apply the same QCL assumption(s) for receiving the scheduling/activation PDCCH/DCI in the CORESET to receive the PDSCH, or equivalently, the UE 116 could assume that DM-RS antenna ports for receiving the PDSCH are quasi co-located with the DM-RS antenna ports for receiving the scheduling/activation PDCCH/DCI in the CORESET, or equivalently, the UE 116 could assume that DM-RS antenna ports for receiving the PDSCH and DM-RS antenna ports for receiving the scheduling/activation PDCCH/DCI in the CORESET are quasi co-located with the reference signals provided by/in one or more TCI states specific to the CORESET. In one example, when/if the codepoint of the TCI selection field/second indicator as specified herein in the present disclosure is set to '00', and/or when/if one TCI state—e.g., denoted by a first TCI state—is associated/specific with/to the CORESET, and/or when/if two TCI states—e.g., denoted by a first TCI state and a second TCI state—are associated/specific with/to the CORESET, the UE 116 could assume that DM-RS antenna ports for receiving the PDSCH are quasi co-located with the reference signals provided by/in the first TCI state specific to the CORESET. In another example, when/if the codepoint of the TCI selection field/second indicator as specified herein in the present disclosure is set to '01', and/or when/if one TCI state—e.g., denoted by a second TCI state—is associated/specific with/to the CORESET, and/or when/if two TCI states—e.g., denoted by a first TCI state and a second TCI state—are associated/specific with/to the CORESET, the UE 116 could assume that DM-RS antenna ports for receiving the PDSCH are quasi co-located with the reference signals provided by/in the second TCI state specific to the CORE- SET. In another example, when/if the codepoint of the TCI selection field/second indicator as specified herein in the present disclosure is set to '10', for example, when/if one TCI state—e.g., denoted by a first TCI state—is associated/specific with/to the CORESET, the UE 116 could assume that DM-RS antenna ports for receiving the PDSCH specific to the first indicated joint/DL TCI state(s) are quasi co-located with the reference signals provided by/in the first TCI state specific to the CORESET; for another example, when/if one TCI state—e.g., denoted by a second TCI state—is associated/specific with/to the CORESET, the UE 116 could assume that DM-RS antenna ports for receiving the PDSCH specific to the second indicated joint/DL TCI state(s) are quasi co-located with the reference signals provided by/in the second TCI state specific to the CORESET; for another example, when/if two TCI states—e.g., denoted by a first TCI state and a second TCI state—are associated/specific with/to the CORESET, the UE 116 could assume that the DM-RS antenna ports for receiving the PDSCH are quasi co-located with the reference signals provided by/in both of the first and second TCI states specific to the CORESET.

For a PUSCH scheduled/activated by a PDCCH/DCI in a CORESET, wherein the CORESET could be one of: a CORESET with index 0, a CORESET other than a CORESET with index 0 and associated only with USS sets and/or Type3-PDCCH CSS sets, and a CORESET other than a CORESET with index 0 and associated at least with CSS sets other than Type3-PDCCH CSS sets, and the UE 116 may not be provided followUnifiedTCI-State or apply-IndicatedTCIState for the CORESET and/or the UE 116 could be provided apply-IndicatedTCIState set to 'none' for the CORESET:

In one example, the UE 116 could apply the QCL assumption(s) for receiving the scheduling/activation PDCCH/DCI in the CORESET to determine spatial domain filter(s) for transmitting the PUSCH, or equivalently, the UE 116 could assume that spatial domain filter(s) for transmitting the PUSCH are spatially related to the DM-RS antenna ports for receiving the scheduling/activation PDCCH/DCI in the CORESET, or equivalently, the UE 116 could assume that spatial domain filter(s) for transmitting the PUSCH and DM-RS antenna ports for receiving the scheduling/activation PDCCH/DCI in the CORESET are determined from the reference signals provided by/in one or more TCI states specific to the CORESET.

For example, when/if one TCI state—e.g., denoted by a first TCI state or a second TCI state—is associated/specific with/to the CORESET, the UE 116 could assume that spatial domain filter(s) for transmitting the PUSCH and DM-RS antenna ports for receiving the scheduling/activation PDCCH/DCI in the CORESET are determined from the reference signals provided by/in the first/second TCI state specific to the CORESET.

For another example, when/if two TCI states—e.g., denoted by a first TCI state and a second TCI state—are associated/specific with/to the CORESET, the UE 116 could assume that the spatial domain filters for transmitting the PUSCH are determined from/spatially related to the reference signals provided by/in the first, second or both of the first and second TCI states according to: (1) fixed rule(s) in system specification(s), e.g., always the first TCI state associated/specific with/to the CORESET, (2) network's configuration(s)/indication(s), e.g., via higher layer RRC signaling(s)/parameter(s) and/or MAC CE command(s) and/or dynamic DCI based L1 signaling(s), and/or (3) UE's autonomous decision/selection/determination, which could be further sent to the network 130, e.g., via/in CSI/beam report and/or UE's capability signaling(s).

In another example, when/if the UE 116 could expect that the SRS resource set indicator field (or the fourth indicator as specified herein in the present disclosure) for transmitting the PUSCH is absent or not present in the corresponding DCI format(s), e.g., in the CORESET (i.e., the SRS resource set indicator field, or equivalently the fourth indicator as specified herein in the present disclosure, for transmitting the PUSCH is not present or is absent or corresponds to a 0-bit field in the corresponding DCI format(s), e.g., in the CORESET)—e.g., the UE 116 may not report its capability of supporting the SRS resource set indicator field (or the fourth indicator as specified herein in the present disclosure) in the corresponding DCI format(s), e.g., in the CORESET, for transmitting the PUSCH and/or the UE 116 is not provided/configured by the network 130 two SRS resource sets and/or is provided/configured by the network 130 a single SRS resource set, and/or when/if the UE 116 could ignore/omit—e.g., based on (i) fixed rule(s) in system specification(s) and/or (ii) network's configuration(s)/indication(s) via/by higher layer RRC signaling(s)/parameter(s) and/or MAC CE command(s) and/or dynamic DCI based L1 signaling(s) and/or (iii) UE's autonomous selection/decision/determination which could be further sent to the network 130 via/by CSI/beam report and/or UE's capability signaling(s)—the value(s) of the SRS resource set indicator field (or the value(s) of the fourth indicator as specified herein in the present disclosure) for transmitting the PUSCH even if the SRS resource set indicator field/fourth indicator as specified herein in the present disclosure is present in the corresponding DCI format(s), e.g., in the CORESET—e.g., the UE 116 may or may not report its capability of supporting the SRS resource set indicator field (or the fourth indicator as specified herein in the present disclosure) in the corresponding DCI format(s), e.g., in the CORESET, for transmitting the PUSCH and/or the UE 116 is or is not provided/configured by the network 130 two SRS resource sets and/or the UE 116 is or is not provided/configured by the network 130 a single SRS resource set, the UE 116 could apply the QCL assumption(s) for receiving the scheduling/activation PDCCH/DCI in the CORESET to determine spatial domain filter(s) for transmitting the PUSCH, or equivalently, the UE 116 could assume that spatial domain filters for transmitting the PUSCH are spatially related to the DM-RS antenna ports for receiving the scheduling/activation PDCCH/DCI in the CORESET, or equivalently, the UE 116 could assume that spatial domain filters for transmitting the PUSCH and DM-RS antenna ports for receiving the scheduling/activation PDCCH/DCI in the CORESET are determined from the reference signals provided by/in one or more TCI states specific to the CORESET.

For example, when/if one TCI state—e.g., denoted by a first TCI state or a second TCI state—is associated/specific with/to the CORESET, the UE 116 could assume that spatial domain filters for transmitting the PUSCH and DM-RS antenna ports for receiving the scheduling/activation PDCCH/DCI in the CORESET are determined from the reference signals provided by/in the first/second TCI state specific to the CORESET.

For another example, when/if two TCI states—e.g., denoted by a first TCI state and a second TCI state—are associated/specific with/to the CORESET, the UE 116 could assume that the spatial domain filters for transmitting the PUSCH are determined from/spatially related to the reference signals provided by/in the first, second or both of the first and second TCI states according to: (1) fixed rule(s) in system specification(s), e.g., always the first TCI state associated/specific with/to the CORESET, (2) network's configuration(s)/indication(s), e.g., via higher layer RRC signaling(s)/parameter(s) and/or MAC CE command(s) and/or dynamic DCI based L1 signaling(s), and/or (3) UE's autonomous decision/selection/determination, which could be further sent to the network 130, e.g., via/in CSI/beam report and/or UE's capability signaling(s).

In another example, when/if the UE 116 could expect that the SRS resource set indicator field (or the fourth indicator as specified herein in the present disclosure) for transmitting the PUSCH is (configured to be) present in the corresponding DCI format(s), e.g., in the CORESET (i.e., the SRS resource set indicator field, or equivalently the fourth indicator as specified herein in the present disclosure, for transmitting the PUSCH is present or corresponds to a 2-bit field in the corresponding DCI format(s), e.g., in the CORESET)—e.g., the UE 116 could report its capability of supporting the SRS resource set indicator field (or the fourth indicator as specified herein in the present disclosure) in the corresponding DCI format(s), e.g., in the CORESET, for transmitting the PUSCH and/or the UE 116 is provided/configured by the network 130 two SRS resource sets:

For example, the UE 116 could determine the spatial domain filter(s) for transmitting the PUSCH according to the SRS resource set indicator field (or the fourth indicator as specified herein in the present disclosure) provided in the corresponding DCI format(s), e.g., in the CORESET. For instance, when/if the codepoint of the SRS resource set indicator field/fourth indicator as specified herein in the present disclosure is set to '00', the UE 116 could apply the first indicated joint/UL TCI state(s) to transmit the PUSCH, or equivalently, the UE 116 could assume that a spatial domain filter for transmitting the PUSCH is determined from/spatially related to the reference signals provided in/by the first indicated joint/UL TCI state(s), when/if the codepoint of the SRS resource set indicator field/fourth indicator as specified herein in the present disclosure is set to '01', the UE 116 could apply the second indicated joint/UL TCI state(s) to transmit the PUSCH, or equivalently, the UE 116 could assume that a spatial domain filter for transmitting the PUSCH is determined from/spatially related to the reference signals provided in/by the second indicated joint/UL TCI state(s), and/or when/if the codepoint of the SRS resource set indicator field/fourth indicator as specified herein in the present disclosure is set to '10', the UE 116 could apply both the first and second indicated joint/UL TCI states to transmit the PUSCH, or equivalently, the UE 116 could assume that spatial domain filters for transmitting the PUSCH are determined from/spatially related to the reference signals provided in/by both the first and second indicated joint/UL TCI states.

For another example, the UE 116 could apply the QCL assumption(s) for receiving the scheduling/activation PDCCH/DCI in the CORESET to determine spatial domain filter(s) for transmitting the PUSCH, or equivalently, the UE 116 could assume that spatial domain filter(s) for transmitting the PUSCH are spatially related to the DM-RS antenna ports for receiving the scheduling/activation PDCCH/DCI in the CORESET, or equivalently, the UE 116 could assume that spatial domain filter(s) for transmitting the PUSCH and DM-RS antenna ports for receiving the scheduling/activation PDCCH/DCI in the CORESET are determined from the reference signals provided by/in one or more TCI states specific to the CORESET. In one example, when/if the codepoint of the SRS resource set indicator field/fourth indicator as specified herein in the present disclosure is set to '00', and/or when/if one TCI state—e.g., denoted by a first TCI state—is associated/specific with/to the CORESET, and/or when/if two TCI states—e.g., denoted by a first TCI state and a second TCI state—are associated/specific with/to the CORESET, the UE 116 could assume that spatial domain filters for transmitting the PUSCH are determined from/spatially related to the reference signals provided by/in the first TCI state specific to the CORESET. In another example, when/if the codepoint of the SRS resource set indicator field/fourth indicator as specified herein in the present disclosure is set to '01', and/or when/if one TCI state—e.g., denoted by a second TCI state—is associated/specific with/to the CORESET, and/or when/if two TCI states—e.g., denoted by a first TCI state and a second TCI state—are associated/specific with/to the CORESET, the UE 116 could assume that spatial domain filters for transmitting the PUSCH are determined from/spatially related to the reference signals provided by/in the second TCI state specific to the CORESET. In another example, when/if the codepoint of the SRS resource set indicator field/fourth indicator as specified herein in the present disclosure is set to '10': for example, when/if one TCI state—e.g., denoted by a first TCI state—is associated/specific with/to the CORESET, the UE 116 could assume that spatial domain filters for transmitting the PUSCH specific to the first indicated joint/UL TCI state(s) are determined from/spatially related to the reference signals provided by/in the first TCI state specific to the CORESET; for another example, when/if one TCI state—e.g., denoted by a second TCI state—is associated/specific with/to the CORESET, the UE 116 could assume that spatial domain filters for transmitting the PUSCH specific to the second indicated joint/UL TCI state(s) are determined from/spatially related to the reference signals provided by/in the second TCI state specific to the CORESET; for another example, when/if two TCI states—e.g., denoted by a first TCI state and a second TCI state—are associated/specific with/to the CORESET, the UE 116 could assume that the spatial domain filters for transmitting the PUSCH are determined from/spatially related to the reference signals provided by/in both of the first and second TCI states specific to the CORESET.

In one embodiment, if a UE is provided/configured with dl-OrJointTCI-StateList and/or ul-TCI-StateList, and is provided two coresetPoolIndex values 0 and 1 for first and second CORESETs, or is not provided coresetPoolIndex value for first CORESETs and is provided coresetPoolIndex value of 1 for second CORESETs, respectively, and is indicated a first TCI-State or TCI-UL-State for/specific to the first CORESETs and a second TCI-State or TCI-UL-State for/specific to the second CORESETs:

For a PDSCH scheduled/activated by a PDCCH/DCI in a first (or second) CORESET specific to value 0 (or 1) of coresetPoolIndex—the PDSCH could also be said to be specific to value 0 (or 1) of coresetPoolIndex, wherein the first (or second) CORESET could be one of: a CORESET with index 0, a CORESET other than a CORESET with index 0 and associated only with USS sets and/or Type3-PDCCH CSS sets, and a CORESET other than a CORESET with index 0 and associated at least with CSS sets other than Type3-PDCCH CSS sets, and the UE 116 may not be provided followUnifiedTCI-State or apply-IndicatedTCIState for the first (or second) CORESET and/or the UE 116 could be provided apply-IndicatedTCIState set to ‘none’ for the first (or second) CORESET, In one example, the UE 116 could apply the same QCL assumption(s) for receiving the scheduling/activation PDCCH/DCI in the first (or second) CORESET as specified herein in the present disclosure to receive the corresponding/associated PDSCH specific to value 0 (or 1) of coresetPoolIndex, or equivalently, the UE 116 could assume that DM-RS antenna ports for receiving the PDSCH specific to value 0 (or 1) of coresetPoolIndex are quasi co-located with the DM-RS antenna ports for receiving the scheduling/activation PDCCH/DCI in the first (or second) CORESET, or equivalently, the UE 116 could assume that DM-RS antenna ports for receiving the PDSCH and DM-RS antenna ports for receiving the scheduling/activation PDCCH/DCI in the first (or second) CORESET are quasi co-located with the reference signals provided by/in one or more TCI states specific to the first (or second) CORESET as specified herein in the present disclosure.

For example, when/if one TCI state—e.g., denoted by a first TCI state specific to value 0 of coresetPoolIndex—is associated/specific with/to the first CORESET, the UE 116 could assume that DM-RS antenna ports for receiving the PDSCH specific to value 0 of coresetPoolIndex and DM-RS antenna ports for receiving the scheduling/activation PDCCH/DCI in the first CORESET are quasi co-located with the reference signals provided by/in the first TCI state specific to the first CORESET/value 0 of coresetPoolIndex.

For another example, when/if one TCI state—e.g., denoted by a second TCI state specific to value 1 of coresetPoolIndex—is associated/specific with/to the second CORESET, the UE 116 could assume that DM-RS antenna ports for receiving the PDSCH specific to value 1 of coresetPoolIndex and DM-RS antenna ports for receiving the scheduling/activation PDCCH/DCI in the second CORESET are quasi co-located with the reference signals provided by/in the second TCI state specific to the second CORESET/value 1 of coresetPoolIndex.

For a PUSCH scheduled/activated by a PDCCH/DCI in a first (or second) CORESET specific to value 0 (or 1) of coresetPoolIndex—the PUSCH could also be said to be specific to value 0 (or 1) of coresetPoolIndex, wherein the first (or second) CORESET could be one of: a CORESET with index 0, a CORESET other than a CORESET with index 0 and associated only with USS sets and/or Type3-PDCCH CSS sets, and a CORESET other than a CORESET with index 0 and associated at least with CSS sets other than Type3-PDCCH CSS sets, and the UE 116 may not be provided followUnifiedTCI-State or apply-IndicatedTCIState for the first (or second) CORESET and/or the UE 116 could be provided apply-IndicatedTCIState set to ‘none’ for the first (or second) CORESET:

In one example, the UE 116 could apply the QCL assumption(s) for receiving the scheduling/activation PDCCH/DCI in the first (or second) CORESET as specified herein in the present disclosure to determine spatial domain filter(s) for transmitting the PUSCH specific to value 0 (or 1) of coresetPoolIndex, or equivalently, the UE 116 could assume that spatial domain filter(s) for transmitting the PUSCH specific to value 0 (or 1) of coresetPoolIndex are spatially related to the DM-RS antenna ports for receiving the scheduling/activation PDCCH/DCI in the first (or second) CORESET, or equivalently, the UE 116 could assume that spatial domain filter(s) for transmitting the PUSCH and DM-RS antenna ports for receiving the scheduling/activation PDCCH/DCI in the first (or second) CORESET are determined from the reference signals provided by/in one or more TCI states specific to the first (or second) CORESET as specified herein in the present disclosure.

For example, when/if one TCI state—e.g., denoted by a first TCI state specific to value 0 of coresetPoolIndex—is associated/specific with/to the first CORESET, the UE 116 could assume that spatial domain filter(s) for transmitting the PUSCH specific to value 0 of coresetPoolIndex and DM-RS antenna ports for receiving the scheduling/activation PDCCH/DCI in the first CORESET are determined from the reference signals provided by/in the first TCI state specific to the CORESET/value 0 of coresetPoolIndex.

For another example, when/if one TCI state—e.g., denoted by a second TCI state specific to value 1 of coresetPoolIndex—is associated/specific with/to the second CORESET, the UE 116 could assume that spatial domain filter(s) for transmitting the PUSCH specific to value 1 of coresetPoolIndex and DM-RS antenna ports for receiving the scheduling/activation PDCCH/DCI in the second CORESET are determined from the reference signals provided by/in the second TCI state specific to the CORESET/value 1 of coresetPoolIndex.

Throughout the present disclosure, a non-UE-dedicated reception of PDSCH or a non-UE-dedicated PDSCH could correspond a PDSCH or PDSCH reception other than a UE-dedicated reception of PDSCH or a UE-dedicated PDSCH, wherein a UE-dedicated PDSCH could be scheduled by dedicated PDCCH for the UE 116 and/or a non-UE-dedicated PDSCH could be scheduled by non-UE-dedicated PDCCH including the PDCCH(s) received in CORESET associated with CCS set other than Type-3 CCS set. Furthermore, for the described design examples herein, in the CA case, if the 'QCL-TypeD' of the PDSCH DM-RSs from respective CCs in a band are different in a slot, the QCL-TypeD assumption of the PDSCH DM-RS in the CC with lowest CC ID in the band is applied to all the PDSCH DM-RSs in the CCs in the band. For the described/specified design example(s) herein provided in the present disclosure, a/the first TCI state specific to the CORESET could correspond to a joint TCI state, a DL TCI state or a UL TCI state, and/or a/the second TCI state specific to the CORESET could correspond to a joint TCI state, a DL TCI state or a UL TCI state.

This disclosure evaluates various design aspects related to TCI state(s) indication, update, and application under unified TCI framework for single-TRP (STRP) and/or multi-TRP (MTRP) operation(s).

As specified in Rel-17, a unified TCI framework could indicate/include N≥1 DL TCI states and/or M≥1 UL TCI states, wherein the indicated TCI state could be at least one of:

- A DL TCI state and/or its corresponding/associated TCI state ID
- An UL TCI state and/or its corresponding/associated TCI state ID
- A joint DL and UL TCI state and/or its corresponding/associated TCI state ID
- Separate DL TCI state and UL TCI state and/or their corresponding/associated TCI state ID(s)

There could be various design options/channels to indicate to the UE 116 a beam (i.e., a TCI state) for the transmission/reception of a PDCCH or a PDSCH. As described in the 3GPP Rel-17,

- In one example, a MAC CE could be used to indicate to the UE 116 a beam (i.e., a TCI state and/or a TCI state ID) for the transmission/reception of a PDCCH or a PDSCH.
- In another example, a DCI could be used to indicate to the UE 116 a beam (i.e., a TCI state and/or a TCI state ID) for the transmission/reception of a PDCCH or a PDSCH
  - For example, a DL related DCI (e.g., DCI format 1_0, DCI format 1_1 or DCI format 1_2) could be used to indicate to the UE 116 a beam (i.e., a TCI state and/or a TCI state ID) for the transmission/reception of a PDCCH or a PDSCH, wherein the DL related DCI may or may not include a DL assignment.
  - For another example, an UL related DCI (e.g., DCI format 0_0, DCI format 0_1, DCI format 0_2) could be used to indicate to the UE 116 a beam (i.e., a TCI state and/or a TCI state ID) for the transmission/reception of a PDCCH or a PDSCH, wherein the UL related DCI may or may not include an UL scheduling grant.
  - Yet for another example, a custom/purpose designed DCI format could be used to indicate to the UE 116 a beam (i.e., a TCI state and/or a TCI state ID) for the transmission/reception of a PDCCH or a PDSCH.

Rel-17 introduced the unified TCI framework, where a unified or master or main TCI state is signaled to the UE 116. The unified or master or main TCI state can be one of:

- In case of joint TCI state indication, wherein a same beam is used for DL and UL channels, a joint TCI state that can be used at least for UE-dedicated DL channels and UE-dedicated UL channels.
- In case of separate TCI state indication, wherein different beams are used for DL and UL channels, a DL TCI state can be used at least for UE-dedicated DL channels.
- In case of separate TCI state indication, wherein different beams are used for DL and UL channels, a UL TCI state can be used at least for UE-dedicated UL channels.

The unified (master or main) TCI state is TCI state of UE-dedicated reception on PDSCH/physical downlink control channel (PDCCH) or dynamic-grant/configured-grant based PUSCH and all of dedicated PUCCH resources.

In a single-TRP system, a UE could be indicated/provided/configured by the network 130, e.g., via a beam indication/activation MAC CE or a DCI (e.g., via one or more TCI codepoints of one or more TCI fields in the corresponding DCI 1_1/1_2 with or without DL assignment), a TCI state/pair of TCI states for at least UE-dedicated reception on PDSCH/PDCCH or dynamic-grant/configured-grant based PUSCH or all of dedicated PUCCH resources, wherein a TCI state could be a joint DL and UL TCI state or a separate DL TCI state provided by TCI-State/DLorJointTCI-State, or a separate UL TCI state provided by TCI-State/UL-TCIState, and a pair of TCI states could include/contain a separate DL TCI state provided by TCI-State/DLorJointTCI-State or a separate UL TCI State provided by TCI-State/UL-TCIState under the unified TCI framework.

In a (single-DCI based) multi-TRP system, a UE could be indicated/provided/configured by the network 130, e.g., via a beam indication/activation MAC CE or a DCI (e.g., via one or more TCI codepoints of one or more TCI fields in the corresponding DCI 1_1/1_2 with or without DL assignment), a set of one or more (e.g., N>1) TCI states/pairs of TCI states for at least UE-dedicated reception on PDSCH/PDCCH or dynamic-grant/configured-grant based PUSCH or all of dedicated PUCCH resources, wherein a TCI state could be a joint DL and UL TCI state or a separate DL TCI state provided by TCI-State/DLorJointTCI-State, or a separate UL TCI state provided by TCI-State/UL-TCIState, and a pair of TCI states could include/contain a separate DL TCI state provided by TCI-State/DLorJointTCI-State or a separate UL TCI State provided by TCI-State/UL-TCIState under the unified TCI framework.

For PDCCH reception or PDCCH candidate monitoring in a (single-DCI based) multi-TRP system, a UE could be configured/provided/indicated by the network 130 via higher layer RRC signaling/parameter and/or MAC CE command and/or dynamic DCI based L1 signaling—e.g., in higher layer RRC signaling/parameter ControlResourceSet that configures a CORESET-a first indicator to indicate which one or more of the set of TCI states/pairs of TCI states indicated, e.g., by a TCI codepoint, in a beam indication DCI or MAC CE as specified herein in the present disclosure, to use/apply for receiving/monitoring the PDCCH(s)/PDCCH candidate(s) in the corresponding CORESET. For instance, for N=2 (i.e., a set of two TCI states/pairs of TCI states are indicated), the first indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate(s) in the corresponding CORESET. '01' indicates that the second TCI state(s) among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate(s) in the corresponding CORESET. '10' indicates that the first and second TCI states among the set of TCI states/pairs of TCI states indicated, e.g., by a TCI codepoint, in a beam indication DCI or MAC CE as specified herein in the present disclosure, could be respectively used/applied for receiving/monitoring the PDCCH(s)/PDCCH candidate(s)—e.g., first and second PDCCH candidates—in the corresponding CORESET(s). '11' indicates that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for receiving/monitoring the PDCCH(s)/PDCCH candidate(s)—e.g., first and second PDCCH candidates—in the corresponding CORESET(s), wherein the first and second PDCCH candidates could be received in search space sets that are higher layer linked via SearchSpaceLinking and/or the first and second PDCCH candidates carry the same/identical DCI payload. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

For PDSCH reception in a (single-DCI based) multi-TRP system, a UE could be configured/provided/indicated by the network 130 via higher layer RRC signaling/parameter and/or MAC CE command and/or dynamic DCI based L1 signaling—e.g., in a DL DCI (e.g., DCI format 1_0/1_1/1_2) that schedules the PDSCH—a second indicator to indicate which one or more of the set of TCI states/pairs of TCI states indicated, e.g., by a TCI codepoint, in a beam indication DCI or MAC CE as specified herein in the present disclosure, to use/apply for receiving the PDSCH(s). For instance, for N=2 (i.e., a set of two TCI states/pairs of TCI states are indicated), the second indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH. '01' indicates that the second TCI state(s) among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH. '10' indicates that the first and second TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH. '11' indicates that the second and first TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH, wherein the first and second PDSCHs could correspond to two PDSCH transmission occasions or repetition in space, time and/or frequency. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

For PUCCH transmission in a (single-DCI based) multi-TRP system, a UE could be configured/provided/indicated by the network 130 via higher layer RRC signaling/parameter and/or MAC CE command and/or dynamic DCI based L1 signaling—e.g., in higher layer RRC signaling/parameter PUCCH-Config that configures PUCCH(s)/PUCCH resource(s)—a third indicator to indicate which one or more of the set of TCI states/pairs of TCI states indicated, e.g., by a TCI codepoint, in a beam indication DCI or MAC CE as specified herein in the present disclosure, to use/apply for transmitting the PUCCH(s)/PUCCH resource(s). For instance, for N=2 (i.e., a set of two TCI states/pairs of TCI states are indicated), the third indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for transmitting the PUCCH(s)/PUCCH resource(s). '01' indicates that the second TCI state(s) among the set of TCI states/pairs of TCI states indicated, e.g., by a TCI codepoint, in a beam indication DCI or MAC CE as specified herein in the present disclosure, could be used/applied for transmitting the PUCCH(s)/PUCCH resource(s). '10' indicates that the first and second TCI states among the set of TCI states/pairs of TCI states indicated, e.g., by a TCI codepoint, in a beam indication DCI or MAC CE as specified herein in the present disclosure, could be respectively used/applied for transmitting the PUCCH(s)/PUCCH resource(s)—e.g., first PUCCH/PUCCH resource and second PUCCH/PUCCH resource. '11' indicates that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for transmitting the PUCCH(s)/PUCCH resource(s)—e.g., first PUCCH/PUCCH resource and second PUCCH/PUCCH resource, wherein the first and second PUCCHs/PUCCH resources could correspond to two PUCCH transmission occasions or repetitions in space, time and/or frequency. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

For PUSCH transmission in a (single-DCI based) multi-TRP system, a UE could be configured/provided/indicated by the network 130 via higher layer RRC signaling/parameter and/or MAC CE command and/or dynamic DCI based L1 signaling—e.g., in an UL DCI (e.g., DCI format 0_0/0_1/0_2) that schedules the PUSCH-a fourth indicator to indicate which one or more of the set of TCI states/pairs of TCI states indicated, e.g., by a TCI codepoint, in a beam indication DCI or MAC CE as specified herein in the present disclosure, to use/apply for transmitting the PUSCH(s). For instance, for N=2 (i.e., a set of two TCI states/pairs of TCI states are indicated), the fourth indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH. '01' indicates that the second TCI state(s) among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH. '10' indicates that the first and second TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs—e.g., scheduled by the UL DCI/PDCCH. '11' indicates that the second and first TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs—e.g., scheduled by the UL DCI/PDCCH, wherein the first and second PUSCHs could correspond to two PUSCH transmission occasions or repetition in space, time and/or frequency. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

Throughout the present disclosure, the first TCI state(s) described herein in the present disclosure can also be denoted/represented/replaced by a/the first applicable TCI state(s), and/or the second TCI state(s) described herein in the present disclosure can also be denoted/represented/replaced by a/the second applicable TCI state(s). Throughout the present disclosure, unless otherwise specified, a TCI state could correspond a joint TCI state, a DL TCI state, an UL TCI state, or a pair of two TCI states each corresponding to a joint TCI state or a DL TCI state or an UL TCI state. Throughout the present disclosure, unless otherwise specified, a joint/DL TCI state could be provided by TCI-State or DLorJointTCI-State, and an UL TCI state could be provided UL-TCIState.

In a (multi-DCI based) multi-TRP system, a UE could be indicated/provided/configured by the network 130, e.g., in PDCCH-Config, two values (i.e., 0 and 1) of CORESET pool index (denoted by CORESETPoolIndex), wherein each CORESET could be configured with a value of CORESETPoolIndex. Furthermore, a UE could be indicated/provided/configured by the network 130, e.g., via a beam indication/activation MAC CE or a DCI (e.g., via one or more TCI codepoints of one or more TCI fields in the corresponding DCI format 1_1/1_2 with or without DL assignment) associated to a CORESET pool index value (e.g., 0 or 1), one or more TCI states/pairs of TCI states for the same (or different) CORESET pool index value, wherein a TCI state could be a joint DL and UL TCI state or a separate DL TCI state provided by TCI-State/DLorJointTCI-State or a separate UL TCI state provided by TCI-State/UL-TCIState indicated for channels/signals such as PDCCH, PDSCH, PUCCH and PUSCH associated to the same (or different) CORESET pool index value, and a pair of TCI states could include/contain a separate DL TCI state provided by TCI-State/DLorJointTCI-State or a separate UL TCI State provided by TCI-State/UL-TCIState indicated for channels/signals such as PDCCH, PDSCH, PUCCH and PUSCH associated to the same (or different) CORESET pool index value under the unified TCI framework.

A UE could be configured/provided/indicated, e.g., via higher layer RRC signaling and/or MAC CE command and/or dynamic DCI based L1 signaling, M≥1 or N≥1 (e.g., M=2 or N=2) groups/lists of TCI states or TCI state IDs with each group/list comprising/containing/including one or more TCI states or TCI state IDs. The bitwidth of the TCI state ID in each group/list could be determined according to the total number of TCI states/TCI state IDs in the corresponding group/list. Alternatively, the bitwidth of the TCI state ID in each group/list could be determined according to the total number of TCI states/TCI state IDs across all the configured groups/lists. Furthermore, the TCI state ID(s) in different groups/lists may not overlap—i.e., different groups/lists may not comprise/include/contain the same TCI state(s) or TCI state ID(s). Additionally, each group/list of TCI states or TCI state IDs could be configured with a (unique) TCI state group/list ID.

For example, an entity index/ID could be provided in the higher layer parameter, e.g., TCI-State or DLorJointTCI-State or UL-TCIState, that configures a joint/DL/UL TCI state as specified herein in the present disclosure. The UE 116 could determine/identify one or more TCI states/TCI state IDs in a (same) group of TCI states/TCI state IDs when/if the entity index(es)/ID(s) provided/configured in the higher layer parameter(s) that configures the one or more TCI states/TCI state IDs—as specified herein in the present disclosure—is the same or identical. In the present disclosure, the entity index/ID could correspond to at least one of: a PCI value, a PCI index pointing to an entry/PCI in a list of PCI that are higher layer configured to the UE 116, a value of CORESETPoolIndex, a value of CORESETGroupIndex, a one-bit flag indicator, a TRP ID, a TRP-specific higher layer signaling index, a CORESET ID, a resource ID/index, a resource set ID/index, etc. For instance, for M=2 or N=2, the entity index/ID could be a one-bit flag indicator; when/if the entity index/ID associated to a TCI state (e.g., by configuring/providing the entity ID in the higher layer parameter TCI-State that configures the TCI state) is set to '0' (or '1'), the UE 116 could determine/identify that the TCI state/TCI state ID belongs to the first group of TCI states/TCI state IDs. When/if the entity index/ID associated to a TCI state (e.g., by configuring/providing the entity ID in the higher layer parameter TCI-State that configures the TCI state) is set to '1' (or '0'), the UE 116 could determine/identify that the TCI state/TCI state ID belongs to the second group of TCI states/TCI state IDs. According to the design procedures described herein in the present disclosure, the UE 116 could determine/identify a first group of joint/DL TCI states and/or a second group of joint/DL TCI states, e.g., in the higher layer configuration of dl-OrJoint-TCIStateList. Furthermore, the UE 116 could determine/identify a first group of UL TCI states and/or a second group of UL TCI states, e.g., in the higher layer configuration of dl-OrJoint-TCIStateList or ul-TCIStateList.

For another example, for N=2 or M=2, the UE 116 could be first provided/configured/indicated by the network 130, e.g., via higher layer RRC signaling/parameter, a list of joint/DL (or UL) TCI states. In the higher layer RRC signaling/parameter that configures/provides the list of joint/DL (or UL) TCI states, the UE 116 could be further configured/provided/indicated by the network 130 the number of TCI states/TCI state IDs (e.g., denoted by Ngroup1) of the first group of TCI states/TCI state IDs in the list and/or the number of TCI states/TCI state IDs (e.g., denoted by Ngroup2) of the second group of TCI states/TCI state IDs in the list. For this design example, the UE 116 could identify/determine that the first Ngroup1 TCI states/TCI state IDs in the list of joint/DL (or UL) TCI states belong to the first group of TCI states/TCI state IDs and the rest (or last Ngroup2) TCI states/TCI state IDs in the list of joint/DL (or UL) TCI states belong to the second group of TCI states/TCI state IDs. Alternatively, the UE 116 could identify/determine that the last Ngroup2 TCI states/TCI state IDs in the list of joint/DL (or UL) TCI states belong to the second group of TCI states/TCI state IDs and the rest (or first Ngroup1) TCI states/TCI state IDs in the list of joint/DL (or UL) TCI states belong to the first group of TCI states/TCI state IDs. According to the design procedures described herein in the present disclosure, the UE 116 could determine/identify a first group of joint/DL TCI states and/or a second group of joint/DL TCI states, e.g., in the higher layer configuration of dl-OrJoint-TCIStateList. Furthermore, the UE 116 could determine/identify a first group of UL TCI states and/or a second group of UL TCI states, e.g., in the higher layer configuration of dl-OrJoint-TCIStateList or ul-TCIStateList. The described UE operations/behaviors herein could be extended/applied to when N>2 (or M>2) groups of TCI states/TCI state IDs are configured.

Yet for another example, for N=2 or M=2, the UE 116 could be first provided/configured/indicated by the network 130, e.g., via higher layer RRC signaling/parameter, a list of joint/DL (or UL) TCI states. In the higher layer RRC signaling/parameter that configures/provides the list of joint/DL (or UL) TCI states, the UE 116 could be further configured/provided/indicated by the network 130 the TCI state indexes/IDs or indexes of the TCI state indexes/IDs of the first group of TCI states/TCI state IDs in the list and/or the TCI state indexes/IDs or indexes of the TCI state indexes/IDs of the second group of TCI states/TCI state IDs in the list. According to the design procedures described herein in the present disclosure, the UE 116 could determine/identify a first group of joint/DL TCI states and/or a second group of joint/DL TCI states, e.g., in the higher layer configuration of dl-OrJoint-TCIStateList. Furthermore, the UE 116 could determine/identify a first group of UL TCI states and/or a second group of UL TCI states, e.g., in the higher layer configuration of dl-OrJoint-TCIStateList or ul-TCIStateList. The described UE operations/behaviors herein could be extended/applied to when N>2 (or M>2) groups of TCI states/TCI state IDs are configured.

As specified herein in the present disclosure, a UE could be configured/provided/indicated by the network 130, e.g., via higher layer RRC signaling/parameter (via/in dl-OrJoint-TCIStateList or ul-TCIStateList) and/or MAC CE command and/or dynamic DCI based L1 signaling, configuration-1: a single list/group of TCI state(s) or TCI state ID(s), and configuration-2: multiple lists/groups of TCI states or TCI state IDs. the UE 116 could be configured/provided/indicated by the network 130, e.g., via higher layer RRC signaling/parameter and/or MAC CE command and/or dynamic DCI based L1 signaling, whether the UE 116 could use/apply the configuration-1 and/or configuration-2. When/if the configuration-1 as specified herein in the present disclosure is used/applied/configured, the UE 116 could operate in a STRP mode; and/or when/if the configuration-2 as specified herein in the present disclosure is used/applied/configured, the UE 116 could operation in a (SDCI based) MTRP mode. Furthermore, the UE 116 could report to the network 130 a capability signaling indicating that whether the UE 116 could be capable of supporting configuration-1 and/or configuration-2 as specified herein in the present disclosure. For example, the capability signaling/report could indicate that the UE 116 could not support configuration-2, or equivalently, the UE 116 could only support configuration-1. For another example, the capability signaling/report could indicate that the UE 116 could support configuration-1 and/or configuration-2 as specified herein in the present disclosure. The UE 116 could then be provided/configured/indicated by the network 130, e.g., via higher layer RRC signaling/parameter and/or MAC CE command and/or dynamic DCI based L1 signaling, the configuration-1 and/or configuration-2 based on the capability signaling/report from the UE 116.

As specified herein in the present disclosure, in a STRP system or for STRP operation in/on a carrier or a component carrier (CC) or a set/list/pool/group of CCs, a UE could be indicated or could apply/use only a single TCI state/pair of TCI states for at least UE-dedicated reception on PDSCH/PDCCH or dynamic-grant/configured-grant based PUSCH or all of dedicated PUCCH resources, wherein a TCI state could be a joint DL and UL TCI state or a separate DL TCI state provided by TCI-State/DLorJointTCI-State, or a separate UL TCI state provided by TCI-State/UL-TCIState, and a pair of TCI states could include/contain a separate DL TCI state provided by TCI-State/DLorJointTCI-State or a separate UL TCI State provided by TCI-State/UL-TCIState, under the unified TCI framework, when/if one or more of the following conditions are achieved:

The UE 116 could receive from the network 130 a beam indication/activation MAC CE, e.g., unified TCI state activation/deactivation MAC CE, wherein the (unified) TCI states activated/provided/indicated in the MAC CE could be used to map up to Ncp (e.g., Ncp=8) TCI codepoints of one or more TCI fields in a beam indication DCI; here, each of the TCI codepoints could include or comprise or could be mapped to a single joint/DL/UL TCI state/pair of joint/DL/UL TCI states.

The UE 116 could receive from the network 130 a beam indication/activation MAC CE, e.g., unified TCI state activation/deactivation MAC CE, wherein the (unified) TCI states activated/provided/indicated in the MAC CE could be used to map up to Ncp (e.g., Ncp=8) TCI codepoints of one or more TCI fields in a beam indication DCI; here, at least one of the TCI codepoints could include or comprise or could be mapped to a single joint/DL/UL TCI state/pair of joint/DL/UL TCI states. The one of the TCI codepoints that includes/comprises or is mapped to a single joint/DL/UL TCI state/pair of joint/DL/UL TCI states could be determined according to: (i) fixed in the system specifications, e.g., the first/last TCI codepoint or the lowest/ highest TCI codepoint (the index of the TCI codepoint is the lowest/highest) among all the TCI codepoints activated by/in the beam indication/activation MAC CE, and/or (2) provided/configured/indicated by the network 130, e.g., via higher layer RRC signaling/parameter and/or MAC CE command and/or dynamic DCI based L1 signaling, and/or (3) the only TCI codepoint in the beam indication/activation MAC CE that comprises a single joint/DL/UL TCI state/pair of joint/DL/UL TCI states.

The UE 116 could receive from the network 130 a beam indication/activation MAC CE, e.g., unified TCI state activation/deactivation MAC CE, wherein the (unified) TCI states activated/provided/indicated in the MAC CE could be used to map up to Ncp (e.g., Ncp=8) TCI codepoints of one or more TCI fields in a beam indication DCI; here, a TCI codepoint could include or comprise or could be mapped to one or more joint/DL/UL TCI states/pairs of joint/DL/UL TCI states. When a TCI codepoint includes/comprises or is mapped to N>1 (e.g., N=2) joint/DL/UL TCI states/pairs of joint/DL/UL TCI states, the N joint/DL/UL TCI states could be the same/identical, i.e., they could correspond to a same TCI state or TCI state ID, or the N pairs of joint/DL/UL TCI states could be the same/identical, i.e., they could correspond to a same pair of TCI states or pair of TCI state IDs.

The UE 116 could receive from the network 130 a beam indication/activation MAC CE, e.g., unified TCI state activation/deactivation MAC CE, wherein the (unified) TCI states activated/provided/indicated in the MAC CE could be used to map up to Ncp (e.g., Ncp=8) TCI codepoints of one or more TCI fields in a beam indication DCI; here, a TCI codepoint could include or comprise or could be mapped to one or more TCI states/pairs of TCI states. Each TCI state(s)/pair(s) of TCI states in the MAC CE may or may not be associated with an indicator, wherein the indicator (if present/associated to the TCI state(s)/pair(s) of TCI states) could indicate whether the TCI state(s)/pair(s) of TCI states could correspond to the first TCI state/pair of TCI states, the second TCI state/pair of TCI states, and/or etc., among all the TCI states/pairs of TCI states mapped to the same TCI codepoint comprising the TCI state(s)/pair(s) of TCI state(s) activated by/in the MAC CE; furthermore, the indicator (if present/associated to the TCI state(s)/pair(s) of TCI states) could also indicate whether the TCI state(s)/pair(s) of TCI states could be from a first group/list of TCI states/TCI state IDs or a second group/list of TCI states/TCI state IDs. When a TCI codepoint includes/comprises or is mapped to N>1 (e.g., N=2) joint/DL/UL TCI states/pairs of joint/DL/UL TCI states, the N joint/DL/UL TCI states could be the same/identical, i.e., they could correspond to a same TCI state or TCI state ID, or the N pairs of joint/DL/UL TCI states could be the same/identical, i.e., they could correspond to a same pair of TCI states or pair of TCI state IDs.

The UE 116 could receive from the network 130 at least one Rel-18 (enhanced) unified TCI state activation/deactivation MAC CE command that deactivates all of the TCI states/TCI codepoints for MTRP operation.

The UE 116 could receive from the network 130 at least one Rel-17 unified TCI state activation/deactivation MAC CE command that activates one or more TCI states/TCI codepoints for STRP operation.

The UE 116 could be configured by the network 130, e.g., via higher layer RRC signaling, a single list of joint/DL TCI states and/or a single list of UL TCI states.

The UE 116 could be configured by the network 130, e.g., via higher layer RRC signaling, a single group of joint/DL TCI states (e.g., within a list of RRC configured joint/DL TCI states) and/or a single group of UL TCI states (e.g., within a list of RRC configured UL TCI states).

The UE 116 could be configured/indicated/provided by the network 130, e.g., via higher layer RRC signaling and/or MAC CE command and/or dynamic DCI based L1 signaling, that the STRP operation under the unified TCI framework is enabled. For instance, an indicator could be indicated/provided in a MAC CE command, e.g., the (enhanced) unified TCI states activation/deactivation MAC CE command, to indicate a switch between the (SDCI based) MTRP operation and the STRP operation. For this case, when/if the indicator is a one-bit indicator and set to ‘0’ (or ‘1’), the STRP operation is enabled (or the operation mode is switched from the (SDCI based) MTRP operation to the STRP operation).

The first indicator as specified herein in the present disclosure could be configured/set to a particular value (such as ‘00’ or ‘01’ as specified herein in the present disclosure) indicating that one of the (two) TCI states/pairs of TCI states—e.g., the first TCI state(s) or the second TCI state(s)—could be applied for PDCCH reception.

The second indicator as specified herein in the present disclosure could be configured/set to a particular value (such as ‘00’ or ‘01’ as specified herein in the present disclosure) indicating that one of the (two) TCI states/pairs of TCI states—e.g., the first TCI state(s) or the second TCI state(s)—could be applied for PDSCH reception.

The third indicator as specified herein in the present disclosure could be configured/set to a particular value (such as ‘00’ or ‘01’ as specified herein in the present disclosure) indicating that only one of the (two) TCI states/pairs of TCI states—e.g., the first TCI state(s) or the second TCI state(s)—could be applied for PUCCH transmission.

The fourth indicator—e.g., by repurposing the SRS resource set indicator in DCI format 0_1/0_2—as specified herein in the present disclosure could be configured/set to a particular value (such as ‘00’ or ‘01’ as specified herein in the present disclosure) indicating that only one of the (two) TCI states/pairs of TCI states—e.g., the first TCI state(s) or the second TCI state(s)—could be applied for PUSCH transmission.

The UE 116 could be provided/configured/indicated by the network 130, e.g., via higher layer RRC signaling, a presence or absence of the first indicator as specified herein in the present disclosure in the corresponding DCI format.

The UE 116 could be provided/configured/indicated by the network 130, e.g., via higher layer RRC signaling, whether or not the SRS resource set indicator in the DCI format 0_1/0_2 is used as the fourth indicator as specified herein in the present disclosure in the corresponding DCI format.

The UE 116 could be indicated, e.g., in/via time-domain resource allocation (TDRA) field in DCI, only the entry(s) in pdsch-TimeDomainAllocationList containing no repetitionNumber.

The UE 116 may not be configured with the higher layer parameter repetitionNumber or the UE 116 may not be configured by the higher layer parameter repetitionScheme set to 'tdmSchemeA', 'fdmSchemeA', 'fdmSchemeB'.

The UE 116 may not be indicated DM-RS port(s) within two code division multiplexing (CDM) groups in the DCI field 'Antenna Port(s)', or the UE 116 could be indicated DM-RS port(s) within a single CDM group in the DCI field 'Antenna Port(s)'.

The UE 116 may not be configured with the higher layer parameter sfnSchemePdsch set to either 'sfnSchemeA'0 or 'sfnSchemeB' for a DL BWP.

The UE 116 may not be configured with the higher layer parameter sfnSchemePdcch.

As specified herein in the present disclosure, in a (SDCI based) MTRP system or for (SDCI based) MTRP operation in/on a carrier or a component carrier (CC) or a list/set/pool/group of CCs, a UE could be indicated or could apply/use one or more (e.g., N>1) TCI states/pairs of TCI states for at least UE-dedicated reception on PDSCH/PDCCH or dynamic-grant/configured-grant based PUSCH or all of dedicated PUCCH resources, wherein a TCI state could be a joint DL and UL TCI state or a separate DL TCI state provided by TCI-State/DLorJointTCI-State, or a separate UL TCI state provided by TCI-State/UL-TCIState, and a pair of TCI states could include/contain a separate DL TCI state provided by TCI-State/DLorJointTCI-State or a separate UL TCI State provided by TCI-State/UL-TCIState, under the unified TCI framework, when/if one or more of the following conditions are achieved:

The UE 116 could receive from the network 130 a beam indication/activation MAC CE, e.g., unified TCI state activation/deactivation MAC CE, wherein the (unified) TCI states activated/provided/indicated in the MAC CE could be used to map up to Ncp (e.g., Ncp=8) TCI codepoints of one or more TCI fields in a beam indication DCI; here, each of the TCI codepoints could include or comprise or could be mapped to N>1 (e.g., N=2) joint/DL/UL TCI states/pairs of joint/DL/UL TCI states. The N joint/DL/UL TCI states could be different from each other, i.e., they could correspond to different TCI states or TCI state IDs, or the N pairs of joint/DL/UL TCI states could be different from each other, i.e., they could correspond to different pairs of TCI states or pairs of TCI state IDs.

The UE 116 could receive from the network 130 a beam indication/activation MAC CE, e.g., unified TCI state activation/deactivation MAC CE, wherein the (unified) TCI states activated/provided/indicated in the MAC CE could be used to map up to Ncp (e.g., Ncp=8) TCI codepoints of one or more TCI fields in a beam indication DCI; here, at least one of the TCI codepoints could include or comprise or could be mapped to N>1 (e.g., N=2) joint/DL/UL TCI states/pairs of joint/DL/UL TCI states. The one of the TCI codepoints that includes/comprises or is mapped to N>1 (e.g., N=2) joint/DL/UL TCI states/pairs of joint/DL/UL TCI states could be determined according to: (i) fixed in the system specifications, e.g., the first/last TCI codepoint or the lowest/highest TCI codepoint (the index of the TCI codepoint is the lowest/highest) among all the TCI codepoints activated by/in the beam indication/activation MAC CE, and/or (2) provided/configured/indicated by the network 130, e.g., via higher layer RRC signaling/parameter and/or MAC CE command and/or dynamic DCI based L1 signaling, and/or (3) the only TCI codepoint in the beam indication/activation MAC CE that comprises N>1 (e.g., N=2) joint/DL/UL TCI states/pairs of joint/DL/UL TCI states. The N joint/DL/UL TCI states could be different from each other, i.e., they could correspond to different TCI states or TCI state IDs, or the N pairs of joint/DL/UL TCI states could be different from each other, i.e., they could correspond to different pairs of TCI states or pairs of TCI state IDs.

The UE 116 could receive from the network 130 a beam indication/activation MAC CE, e.g., unified TCI state activation/deactivation MAC CE, wherein the (unified) TCI states activated/provided/indicated in the MAC CE could be used to map up to Ncp (e.g., Ncp=8) TCI codepoints of one or more TCI fields in a beam indication DCI; here, a TCI codepoint could include or comprise or could be mapped to one or more TCI states/pairs of TCI states. Each TCI state(s)/pair(s) of TCI states in the MAC CE may or may not be associated with an indicator, wherein the indicator (if present/associated to the TCI state(s)/pair(s) of TCI states) could indicate whether the TCI state(s)/pair(s) of TCI states could correspond to the first TCI state/pair of TCI states, the second TCI state/pair of TCI states, and/or etc., among all the TCI states/pairs of TCI states mapped to the same TCI codepoint comprising the TCI state(s)/pair(s) of TCI state(s) activated by/in the MAC CE; furthermore, the indicator (if present/associated to the TCI state(s)/pair(s) of TCI states) could also indicate whether the TCI state(s)/pair(s) of TCI states could be from a first group/list of TCI states/TCI state IDs or a second group/list of TCI states/TCI state IDs. When a TCI codepoint includes/comprises or is mapped to N>1 (e.g., N=2) joint/DL/UL TCI states/pairs of TCI states, the N joint/DL/UL TCI states could be different from each other, i.e., they could correspond to different TCI states or TCI state IDs, or the N pairs of joint/DL/UL TCI states could be different from each other, i.e., they could correspond to different pairs of TCI states or pairs of TCI state IDs.

The UE 116 could receive from the network 130 at least one Rel-18 (enhanced) unified TCI state activation/deactivation MAC CE command that activates one or more TCI states/TCI codepoints for MTRP operation.

The UE 116 could receive from the network 130 at least one Rel-17 unified TCI state activation/deactivation MAC CE command that deactivates all of the TCI states/pairs of TCI states for STRP operation.

The UE 116 could be configured by the network 130, e.g., via higher layer RRC signaling, one or more lists of joint/DL TCI states and/or one or more lists of UL TCI states. For instance, for M=2 or N=2, the UE 116 could be configured by the network 130, e.g., via higher layer RRC signaling, a first and a second lists of joint/DL TCI states and/or a first and a second lists of UL TCI states.

The UE 116 could be configured by the network 130, e.g., via higher layer RRC signaling, one or more groups of joint/DL TCI states (e.g., within a list of RRC configured joint/DL TCI states) and/or one or more groups of UL TCI states (e.g., within a list of RRC configured UL TCI states). For instance, for M=2 or N=2, the UE 116 could be configured by the network 130, e.g., via higher layer RRC signaling, a first and a second groups of joint/DL TCI states (e.g., within a list of RRC configured joint/DL TCI states) and/or a first and a second groups of UL TCI states (e.g., within a list of RRC configured UL TCI states).

The UE 116 could be configured/indicated/provided by the network 130, e.g., via higher layer RRC signaling and/or MAC CE command and/or dynamic DCI based L1 signaling, that the (SDCI based) MTRP operation under the unified TCI framework is enabled. For instance, an indicator could be indicated/provided in a MAC CE command, e.g., the (enhanced) unified TCI states activation/deactivation MAC CE command, to indicate a switch between the STRP operation and the (SDCI based) MTRP operation. For this case, when/if the indicator is a one-bit indicator and set to '1' (or '0'), the (SDCI based) MTRP operation is enabled (or the operation mode is switched from the STRP operation to the (SDCI based) MTRP operation).

The first indicator as specified herein in the present disclosure could be configured/set to a particular value (such as '00' or '01' as specified herein in the present disclosure) indicating that one of the (two) TCI states/pairs of TCI states—e.g., the first TCI state(s) or the second TCI state(s)—could be applied for PDCCH reception.

The first indicator as specified herein in the present disclosure could be configured/set to a particular value (such as '10' or '11' as specified herein in the present disclosure) indicating that both of the (two) TCI states/pairs of TCI states—e.g., the first TCI state(s) and the second TCI state(s)—could be applied for PDCCH reception.

The second indicator as specified herein in the present disclosure could be configured/set to a particular value (such as '00' or '01' as specified herein in the present disclosure) indicating that one of the (two) TCI states/pairs of TCI states—e.g., the first TCI state(s) or the second TCI state(s)—could be applied for PDSCH reception.

The second indicator as specified herein in the present disclosure could be configured/set to a particular value (such as '10' or '11' as specified herein in the present disclosure) indicating that both of the (two) TCI states/pairs of TCI states—e.g., the first TCI state(s) and the second TCI state(s)—could be applied for PDSCH reception.

The third indicator as specified herein in the present disclosure could be configured/set to a particular value (such as '00' or '01' as specified herein in the present disclosure) indicating that only one of the (two) TCI states/pairs of TCI states—e.g., the first TCI state(s) or the second TCI state(s)—could be applied for PUCCH transmission.

The third indicator as specified herein in the present disclosure could be configured/set to a particular value (such as '10' or '11' as specified herein in the present disclosure) indicating that both of the (two) TCI states/pairs of TCI states—e.g., the first TCI state(s) and the second TCI state(s)—could be applied for PUCCH transmission.

The fourth indicator—e.g., by repurposing the SRS resource set indicator in DCI format 0_1/0_2—as specified herein in the present disclosure could be configured/set to a particular value (such as '00' or '01' as specified herein in the present disclosure) indicating that only one of the (two) TCI states/pairs of TCI states—e.g., the first TCI state(s) or the second TCI state(s)—could be applied for PUSCH transmission.

The fourth indicator—e.g., by repurposing the SRS resource set indicator in DCI format 0_1/0_2—as specified herein in the present disclosure could be configured/set to a particular value (such as '10' or '11' as specified herein in the present disclosure) indicating that both of the (two) TCI states/pairs of TCI states—e.g., the first TCI state(s) and the second TCI state(s)—could be applied for PUSCH transmission.

The UE 116 could be provided/configured/indicated by the network 130, e.g., via higher layer RRC signaling, a presence or absence of the first indicator as specified herein in the present disclosure in the corresponding DCI format.

The UE 116 could be provided/configured/indicated by the network 130, e.g., via higher layer RRC signaling, whether or not the SRS resource set indicator in the DCI format 0_1/0_2 is used as the fourth indicator as specified herein in the present disclosure in the corresponding DCI format.

The UE 116 could be indicated, e.g., in/via time-domain resource allocation (TDRA) field by DCI, at least one entry in pdsch-TimeDomainAllocationList containing repetitionNumber (e.g., >1).

The UE 116 could be indicated, e.g., in/via time-domain resource allocation (TDRA) field by DCI, one entry in pdsch-TimeDomainAllocationList containing no repetitionNumber, but at least one entry in pdsch-TimeDomainAllocationList containing repetitionNumber (e.g., >1).

The UE 116 could be indicated, e.g., in/via time-domain resource allocation (TDRA) field in DCI, only the entry(s) in pdsch-TimeDomainAllocationList containing no repetitionNumber.

The UE 116 could be configured with the higher layer parameter repetitionNumber or the UE 116 could be configured by the higher layer parameter repetitionScheme set to 'tdmSchemeA', 'fdmSchemeA', 'fdmSchemeB'.

The UE 116 could be indicated DM-RS port(s) within two CDM groups in the DCI field 'Antenna Port(s)'.

The UE 116 could be configured with the higher layer parameter sfnSchemePdsch set to either 'sfnSchemeA'0 or 'sfnSchemeB' for a DL BWP.

The UE 116 could be configured with the higher layer parameter sfnSchemePdcch.

As specified herein in the present disclosure, in a (MDCI based) MTRP system or for (MDCI based) MTRP operation in/on a carrier or a component carrier (CC) or a list/set/pool/group of CCs, the UE 116 could be provided/configured/indicated by the network 130, e.g., via higher layer RRC signaling/parameter (e.g., in PDCCH-Config) and/or MAC CE command and/or dynamic DCI based L1 signaling, one or two values (i.e., either 0 or 1, or both 0 and 1) of CORESETPoolIndex each configured for/associated to one or more CORESETs, wherein each CORESET could be configured/associated with a value (i.e., 0 or 1) of CORESETPoolIndex.

In one embodiment, a UE could be provided/configured by the network 130, e.g., via higher layer RRC signaling/parameter such as simultaneous-eU-TCI-UpdateList-x, one or more lists of component carriers (CCs) with each list comprising one or more CCs, wherein a CC could correspond to a STRP CC, a SDCI based MTRP CC or a MDCI based MTRP CC as specified herein in the present disclosure. Furthermore, common, or identical or simultaneous TCI state activation/update/indication/application could be assumed or expected or applied to all CCs in the same CC list or one or more CCs across one or more CC lists.

For example, the UE 116 could be provided/configured by the network 130, e.g., via higher layer RRC signaling(s)/parameter(s), a list of CCs provided by simultaneous-eU-TCI-UpdateList-1 with each CC configured for the STRP operation as specified herein in the present disclosure, and/or a list of CCs provided by simultaneous-eU-TCI-UpdateList-2 with each CC configured for the SDCI based MTRP operation as specified herein in the present disclosure, and/or a list of CCs provided by simultaneous-eU-TCI-UpdateList-3 with each CC configured for the MDCI based MTRP operation as specified herein in the present disclosure, and/or a list of CCs provided by simultaneous-eU-TCI-UpdateList-4 with one or more CCs configured therein for the STRP operation and one or more CCs configured therein for the SDCI based MTRP operation as specified herein in the present disclosure, and/or a list of CCs provided by simultaneous-eU-TCI-UpdateList-5 with one or more CCs configured therein for the STRP operation and one or more CCs configured therein for the MDCI based MTRP operation as specified herein in the present disclosure, and/or a list of CCs provided by simultaneous-eU-TCI-UpdateList-6 with one or more CCs configured therein for the SDCI based MTRP operation and one or more CCs configured therein for the MDCI based MTRP operation as specified herein in the present disclosure, and/or a list of CCs provided by simultaneous-eU-TCI-UpdateList-7 with one or more CCs configured therein for the STRP operation and one or more CCs configured therein for the SDCI based MTRP operation and one or more CCs configured therein for the MDCI based MTRP operation as specified herein in the present disclosure.

For another example, the UE 116 could be provided/configured by the network 130, e.g., via higher layer RRC signaling(s)/parameter(s), a list of CCs provided by simultaneous-eU-TCI-UpdateList-1 with each CC configured for the STRP operation as specified herein in the present disclosure, and/or a list of CCs provided by simultaneous-eU-TCI-UpdateList-2 with each CC configured for the SDCI based MTRP operation as specified herein in the present disclosure, and/or a list of CCs provided by simultaneous-eU-TCI-UpdateList-3 with each CC configured for the MDCI based MTRP operation as specified herein in the present disclosure.

In one example, the UE 116 could determine/identify, e.g., based on fixed rule(s)/relation(s) in the system specifications and/or higher layer RRC signaling/parameter (e.g., via one or more one-bit or multi-bit indicators in the corresponding RRC signaling(s)/parameter(s)) and/or MAC CE command and/or dynamic DCI based L1 signaling, that the STRP CCs in simultaneous-eU-TCI-UpdateList-1 and the SDCI based MTRP CCs in simultaneous-eU-TCI-UpdateList-2 could be in the same (virtual) CC list such that the UE 116 could assume or expect or apply common or identical or simultaneous TCI state activation/update/indication/application to all CCs in the same (virtual) CC list. Furthermore, the UE 116 could determine/identify, e.g., based on fixed rule(s)/relation(s) in the system specifications and/or higher layer RRC signaling/parameter (e.g., via one or more one-bit or multi-bit indicators in the corresponding RRC signaling(s)/parameter(s)) and/or MAC CE command and/or dynamic DCI based L1 signaling, which one or more of the STRP CCs in simultaneous-eU-TCI-UpdateList-1 and which one or more of the SDCI based MTRP CCs in simultaneous-eU-TCI-UpdateList-2 could be in the (virtual) CC list. For instance, the UE 116 could be provided/configured/indicated by the network 130, e.g., via higher layer RRC signaling/parameter and/or MAC CE command and/or dynamic DCI based L1 signaling, a first bitmap associated with/to the STRP CC list simultaneous-eU-TCI-UpdateList-1 and a second bitmap associated with/to the SDCI based MTRP CC list simultaneous-eU-TCI-UpdateList-2. Each entry/bit position in the first (or second) bitmap could be associated/corresponding to a CC in simultaneous-eU-TCI-UpdateList-1 (or simultaneous-eU-TCI-UpdateList-2). For this case, when an entry/bit position in the first (or second) bitmap is set to '0' (or '1'), the STRP (or SDCI based MTRP) CC corresponding/associated to the entry/bit position in simultaneous-eU-TCI-UpdateList-1 (or simultaneous-eU-TCI-UpdateList-2) could be in the same (virtual) CC list as specified herein in the present disclosure. Optionally, the UE 116 could be provided/configured by the network 130 a higher layer RRC signaling/parameter simultaneous-eU-TCI-UpdateVirtualList, which could comprise one or more STRP CCs in/from simultaneous-eU-TCI-UpdateList-1 and one or more SDCI based MTRP CCs in/from simultaneous-eU-TCI-UpdateList-2.

In another example, the UE 116 could determine/identify, e.g., based on fixed rule(s)/relation(s) in the system specifications and/or higher layer RRC signaling/parameter (e.g., via one or more one-bit or multi-bit indicators in the corresponding RRC signaling(s)/parameter(s)) and/or MAC CE command and/or dynamic DCI based L1 signaling, that the STRP CCs in simultaneous-eU-TCI-UpdateList-1 and the MDCI based MTRP CCs in simultaneous-eU-TCI-UpdateList-3 could be in the same (virtual) CC list such that the UE 116 could assume or expect or apply common or identical or simultaneous TCI state activation/update/indication/application to all CCs in the same (virtual) CC list. Furthermore, the UE 116 could determine/identify, e.g., based on fixed rule(s)/relation(s) in the system specifications and/or higher layer RRC signaling/parameter (e.g., via one or more one-bit or multi-bit indicators in the corresponding RRC signaling(s)/parameter(s)) and/or MAC CE command and/or dynamic DCI based L1 signaling, which one or more of the STRP CCs in simultaneous-eU-TCI-UpdateList-1 and which one or more of the MDCI based MTRP CCs in simultaneous-eU-TCI-UpdateList-3 could be in the (virtual) CC list. For instance, the UE 116 could be provided/configured/indicated by the network 130, e.g., via higher layer RRC signaling/parameter and/or MAC CE command and/or dynamic DCI based L1 signaling, a first bitmap associated with/to the STRP CC list simultaneous-eU-TCI-UpdateList-1 and a second bitmap associated with/to the MDCI based MTRP CC list simultaneous-eU-TCI-UpdateList-3. Each entry/bit position in the first (or second) bitmap could be associated/corresponding to a CC in simultaneous-eU-TCI-UpdateList-1 (or simultaneous-eU-TCI-UpdateList-3). For this case, when an entry/bit position in the first (or second) bitmap is set to '0' (or '1'), the STRP (or MDCI based MTRP) CC corresponding/associated to the entry/bit position in simultaneous-eU-TCI-UpdateList-1 (or simultaneous-eU-TCI-UpdateList-3) could be in the same (virtual) CC list as specified herein in the present disclosure. Optionally, the UE 116 could be provided/configured by the network 130 a higher layer RRC signaling/parameter simultaneous-eU-TCI-UpdateVirtualList, which could comprise one or more STRP CCs in/from simultaneous-eU-TCI-UpdateList-1 and one or more MDCI based MTRP CCs in/from simultaneous-eU-TCI-UpdateList-3.

In yet another example, the UE 116 could determine/identify, e.g., based on fixed rule(s)/relation(s) in the system specifications and/or higher layer RRC signaling/parameter (e.g., via one or more one-bit or multi-bit indicators in the corresponding RRC signaling(s)/parameter(s)) and/or MAC CE command and/or dynamic DCI based L1 signaling, that the SDCI based MTRP CCs in simultaneous-eU-TCI-UpdateList-2 and the MDCI based MTRP CCs in simultaneous-eU-TCI-UpdateList-3 could be in the same (virtual) CC list such that the UE 116 could assume or expect or apply common or identical or simultaneous TCI state activation/update/indication/application to all CCs in the same (virtual) CC list. Furthermore, the UE 116 could determine/identify, e.g., based on fixed rule(s)/relation(s) in the system specifications and/or higher layer RRC signaling/parameter (e.g., via one or more one-bit or multi-bit indicators in the corresponding higher layer RRC signaling(s)/parameter(s)) and/or MAC CE command and/or dynamic DCI based L1 signaling, which one or more of the SDCI based MTRP CCs in simultaneous-eU-TCI-UpdateList-2 and which one or more of the MDCI based MTRP CCs in simultaneous-eU-TCI-UpdateList-3 could be in the (virtual) CC list. For instance, the UE 116 could be provided/configured/indicated by the network 130, e.g., via higher layer RRC signaling/parameter (e.g., via one or more one-bit or multi-bit indicators in the corresponding higher layer RRC signaling(s)/parameter(s)) and/or MAC CE command and/or dynamic DCI based L1 signaling, a first bitmap associated with/to the SDCI based MTRP CC list simultaneous-eU-TCI-UpdateList-2 and a second bitmap associated with/to the MDCI based MTRP CC list simultaneous-eU-TCI-UpdateList-3. Each entry/bit position in the first (or second) bitmap could be associated/corresponding to a CC in simultaneous-eU-TCI-UpdateList-2 (or simultaneous-eU-TCI-UpdateList-3). For this case, when an entry/bit position in the first (or second) bitmap is set to '0' (or '1'), the SDCI based MTRP (or MDCI based MTRP) CC corresponding/associated to the entry/bit position in simultaneous-eU-TCI-UpdateList-2 (or simultaneous-eU-TCI-UpdateList-3) could be in the same (virtual) CC list as specified herein in the present disclosure. Optionally, the UE 116 could be provided/configured by the network 130 a higher layer RRC signaling/parameter simultaneous-eU-TCI-UpdateVirtualList, which could comprise one or more SDCI based MTRP CCs in/from simultaneous-eU-TCI-UpdateList-2 and one or more MDCI based MTRP CCs in/from simultaneous-eU-TCI-UpdateList-3.

In yet another example, the UE 116 could determine/identify, e.g., based on fixed rule(s)/relation(s) in the system specifications and/or higher layer RRC signaling/parameter (e.g., via one or more one-bit or multi-bit indicators in the corresponding RRC signaling(s)/parameter(s)) and/or MAC CE command and/or dynamic DCI based L1 signaling, that the STRP CCs in simultaneous-eU-TCI-UpdateList-1 and SDCI based MTRP CCs in simultaneous-eU-TCI-UpdateList-2 and the MDCI based MTRP CCs in simultaneous-eU-TCI-UpdateList-3 could be in the same (virtual) CC list such that the UE 116 could assume or expect or apply common or identical or simultaneous TCI state activation/update/indication/application to all CCs in the same (virtual) CC list. Furthermore, the UE 116 could determine/identify, e.g., based on fixed rule(s)/relation(s) in the system specifications and/or higher layer RRC signaling/parameter (e.g., via one or more one-bit or multi-bit indicators in the corresponding higher layer RRC signaling(s)/parameter(s)) and/or MAC CE command and/or dynamic DCI based L1 signaling, which one or more of the STRP CCs in simultaneous-eU-TCI-UpdateList-1 and which one or more of the SDCI based MTRP CCs in simultaneous-eU-TCI-UpdateList-2 and which one or more of the MDCI based MTRP CCs in simultaneous-eU-TCI-UpdateList-3 could be in the (virtual) CC list. For instance, the UE 116 could be provided/configured/indicated by the network 130, e.g., via higher layer RRC signaling/parameter and/or MAC CE command and/or dynamic DCI based L1 signaling, a first bitmap associated with/to the MTRP CC list simultaneous-eU-TCI-UpdateList-1 and a second bitmap associated with/to the SDCI based MTRP CC list simultaneous-eU-TCI-UpdateList-2 and a third bitmap associated with/to the MDCI based MTRP CC list simultaneous-eU-TCI-UpdateList-3. Each entry/bit position in the first (or second or third) bitmap could be associated/corresponding to a CC in simultaneous-eU-TCI-UpdateList-1 (or simultaneous-eU-TCI-UpdateList-2 or simultaneous-eU-TCI-UpdateList-3). For this case, when an entry/bit position in the first (or second or third) bitmap is set to '0' (or '1'), the STRP (or SDCI based MTRP or MDCI based MTRP) CC corresponding/associated to the entry/bit position in simultaneous-eU-TCI-UpdateList-1 (or simultaneous-eU-TCI-UpdateList-2 or simultaneous-eU-TCI-UpdateList-3) could be in the same (virtual) CC list as specified herein in the present disclosure. Optionally, the UE 116 could be provided/configured by the network 130 a higher layer RRC signaling/parameter simultaneous-eU-TCI-UpdateVirtualList, which could comprise one or more STRP CCs in/from simultaneous-eU-TCI-UpdateList-1 and one or more SDCI based MTRP CCs in/from simultaneous-eU-TCI-UpdateList-2 and one or more MDCI based MTRP CCs in/from simultaneous-eU-TCI-UpdateList-3.

A reference CC could be specified/defined in a CC list. Throughout the present disclosure, a reference CC in a CC list could correspond to one or more of:

A STRP CC as specified herein in the present disclosure in the CC list;

A SDCI based MTRP CC as specified herein in the present disclosure in the CC list;

- A MDCI based MTRP CC as specified herein in the present disclosure in the CC list;
- A CC with the lowest/highest CC ID/index among one or more CCs in the CC list, wherein the one or more CCs could correspond to all CCs in the CC list, all STRP CCs as specified herein in the present disclosure in the CC list, all SDCI based MTRP CCs as specified herein in the present disclosure in the CC list or all MDCI based MTRP CCs as specified herein in the present disclosure in the CC list;
- A CC with the lowest/highest CC ID/index among one or more CCs in the CC list, wherein the one or more CCs or their corresponding CC IDs/indexes could be (i) fixed in the system specifications and/or (ii) configured/indicated/provided by the network 130, e.g., via higher layer RRC signaling/parameter and/or MAC CE command and/or dynamic DCI based L1 signaling;
- A CC with their CC ID/index provided/fixed in the system specifications and/or configured/indicated/provided by the network 130, e.g., via higher layer RRC signaling/parameter and/or MAC CE command and/or dynamic DCI based L1 signaling;
- A CC with one or more (RRC) configured/configurations of lists/groups of joint/DL/UL TCI states as specified herein in the present disclosure;
- A CC for which at least one unified TCI state activation/deactivation MAC CE for Rel-17 STRP operation is applied, wherein one or more TCI states activated by the MAC CE are mapped to one or more TCI codepoints of one or more TCI fields in a beam indication DCI, and a TCI codepoint could comprise one joint/DL/UL TCI state or one pair of joint/DL/UL TCI states;
- A CC for which at least one (enhanced) unified TCI state activation/deactivation MAC CE for Rel-18 MTRP operation is applied, wherein one or more TCI states activated by the MAC CE are mapped to one or more TCI codepoints of one or more TCI fields in a beam indication DCI;
  - A TCI codepoint could comprise one joint/DL/UL TCI state or one pair of joint/DL/UL TCI states with an indicator associated to the TCI codepoint indicating that the joint/DL/UL TCI state or pair of joint/DL/UL TCI states could correspond to the first or second TCI state(s) for TCI state(s) update at the UE 116;
  - A TCI codepoint could comprise multiple (e.g., 2) joint/DL/UL TCI states or multiple (e.g., 2) pairs of joint/DL/UL TCI states; each of the joint/DL/UL TCI states or pairs of joint/DL/UL TCI states could be associated with an indicator indicating that the corresponding joint/DL/UL TCI state or pair of joint/DL/UL TCI states could correspond to the first or second TCI state(s) for TCI state(s) update at the UE 116; alternatively, the first joint/DL/UL TCI state or pair of joint/DL/UL TCI states could correspond to the first TCI state(s) for TCI state(s) update at the UE 116, and the second joint/DL/UL TCI state or pair of joint/DL/UL TCI states could correspond to the second TCI state(s) for TCI state(s) update at the UE 116; and/or
- A CC in/on which at least one beam indication DCI is received, wherein one or more TCI states could be indicated via/by one or more TCI codepoints of one or more TCI fields; here, a TCI codepoint could comprise one or more TCI states activated by/in/from the unified TCI state activation/deactivation MAC CE for the Rel-17 STRP operation and/or the (enhanced) unified TCI state activation/deactivation MAC CE for the Rel-18 MTRP operation as specified herein in the present disclosure. Optionally, the beam indication DCI could also indicate/provide a (valid) value of ‘Carrier Indicator’ field.

An applicable CC could be specified/defined in a CC list. Throughout the present disclosure, an applicable CC in a CC list could correspond to one or more of:

- Any CC in the CC list, which could correspond to a reference CC in the CC list as specified herein in the present disclosure, and/or a CC in the CC list other than the reference CC(s);
- A STRP CC as specified herein in the present disclosure in the CC list;
- A SDCI based MTRP CC as specified herein in the present disclosure in the CC list; A MDCI based MTRP CC as specified herein in the present disclosure in the CC list;
- A CC with their CC ID/index provided/fixed in the system specifications and/or configured/indicated/provided by the network 130, e.g., via higher layer RRC signaling/parameter and/or MAC CE command and/or dynamic DCI based L1 signaling;
- A CC with one or more (RRC) configured/configurations of lists/groups of joint/DL/UL TCI states as specified herein in the present disclosure;
- A CC that is not configured or provided by the network 130, e.g., via higher layer RRC signaling, any list(s)/group(s) of joint/DL/UL TCI states or any configurations of list(s)/group(s) of joint/DL/UL TCI states;
- A CC to which one or more (configurations of) lists/groups of joint/DL/UL TCI states configured/provided for/by/in the reference CC(s), e.g., in the same CC list, as specified herein in the present disclosure are simultaneously applied. That is, here, the same (configurations of) lists/groups of joint/DL/UL TCI states could be simultaneously applied for the reference CC(s) and the applicable CC(s), e.g., in the same CC list;
- A CC for which at least one unified TCI state activation/deactivation MAC CE for Rel-17 STRP operation is applied, wherein one or more TCI states activated by the MAC CE are mapped to one or more TCI codepoints of one or more TCI fields in a beam indication DCI, and a TCI codepoint could comprise one joint/DL/UL TCI state or one pair of joint/DL/UL TCI states;
- A CC for which at least one (enhanced) unified TCI state activation/deactivation MAC CE for Rel-18 MTRP operation is applied, wherein one or more TCI states activated by the MAC CE are mapped to one or more TCI codepoints of one or more TCI fields in a beam indication DCI;
  - A TCI codepoint could comprise one joint/DL/UL TCI state or one pair of joint/DL/UL TCI states with an indicator associated to the TCI codepoint indicating that the joint/DL/UL TCI state or pair of joint/DL/UL TCI states could correspond to the first or second TCI state(s) for TCI state(s) update at the UE 116;
  - A TCI codepoint could comprise multiple (e.g., 2) joint/DL/UL TCI states or multiple (e.g., 2) pairs of joint/DL/UL TCI states; each of the joint/DL/UL TCI states or pairs of joint/DL/UL TCI states could be associated with an indicator indicating that the corresponding joint/DL/UL TCI state or pair of joint/DL/UL TCI states could correspond to the first or second TCI state(s) for TCI state(s) update at the UE 116; alternatively, the first joint/DL/UL TCI state or pair of joint/DL/UL TCI states could correspond to the first TCI state(s) for TCI state(s) update at the UE 116, and the second joint/DL/UL TCI state or pair of joint/DL/UL TCI states could correspond to the second TCI state(s) for TCI state(s) update at the UE 116;

A CC that is not associated with any unified TCI state activation/deactivation MAC CE for the Rel-17 STRP operation and/or (enhanced) unified TCI state activation/deactivation MAC CE for the Rel-18 MTRP operation as specified herein in the present disclosure;

A CC to which the unified TCI state activation/deactivation MAC CE for the Rel-17 STRP operation and/or the (enhanced) unified TCI state activation/deactivation MAC CE for the Rel-18 MTRP operation as specified herein in the present disclosure that is received/associated/applied in/with/to the reference CC(s), e.g., in the same CC list, is simultaneously applied. That is, here, the same unified TCI state activation/deactivation MAC CE for the Rel-17 STRP operation and/or the same (enhanced) unified TCI state activation/deactivation MAC CE for the Rel-18 MTRP operation as specified herein in the present disclosure could be simultaneously applied for the reference CC(s) and the applicable CC(s), e.g., in the same CC list;

A CC in/on which at least one beam indication DCI is received, wherein one or more TCI states could be indicated via/by one or more TCI codepoints of one or more TCI fields; here, a TCI codepoint could comprise one or more TCI states activated by/in/from the unified TCI state activation/deactivation MAC CE for the Rel-17 STRP operation and/or the (enhanced) unified TCI state activation/deactivation MAC CE for the Rel-18 MTRP operation as specified herein in the present disclosure. Optionally, the beam indication DCI could also indicate/provide a (valid) value of 'Carrier Indicator' field;

A CC in/on which no beam indication DCI(s) is received, wherein a beam indication DCI could indicate one or more TCI states via/by one or more TCI codepoints of one or more TCI fields, and a TCI codepoint could comprise one or more TCI states activated by/in/from the unified TCI state activation/deactivation MAC CE for the Rel-17 STRP operation and/or the (enhanced) unified TCI state activation/deactivation MAC CE for the Rel-18 MTRP operation as specified herein in the present disclosure;

A CC in/on which no beam indication DCI(s) that provides/indicates a (valid) value of 'Carrier Indicator' field is received; and/or A CC to which the beam indication DCI(s) that is received in/on the reference CC(s), e.g., in the same CC list, is simultaneously applied, wherein a beam indication DCI could indicate one or more TCI states via/by one or more TCI codepoints of one or more TCI fields, and a TCI codepoint could comprise one or more TCI states activated by/in/from the unified TCI state activation/deactivation MAC CE for the Rel-17 STRP operation and/or the (enhanced) unified TCI state activation/deactivation MAC CE for the Rel-18 MTRP operation as specified herein in the present disclosure. That is, here, the beam indication DCI(s), and therefore, the corresponding TCI state(s) and/or value(s) of the 'Carrier Indicator' field indicated therein, could be simultaneously applied for the reference CC(s) and the applicable CC(s), e.g., in the same CC list.

As specified herein in the present disclosure, a UE could be provided/indicated/configured by the network 130, e.g., via higher layer RRC signaling/parameter (e.g., via/in higher layer configuration(s) of dl-OrJoint-TCIStateList and/or ul-TCIStateList) and/or MAC CE command and/or dynamic DCI based L1 signaling, a list/pool of joint/DL (UL) TCI states. For a CC list that comprises STRP CCs and SDCI based MTRP CCs as specified herein in the present disclosure, the provided/indicated/configured list/pool of joint/DL TCI states (e.g., via/in higher layer configuration of dl-OrJoint-TCIStateList) and/or list/pool of UL TCI states (e.g., via/in higher layer configuration of ul-TCIStateList) could be simultaneously applied to one or more of the STRP CCs and one or more of the SDCI based MTRP CCs in the CC list, wherein (i) the one or more of the STRP CCs (or the one or more of the SDCI based MTRP CCs) could correspond to all the STRP CCs (or all the SDCI based MTRP CCs) in the CC list, (ii) the one or more of the STRP CCs (or the one or more of the SDCI based MTRP CCs), and their corresponding CC indexes/IDs, in the CC list, could be fixed in the system specifications, and/or (iii) the one or more of the STRP CCs (or the one or more of the SDCI based MTRP CCs), and their corresponding CC indexes/IDs, in the CC list, could be configured/indicated/provided by the network 130, e.g., via higher layer RRC signaling/parameter and/or MAC CE command and/or dynamic DCI based L1 signaling. Furthermore, the list/pool of joint/DL (UL) TCI states could be configured/indicated/provided for the reference CC(s) in the CC list as specified herein in the present disclosure.

As specified herein in the present disclosure, a UE could be provided/indicated/configured by the network 130, e.g., via higher layer RRC signaling/parameter (e.g., via/in higher layer configuration(s) of dl-OrJoint-TCIStateList and/or ul-TCIStateList) and/or MAC CE command and/or dynamic DCI based L1 signaling, a first group of joint/DL (UL) TCI states and a second group of joint/DL (UL) TCI states in a list/pool of joint/DL (UL) TCI states. For a CC list that comprises STRP CCs and SDCI based MTRP CCs as specified herein in the present disclosure, the first group of joint/DL (UL) TCI states and/or the second group of joint/DL (UL) TCI states in the provided/indicated/configured list/pool of joint/DL (UL) TCI states (e.g., via/in higher layer configuration(s) of dl-OrJoint-TCIStateList and/or ul-TCIStateList) could be simultaneously applied to one or more of the STRP CCs and one or more of the SDCI based MTRP CCs in the CC list, wherein (i) the one or more of the STRP CCs (or the one or more of the SDCI based MTRP CCs) could correspond to all the STRP CCs (or all the SDCI based MTRP CCs) in the CC list, (ii) the one or more of the STRP CCs (or the one or more of the SDCI based MTRP CCs), and their corresponding CC indexes/IDs, in the CC list, could be fixed in the system specifications, and/or (iii) the one or more of the STRP CCs (or the one or more of the SDCI based MTRP CCs), and their corresponding CC indexes/IDs, in the CC list, could be configured/indicated/provided by the network 130, e.g., via higher layer RRC signaling/parameter and/or MAC CE command and/or dynamic DCI based L1 signaling. Furthermore:

Whether the first and/or second group(s) of joint/DL (UL) TCI states—e.g., in the list/pool of joint/DL (UL) TCI states as specified herein in the present disclosure—could be simultaneously applied to the STRP CC(s) and the SDCI based MTRP CC(s) in the same CC list could be fixed in the system specifications.

For example, only the first group of joint/DL (UL) TCI states as specified herein in the present disclosure, e.g., in the list/pool of joint/DL (UL) TCI states, could be simultaneously applied to the STRP CC(s) and the SDCI based MTRP CC(s) in the same CC list.

For another example, only the second group of joint/DL (UL) TCI states as specified herein in the present disclosure, e.g., in the list/pool of joint/DL (UL) TCI states, could be simultaneously applied to the STRP CC(s) and the SDCI based MTRP CC(s) in the same CC list.

Yet for another example, both of the first and second groups of joint/DL (UL) TCI states as specified herein in the present disclosure, e.g., in the list/pool of joint/DL (UL) TCI states, could be simultaneously applied to the STRP CC(s) and the SDCI based MTRP CC(s) in the same CC list.

Alternatively, the UE 116 could be indicated/configured/provided by the network 130, e.g., via higher layer RRC signaling/parameter and/or MAC CE command and/or dynamic DCI based L1 signaling, whether the first, the second or both of the first and second groups of joint/DL (UL) TCI states as specified herein in the present disclosure, e.g., in the list/pool of joint/DL (UL) TCI states, could be simultaneously applied to the STRP CC(s) and the SDCI based MTRP CC(s) in the same CC list.

In addition, the list/pool of joint/DL (UL) TCI states, and therefore, the first and/or second group(s) of joint/DL (UL) TCI states configured/provided/indicated therein, could be configured/indicated/provided for the reference CC(s) in the CC list as specified herein in the present disclosure.

In one embodiment, as specified herein in the present disclosure, a UE could receive from the network 130 a first beam indication/activation MAC CE, e.g., unified TCI state activation/deactivation MAC CE, wherein the (unified) TCI states activated/provided/indicated in the first MAC CE could be used to map up to Ncp (e.g., Ncp=8) TCI codepoints of one or more TCI fields in a beam indication DCI; here, each of the TCI codepoints could include or comprise or could be mapped to a single joint/DL/UL TCI state/pair of joint/DL/UL TCI states. For a CC list comprising both STRP CCs and SDCI based MTRP CCs, the UE 116 could receive the first beam indication/activation MAC CE in/on the reference CC(s) and/or STRP CC(s) in the CC list. Furthermore, the UE 116 could simultaneously apply/use the received first beam indication/activation MAC CE, e.g., the unified TCI state activation/deactivation MAC CE here, and therefore, the corresponding TCI state(s) indicated/activated/provided therein, for one or more of the STRP CCs and one or more of the SDCI based MTRP CCs in the CC list, wherein (i) the one or more of the STRP CCs (or the one or more of the SDCI based MTRP CCs) could correspond to all the STRP CCs (or all the SDCI based MTRP CCs) in the CC list, (ii) the one or more of the STRP CCs (or the one or more of the SDCI based MTRP CCs), and their corresponding CC indexes/IDs, in the CC list, could be fixed in the system specifications, and/or (iii) the one or more of the STRP CCs (or the one or more of the SDCI based MTRP CCs), and their corresponding CC indexes/IDs, in the CC list, could be configured/indicated/provided by the network 130, e.g., via higher layer RRC signaling/parameter and/or MAC CE command and/or dynamic DCI based L1 signaling.

In one example, the UE 116 could simultaneously apply/use all of the TCI states activated/indicated/provided in the first beam indication/activation MAC CE, e.g., the unified TCI state activation/deactivation MAC CE here, to the STRP CC(s) and the SDCI based MTRP CC(s) in the same CC list as specified herein in the present disclosure.

In another example, the UE 116 could simultaneously apply/use one or more TCI states activated/indicated/provided in the first beam indication/activation MAC CE, e.g., the unified TCI state activation/deactivation MAC CE here, to the STRP CC(s) and the SDCI based MTRP CC(s) in the same CC list as specified herein in the present disclosure. the UE 116 could determine/identify the one or more TCI states (or their corresponding TCI state IDs) from/among all the TCI states/TCI state IDs activated/indicated/provided in the first beam indication/activation MAC CE following fixed rule(s)/relation(s) in the system specifications. Or the UE 116 could determine/identify the TCI codepoint(s), to which the one or more TCI states (or their corresponding TCI state IDs) are mapped, from/among all the TCI codepoints, to which all the TCI states/TCI state IDs activated/indicated/provided in the first beam indication/activation MAC CE are mapped, following fixed rule(s)/relation(s) in the system specifications.

In yet another example, the UE 116 could simultaneously apply/use one or more TCI states activated/indicated/provided in the first beam indication/activation MAC CE, e.g., the unified TCI state activation/deactivation MAC CE here, to the STRP CC(s) and the SDCI based MTRP CC(s) in the same CC list as specified herein in the present disclosure. The UE 116 could determine/identify the one or more TCI states (or their corresponding TCI state IDs) from/among all the TCI states/TCI state IDs activated/indicated/provided in the first beam indication/activation MAC CE according to higher layer RRC signaling(s)/parameter(s) and/or MAC CE command(s) and/or dynamic DCI based L1 signaling(s). Or, the UE 116 could determine/identify the TCI codepoint(s), to which the one or more TCI states (or their corresponding TCI state IDs) are mapped, from/among all the TCI codepoints, to which all the TCI states/TCI state IDs activated/indicated/provided in the first beam indication/activation MAC CE are mapped, according to higher layer RRC signaling(s)/parameter(s) and/or MAC CE command(s) and/or dynamic DCI based L1 signaling(s).

For example, a TCI state/pair of TCI states activated/indicated/provided in the first beam indication/activation MAC CE that is mapped to a TCI codepoint could be associated to/with an (one-bit) indicator indicated/provided in a RRC signaling/parameter and/or the same first beam indication/activation MAC CE and/or a DCI based L1 signaling. When/if the (one-bit) indicator is set to '0' (or '1'), the UE 116 could identify/determine that the indicated/activated/provided TCI state(s) associated/corresponding to the (one-bit) indicator could be simultaneously applied/used for the STRP CC(s) and the SDCI based MTRP CC(s) in the CC list according to those specified herein in the present disclosure.

For another example, a bitmap could be indicated/provided in a RRC signaling/parameter and/or the first beam indication/activation MAC CE and/or a DCI based L1 signaling with each entry/bit position of the bitmap corresponding to a TCI state/pair of TCI states-mapped to a TCI codepoint—that is activated/indicated/provided in the same first beam indication/activation MAC CE. When/if an entry/bit position of the bitmap is set to '0' (or '1'), the UE 116 could identify/determine that the indicated/activated/provided TCI state(s) associated/corresponding to the entry/bit position in the bitmap could be simultaneously applied/used for the STRP CC(s) and the SDCI based MTRP CC(s) in the CC list according to those specified herein in the present disclosure.

In yet another example, a UE could receive from the network 130 a second beam indication/activation MAC CE, e.g., unified TCI state activation/deactivation MAC CE, wherein the (unified) TCI states activated/provided/indicated in the second MAC CE could be used to map up to Ncp (e.g., Ncp=8) TCI codepoints of one or more TCI fields in a beam indication DCI; here, each of the TCI codepoints could include or comprise or could be mapped to a single joint/DL/UL TCI state/pair of joint/DL/UL TCI states. For a CC list comprising both STRP CCs and SDCI based MTRP CCs, the UE 116 could receive the second beam indication/activation MAC CE in/on the reference CC(s) and/or STRP CC(s) in the CC list.

For example, the UE 116 could follow fixed rule(s)/relation(s) in the system specifications to identify the first and/or second beam indication/activation MAC CE(s) to use for determining common TCI state(s) update/activation for the STRP CC(s) and the SDCI based MTRP CC(s) in the same CC list. In one example, the UE 116 could identify that the first beam indication/activation MAC CE could be used. In another example, the UE 116 could identify that the second beam indication/activation MAC CE could be used. In yet another example, the UE 116 could identify that both of the first and second beam indication/activation MAC CEs could be used. In yet another example, the UE 116 could identify that the first or the second beam indication/activation MAC CE that is with the lowest/highest ID/index, the lowest/highest number of activated TCI state(s)/TCI codepoint(s), received the earlies/latest in time and/or etc. could be used. The UE 116 could simultaneously apply/use the TCI state(s) provided/indicated/activated in/from the identified first and/or second beam indication/activation MAC CE(s) for the STRP CC(s) and the SDCI based MTRP CC(s) in the CC list according to those specified herein in the present disclosure.

For another example, the UE 116 could be indicated/configured/provided by the network 130, e.g., via higher layer RRC signaling/parameter and/or MAC CE command and/or dynamic DCI based L1 signaling, the first and/or second beam indication/activation MAC CE(s) to use for determining common TCI state(s) update/activation for the STRP CC(s) and the SDCI based MTRP CC(s) in the same CC list. The UE 116 could simultaneously apply/use the TCI state(s) provided/indicated/activated in/from the indicated/configured/provided first and/or second beam indication/activation MAC CE(s) for the STRP CC(s) and the SDCI based MTRP CC(s) in the CC list according to those specified herein in the present disclosure.

Yet for another example, the UE 116 could first determine/identify, e.g., following fixed rule(s)/relation(s) in the system specifications based on those specified herein in the present disclosure, and/or according to higher layer RRC signaling/parameter and/or MAC CE command and/or dynamic DCI based L1 signaling based on those specified herein in the present disclosure, the first and/or second beam indication/activation MAC CE(s) to use for determining common TCI state(s) update/activation for the STRP CC(s) and the SDCI based MTRP CC(s) in the same CC list. The UE 116 could then follow fixed rule(s)/relation(s) in the system specifications to identify one or more of the TCI states from/in the determined/identified first and/or second beam indication/activation MAC CE(s) to use for common TCI state(s) update/activation for the STRP CC(s) and the SDCI based MTRP CC(s) in the same CC list.

Yet for another example, the UE 116 could first determine/identify, e.g., following fixed rule(s)/relation(s) in the system specifications based on those specified herein in the present disclosure, and/or according to higher layer RRC signaling/parameter and/or MAC CE command and/or dynamic DCI based L1 signaling based on those specified herein in the present disclosure, the first and/or second beam indication/activation MAC CE(s) to use for determining common TCI state(s) update/activation for the STRP CC(s) and the SDCI based MTRP CC(s) in the same CC list. The UE 116 could then be indicated/configured/provided by the network 130, e.g., via higher layer RRC signaling/parameter and/or MAC CE command and/or dynamic DCI based L1 signaling, one or more (or which of) of the TCI states from/in the determined/identified first and/or second beam indication/activation MAC CE(s) to use for common TCI state(s) update/activation for the STRP CC(s) and the SDCI based MTRP CC(s) in the same CC list.

Yet for another example, the UE 116 could first determine/identify common or identical TCI state(s)/TCI state ID(s) that are activated/indicated/provided in both of the first and second beam indication/activation MAC CEs. The UE 116 could then simultaneously apply/use the determined/identified common/identical TCI state(s) for the STRP CC(s) and the SDCI based MTRP CC(s) in the CC list according to those specified herein in the present disclosure. Optionally, the UE 116 could follow fixed rule(s)/relation(s) in the system specifications and/or higher layer RRC signaling/parameter and/or MAC CE command and/or dynamic DCI based L1 signaling to determine/identify which one or more of the determined/identified common/identical TCI state(s) as specified herein in the present disclosure that can be simultaneously used/applied for the STRP CC(s) and the SDCI based MTRP CC(s) in the same CC list as specified herein in the present disclosure.

In yet another example, the UE 116 could receive from the network 130 a third beam indication/activation MAC CE, e.g., (enhanced) unified TCI state activation/deactivation MAC CE, wherein the (unified) TCI states activated/provided/indicated in the third MAC CE could be used to map up to Ncp (e.g., Ncp=8) TCI codepoints of one or more TCI fields in a beam indication DCI; here, each of the TCI codepoints could include or comprise or could be mapped to one or multiple (e.g., 2) joint/DL/UL TCI states/pairs of joint/DL/UL TCI states. For the CC list comprising both STRP CCs and SDCI based MTRP CCs, the UE 116 could receive the third beam indication/activation MAC CE in/on the reference CC(s) and/or SDCI based MTRP CC(s) in the CC list.

For example, the UE 116 could follow fixed rule(s)/relation(s) in the system specifications to identify the first and/or third beam indication/activation MAC CE(s) to use for determining common TCI state(s) update/activation for the STRP CC(s) and the SDCI based MTRP CC(s) in the same CC list. In one example, the UE 116 could identify that the first beam indication/activation MAC CE could be used. In another example, the UE 116 could identify that the third beam indication/activation MAC CE could be used. In yet another example, the UE 116 could identify that both of the first and third beam indication/activation MAC CEs could be used. In yet another example, the UE 116 could identify that the first or the third beam indication/activation MAC CE that is with the lowest/highest ID/index, the lowest/highest number of activated TCI state(s)/TCI codepoint(s), received the earlies/latest in time and/or etc. could be used. The UE 116 could simultaneously apply/use the TCI state(s) provided/indicated/activated in/from the identified first and/or third beam indication/activation MAC CE(s) for the STRP CC(s) and the SDCI based MTRP CC(s) in the CC list according to those specified herein in the present disclosure.

For another example, the UE 116 could be indicated/configured/provided by the network 130, e.g., via higher layer RRC signaling/parameter and/or MAC CE command and/or dynamic DCI based L1 signaling, the first and/or third beam indication/activation MAC CE(s) to use for determining common TCI state(s) update/activation for the STRP CC(s) and the SDCI based MTRP CC(s) in the same CC list. The UE 116 could simultaneously apply/use the TCI state(s) provided/indicated/activated in/from the indicated/configured/provided first and/or third beam indication/activation MAC CE(s) for the STRP CC(s) and the SDCI based MTRP CC(s) in the CC list according to those specified herein in the present disclosure.

Yet for another example, the UE 116 could first determine/identify, e.g., following fixed rule(s)/relation(s) in the system specifications based on those specified herein in the present disclosure, and/or according to higher layer RRC signaling/parameter and/or MAC CE command and/or dynamic DCI based L1 signaling based on those specified herein in the present disclosure, the first and/or third beam indication/activation MAC CE(s) to use for determining common TCI state(s) update/activation for the STRP CC(s) and the SDCI based MTRP CC(s) in the same CC list. The UE 116 could then follow fixed rule(s)/relation(s) in the system specifications to identify one or more of the TCI states from/in the determined/identified first and/or third beam indication/activation MAC CE(s) to use for common TCI state(s) update/activation for the STRP CC(s) and the SDCI based MTRP CC(s) in the same CC list.

Yet for another example, the UE 116 could first determine/identify, e.g., following fixed rule(s)/relation(s) in the system specifications based on those specified herein in the present disclosure, and/or according to higher layer RRC signaling/parameter and/or MAC CE command and/or dynamic DCI based L1 signaling based on those specified herein in the present disclosure, the first and/or third beam indication/activation MAC CE(s) to use for determining common TCI state(s) update/activation for the STRP CC(s) and the SDCI based MTRP CC(s) in the same CC list. The UE 116 could then be indicated/configured/provided by the network 130, e.g., via higher layer RRC signaling/parameter and/or MAC CE command and/or dynamic DCI based L1 signaling, one or more (or which of) of the TCI states from/in the determined/identified first and/or third beam indication/activation MAC CE(s) to use for common TCI state(s) update/activation for the STRP CC(s) and the SDCI based MTRP CC(s) in the same CC list.

Yet for another example, the UE 116 could first determine/identify common or identical TCI state(s)/TCI state ID(s) that are activated/indicated/provided in both of the first and third beam indication/activation MAC CEs. The UE 116 could then simultaneously apply/use the determined/identified common/identical TCI state(s) for the STRP CC(s) and the SDCI based MTRP CC(s) in the CC list according to those specified herein in the present disclosure. Optionally, the UE 116 could follow fixed rule(s)/relation(s) in the system specifications and/or higher layer RRC signaling/parameter and/or MAC CE command and/or dynamic DCI based L1 signaling to determine/identify which one or more of the determined/identified common/identical TCI state(s) as specified herein in the present disclosure that can be simultaneously used/applied for the STRP CC(s) and the SDCI based MTRP CC(s) in the same CC list as specified herein in the present disclosure.

In one embodiment, as specified herein in the present disclosure, the UE 116 could receive from the network 130 a fourth beam indication/activation MAC CE, e.g., (enhanced) unified TCI state activation/deactivation MAC CE, wherein the (unified) TCI states activated/provided/indicated in the fourth MAC CE could be used to map up to Ncp (e.g., Ncp=8) TCI codepoints of one or more TCI fields in a beam indication DCI; here, each of the TCI codepoints could include or comprise or could be mapped to one or multiple (e.g., 2) joint/DL/UL TCI states/pairs of joint/DL/UL TCI states. For the CC list comprising both STRP CCs and SDCI based MTRP CCs, the UE 116 could receive the fourth beam indication/activation MAC CE in/on the reference CC(s) and/or SDCI based MTRP CC(s) in the CC list. Furthermore, the UE 116 could simultaneously apply/use the received fourth beam indication/activation MAC CE, e.g., the (enhanced) unified TCI state activation/deactivation MAC CE here, and therefore, the corresponding TCI state(s) indicated/activated/provided therein, for one or more of the STRP CCs and one or more of the SDCI based MTRP CCs in the CC list, wherein (i) the one or more of the STRP CCs (or the one or more of the SDCI based MTRP CCs) could correspond to all the STRP CCs (or all the SDCI based MTRP CCs) in the CC list, (ii) the one or more of the STRP CCs (or the one or more of the SDCI based MTRP CCs), and their corresponding CC indexes/IDs, in the CC list, could be fixed in the system specifications, and/or (iii) the one or more of the STRP CCs (or the one or more of the SDCI based MTRP CCs), and their corresponding CC indexes/IDs, in the CC list, could be configured/indicated/provided by the network 130, e.g., via higher layer RRC signaling/parameter and/or MAC CE command and/or dynamic DCI based L1 signaling.

In one example, the UE 116 could simultaneously apply/use all of the TCI states activated/indicated/provided in the fourth beam indication/activation MAC CE, e.g., the (enhanced) unified TCI state activation/deactivation MAC CE here, to the STRP CC(s) and the SDCI based MTRP CC(s) in the same CC list as specified herein in the present disclosure.

In another example, the UE 116 could simultaneously apply/use one or more TCI states activated/indicated/provided in the fourth beam indication/activation MAC CE, e.g., the (enhanced) unified TCI state activation/deactivation MAC CE here, to the STRP CC(s) and the SDCI based MTRP CC(s) in the same CC list as specified herein in the present disclosure. The UE 116 could determine/identify the one or more TCI states (or their corresponding TCI state IDs) from/among all the TCI states/TCI state IDs activated/indicated/provided in the fourth beam indication/activation MAC CE following fixed rule(s)/relation(s) in the system specifications. Or the UE 116 could determine/identify the TCI codepoint(s), to which the one or more TCI states (or their corresponding TCI state IDs) are mapped, from/among all the TCI codepoints, to which all the TCI states/TCI state IDs activated/indicated/provided in the fourth beam indication/activation MAC CE are mapped, following fixed rule(s)/relation(s) in the system specifications.

For example, the UE 116 could simultaneously use/apply the first/last Ncp≥1 (e.g., Ncp=4, 8) TCI states (or the first/last Ncp≥1 TCI state IDs) from/among all the TCI states/TCI state IDs activated/indicated/provided in the fourth beam indication/activation MAC CE to the STRP CC(s) and the SDCI based MTRP CC(s) in the same CC list.

For another example, the UE 116 could simultaneously use/apply the one or more TCI states that are mapped to the first/last Mcp≥1 (e.g., Mcp=4, 8) TCI codepoints from/among all the TCI codepoints activated/indicated/provided in the fourth beam indication activation MAC CE to the STRP CC(s) and the SDCI based MTRP CC(s) in the same CC list.

In yet another example, the UE 116 could simultaneously apply/use one or more TCI states activated/indicated/provided in the fourth beam indication/activation MAC CE, e.g., the (enhanced) unified TCI state activation/deactivation MAC CE here, to the STRP CC(s) and the SDCI based MTRP CC(s) in the same CC list as specified herein in the present disclosure. The UE 116 could determine/identify the one or more TCI states (or their corresponding TCI state IDs) from/among all the TCI states/TCI state IDs activated/indicated/provided in the fourth beam indication/activation MAC CE according to higher layer RRC signaling(s)/parameter(s) and/or MAC CE command(s) and/or dynamic DCI based L1 signaling(s). Or, the UE 116 could determine/identify the TCI codepoint(s), to which the one or more TCI states (or their corresponding TCI state IDs) are mapped, from/among all the TCI codepoints, to which all the TCI states/TCI state IDs activated/indicated/provided in the fourth beam indication/activation MAC CE are mapped, according to higher layer RRC signaling(s)/parameter(s) and/or MAC CE command(s) and/or dynamic DCI based L1 signaling(s).

For example, one or multiple (e.g., 2) TCI states/pairs of TCI states activated/indicated/provided in the fourth beam indication/activation MAC CE that is mapped to a TCI codepoint could be associated to/with an (one-bit) indicator indicated/provided in a RRC signaling/parameter and/or the same fourth beam indication/activation MAC CE and/or a DCI based L1 signaling. When/if the (one-bit) indicator is set to '0' (or '1'), the UE 116 could identify/determine that the indicated/activated/provided TCI state(s) associated/corresponding to the (one-bit) indicator could be simultaneously applied/used for the STRP CC(s) and the SDCI based MTRP CC(s) in the CC list according to those specified herein in the present disclosure.

For another example, a bitmap could be indicated/provided in a RRC signaling/parameter and/or the fourth beam indication/activation MAC CE and/or a DCI based L1 signaling with each entry/bit position of the bitmap corresponding to one or multiple (e.g., 2) TCI states/pairs of TCI states-mapped to a TCI codepoint—that are activated/indicated/provided in the same fourth beam indication/activation MAC CE. When/if an entry/bit position of the bitmap is set to '0' (or '1'), the UE 116 could identify/determine that the indicated/activated/provided TCI state(s) associated/corresponding to the entry/bit position in the bitmap could be simultaneously applied/used for the STRP CC(s) and the SDCI based MTRP CC(s) in the CC list according to those specified herein in the present disclosure.

In yet another example, the UE 116 could simultaneously apply/use one or more TCI states activated/indicated/provided in the fourth beam indication/activation MAC CE, e.g., the (enhanced) unified TCI state activation/deactivation MAC CE here, to the STRP CC(s) and the SDCI based MTRP CC(s) in the same CC list as specified herein in the present disclosure. The one or more TCI states could correspond to those (or one or more of those according to fixed rule(s)/relation(s) in system specifications and/or higher layer RRC signaling/parameter and/or MAC CE command and/or dynamic DCI based L1 signaling following those specified herein in the present disclosure) mapped to one or more TCI codepoints each comprising a single joint/DL/UL TCI state/pair of joint/DL/UL TCI states. Alternatively, the one or more TCI states could correspond to those (or one or more of those according to fixed rule(s)/relation(s) in system specifications and/or higher layer RRC signaling/parameter and/or MAC CE command and/or dynamic DCI based L1 signaling following those specified herein in the present disclosure) mapped to one or more TCI codepoints each comprising a single joint/DL/UL TCI state/pair of joint/DL/UL TCI states associated to or activated/configured/indicated for a/the first TRP (e.g., by indicating that the single joint/DL/UL TCI state/pair of joint/DL/UL TCI states as the first TCI state(s) via one or more indicators/indicator fields, e.g., in the fourth beam indication/activation MAC CE). Optionally, the one or more TCI states could correspond to those (or one or more of those according to fixed rule(s)/relation(s) in system specifications and/or higher layer RRC signaling/parameter and/or MAC CE command and/or dynamic DCI based L1 signaling following those specified herein in the present disclosure) mapped to one or more TCI codepoints each comprising a single joint/DL/UL TCI state/pair of joint/DL/UL TCI states associated to or activated/configured/indicated for a/the second TRP (e.g., by indicating that the single joint/DL/UL TCI state/pair of joint/DL/UL TCI states as the second TCI state(s) via one or more indicators/indicator fields, e.g., in the fourth beam indication/activation MAC CE).

In yet another example, the UE 116 could simultaneously apply/use one or more TCI states activated/indicated/provided in the fourth beam indication/activation MAC CE, e.g., the (enhanced) unified TCI state activation/deactivation MAC CE here, to the STRP CC(s) and the SDCI based MTRP CC(s) in the same CC list as specified herein in the present disclosure. The one or more TCI states could correspond to those (or one or more of those according to fixed rule(s)/relation(s) in system specifications and/or higher layer RRC signaling/parameter and/or MAC CE command and/or dynamic DCI based L1 signaling following those specified herein in the present disclosure) mapped to one or more first TCI codepoints each comprising a single joint/DL/UL TCI state/pair of joint/DL/UL TCI states, and/or those mapped to one or more second TCI codepoints each comprising multiple (e.g., 2) joint/DL/UL TCI states/pairs of joint/DL/UL TCI states. For a (or each) second TCI codepoint comprising a/the first TCI state(s) and a/the second TCI state(s):

For example, the UE 116 could follow fixed rule(s)/relation(s) in system specifications to determine which of the first and/or second TCI state(s) of a (or each) second TCI codepoint in/from the fourth beam indication/activation MAC CE that can be simultaneously used/applied to the STRP CC(s) and the SDCI based MTRP CC(s) in the same CC list. In one example, the UE 116 could use/apply the first TCI state(s) of a (or each) second TCI codepoint in/from the fourth beam indication/activation MAC CE simultaneously to the STRP CC(s) and the SDCI based MTRP CC(s) in the same CC list. In another example, the UE 116 could use/apply the second TCI state(s) of a (or each) second TCI codepoint in/from the fourth beam indication/activation MAC CE simultaneously to the STRP CC(s) and the SDCI based MTRP CC(s) in the same CC list. In yet another example, the UE 116 could use/apply both the first and second TCI states of a (or each) second TCI codepoint in/from the fourth beam indication/activation MAC CE simultaneously to the STRP CC(s) and the SDCI based MTRP CC(s) in the same CC list. In yet another example, the UE 116 could use/apply the first and/or second TCI state(s) that is with the lowest/highest TCI state ID/index and/or etc. of a (or each) second TCI codepoint in/from the fourth beam indication/activation MAC CE simultaneously to the STRP CC(s) and the SDCI based MTRP CC(s) in the same CC list.

For another example, the UE 116 could be indicated/provided/configured by the network 130, e.g., via higher layer RRC signaling/parameter and/or MAC CE command and/or dynamic DCI based L1 signaling, which of the first and/or second TCI state(s) of a (or each) second TCI codepoint in/from the fourth beam indication/activation MAC CE that can be simultaneously used/applied to the STRP CC(s) and the SDCI based MTRP CC(s) in the same CC list.

In yet another example, a UE could receive from the network 130 a fifth beam indication/activation MAC CE, e.g., unified TCI state activation/deactivation MAC CE, wherein the (unified) TCI states activated/provided/indicated in the fifth MAC CE could be used to map up to Ncp (e.g., Ncp=8) TCI codepoints of one or more TCI fields in a beam indication DCI; here, each of the TCI codepoints could include or comprise or could be mapped to a single joint/DL/UL TCI state/pair of joint/DL/UL TCI states. For a CC list comprising both STRP CCs and SDCI based MTRP CCs, the UE 116 could receive the fifth beam indication/activation MAC CE in/on the reference CC(s) and/or STRP CC(s) in the CC list.

For example, the UE 116 could follow fixed rule(s)/relation(s) in the system specifications to identify the fourth and/or fifth beam indication/activation MAC CE(s) to use for determining common TCI state(s) update/activation for the STRP CC(s) and the SDCI based MTRP CC(s) in the same CC list. In one example, the UE 116 could identify that the fourth beam indication/activation MAC CE could be used. In another example, the UE 116 could identify that the fifth beam indication/activation MAC CE could be used. In yet another example, the UE 116 could identify that both of the fourth and fifth beam indication/activation MAC CEs could be used. In yet another example, the UE 116 could identify that the fourth or the fifth beam indication/activation MAC CE that is with the lowest/highest ID/index, the lowest/highest number of activated TCI state(s)/TCI codepoint(s), received the earlies/latest in time and/or etc. could be used. The UE 116 could simultaneously apply/use the TCI state(s) provided/indicated/activated in/from the identified fourth and/or fifth beam indication/activation MAC CE(s) for the STRP CC(s) and the SDCI based MTRP CC(s) in the CC list according to those specified herein in the present disclosure.

For another example, the UE 116 could be indicated/configured/provided by the network 130, e.g., via higher layer RRC signaling/parameter and/or MAC CE command and/or dynamic DCI based L1 signaling, the fourth and/or fifth beam indication/activation MAC CE(s) to use for determining common TCI state(s) update/activation for the STRP CC(s) and the SDCI based MTRP CC(s) in the same CC list. The UE 116 could simultaneously apply/use the TCI state(s) provided/indicated/activated in/from the indicated/configured/provided fourth and/or fifth beam indication/activation MAC CE(s) for the STRP CC(s) and the SDCI based MTRP CC(s) in the CC list according to those specified herein in the present disclosure.

Yet for another example, the UE 116 could first determine/identify, e.g., following fixed rule(s)/relation(s) in the system specifications based on those specified herein in the present disclosure, and/or according to higher layer RRC signaling/parameter and/or MAC CE command and/or dynamic DCI based L1 signaling based on those specified herein in the present disclosure, the fourth and/or fifth beam indication/activation MAC CE(s) to use for determining common TCI state(s) update/activation for the STRP CC(s) and the SDCI based MTRP CC(s) in the same CC list. The UE 116 could then follow fixed rule(s)/relation(s) in the system specifications to identify one or more of the TCI states from/in the determined/identified fourth and/or fifth beam indication/activation MAC CE(s) to use for common TCI state(s) update/activation for the STRP CC(s) and the SDCI based MTRP CC(s) in the same CC list.

Yet for another example, the UE 116 could first determine/identify, e.g., following fixed rule(s)/relation(s) in the system specifications based on those specified herein in the present disclosure, and/or according to higher layer RRC signaling/parameter and/or MAC CE command and/or dynamic DCI based L1 signaling based on those specified herein in the present disclosure, the fourth and/or fifth beam indication/activation MAC CE(s) to use for determining common TCI state(s) update/activation for the STRP CC(s) and the SDCI based MTRP CC(s) in the same CC list. The UE 116 could then be indicated/configured/provided by the network 130, e.g., via higher layer RRC signaling/parameter and/or MAC CE command and/or dynamic DCI based L1 signaling, one or more (or which of) of the TCI states from/in the determined/identified fourth and/or fifth beam indication/activation MAC CE(s) to use for common TCI state(s) update/activation for the STRP CC(s) and the SDCI based MTRP CC(s) in the same CC list.

Yet for another example, the UE 116 could first determine/identify common or identical TCI state(s)/TCI state ID(s) that are activated/indicated/provided in both of the fourth and fifth beam indication/activation MAC CEs. The UE 116 could then simultaneously apply/use the determined/identified common/identical TCI state(s) for the STRP CC(s) and the SDCI based MTRP CC(s) in the CC list according to those specified herein in the present disclosure. Optionally, the UE 116 could follow fixed rule(s)/relation(s) in the system specifications and/or higher layer RRC signaling/parameter and/or MAC CE command and/or dynamic DCI based L1 signaling to determine/identify which one or more of the determined/identified common/identical TCI state(s) as specified herein in the present disclosure that can be simultaneously used/applied for the STRP CC(s) and the SDCI based MTRP CC(s) in the same CC list as specified herein in the present disclosure.

In yet another example, the UE 116 could receive from the network 130 a sixth beam indication/activation MAC CE, e.g., (enhanced) unified TCI state activation/deactivation MAC CE, wherein the (unified) TCI states activated/provided/indicated in the sixth MAC CE could be used to map up to Ncp (e.g., Ncp=8) TCI codepoints of one or more TCI fields in a beam indication DCI; here, each of the TCI codepoints could include or comprise or could be mapped to one or multiple (e.g., 2) joint/DL/UL TCI states/pairs of joint/DL/UL TCI states. For the CC list comprising both STRP CCs and SDCI based MTRP CCs, the UE 116 could receive the sixth beam indication/activation MAC CE in/on the reference CC(s) and/or SDCI based MTRP CC(s) in the CC list.

For example, the UE 116 could follow fixed rule(s)/relation(s) in the system specifications to identify the fourth and/or sixth beam indication/activation MAC CE(s) to use for determining common TCI state(s) update/activation for the STRP CC(s) and the SDCI based MTRP CC(s) in the same CC list. In one example, the UE 116 could identify that the fourth beam indication/activation MAC CE could be used. In another example, the UE 116 could identify that the sixth beam indication/activation MAC CE could be used. In yet another example, the UE 116 could identify that both of the fourth and sixth beam indication/activation MAC CEs could be used. In yet another example, the UE 116 could identify that the fourth or the sixth beam indication/activation MAC CE that is with the lowest/highest ID/index, the lowest/highest number of activated TCI state(s)/TCI codepoint(s), received the earlies/latest in time and/or etc. could be used. The UE 116 could simultaneously apply/use the TCI state(s) provided/indicated/activated in/from the identified fourth and/or sixth beam indication/activation MAC CE(s) for the STRP CC(s) and the SDCI based MTRP CC(s) in the CC list according to those specified herein in the present disclosure.

For another example, the UE 116 could be indicated/configured/provided by the network 130, e.g., via higher layer RRC signaling/parameter and/or MAC CE command and/or dynamic DCI based L1 signaling, the fourth and/or sixth beam indication/activation MAC CE(s) to use for determining common TCI state(s) update/activation for the STRP CC(s) and the SDCI based MTRP CC(s) in the same CC list. The UE 116 could simultaneously apply/use the TCI state(s) provided/indicated/activated in/from the indicated/configured/provided fourth and/or sixth beam indication/activation MAC CE(s) for the STRP CC(s) and the SDCI based MTRP CC(s) in the CC list according to those specified herein in the present disclosure.

Yet for another example, the UE 116 could first determine/identify, e.g., following fixed rule(s)/relation(s) in the system specifications based on those specified herein in the present disclosure, and/or according to higher layer RRC signaling/parameter and/or MAC CE command and/or dynamic DCI based L1 signaling based on those specified herein in the present disclosure, the fourth and/or sixth beam indication/activation MAC CE(s) to use for determining common TCI state(s) update/activation for the STRP CC(s) and the SDCI based MTRP CC(s) in the same CC list. The UE 116 could then follow fixed rule(s)/relation(s) in the system specifications to identify one or more of the TCI states from/in the determined/identified fourth and/or sixth beam indication/activation MAC CE(s) to use for common TCI state(s) update/activation for the STRP CC(s) and the SDCI based MTRP CC(s) in the same CC list.

Yet for another example, the UE 116 could first determine/identify, e.g., following fixed rule(s)/relation(s) in the system specifications based on those specified herein in the present disclosure, and/or according to higher layer RRC signaling/parameter and/or MAC CE command and/or dynamic DCI based L1 signaling based on those specified herein in the present disclosure, the fourth and/or sixth beam indication/activation MAC CE(s) to use for determining common TCI state(s) update/activation for the STRP CC(s) and the SDCI based MTRP CC(s) in the same CC list. The UE 116 could then be indicated/configured/provided by the network 130, e.g., via higher layer RRC signaling/parameter and/or MAC CE command and/or dynamic DCI based L1 signaling, one or more (or which of) of the TCI states from/in the determined/identified fourth and/or sixth beam indication/activation MAC CE(s) to use for common TCI state(s) update/activation for the STRP CC(s) and the SDCI based MTRP CC(s) in the same CC list.

Yet for another example, the UE 116 could first determine/identify common or identical TCI state(s)/TCI state ID(s) that are activated/indicated/provided in both of the fourth and sixth beam indication/activation MAC CEs. The UE 116 could then simultaneously apply/use the determined/identified common/identical TCI state(s) for the STRP CC(s) and the SDCI based MTRP CC(s) in the CC list according to those specified herein in the present disclosure. Optionally, the UE 116 could follow fixed rule(s)/relation(s) in the system specifications and/or higher layer RRC signaling/parameter and/or MAC CE command and/or dynamic DCI based L1 signaling to determine/identify which one or more of the determined/identified common/identical TCI state(s) as specified herein in the present disclosure that can be simultaneously used/applied for the STRP CC(s) and the SDCI based MTRP CC(s) in the same CC list as specified herein in the present disclosure.

As specified herein in the present disclosure, for a CC list comprising both STRP CCs and SDCI based MTRP CCs, a UE could receive from the network 130 one or more Rel-17 beam indication/activation MAC CEs, e.g., unified TCI state activation/deactivation MAC CEs, wherein the (unified) TCI states activated/provided/indicated in each of the one or more MAC CEs could be used to map up to Ncp (e.g., Ncp=8) TCI codepoints of one or more TCI fields in a beam indication DCI; here, each of the TCI codepoints could include or comprise or could be mapped to a single joint/DL/UL TCI state/pair of joint/DL/UL TCI states. For the CC list comprising both STRP CCs and SDCI based MTRP CCs, the UE 116 could receive the one or more Rel-17 beam indication/activation MAC CEs in/on the reference CC(s) and/or STRP CC(s) in the CC list. The UE 116 could identify/determine, e.g., according to fixed rule(s)/relation(s) in the system specifications and/or higher layer RRC signaling/parameter and/or MAC CE command and/or dynamic DCI based L1 signaling, at least one received Rel-17 beam indication/activation MAC CE as specified herein (and therefore, one or more of the TCI states activated/provided/indicated therein) that can be simultaneously used/applied to one or more of the STRP CCs and one or more of the SDCI based MTRP CCs in the CC list, wherein (i) the one or more of the STRP CCs (or the one or more of the SDCI based MTRP CCs) could correspond to all the STRP CCs (or all the SDCI based MTRP CCs) in the CC list, (ii) the one or more of the STRP CCs (or the one or more of the SDCI based MTRP CCs), and their corresponding CC indexes/IDs, in the CC list, could be fixed in the system specifications, and/or (iii) the one or more of the STRP CCs (or the one or more of the SDCI based MTRP CCs), and their corresponding CC indexes/IDs, in the CC list, could be configured/indicated/provided by the network 130, e.g., via higher layer RRC signaling/parameter and/or MAC CE command and/or dynamic DCI based L1 signaling. The UE 116 could identify/determine, according to those specified herein in the present disclosure, the one or more of the TCI states activated/provided/indicated in the identified/determined Rel-17 beam indication/activation MAC CE(s), and use/apply the identified/determined one or more of the TCI states simultaneously for the STRP CC(s) and the SDCI based MTRP CC(s) in the same CC list.

In one example, the identified/determined Rel-17 beam indication/activation MAC CE as specified herein in the present disclosure could correspond to that with the lowest/highest MAC CE ID/index—e.g., among all of the received Rel-17 beam indication/activation MAC CEs, received the earliest/latest in time—e.g., among all of the received Rel-17 beam indication/activation MAC CEs, received in the (STRP) CC(s) with the lowest/highest CC ID(s)/index(es).

In another example, the UE 116 could be explicitly indicated/configured/provided by the network 130, e.g., via higher layer RRC signaling and/or MAC CE command and/or dynamic DCI based L1 signaling, whether or not a received Rel-17 beam indication/activation MAC CE could be used/applied simultaneously for the STRP CC(s) and the SDCI based MTRP CC(s) in the same CC list. For example, an (one-bit) indicator could be associated to/indicated for/configured for/provided/for a Rel-17 beam indication/activation MAC CE. When/if an (one-bit) indicator is set to '0' (or '1'), the UE 116 could identify/determine that the Rel-17 beam indication/activation MAC CE corresponding to the (one-bit) indicator could be used/applied simultaneously for the STRP CC(s) and the SDCI based MTRP CC(s) in the same CC list. Otherwise, e.g., when/if the (one-bit) indicator is set to '1' (or '0'), the UE 116 could identify/determine that the Rel-17 beam indication/activation MAC CE corresponding to the (one-bit) indicator could only be used/applied for the STRP CC(s) in the CC list or the CC(s) in which the Rel-17 beam indication/activation MAC CE is received.

In yet another example, the identified/determined Rel-17 beam indication/activation MAC CE as specified herein in the present disclosure could correspond to that having the number of TCI states/TCI codepoints activated/provided/indicated therein less than or equal to (or greater than or equal to) a threshold (e.g., 4, 8, 16). The UE 116 could be configured/provided/indicated by the network 130, e.g., via higher layer RRC signaling/parameter and/or MAC CE command and/or dynamic DCI based L1 signaling, the threshold value. Otherwise, i.e., if a received Rel-17 beam indication/activation MAC CE has the number of TCI states/TCI codepoints activated/provided/indicated therein greater than or equal to (or less than or equal to) a threshold (e.g., 4, 8, 16), it could only be used/applied for the STRP CC(s) in the CC list or the CC(s) in which the Rel-17 beam indication/activation MAC CE is received.

In yet another example, the UE 116 could be provided/indicated/configured by the network 130, e.g., via higher layer RRC signaling/parameter and/or MAC CE command and/or dynamic DCI based L1 signaling, one or more CCs (or CC IDs/indexes) in the CC list. The UE 116 could determine/identify that, the Rel-17 beam indication/activation MAC CE(s) as specified herein in the present disclosure that is received in the one or more CCs, could be used/applied simultaneously to the STRP CC(s) and the SDCI based MTRP CC(s) in the CC list.

In yet another example, when/if a Rel-17 beam indication/activation MAC CE as specified herein in the present disclosure is received after a time period/window from the reception of the last Rel-17 beam indication/activation MAC CE that can be used/applied simultaneously to the STRP CC(s) and the SDCI based MTRP CC(s) in the same CC list, the UE 116 would use/apply the Rel-17 beam indication/activation MAC CE as specified herein in the present disclosure simultaneously to the STRP CC(s) and the SDCI based MTRP CC(s) in the same CC list. The UE 116 could be indicated/provided/configured by the network 130, e.g., via higher layer RRC signaling/parameter and/or MAC CE command and/or dynamic DCI based L1 signaling, the time period/window.

As specified herein in the present disclosure, for a CC list comprising both STRP CCs and SDCI based MTRP CCs, a UE could receive from the network 130 one or more Rel-18 beam indication/activation MAC CEs, e.g., (enhanced) unified TCI state activation/deactivation MAC CEs, wherein the (unified) TCI states activated/provided/indicated in each of the one or more MAC CEs could be used to map up to Ncp (e.g., Ncp=8) TCI codepoints of one or more TCI fields in a beam indication DCI; here, each of the TCI codepoints could include or comprise or could be mapped to one or multiple (e.g., 2) joint/DL/UL TCI states/pairs of joint/DL/UL TCI states. For the CC list comprising both STRP CCs and SDCI based MTRP CCs, the UE 116 could receive the one or more Rel-18 beam indication/activation MAC CEs in/on the reference CC(s) and/or SDCI based MTRP CC(s) in the CC list. The UE 116 could identify/determine, e.g., according to fixed rule(s)/relation(s) in the system specifications and/or higher layer RRC signaling/parameter and/or MAC CE command and/or dynamic DCI based L1 signaling, at least one received Rel-18 beam indication/activation MAC CE as specified herein (and therefore, one or more of the TCI states activated/provided/indicated therein) that can be used/applied simultaneously to one or more of the STRP CCs and one or more of the SDCI based MTRP CCs in the CC list, wherein (i) the one or more of the STRP CCs (or the one or more of the SDCI based MTRP CCs) could correspond to all the STRP CCs (or all the SDCI based MTRP CCs) in the CC list, (ii) the one or more of the STRP CCs (or the one or more of the SDCI based MTRP CCs), and their corresponding CC indexes/IDs, in the CC list, could be fixed in the system specifications, and/or (iii) the one or more of the STRP CCs (or the one or more of the SDCI based MTRP CCs), and their corresponding CC indexes/IDs, in the CC list, could be configured/indicated/provided by the network 130, e.g., via higher layer RRC signaling/parameter and/or MAC CE command and/or dynamic DCI based L1 signaling. The UE 116 could identify/determine, according to those specified herein in the present disclosure, the one or more of the TCI states activated/provided/indicated in the identified/determined Rel-18 beam indication/activation MAC CE(s), and use/apply the identified/determined one or more of the TCI states simultaneously for the STRP CC(s) and the SDCI based MTRP CC(s) in the same CC list.

- In one example, the identified/determined Rel-18 beam indication/activation MAC CE as specified herein in the present disclosure could correspond to that with the lowest/highest MAC CE ID/index—e.g., among all of the received Rel-18 beam indication/activation MAC CEs, received the earliest/latest in time—e.g., among all of the received Rel-18 beam indication/activation MAC CEs, received in the (SDCI based MTRP) CC(s) with the lowest/highest CC ID(s)/index(es).
- In another example, the UE 116 could be explicitly indicated/configured/provided by the network 130, e.g., via higher layer RRC signaling and/or MAC CE command and/or dynamic DCI based L1 signaling, whether or not a received Rel-18 beam indication/activation MAC CE could be used/applied simultaneously for the STRP CC(s) and the SDCI based MTRP CC(s) in the same CC list. For example, an (one-bit) indicator could be associated to/indicated for/configured for/provided/for a Rel-18 beam indication/activation MAC CE. When/if an (one-bit) indicator is set to '0' (or '1'), the UE 116 could identify/determine that the Rel-18 beam indication/activation MAC CE corresponding to the (one-bit) indicator could be used/applied simultaneously for the STRP CC(s) and the SDCI based MTRP CC(s) in the same CC list. Otherwise, e.g., when/if the (one-bit) indicator is set to '1' (or '0'), the UE 116 could identify/determine that the Rel-18 beam indication/activation MAC CE corresponding to the (one-bit) indicator could only be used/applied for the SDCI based MTRP CC(s) in the CC list or the CC(s) in which the Rel-18 beam indication/activation MAC CE is received.
- In yet another example, the identified/determined Rel-18 beam indication/activation MAC CE as specified herein in the present disclosure could correspond to that having the number of TCI states/TCI codepoints activated/provided/indicated therein less than or equal to (or greater than or equal to) a threshold (e.g., 4, 8, 16). The UE 116 could be configured/provided/indicated by the network 130, e.g., via higher layer RRC signaling/parameter and/or MAC CE command and/or dynamic DCI based L1 signaling, the threshold value. Otherwise, i.e., if a received Rel-18 beam indication/activation MAC CE has the number of TCI states/TCI codepoints activated/provided/indicated therein greater than or equal to (or less than or equal to) a threshold (e.g., 4, 8, 16), it could only be used/applied for the SDCI based MTRP CC(s) in the CC list or the CC(s) in which the Rel-18 beam indication/activation MAC CE is received.
- In yet another example, the UE 116 could be provided/indicated/configured by the network 130, e.g., via higher layer RRC signaling/parameter and/or MAC CE command and/or dynamic DCI based L1 signaling, one or more CCs (or CC IDs/indexes) in the CC list. The UE 116 could determine/identify that the Rel-18 beam indication/activation MAC CE(s) as specified herein in the present disclosure that is received in the one or more CCs could be used/applied simultaneously to the STRP CC(s) and the SDCI based MTRP CC(s) in the CC list.
- In yet another example, when/if a Rel-18 beam indication/activation MAC CE as specified herein in the present disclosure is received after a time period/window from the reception of the last Rel-18 beam indication/activation MAC CE that can be used/applied simultaneously to the STRP CC(s) and the SDCI based MTRP CC(s) in the same CC list, the UE 116 would use/apply the Rel-18 beam indication/activation MAC CE as specified herein in the present disclosure simultaneously to the STRP CC(s) and the SDCI based MTRP CC(s) in the same CC list. The UE 116 could be indicated/provided/configured by the network 130, e.g., via higher layer RRC signaling/parameter and/or MAC CE command and/or dynamic DCI based L1 signaling, the time period/window.
- In yet another example, when/if any of the TCI codepoint(s) activated/provided/indicated in a Rel-18 beam indication/activation MAC CE comprises multiple (e.g., 2) joint/DL/UL TCI states or pairs of DL and UL TCI states:
  - For example, the UE 116 could determine/identify that the Rel-18 beam indication/activation MAC CE could only be used/applied for the SDCI based MTRP CC(s) in the CC list or the CC(s) in which the Rel-18 beam indication/activation MAC CE is received. Otherwise, the UE 116 could determine/identify that the Rel-18 beam indication/activation MAC CE could be used/applied simultaneously to the STRP CC(s) and the SDCI based MTRP CC(s) in the CC list.

For another example, the UE 116 could determine/identify that the Rel-18 beam indication/activation MAC CE could be used/applied simultaneously to the STRP CC(s) and the SDCI based MTRP CC(s) in the CC list. Otherwise, the UE 116 could determine/identify that the Rel-18 beam indication/activation MAC CE could only be used/applied for the SDCI based MTRP CC(s) in the CC list or the CC(s) in which the Rel-18 beam indication/activation MAC CE is received.

In yet another example, when/if any of the TCI codepoint(s) activated/provided/indicated in a Rel-18 beam indication/activation MAC CE comprises a single joint/DL/UL TCI state or pair of DL and UL TCI states:

For example, the UE 116 could determine/identify that the Rel-18 beam indication/activation MAC CE could only be used/applied for the SDCI based MTRP CC(s) in the CC list or the CC(s) in which the Rel-18 beam indication/activation MAC CE is received. Otherwise, the UE 116 could determine/identify that the Rel-18 beam indication/activation MAC CE could be used/applied simultaneously to the STRP CC(s) and the SDCI based MTRP CC(s) in the CC list.

For another example, the UE 116 could determine/identify that the Rel-18 beam indication/activation MAC CE could be used/applied simultaneously to the STRP CC(s) and the SDCI based MTRP CC(s) in the CC list. Otherwise, the UE 116 could determine/identify that the Rel-18 beam indication/activation MAC CE could only be used/applied for the SDCI based MTRP CC(s) in the CC list or the CC(s) in which the Rel-18 beam indication/activation MAC CE is received.

In yet another example, when/if one or more of the TCI codepoints activated/provided/indicated in a Rel-18 beam indication/activation MAC CE comprises a single joint/DL/UL TCI state or pair of DL and UL TCI states, and one or more of the TCI codepoints activated/provided/indicated in the same Rel-18 beam indication/activation MAC CE comprises multiple (e.g., 2) joint/DL/UL TCI states or pairs of DL and UL TCI states:

For example, the UE 116 could determine/identify that the Rel-18 beam indication/activation MAC CE could only be used/applied for the SDCI based MTRP CC(s) in the CC list or the CC(s) in which the Rel-18 beam indication/activation MAC CE is received. Otherwise, the UE 116 could determine/identify that the Rel-18 beam indication/activation MAC CE could be used/applied simultaneously to the STRP CC(s) and the SDCI based MTRP CC(s) in the CC list.

For another example, the UE 116 could determine/identify that the Rel-18 beam indication/activation MAC CE could be used/applied simultaneously to the STRP CC(s) and the SDCI based MTRP CC(s) in the CC list. Otherwise, the UE 116 could determine/identify that the Rel-18 beam indication/activation MAC CE could only be used/applied for the SDCI based MTRP CC(s) in the CC list or the CC(s) in which the Rel-18 beam indication/activation MAC CE is received.

In one example, for a CC list comprising both STRP and SDCI based MTRP CCs as specified herein in the present disclosure, a reference CC could correspond to a SDCI based MTRP CC in the CC list. For example, the reference CC could correspond to the SDCI based MTRP CC in the CC list with the lowest/highest (CC) ID/index (e.g., among all CCs in the CC list or among all SDCI based MTRP CCs in the CC list). For another example, the UE 116 could be provided/indicated/configured by the network 130, e.g., via higher layer RRC signaling/parameter and/or MAC CE command and/or dynamic DCI based L1 signaling, which one of the SDCI based MTRP CCs in the CC list could correspond to the reference CC. Yet for another example, the UE 116 could be provided/indicated/configured by the network 130, e.g., via higher layer RRC signaling/parameter and/or MAC CE command and/or dynamic DCI based L1 signaling, to disable or turn off the reference CC (e.g., the SDCI based MTRP reference CC). Yet for another example, when/if the SDCI based MTRP reference CC is configured to be or becomes to a STRP CC, the reference CC is disabled or turned off. Yet for another example, the UE 116 could identify Nsdci (e.g., Nsdci>1) SDCI based MTRP CCs in the CC list as candidate reference CCs according to fixed relationship(s)/rule(s) in the system specifications or network's indication/configuration via higher layer RRC signaling/parameter and/or MAC CE command and/or dynamic DCI based L1 signaling. For this case, the UE 116 could determine/identify, according to those specified herein in the present disclosure (e.g., based on fixed rule(s)/relationship(s) in the system specifications or via higher layer RRC signaling/parameter and/or MAC CE command and/or dynamic DCI based L1 signaling), the reference CC from the candidate reference CCs. When/if the reference CC is disabled or turned off or configured to be a STRP CC as specified here in the present disclosure, the candidate reference CC with the lowest/highest (CC) index/ID among all CCs or all candidate reference CCs in the CC list could be used/applied as the (new) reference CC. One or more TCI states/TCI codepoints activated by the (enhanced) unified TCI state activation/deactivation MAC CE received/used/applied in the reference CC (e.g., the reference SDCI based MTRP CC) could be simultaneously applied to the other CCs in the same CC list.

In one example, the first TCI state(s) of one or more TCI codepoints in the (enhanced) unified TCI state activation/deactivation MAC CE could be used for the STRP CCs in the same CC list. Alternatively, the second TCI state(s) of one or more TCI codepoints in the (enhanced) unified TCI state activation/deactivation MAC CE could be simultaneously used for the STRP CCs in the same CC list.

In another example, both of the first and second TCI states of one or more TCI codepoints in the (enhanced) unified TCI state activation/deactivation MAC CE could be simultaneously used for the SDCI based MTRP CCs (e.g., those other than the reference CC) in the same CC list.

In yet another example, for a CC in the CC list, the UE 116 could be configured/provided/indicated by the network 130, e.g., via higher layer RRC signaling/parameter and/or MAC CE command and/or dynamic DCI based L1 signaling, that the first, second or both of the TCI states of one or more TCI codepoints in the (enhanced) unified TCI state activation/deactivation MAC CE could be simultaneously used for the CC in the CC list (e.g., other than the reference CC).

For example, for a STRP CC in the CC list, the UE 116 could be configured/provided/indicated by the network 130, e.g., via higher layer RRC signaling/parameter and/or MAC CE command and/or dynamic DCI based L1 signaling, that the first or second TCI state(s) of one or more TCI codepoints in the (enhanced) unified TCI state activation/deactivation MAC CE could be simultaneously used for the STRP CC in the CC list (e.g., other than the reference CC).

For another example, for a SDCI based STRP CC in the CC list, the UE 116 could be configured/provided/indicated by the network 130, e.g., via higher layer RRC signaling/parameter and/or MAC CE command and/or dynamic DCI based L1 signaling, that the first, second or both of the TCI states of one or more TCI codepoints in the (enhanced) unified TCI state activation/deactivation MAC CE could be simultaneously used for the SDCI based STRP CC in the CC list (e.g., other than the reference CC).

In one example, the reference CC (e.g., the reference SDCI based MTRP CC) could (only) be configured with 'separate' TCI state update/type/mode, wherein each of the TCI codepoints activated by the (enhanced) unified TCI state activation/deactivation MAC CE could only comprise a full-set or any sub-set of {first DL TCI state, first UL TCI state, first DL TCI state, first UL TCI state}.

When only the first (or second) TCI state(s) could be simultaneously applied/used for one or more CCs (e.g., STRP CCs) configured with 'joint' TCI state update/type/mode in the same CC list according to those specified herein in the present disclosure, only the first (or second) DL TCI state is used, wherein for the 'joint' TCI state update/type/mode, each of the TCI codepoints activated by the (enhanced) TCI state activation/deactivation MAC CE could only comprise a full-set or any sub-set of {first joint TCI state, second joint TCI state}.

When only the first (or second) TCI state(s) could be simultaneously applied/used for one or more CCs (e.g., STRP CCs) configured with 'separate' TCI state update/type/mode in the same CC list according to those specified herein in the present disclosure, both of the first DL TCI state and the first UL TCI state (or both of the second DL TCI state and the second UL TCI state) are used.

When both of the first and second TCI states could be simultaneously applied/used for one or more CCs (e.g., SDCI based MTRP CCs other than the reference CC) configured with 'joint' TCI state update/type/mode in the same CC list according to those specified herein in the present disclosure, both of the first DL TCI state and the second DL TCI state are used.

When both of the first and second TCI states could be simultaneously applied/used for one or more CCs (e.g., SDCI based MTRP CCs other than the reference CC) configured with 'separate' TCI state update/type/mode in the same CC list according to those specified herein in the present disclosure, both of the first TCI state(s) and the second TCI state(s) are used.

In one example, the reference CC (e.g., the reference SDCI based MTRP CC) could (only) be configured with 'joint' TCI state update/type/mode, wherein each of the TCI codepoints activated by the (enhanced) unified TCI state activation/deactivation MAC CE could only comprise a full-set or any sub-set of {first joint TCI state, second joint TCI state}.

When only the first (or second) TCI state(s) could be simultaneously applied/used for one or more CCs (e.g., STRP CCs) configured with 'joint' TCI state update/type/mode in the same CC list according to those specified herein in the present disclosure, the first (or second) joint TCI state is used.

When only the first (or second) TCI state(s) could be simultaneously applied/used for one or more CCs (e.g., STRP CCs) configured with 'separate' TCI state update/type/mode in the same CC list according to those specified herein in the present disclosure, the first (or second) joint TCI state is used as the DL TCI state(s) for the one or more CCs. The UL TCI state(s) for the one or more CCs could still be determined/identified according to/based on the beam indication/activation MAC CE(s) received/applied in the one or more CCs.

When both of the first and second TCI states could be simultaneously applied/used for one or more CCs (e.g., SDCI based MTRP CCs other than the reference CC) configured with 'joint' TCI state update/type/mode in the same CC list according to those specified herein in the present disclosure, both of the first joint TCI state and the second joint TCI state are used.

When both of the first and second TCI states could be simultaneously applied/used for one or more CCs (e.g., SDCI based MTRP CCs other than the reference CC) configured with 'separate' TCI state update/type/mode in the same CC list according to those specified herein in the present disclosure, the first joint TCI state and the second joint TCI state are used as the first DL TCI state and the second DL TCI state for the one or more CCs. The UL TCI state(s) for the one or more CCs could still be determined/identified according to/based on the beam indication/activation MAC CE(s) received/applied in the one or more CCs.

In one example, all the CCs in the CC list (including the reference CC) should be configured with the same TCI state update type/mode (e.g., either 'joint'0 or 'separate). Optionally, the reference CC in the CC list should only/always be configured with 'separate' TCI state update/type/mode, or the reference CC in the CC list should only/always be configured with 'joint' TCI state update/type/mode.

In the present disclosure, a UE could be higher layer configured by the network 130, e.g., via a RRC parameter unifiedTCIState-type set to 'joint', to enable the 'joint' TCI state update/type/mode. Furthermore, a UE could be higher layer configured by the network 130, e.g., via a RRC parameter unifiedTCIState-type set to 'separate', to enable the 'separate' TCI state update/type/mode. The UE 116 could be indicated/configured/provided by the network 130, e.g., via higher layer RRC signaling/parameter and/or MAC CE command and/or dynamic DCI based L1 signaling, whether one or more TCI states of a TCI codepoint in the (enhanced) unified TCI state activation/deactivation MAC CE are the first TCI state(s), or the second TCI state(s) as specified herein in the present disclosure.

In one embodiment, as specified herein in the present disclosure, a UE could be indicated by the network 130, e.g., via one or more TCI codepoints of one or more TCI fields in a beam indication DCI, one or more TCI states for at least UE-dedicated reception on PDSCH/PDCCH or dynamic-grant/configured-grant based PUSCH or all of dedicated PUCCH resources. For a CC list comprising both STRP CCs and SDCI based MTRP CCs as specified herein in the present disclosure:

In one example, when/if the UE 116 receives the beam indication DCI in a STRP CC or a SDCI based MTRP CC or a reference CC as specified herein in the present disclosure in the CC list, the UE 116 could simultaneously use/apply one or more of the indicated TCI states to one or more of the STRP CCs and/or one or more of the SDCI based MTRP CCs in the CC list according to those specified herein in the present disclosure—e.g., following fixed rule(s)/relation(s) in the system specifications and/or higher layer RRC signaling/parameter and/or MAC CE command and/or dynamic DCI based L1 signaling to determine which one or more of the indicated TCI states and/or which one or more of the STRP CCs in the CC list and/or which one or more of the SDCI based MTRP CCs in the CC list and/or etc.

In another example, as specified herein in the present disclosure, the UE 116 could identify/determine that one or more of the TCI states activated/provided/indicated in one or more beam indication/activation MAC CEs could be simultaneously used/applied to the STRP CC(s) and the SDCI based MTRP CC(s) in the CC list. When/if one or more of the indicated TCI states belong to the one or more of the TCI states activated/provided/indicated in the beam indication/activation MAC CE(s), the UE 116 could simultaneously use/apply the one or more of the indicated TCI states to one or more of the STRP CCs and/or one or more of the SDCI based MTRP CCs in the CC list.

In yet another example, the beam indication DCI could also provide/indicate a 'Carrier Indicator' field. For this case, the UE 116 could use/apply one or more of the indicated TCI states simultaneously to one or more of the CCs or one or more of the CC lists or one or more of the CCs in one or more of the CC lists associated to/indicated by/identified by the 'Carrier Indicator' field. The UE 116 could follow those specified herein in the present disclosure, e.g., fixed rule(s)/relation(s) in the system specifications and/or higher layer RRC signaling/parameter and/or MAC CE command and/or dynamic DCI based L1 signaling, to determine/identify which one or more of the indicated TCI states and/or which one or more of the CCs and/or which one or more of the CC lists and/or which one or more of the CCs in which one or more of the CC lists associated to/indicated by/identified by the 'Carrier Indicator' field.

The simultaneous TCI state(s) configuration/activation/indication/update for a CC list comprising of one or more STRP CCs and one or more SDCI based MTRP CCs, as specified herein throughout the present disclosure, could be equally applied/extended to one or more of the following settings/scenarios:

A CC list comprising only STRP CCs;

A CC list comprising only SDCI based MTRP CCs;

A CC list comprising only MDCI based MTRP CCs, wherein each MDCI based MTRP CC could be associated/configured with a value of CORESET pool index;

A CC list comprising one or more STRP CCs and one or more MDCI based MTRP CCs, wherein each MDCI based MTRP CC could be associated/configured with a value of CORESETPoolIndex;

A CC list comprising one or more SDCI based MTRP CCs and one or more MDCI based MTRP CCs, wherein each MDCI based MTRP CC could be associated/configured with a value of CORESETPoolIndex; and/or A CC list comprising one or more STRP CCs and one or more SDCI based MTRP CCs and one or more MDCI based MTRP CCs, wherein each MDCI based MTRP CC could be associated/configured with a value of CORESETPoolIndex.

Any of the above variation embodiments can be utilized independently or in combination with at least one other variation embodiment.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE), comprising:

a transceiver configured to:

receive a threshold related to a quasi co-location (QCL) for applying a transmission configuration indication (TCI) state;

receive downlink control information (DCI) that schedules a physical downlink shared channel (PDSCH) with a scheduling offset between the DCI and the PDSCH; and a processor operably coupled to the transceiver, the processor configured to:

identify a value of a frequency range index, and determine to receive the PDSCH with a first TCI state or a second TCI state based on the value of the frequency range index, a capability of the UE to process two TCI states for a specific frequency range, and a comparison of the scheduling offset and the threshold, wherein the first and second TCI states are joint or downlink (DL) TCI states.

2. The UE of claim 1, wherein the processor is further configured to, when the value of the frequency range index is 2, the capability does not indicate support for processing two TCI states for a frequency range with index 2, and the scheduling offset is less than the threshold, determine to receive the PDSCH using the first TCI state.

3. The UE of claim 1, wherein the processor is further configured to:

determine to receive the PDSCH using the first TCI state or the second TCI state based on a TCI codepoint in the DCI, when the value of the frequency range index is 1, determine to receive the PDSCH using the first TCI state or the second TCI state based on the TCI codepoint, when the value of the frequency range index is 2 and the capability indicates support for processing two TCI states, and determine to receive the PDSCH using the first TCI state or the second TCI state based on the TCI codepoint, when the value of the frequency range index is 2, the capability does not indicate support for processing two TCI states for a frequency range with index 2, and the scheduling offset is equal to or larger than the threshold.

4. The UE of claim 3, wherein:

the TCI codepoint consists of 2 bits, when the TCI codepoint of '00' indicates to apply the first TCI state, when the TCI codepoint of '01' indicates to apply the second TCI state, when the TCI codepoint of '11' indicates to apply both the first and second TCI states, and the processor is configured to, when the TCI codepoint is not configured, determine to receive the PDSCH using both the first TCI state and the second TCI state.

5. A base station (BS), comprising:

a transceiver configured to:

transmit a threshold related to a quasi co-location (QCL) for applying a transmission configuration indication (TCI) state;

transmit downlink control information (DCI) that schedules a first physical downlink shared channel (PDSCH) with a scheduling offset between the DCI and the PDSCH; and a processor operably coupled to the transceiver, the processor configured to:

identify a value of a frequency range index, and determine to transmit the PDSCH with a first TCI state or a second TCI state based on the value of the frequency range index, a capability of the UE to process two TCI states for a specific frequency range, and a comparison of the scheduling offset and the threshold, wherein the first and second TCI states are joint or downlink (DL) TCI states.

6. The BS of claim 5, wherein the processor is further configured to, when the value of the frequency range index is 2, the capability does not indicate support for processing two TCI states for a frequency range with index 2, and the scheduling offset is less than the threshold, determine to transmit the PDSCH using the first TCI state.

7. The BS of claim 5, wherein the processor is further configured to:

determine to transmit the PDSCH using the first TCI state or the second TCI state based on a TCI codepoint in the DCI, when the value of the frequency range index is 1, determine to transmit the PDSCH using the first TCI state or the second TCI state based on the TCI codepoint, when the value of the frequency range index is 2 and the capability indicates support for processing two TCI states, and determine to transmit the PDSCH using the first TCI state or the second TCI state based on the TCI codepoint, when the value of the frequency range index is 2, the capability does not indicate support for processing two TCI states for a frequency range with index 2, and the scheduling offset is equal to or larger than the threshold.

8. The BS of claim 7, wherein:

the TCI codepoint consists of 2 bits, when the TCI codepoint of '00' indicates to apply the first TCI state, when the TCI codepoint of '01' indicates to apply the second TCI state, when the TCI codepoint of '11' indicates to apply both the first and second TCI states, and the processor is configured to, when the TCI codepoint is not configured, determine to transmit the PDSCH using both the first TCI state and the second TCI state.

9. A method performed by a user equipment (UE), the method comprising:

receiving a threshold related to a quasi co-location (QCL) for applying a transmission configuration indication (TCI) state;

receiving downlink control information (DCI) that schedules a physical downlink shared channel (PDSCH) with a scheduling offset between the DCI and the PDSCH;

identifying a value of a frequency range index; and determining to receive the PDSCH with a first TCI state or a second TCI state based on the value of the frequency range index, a capability of the UE to process two TCI states for a specific frequency range, and a comparison of the scheduling offset and the threshold, wherein the first and second TCI states are joint or downlink (DL) TCI states.

10. The method of claim 9, wherein determining to receive the PDSCH with the first TCI state or the second TCI state further comprises, when the value of the frequency range index is 2, the capability does not indicate support for processing two TCI states for a frequency range with index 2, and the scheduling offset is less than the threshold, determining to receive the PDSCH using the first TCI state.

11. The method of claim 9, wherein determining to receive the PDSCH with the first TCI state or the second TCI state further comprises:

determining to receive the PDSCH using the first TCI state or the second TCI state based on a TCI codepoint in the DCI, when the value of the frequency range index is 1, determining to receive the PDSCH using the first TCI state or the second TCI state based on the TCI codepoint, when the value of the frequency range index is 2 and the capability indicates support for processing two TCI states, and determining to receive the PDSCH using the first TCI state or the second TCI state based on the TCI codepoint, when the value of the frequency range index is 2, the capability does not indicate support for processing two TCI states for a frequency range with index 2, and the scheduling offset is equal to or larger than the threshold.

12. The method of claim 11, wherein:

the TCI codepoint consists of 2 bits, the TCI codepoint of '00' indicates to apply the first TCI state, the TCI codepoint of '01' indicates to apply the second TCI state, the TCI codepoint of '11' indicates to apply both the first TCI state and the second TCI state, and determining to receive the PDSCH with the first TCI state or the second TCI state further comprises when the TCI codepoint is not configured, determining to receive the PDSCH using both the first TCI state and the second TCI state.

* * * * *